US012497441B2

(12) United States Patent
Sato et al.

(10) Patent No.: US 12,497,441 B2
(45) Date of Patent: Dec. 16, 2025

(54) COMPOSITIONS AND METHODS FOR ALPHA-1-ANTITRYPSIN DISORDERS

(71) Applicant: SPIN THERAPEUTICS, LLC, Berkeley, CA (US)

(72) Inventors: Aaron Sato, Berkeley, CA (US); Mark DeSouza, Berkeley, CA (US)

(73) Assignee: SPIN THERAPEUTICS, LLC, Berkeley, CA (US)

( * ) Notice: Subject to any disclaimer, the term of this patent is extended or adjusted under 35 U.S.C. 154(b) by 775 days.

(21) Appl. No.: 17/289,136

(22) PCT Filed: Oct. 29, 2019

(86) PCT No.: PCT/US2019/058673

§ 371 (c)(1),
(2) Date: Apr. 27, 2021

(87) PCT Pub. No.: WO2020/092448

PCT Pub. Date: May 7, 2020

(65) Prior Publication Data

US 2021/0388059 A1 Dec. 16, 2021

Related U.S. Application Data

(60) Provisional application No. 62/752,182, filed on Oct. 29, 2018.

(51) Int. Cl.

| | |
|---|---|
| ***C07K 14/81*** | (2006.01) |
| ***A61K 38/00*** | (2006.01) |
| ***C07K 14/765*** | (2006.01) |

(52) U.S. Cl.

CPC ........ *C07K 14/8125* (2013.01); *C07K 14/765* (2013.01); *A61K 38/00* (2013.01); *C07K 2319/31* (2013.01)

(58) Field of Classification Search

CPC .............. C07K 14/765; C07K 14/8125; C07K 2319/31; C12N 15/62; A61K 38/00

See application file for complete search history.

(56) References Cited

U.S. PATENT DOCUMENTS

| | | | | |
|---|---|---|---|---|
| 7,419,801 | B2 | 9/2008 | Barr et al. | |
| 8,980,266 | B2 * | 3/2015 | Eckelman | A61P 3/10 530/391.1 |
| 9,920,109 | B2 * | 3/2018 | Eckelman | A61P 31/04 |
| 10,400,029 | B2 * | 9/2019 | Eckelman | C07K 14/7155 |
| 10,723,785 | B2 * | 7/2020 | Eckelman | A61P 37/00 |

(Continued)

FOREIGN PATENT DOCUMENTS

| | | | |
|---|---|---|---|
| CN | 103917563 | A | 7/2014 |
| JP | 2014-523900 | A | 9/2014 |

(Continued)

OTHER PUBLICATIONS

International Preliminary Report on Patentability for PCT International Application No. PCT/US2019/058673, patent report dated Apr. 27, 202, 10 pages.

(Continued)

*Primary Examiner* — Randall L Beane

(74) *Attorney, Agent, or Firm* — Foley & Lardner LLP

(57) ABSTRACT

Disclosed herein are compositions and methods useful for treating an alpha-1-antitrypsin deficiency.

9 Claims, 29 Drawing Sheets

Specification includes a Sequence Listing.

(56) References Cited

U.S. PATENT DOCUMENTS

| | | | | |
|---|---|---|---|---|
| 10,730,929 | B2 * | 8/2020 | Eckelman | A61P 37/06 |
| 2003/0199043 | A1 * | 10/2003 | Ballance | A61P 31/14 435/325 |
| 2007/0269442 | A1 | 11/2007 | Webber et al. | |
| 2008/0131399 | A1 | 6/2008 | Ballance et al. | |
| 2012/0094356 | A1 | 4/2012 | Chung et al. | |
| 2013/0011398 | A1 * | 1/2013 | Eckelman | A61P 31/04 514/3.3 |
| 2018/0273610 | A1 * | 9/2018 | Huntington | A61P 7/02 |
| 2020/0354433 | A1 * | 11/2020 | Lin | C07K 1/20 |
| 2021/0024613 | A1 | 1/2021 | Eckelman et al. | |

FOREIGN PATENT DOCUMENTS

| | | | |
|---|---|---|---|
| WO | 200179271 | A1 | 10/2001 |
| WO | 2008028977 | A2 | 3/2008 |
| WO | 2008086524 | A2 | 7/2008 |
| WO | 2009066807 | A1 | 5/2009 |
| WO | 2010123290 | A2 | 10/2010 |
| WO | 20011123830 | A2 | 10/2011 |
| WO | 2013003641 | A2 | 1/2013 |
| WO | 2013106589 | A1 | 7/2013 |
| WO | 2016069574 | A1 | 6/2016 |
| WO | 2018183705 | A1 | 10/2018 |
| WO | 2019148848 | A1 | 8/2019 |

OTHER PUBLICATIONS

International Search Report for PCT International Application No. PCT/US2019/058673, search report dated Jan. 4, 2020, 8 pages.

Taggart, C., et al., Oxidation or either Methionine 351 or Methionine 358 in Alpha1-Antitrypsin Causes Loss of Anti-neutrophil Elastase Activity, The Journal of Biological Chemistry , vol. 275, Issue 35, pp. 27258-27265 (Sep. 2000).

Baek, Je-Hyun, et al., "Probing the Local Conformational Change of Alpha1-antitrypsin," Protein Science, vol. 16 , pp. 1842-1850 (Sep. 2007).

Dafforn, T., et al., "A Kinetic Mechanism for the Polymerization of Alpha1-Antitrypsin," The Journal of Biological Chemistry, vol. 274, Issue 14, pp. 9548-9555 (Apr. 1999).

Parfrey, H., et al., "Targeting a Surface Cavity of Alpha1-Antitrypsin to Prevent Conformational Disease," The Journal of Biological Chemistry, vol. 278, No. 35, pp. 33060-33066 (Aug. 2003).

Seo, E., et al., "Distribution of the Native Strain in Human alpha1-Antitrypsin and Its Association with Protease Inhibitor Function," The Journal of Biological Chemistry, vol. 275, No. 22, pp. 16904-16909 (Mar. 20, 2000).

Irving, J., et al., Altered Native Stability is the Dominant Basis for Susceptibility of Alpha1-Antitrypsin Mutants to Polymerization, Journal of Biochem., vol. 460, pp. 103-115 (May 15, 2014).

Official Action for Japanese Patent Application No. 2021-548539 dated Sep. 13, 2023 with English translation.

Official Action for Chinese Patent Application No. 201980084112.0 dated Aug. 26, 2023 with English translation.

Stockley, Robert A. et al., "α-1-Antitrypsin deficiency: clinical variability, assessment, and treatment" Trends in Molecular Medicine Feb. 2014, vol. 20, No. 2, pp. 105-115.

Hatipolu U, Stoller JK. α1-Antitrypsin Deficiency. Clin Chest Med. Sep. 2016;37(3):487-504. doi: 10.1016/j.ccm.2016.04.011. Epub Jun. 26, 2016. PMID: 27514595.

Janciauskiene, Sabina M. et al., "The discovery of α1-antitrypsin and its role in health and disease", Respiratory Medicine (2011) 105, 1129-1139.

Stone, H., "Disease associations in alpha-1-antitrypsin", Respiratory Medicine (2014) 108, 338-343.

[No Author Listed] Alpha-1-To-One magazine (2016) vol. 14, No. 3, published by The Alpha-1 Foundation, Coral Gables, FL, 32 pages.

Ghouse, Raafe et al., "Mysteries of α1-antitrypsin deficiency: emerging therapeutic strategies for a challenging disease", The Company of Biologists Ltd, Disease Models & Mechanisms (2014) 7, 411-419 DOI: 10.1242/dmm.014092.

Blanco, Ignacio et al., "Efficacy of alpha 1-antitrypsin augmentation therapy in conditions other than pulmonary emphysema", Orphanet Journal of rare Diseases 2011, 6:14.

Baek, Je-Hyun, et al., "Probing the Local Conformational change of α1-antitrypsin" Protein Science (2007), 16:1842-1850.

Korkmaz, Brice, et al., "Inhibition of Neutrophil Elastase a1-Protease Inhibitor at the Surface of Human Polymorphonuclear Neutrophils", The Journal of Immunology 2005, 175:3329-3338, doi: 10.4049/jimmunol.175.5.3329.

Ordonez, Adriana, et al., "A signle-chain variable fragment intrabody prevents intracellular polymerization of Z α1-antitrypsin while allowing its antiproteinase activity", FASEB J. Jun. 2015; 29(6): 2667-2678.

Lussier, Bethany, "Chapter 2, Alpha-1 Antitrypsin: The Protein", Springer International Publishing Switzerland 2016, A. Wanner, R.S. Sandhaus (eds.), Alpha-1 Antitrypsin, Respiratory Medicine, DOI 10.1007/978-3-319-23449-6_2 pp. 17-30.

Azam, Tania, et al., "Recombinant alpha-1 antitrypsin-Fc (AAT-Fc) inhibits candida-induced IL 1β secretion from human CD14 monocytes: comparison to plasma-derived AAT and caspase 1 inhibition", Abstract / Cytokine 63 (2013) 245-314.

Purkayastha, Pradipta, et al., "α1-Antitrypsin Polymerization: A Fluorescence Correlation Spectroscopic Study", Biochemistry 2005, 44, 2642-2649.

Kandregula, Chaya S. Babu, et al., "Alpha-1 antitrypsin: Associated diseases and therapeutic uses", Clinica Chimica Acta 459 (2016) 109-116.

[No Author Listed], "Alpha 1 anti-trypsin (/Alpha+1+anti-trypsin)", article retrieved from afa20161030amcase6.wikispaces.com/Alpha+1+anti-trypsin on Feb. 7, 2017, 7 pages.

Santangelo, S., et al., Alpha1 Antitrypsin Deficiency: Current Perspective from Genetics to Diagnosis and Therapeutic Approaches, Curr Med Chem. Nov. 18, 2016, 2 pages.

Miravitlles, Marc, et al., "Alpha-1-antitrypsin and other proteinase inhibitors", Current Opinion in Pharmacology 2012, 12:309-314.

Bals, Robert, "Alpha-1-antitrypsin deficiency", Best Practice & Research Clinical Gastroenterology 24 (2010) 629-633.

Kelly, Emer, et al., "Alpha-1 antitrypsin deficiency", Respiratory Medicine CME 4 (2011) 1-8.

Joosten, LA, et al., "Alpha-1-antitrypsin-Fc fusion protein ameliorates gouty arthritis by reducing release and extracellular processing of IL-1β and by the induction of endogenous IL-1Ra", Ann Rheum Dis. Jun. 2016;75(6):121927. doi: 10.1136/annrheumdis2014206966. Epub Jul. 14, 2015.

Irving, James A., et al. "Altered native stability is the dominant basis for susceptibility of α1-antitrypsin mutants to polymerization", Biochem. J. (2014) 460, 103-115 (Printed in Great Britain) doi: 10.1042/BJ20131650.

Smith, Bryan J., et al., "Prolonged in Vivo Residence Times of Antibody Fragments Associated with Albumin", Bioconjugate Chem. 2001, 12, 750-756.

Motamedi-Shad, Neda, et al., "An antibody that prevents serpin polymerisation acts by inducing a novel allosteric behaviour", Biochemical Journal (2016) 473 3269-3290 DOI: 10.1042/BCJ20160159.

Osborne, Randy, "Drinking in Profitability with Multiple AAT bids on Tap" Bioworld Today, Mar. 16, 2017, vol. 28, No. 51, pp. 1, 3.

Haq, Imran, et al., "Reactive centre loop mutants of α-1-antitrypsin reveal position-specific effects on intermediate formation along the polymerization pathway", Biosci. Rep. (2013) / 33 / art:e00046 / doi 10.1042/BSR20130038, pp. 499-511.

Cantin, Andre M., et al., "Polyethylene Glycol Conjugation at Cys232 Prolongs the Half-Life of 1 Proteinase Inhibitor", Am. J. Respir. Cell Mol. Biol. vol. 27. pp. 659-665, 2002 DOI: 10.1165/rcmb.4866.

Chang, Wun-Shaing W., et al., "Importance of the release of strand 1C to the polymerization mechanism of inhibitory serpins", Protein Science (1997). 6:89-98. Cambridge University Press, pp. 89-98.

(56) References Cited

OTHER PUBLICATIONS

Sandhaus, Robert A., "Pulmonary Function in Osteogenesis Imperfecta", Elsevier, Inc., 2014 Chapter 35, pp. 335-342 DOI: http://dx.doi.org/10.1016/B978-0-12-397165-4.00035-6.
Sandhaus, Robert A., "α1-Antitrypsin Deficiency" Pediatric Respiratory Medicine, 2008, Second Edition, Part 13, Miscellaneous Disorders, Chapter 71, pp. 1015-1023.
Deterding, Robin R., et al., "Thoracic Tumers" Pediaric Respiratory Medicine, 2008, Second Editional, Part 13, Mescellaneous Disorders, Chapter 72, p. 1025-1030.
Campos, Michael A., et al., Clinical Characteristics of Subjects with Symptoms of α1-Antitrypsin Deficiency Order Than 60 years*, www.chestjournal.org, Mar. 2009, pp. 600-608.
Yamasaki, Masayuki, et al., "Crystal structure of a stable dimer reveals the molecular basis of serpin polymerization", Nature| vol. 455|Oct. 30, 2008 pp. 1255-1259.
Lee, Siyoung, et al., "Effect of Recombinant α1-Antitrypsin Fc-Fused (AAT-Fc) Protein on the Inhibition of inflammatory Cytokine Production and Streptozotocin-Induced Diabetes", Mol Med 19:65-71, 2013.
Boxio, Rachel, et al., "Neutrophil elastase cleaves epithelial cadherin in acutely injured lung epithelium", Respiratory Research (2016) 17:129, DOI 10.1186/s12931-016-0449-x.
Werb, Ph.D, Zena, et al., "Elastases and Elastin Degradation", The Journal of Investigative Dermatology, 79:1548-1598, 1982.
Yamasaki, Masayuki, et al., "Molecular basis of α1-antitrypsin deficiency revealed y the structure of a domain-swapped trimer", EMBO reports, vol. 12 No. 10, 2011, pp. 1011-1017.
Campos, Michael A., "Exacerbations in subjects with alpha-1 antitrypsin deficiency receiving augmentation therapy", Respiratory Medicine (2009) 103, 1532-1539.
Law, Ruby HP, et al., "An overview of the serpin superfamily", Genome Biology 2006, 7:216 (doi:10.1186/GB-2006-7-5-216).
Gilis, Dimitri, et al., "In Vitro and in Silico Design of α1-antitrypsin Mutants with Different Conformational Stabilities", J. Mol. Biol. (2003) 325, 581-589.
Holliger, Philipp, et al., "Retargeting serum immunoglobulin with bispecific diabodies", Nature biotechnology, vol. 15, Jul. 1997, pp. 632-636.
Holt, Lucy J., et al., "Anti-serum albumin domain antibodies for extending the half-lives of short lived drugs", Protein Engineering, Design & Selection vol. 21 No. 5 pp. 283-288, 2008.
Dumont, Jennifer, et al., "Human cell lines for biopharmaceutical manufacturing: history, status, and future perspectives", Crit Rev Biotechnol, 2016; 36(6): 1110-1122, 2015 Biogen. DOI: 10.3109/07388551.2015.1084266.
Ghaedi, Mahboobe, et al., "Expression of recombinant alpha-1 antitrypsin in CHO and COS-7 cell lines using lentiviral vector", Iranian Journal of Biotechnology, vol. 7, No. 3, Jul. 2009, pp. 148-156.
Im, Hana, et al., "Metastability in the Inhibitory Mechanism of Human α1-Antitrypsin", The Journal of Biological Chemistry, vol. 274, No. 16, Issue of Apr. 16, pp. 11072-11077, 1999.
Ehlers, Mario R., "Immune-modulating effects of alpha-1 antitrypsin", Biol Chem. Oct. 2014 ; 395(10): 1187-1193. doi:10.1515/hsz-2014-0161.
Chapman, Kenneth R., "Intravenous augmentation treatment and lung density in severe α1 antitrypsin deficiency (RAPID): a randomised, double-blind, placebo-controlled trial", Lancet 2015; 386: 360-68.
Travis, James, et al., "Isolation and Properties of Recombinant DNA Produced Variants of Human α1-Proteinase Inhibitor", The Journal of Biological Chemistry, vol. 260, No. 7, Issue of Apr. 10, pp. 4384-4389 1985.
Matheson, Nancy R., et al., "Recombinant DNA-derived Forms of Human α1-Proteinase inhibitor", The Journal of Biological Chemistry, vol. 261, No. 22, Issue of August 5, pp. 10404-10409, 1986.
Sivasothy, Pasupathy, et al., "Pathogenic α1-Antitrypsin Polymers Are Formed by Reactive Loop-β-Sheet A Linkage", The Journal of Biological Chemistry, vol. 275, No. 43, Issue of Oct. 27, pp. 33663-33668, 2000.
Griffiths, Steven W., "The Reactivity and Oxidation Pathway of Cysteine 232 in Recombinant Human α1-Antitrypsin", The Journal of Biological Chemistry, vol. 277, Issue of Jul. 12, pp. 25486-25492, 2002.
Shin, Jong-Shik, et al., "Kinetic Dissection of α1-Antitrypsin Inhibition Mechanism", The Journal of Biological Chemistry, vol. 277, No. 14 Issue of April 5, pp. 11629-11635, 2002.
Janciauskiene, Sabina M., "α1-Antitrypsin, Old Dog, New Tricks, a1-Antitrypsin Exerts in Vitro Anti-Inflammatory Activity in Human Monocytes by Elevating camp", The journal of Biological Chemistry, vol. 282, No. 12, pp. 8573-8582. Mar. 23, 2007.
Lomas, David A., et al., Update on Alapha-1 antitrypsin deficiency; New therapies, Journal of Hepatology, 2016 vol. 65 pp. 413-424.
Taggart, Clifford, et al., "Oxidation of Either Methionine or Methionine in α1-Antitrypsin Causes", JBC Papers in Press. Published on Jun. 23, 2000 as Manuscript M004850200, pp. 2-43.
Hubbard, Richard C., et al., "Recombinant DNA-produced α1-Antitrypsin Administered by Aerosol Augments Lower Respiratory Tract Antineutrophil Elastase Defenses in Individuals with a1-Antitrypsin Deficiency", The Journal of Clinical Investigation, Inc., vol. 84, Oct. 1989, 1349-1354.
Knaupp, Anja S., et al., "The Roles of Helix I and Strand 5A in the Folding, Function and Misfolding of α1-Antitrypsin", PLOS One, Jan. 2013, vol. 8, Issue 1, E54766, pp. 1-8.
Berthelier, Valerie, et al., "Discovery of an Inhibitor of Z-Alpha 1 Antitrypsin Polymerization", PLOS One, DOI: 1.1371/Journal. pone.0126256, May 2015 pp. 1-18.
Karadagi, Ahmad, et al., "Exogenous alpha 1-antitrypsin down-regulates SERPINA1 expression", Plos One | https://doi.org/10.1371/journal.pone.0177279 May 9, 2017 pp. 1-13.
Timmer, PhD, John, Overcoming AAT deficiency with an optimized AAT-Fx: INBRX-101, Presentation Apr. 25, 2016, pp. 1-18.
Knaupp, Anja S., et al., "Structural Change in B-Sheet A of Z α1-Antitrypsin is Responsible for Accelerated Polymerization and Disease", J. Mol. Biol. (2011) 413, 888-898.
Korkmaz, Brice, et al., "Inhibition of Neutrophil Elastase by α 1-Protease Inhibitor at the Surface of Human Polymorphonuclear Neutrophils", J Immunol 2005; 175:3329-3338; doi: 10.4049/jimmunol.175.5.3329.
McElvaney, Noel G., "Alpha-1 Antitrypsin Therapy in Cystic Fibrosis and the Lung Disease Associated with Alpha-1 Antitrypsin Deficiency", AnnalsATS vol. 13 Supplement Apr. 2, 2016 pp. S191-S196.
No author listed], "Might your respiratory patient have alpha-1 antitrypsin deficiency?", Heart & Lung The Journal of Acute and Critical Care 44 (2015) pp. 463-464.
Miranda, Elena, et al., a Novel Monoclonal Antibody to Characterize Pathogenic Polymers in Liver Disease Associated with α1-Antitrypsin Deficiency, Hepatology, vol. 52, No. 3, 2010, pp. 1078-1088.
Toonen, Erik JM, et al., "Activation of roteinase 3 Contibutes to Nonalcoholic Fatty Liver Disease and Insulin Resistance", Molecular Medicine 22:202-214, 2016.
Marcus, Nancy Y, et al., "Oxidative stress contributes to liver damage in a murine model of alpha-1-antitrypsin deficiency", Biol Med (Maywood). Oct. 1, 2012; 237(10): 1163-1172. doi:10.1258/ebm.2012.012106.
Parfrey, Helen, et al., "Protein Structure and Folding: Targeting a Surface Cavity of α1-Antitrypsin to Prevent Conformational Disease", J. Biol. Chem. 2003, 278:33060-33066. doi: 10.1074/jbc.M302646200 originally published online Jun. 13, 2003.
Cantin, Andre M., et al., "Polyethylene Glycol Conjugation as Cys232 Prolongs the Half-Life of α1 Proteinase Inhibitor", Am. J. Respir. Cell Mol. Biol. vol. 27, pp. 659-665, 2002 DOI: 10.1165/rcmb.4866.
Jonigk, Danny, et al., "Anti-inflammatory and immunomodulatory properties of α1-antitrypsin without inhibition of elastase", PNAS, Sep. 10, 2013, vol. 110, No. 37, pp. 15007-15012.
Ekeowa, Ugo I., et al., "Defining the mechanism of plymerization in the serpinopathies", 17146-17151, PNAS, Oct. 5, 2010, vol. 107, No. 40.

(56) References Cited

OTHER PUBLICATIONS

Lindhout, Theresa, et al., "Site-specific enzymatic polysialylation of therapeutic proteins using bacterial enzymes", PNAS, May 3, 2011, vol. 108, No. 18 pp. 7397-7402.
Dafforn, Timothy R., et al., "A Kinetic Mechanism for the Polymerization of α1-Antitrypsin", The Journal of Biological Chemistry, vol. 274, No. 14, Issue of Apr. 2, pp. 9548-9555, 1999.
McCarthy, Cormac, et al., The Role and Importance of Glycosylation of Acute Phase Proteins with Focus on Alpha-1 Antitrypsin in Acute and Chronic Inflammatory Conditions, Journal of Proteome Research, 2014, 13, pp. 3131-3143.
Hoefman, Sven, et al., "Pre-Clinical Intravenous Serum Pharmacokinetics of Albumin Binding and Non-Half-Life Extended Nanobodies", Antibodies 2015, 4, 141-156; doi: 10.3390/antib4030141.
Castilho, Alexandra, et al., "Proteolytic and N-Glycan Processing of Human α1-Antitrypsin Expressed in Nicotiana Benthamiana", American Society of Plant Biologists, Plant Physiology, Dec. 2014, vol. 166, pp. 1839-1851.
Losseff, Maxine S., et al., Zemaira Alpha 1-proteinase inhibitor (Human), P&T, vol. 35, Issue 3, Mar. 2010, Section two, pp. 1-23.
Arjmand, Sareh, et al., "Expression and Purification of Fuctionally Active Recombinant Human Alpha 1-Antitrypsin in Methylotrophic Yeast Pichia pastoris", Avicenna Journal of Medical Biotechnology, vol. 3, No. 3, Jul.-Sep. 2011, pp. 127-134.
Henao, MP, et al., "Recent advances in understanding and treating COPD related to α1-antitrypsin deficiency", P Expert Rev Respir Med. Nov. 4, 2016:114, pp. 1-2.
Kelly,E., et al., Letter to the Editor, Alpha-1-antitrypsin deficiency, Respiratory Medicine (2010) 104, 1956-1957.
Gettins, Peter G.W., "Serpin Structure, Mechanism, and Function", Chem Rev. 2002, 102, pp. 4751-4803.
Stoller, MD, MS, James K., "Alpha-1 antitrypsin deficiency: an Underrecognized, treatable cause of COPD", Cleveland Clinic journal of Medicine, vol. 83, No. 7, Jul. 2016, pp. 507-514.
Tan, Lu, et al., "Characterising the association of latency with α1-antitrypsin polymerisation using a novel monclonal antibody", the International Journal of Biochemistry & Cell Biology 58, (2015) pp. 81-91.
Greulich, T., et al., "The prevalence of diagnosed α1-antitrypsin deficiency and its comorbidities: results from a large population-based database", Eur Respir J. Oct. 20, 2016. pii: ERJ001542016. doi: 10.1183/13993003.001542016.
Gooptu, Bibek, et al., "The molecular and cellular pathology of α1-antitrypsin deficiency", Trends in Molecular Medicine, Feb. 2014, vol. 20, No. 2, pp. 116-127.
Holm, Kristen E., "The prospective association of perceived criticism with Dyspnea in Chronic lung disease", Journal of Psychosomatic Research, 74 (2013) pp. 450-453.
Ferrarotti, Ilaria, et al., Update on α1-antitrypsin deficiency, Breathe Jun. 2018; vol. 14, No. 1 :e17-e24.
[No Author Listed] "Opportunity of Collaboration: AlbudAb Half-Life Extension Platform", article retrieved from GSK, Apr. 18, 2014, 1 page.
Capman, Kenneth R., et al., "Intravenous augmentation treatment and lung density in severe a1 antitrypsin deficiency (RAPID): a randomised, double-blind, placebo-controlled trial", The Lancet. Published online May 28, 2015; www.thelancet.com, http://dx.doi.org/10.1016, S0141-6736(15)60860-1.
[No Author Listed], CEVEC Pharma Introduces CAP Go Expression System For Scalable Production of Tailor-Made Glycoproteins—BioSpace, Jun. 1, 2015, pp. 1-9; https://www.biospace.com/cevec-pharma-introduces-cap-go-expression-system-for-scalable-production-of-tailor-made-glycoproteins.
Li, Yan, et al., α1-antitrypsin promotes lung adenocarcinoma metastasis through upregulating fibronection expression, International Journal of Oncology 50: 1955-1964, Apr. 18, 2017; DOI: 10.3892/ijo.2017.3962.
Miranda, Elena, et al., "The pathological Trento variant of Alpha-1-antitrypsin (E75V) shows nonclassical behaviour during polymerization" The FEBS Journal Jun. 8, 2017 pp. 1-17.
Boerema, David J., et al., "Biochemical comparison of four commercially available human a1-proteinase inhibitors for treatment of α1-antitrypsin deficiency", Biologicals vol. 50, Nov. 2017, 63-72. https://doi.org/10.1016/j.biologicals.2017.08.010.
Rahaghi, Franck F., et al., "Long-term clinical outcomes following treatment with alpha 1-proteinase inhibitor for COPD associated with alpha-1 antitrypsin deficiency: a look at the evidence", Respiratory Research May 30, 2017; 18:105, pp. 1-9 DOI 10.1186/S12931-017-0574-1.
Jonigk, Danny, et al., "Anti-inflammatory and immunomodulatory properties of α1-antitrypsin without inhibition of elastase", PNAS, Sep. 10, 2013, vol. 110, No. 37, pp. 15007-15012; Support Information.

* cited by examiner

SR8163 CE-SDS of purified PP12288 (ATT)

SR8163 CE-SDS of purified PP12289 (C232S)

2017-11-02_02-36-51

SR8163 CE-SDS of purified PP12290 (M351V, M358V)

2017-11-02_02-36-51

SR8163 CE-SDS of purified PP12291 (M351V, M358L)

SR8163 CE-SDS of purified PP12292 (C232S, M351V, M358L)

CE-SDS of Purified Samples (Reduced Overlay)

Stability Analysis of 5 AAT-Albumin Fusions
All 5 Fusions Show Similar Stability

*Summary:*

| | | AAT | | | HSA | | | |
|---|---|---|---|---|---|---|---|---|
| *No.* | *Sample* | *Tm1* (°C) | *Tm2* (°C) | *Tm3* (°C) | *Tm4* (°C) | *Tm5* (°C) | *Taqq 266* (°C) | *Taqq 473* (°C) |
| 1 | AAT (PP12288) | 49.3 | 60.3 | | 76.3 | 87.2 | 55.2 | 48.2 |
| 2 | C232S (PP12289) | 46.5 | 59.9 | 70.5 | 77.2 | | 55.9 | 68.6 |
| 3 | M351V, M358V (PP12290) | 49.9 | 59.9 | | 77.2 | | 51.9 | 46.7 |
| 4 | M351V, M358L (PP12291) | 46.9 | 58.8 | 73.6 | 77.6 | | 51.9 | 46.7 |
| 5 | C232S, M351V, M358L (PP12292) | 46.5 | 60.9 | | 78.3 | | 56.3 | 48.5 |

Plasma AAT was dissolved in assay buffer and the concentration was measured using the Extinction Coefficient of 25400 and the molecular weight of 52,000

CE-SDS of PP13589 F51L/S283C/P361C

CE-SDS of PP13590 G117F/K331F

CE-SDS of PP13594 G117F/S283C/P361C

CE-SDS of PP13595 K331F/K335A

CE-SDS of PP13600 K168C/F189C/S283C/P361C

HSA (→ Tm3) AAT (→ Tm4)

| *Client Name* | *PP#* | *Tm1* (°C) | *Tm2* (°C) | *Tm3* (°C) | *Tm4* (°C) | *Tag 266* (°C) | *Tag 473* (°C) |
|---|---|---|---|---|---|---|---|
| F51L | PP13579 | 35.9 | 45.2 | 62.7 | 82.9 | 46.6 | 50.2 |
| G117F | PP13580 | 35.5 | 45.1 | 65.2 | 85.0 | 50.8 | 53.7 |
| K331F | PP13581 | 35.8 | 54.3 | 70.3 | 84.9 | 52.4 | 40.9 |
| K335A | PP13582 | 33.3 | 52.2 | 60.9 | 85.8 | 51.0 | 53.7 |
| K168C/F189C | PP13583 | 30.3 | 49.8 | 59.2 | 81.7 | 44.4 | 44.2 |
| S283C/P361C | PP13584 | 30.0 | 38.2 | 63.3 | 83.8 | 47.2 | 44.2 |
| F51L/G117F | PP13585 | 32.0 | 38.5 | 66 | 84.1 | 45.0 | 45.4 |
| F51L/K331F | PP13586 | 36.6 | 51.3 | 69.6 | 84.8 | 47.4 | 47.0 |
| F51L, K335A | PP13587 | 32.6 | 51.4 | 64.1 | 85.0 | 48.9 | 46.7 |
| F51L/K168C/F189C | PP13588 | 32.4 | 53.8 | 61.7 | 83.6 | 48.3 | 47.2 |
| F51L/S283C/P361C | PP13589 | 35.2 | 53.7 | 67.0 | 80.5 | 45.4 | 49.5 |
| G117F/K331F | PP13590 | 33.9 | 53.0 | 65.1 | 83.0 | 46.9 | 46.7 |
| G117F/K335A | PP13592 | 34.1 | 49.3 | 67.4 | 84.5 | 48.1 | 48.3 |
| G117F/K168C/F189C | PP13593 | 28.7 | 61.3 | 70.1 | 84.5 | 50.7 | 50.2 |
| G117F/S283C/P361C | PP13594 | 32.4 | 45.1 | 69.0 | 86.9 | 47.7 | 47.5 |
| K331F/K335A | PP13595 | 33.1 | 48.5 | 62.9 | 86.9 | 48.3 | 44.2 |
| K331F/K168C/F189C | PP13596 | 34.9 | 52.1 | 62.6 | 85.4 | 50.8 | 40.9 |
| K331F/S283C/P361C | PP13597 | 34.9 | 50.4 | 62.6 | 82.0 | 45.7 | 47.8 |
| K335A/K168C/F189C | PP13598 | 30.1 | 46.9 | 62.3 | 85.0 | 46.2 | 47.6 |
| K335A/S283C/P361C | PP13599 | 30.1 | 54.8 | 68.1 | 83.9 | 48.2 | 47.6 |
| K168C/F189C/S283C/P361C | PP13600 | 28.9 | 48.6 | 71.0 | 81.3 | 45.8 | 44.4 |

FIG. 8 (Cont.)

IC50 analysis of AAT mutants

| | *DSF* | | | | *SLS* | |
|---|---|---|---|---|---|---|
| *Temperature (°C)* | Tm1 | Tm2 | Tm3 | Tm4 | Tagg 266 | Tagg 473 |
| | 72.0 | 83.8 | | | 74.0 | 76.0 |

| | AAT-HSA | Prolastin |
|---|---|---|
| Y0 | 1.339 | 2.291 |
| Plateau | 0.04047 | 0.005383 |
| PercentFast | 66.20 | 92.95 |
| KFast | 0.4832 | 0.9226 |
| KSlow | 0.02302 | 0.07099 |
| Half Life (Slow) | 30.12 | 9.764 |
| Half Life (Fast) | 1.435 | 0.7513 |
| Tau (slow) | 43.45 | 14.09 |
| Tau (fast) | 2.070 | 1.084 |
| Rate constant ratio | 20.99 | 13.00 |

| | AAT-HSA | Prolastin |
|---|---|---|
| Y0 | 3493 | 145620 |
| Plateau | 105.7 | 332.7 |
| PercentFast | 66.50 | 92.90 |
| KFast | 0.5181 | 0.9002 |
| KSlow | 0.02354 | 0.07017 |
| Half Life (Slow) | 29.44 | 9.879 |
| Half Life (Fast) | 1.338 | 0.7700 |
| Tau (slow) | 42.48 | 14.25 |
| Tau (fast) | 1.930 | 1.111 |
| Rate constant ratio | 22.01 | 12.83 |

COMPOSITIONS AND METHODS FOR ALPHA-1-ANTITRYPSIN DISORDERS

PRIORITY CLAIM

This application claims the benefit of International Application No. PCT/US2019/058673, filed Oct. 29, 2019, which claim priority to U.S. provisional application No. 62/752,182, filed Oct. 29, 2018, which is incorporated by reference herein in its entirety.

BACKGROUND OF THE INVENTION

Serpins are a superfamily of proteins with similar structures that were first identified for their ability to inhibit proteases. The name serpin was originally coined because the first serpins to be identified were found to act on chymotrypsin-like serine proteases. As a result, the acronym serpin was chosen to incorporate the first couple of letters of the word(s) serine protease inhibitors.

Serpins are interesting because of their unusual mechanism of action in which they irreversibly inhibit a target protease by undergoing a large conformational change to disrupt an active site on the target protease. Protease inhibition by serpins controls an array of biological processes, including coagulation and inflammation. The mechanism of protease inhibition confers certain advantages but also has drawbacks. One major drawback is that serpins are especially vulnerable to a mutation that can result in serpinopathies, such as protein misfolding and the formation of inactive long-chain polymers.

Alpha-1-antitrypsin or $\alpha_1$-antitrypsin ("A1AT," "A1A," or "AAT") is a protein belonging to the serpin superfamily. It is encoded in humans by the SERPINA1 gene, which has 4 coding exons and 3 untranslated exons and resides on chromosome 14 at q31-31.2. It is also known as alpha$_1$-proteinase inhibitor or alpha$_1$-antiproteinase because it inhibits various proteases, not just trypsin. It is a 52-kD glycoprotein that functions as an antiprotease. It has a single chain of 394 amino acids with a signal peptide of 24 amino acids in length attached. As a type of enzyme inhibitor, it protects tissues from enzymes of inflammatory cells, especially neutrophil elastase and proteinase 3 ("PR3"), and has a normal reference range in blood of 1.5-3.5 g/L. The concentration of alpha-1-antitrypsin can rise manyfold upon acute inflammation.

Neutrophil elastase is a serine protease that destroys elastase, the rubberlike macromolecule that provides elastic recoil to the lung. When the blood contains inadequate amounts of alpha-1-antitrypsin or functionally defective alpha-1-antitrypsin, neutrophil elastase is excessively free to break down elastin, degrading the elasticity of the lungs. Degradation of elasticity results in respiratory complications, such as chronic obstructive pulmonary disease.

PR3 is a serine protease enzyme expressed mainly in neutrophil granulocytes. Its exact role in the function of the neutrophil is unknown, but, in human neutrophils, proteinase 3 contributes to the proteolytic generation of antimicrobial peptides.

Alpha-1-antitrypsin deficiency ("AATD") is a genetic disorder that causes defective production of alpha-1-antitrypsin. AATD is an autosomal recessive disorder caused by reduced serum levels of AATD. The disease leads to a decrease of alpha-1-antitrypsin. The disease often causes lung and liver disease and is referred to as hereditary pulmonary emphysema. AATD is one of the most common lethal hereditary disorders of caucasians of European descent.

There are several forms and degrees of alpha-1-antitrypsin deficiency and the form and degree depend on whether the sufferer has one or two copies of a defective allele. Severe alpha-1-antitrypsin deficiency can cause panacinar emphysema or COPD-like symptoms in adult life in many people with the condition, especially if they are exposed to cigarette smoke. The disorder can also lead to various liver diseases in children and adults, and occasionally can lead to problems that are more unusual. Alpha-1-antitrypsin deficiency usually produces some degree of disability and reduces life expectancy.

Alpha-1-antitrypsin deficiency is treated through avoidance of damaging inhalants and by intravenous infusions of alpha-1-antitrypsin or by transplantation of the liver or lungs. Recombinant versions of alpha-1-antitrypsin are also known but are currently used in medical research more than as treatment. Approved alpha-1-antitrypsin deficiency products are purified from human plasma and require frequent weekly infusion, with high doses (60-120 mg/kg) and have only limited efficacy. Alpha-1-antitrypsin augmentation therapy is not ideal due to poor pharmacokinetics, with peaks and troughs seen in circulating AAT levels, despite administration of high concentrations of plasma-derived AAT.

Some current research is focused on developing long-acting alpha-1-antitrypsin fusions through protein engineering. For example, AAT Fc has been expressed and developed by two groups: Soohyun Kim (Konkuk University, Seoul, Korea; licensed to OmniBio ("Kim/OmniBio molecule") (See Lee S, Lee Y, Hong K, Hong J, Bae S, Choi J, Jhun H, Kwak A, Kim E, Jo S, Dinarello C A, Kim S. Effect of recombinant al-antitrypsin Fc-fused (AAT-Fc) protein on the inhibition of inflammatory cytokine production and streptozotocin-induced diabetes. Mol Med. 2013 May 20; 19:65-71. doi:10.2119/molmed.2012.00308. PubMed PMID: 23552726; PubMed Central PMCID:PMC3667213, which is incorporated by reference in its entirety herein, including any drawings.) and InhibRx ("InhibRx molecule") (See, for example, U.S. Pat. No. 8,980,266 B2, Serpin Fusion Polypeptides and Methods and Use Thereof, which is incorporated in its entirety herein in its entirety, including any drawings.) Both molecules are N-terminal AAT fusions to IgG1 Fc. The Kim/OmniBio molecule does not inhibit human neutrophil elastase as well as plasma derived AAT, which may be a result of low-pH instability upon elution from protein A chromatography during purification. The InhibRx molecule is reported to inhibit human neutrophil elastase like plasma derived AAT.

Others have modified the glycosylation pattern of AAT by increasing the number of N-glycans (See, for example, Chung H S, Kim J S, Lee S M, Park S J. Additional N-glycosylation in the N-terminal region of recombinant human alpha-1 antitrypsin enhances the circulatory half-life in Sprague-Dawley rats. Glycoconj J. 2016 April; 33(2): 201-8. doi: 10.1007/s10719-016-9657-3. Epub 2016 Mar. 7. PubMed PMID: 26947874, which is incorporated by reference in its entirety herein, including any drawings) or adding polysialyation (See, for example, Lindhout T, Iqbal U, Willis L M, Reid A N, Li J, Liu X, Moreno M, Wakarchuk W W. Site-specific enzymatic polysialylation of therapeutic proteins using bacterial enzymes. Proc Natl Acad Sci USA. 2011 May 3; 108(18):7397-402. doi:10.1073/pnas.1019266108. Epub 2011 Apr. 18. PubMed PMID: 21502532; PubMed Central PMCID: PMC3088639, which is incorporated by reference in its entirety herein, including any drawings.) Some have produced an aglycosylated AAT (See, for example, Cantin A M, Woods D E, Cloutier D, Héroux J, Dufour E K, Leduc R. Leukocyte elastase inhibition therapy in cystic fibrosis: role of glycosylation on the distribution of alpha-1-proteinase inhibitor in blood versus lung. J Aerosol Med. 2002 Summer; 15(2):141-8. PubMed PMID: 12184864, which is incorporated by reference in its entirety herein, including any drawings.) Still others have developed a PEGylated aglycosylated AAT to extend half-life (See, for example, Cantin A M, Woods D E, Cloutier D, Dufour E K, Leduc R. Polyethylene glycol conjugation at Cys232 prolongs the half-life of alpha1 proteinase inhibitor. Am J Respir Cell Mol Biol. 2002 December; 27(6):659-65. PubMed PMID: 12444025, which is incorporated by reference in its entirety herein, including any drawings.)

AAT is prone to Met oxidation in the lung and so some groups have constructed mutated AAT variants that are resistant to methionine oxidation but retain activity. In particular, the M351V/M358V mutant is resistant to oxidation (See, for example, Taggart C, Cervantes-Laurean D, Kim G, McElvaney N G, Wehr N, Moss J, Levine R L. Oxidation of either methionine 351 or methionine 358 in alpha 1-antitrypsin causes loss of anti-neutrophil elastase activity. J Biol Chem. 2000 Sep. 1; 275(35):27258-65. PubMed PMID: 10867014, which is incorporated by reference in its entirety herein, including any drawings.) Baek et al. have introduced a disulfide bond (K168C-F189C) in AAT and substantially increased resistance to loop-sheet polymerization (See Baek J H, Im H, Kang U B, Seong K M, Lee C, Kim J, Yu M H. Probing the local conformational change of alpha1-antitrypsin. Protein Sci. 2007 September; 16(9): 1842-50. Epub 2007 Jul. 27. PubMed PMID: 17660256; PubMed Central PMCID: PMC2206966m, which is incorporated by reference in its entirety herein, including any drawings.) Single point mutations (F51L, G117F, K331F, K335A) in AAT have also been created and show increases in stability and resistance to loop-sheet polymerization (See, Dafforn T R, Mahadeva R, Elliott P R, Sivasothy P, Lomas D A. A kinetic mechanism for the polymerization of alpha1-antitrypsin. J Biol Chem. 1999 Apr. 2; 274(14):9548-55. PubMed PMID: 10092640; Parfrey H, Mahadeva R, Ravenhill N A, Zhou A, Dafforn T R, Foreman R C, Lomas D A. Targeting a surface cavity of alpha 1-antitrypsin to prevent conformational disease. J Biol Chem. 2003 Aug. 29; 278 (35):33060-6. Epub 2003 Jun. 13. PubMed PMID: 12807889; Gilis D, McLennan H R, Dehouck Y, Cabrita L D, Rooman M, Bottomley S P. In vitro and in silico design of alpha1-antitrypsin mutants with different conformational stabilities. J Mol Biol. 2003 Jan. 17; 325(3):581-9. PubMed PMID: 12498804; and Im H, Seo E J, Yu M H. Metastability in the inhibitory mechanism of human alpha1-antitrypsin. J Biol Chem. 1999 Apr. 16; 274(16):11072-7. PubMed PMID: 10196190, each of which is incorporated by reference herein including any drawings.)

However, despite the above-mentioned progress, additional treatment options are needed.

SUMMARY OF THE INVENTION

The invention described herein is based, in part, on a recombinant engineered alpha-1-antitrypsin serpin domain fused to a human serum albumin binding domain or human serum albumin domain.

Some embodiments comprise a recombinant protein comprising an alpha-1-antitrypsin serpin domain and a human serum albumin binding domain or a human serum albumin domain. In some embodiments, the aplha-1-antitrypsin serpin domain has a sequence comprising all or part of SEQ ID NO: 1. In some embodiments, the recombinant protein comprises one or more linkers. In some embodiments, the C-terminus of the alpha-1-antitrypsin serpin domain is fused to the N-terminus of the human serum albumin or human serum albumin binding domain in the recombinant protein. Some embodiments comprise a recombinant protein comprising an alpha-1-antitrypsin serpin domain and a human serum albumin domain wherein the alpha-1-antitrypsin serpin domain and a human serum albumin domain are not both wild-type alpha-1-antitrypsin and a wild type human serum albumin.

In some embodiments, the alpha-1-antitrypsin serpin domain has one or more mutations. In some embodiments, the alpha-1-antitrypsin serpin domain retains activity compared to a wild type alpha-1-antitrypsin serpin domain. In some embodiments, the one or more mutations causes resistance to methionine oxidation as compared to wild type alpha-1-antitrypsin. In some embodiments, the one or more mutations comprises M351V and/or M358V with residues being numbered according to SEQ ID NO: 1. In some embodiments, the one or more mutations comprises K168C and F189C with residues being numbered according to SEQ ID NO: 1. In some embodiments, the one or more mutations confer a substantially increased resistance to loop-sheet polymerization as compared to wild type alpha-1-antitrypsin. In some embodiments, the one or more mutations are one or more point mutations selected from F51L, G117F, K331F, or K335A with residues being numbered according to SEQ ID NO: 1. In some embodiments, the alpha-1-antitrypsin serpin domain retains activity against human neutrophil elastase and/or PR3 compared to a wild type alpha-1-antitrypsin serpin domain.

In some embodiments, the one or more mutations comprises a mutation in at least one of the following residue positions according to SEQ ID NO 1: 51, 100, 114, 117, 163, 164, 165, 168, 169, 172, 173, 174, 183, 189, 232, 283, 300, 302, 303, 304, 306, 330, 331, 333, 335, 336, 337, 338, 339, 340, 351, 356, 358, or 361. In some embodiments, the one or more mutations comprises one or more of the following mutations according to SEQ ID NO 1: F51L, L100F, L100C, T114F, G117F, K163T, G164V, T165S. K168C, K168I, K168A, K169V, L172V, L172A, L172C, V173C, K174T, A183V, F189C, F189I, F189V, C232S, S283C, K300A, V302A, L303A, G304A, L306A, S330R, K331F, K331I, K331V, K331T, K331C, V333C, V333A, K335A, K331F, K335G, K335T, A336G, V337C, V337A, L338A, T339S, I340V, M351V, I356M, M358I, M358P, M358A, M358R M358L, M358V, or P361C. In some embodiments, the one or more mutations comprises F51L, G117F, K168C, F189C, C232S, S283C, K331F, K335A, M351V, M358V, M358L, or P361C according to SEQ ID NO: 1. In some embodiments, the one or more mutations are both of K168C and F189C according to SEQ ID NO: 1. In some embodiments, the one or more mutations are both of P361C and KS:3C according to SEQ ID NO: 1.

In some embodiments, the alpha-1-antitrypsin serpin domain has one or more mutations comprising C232S according to SEQ ID NO: 1. In some embodiments, the alpha-1-antitrypsin serpin domain has one or more mutations comprising M351V and M358V according to SEQ ID NO: 1. In some embodiments, the alpha-1-antitrypsin serpin domain has one or more mutations comprising M351V and M358L according to SEQ ID NO: 1. In some embodiments, the alpha-1-antitrypsin serpin domain has one or more mutations comprising C232S, M351V, and M358V according to SEQ ID NO: 1.

In some embodiments, the alpha-1-antitrypsin serpin domain has one or more mutations comprising F51L, C232S, M351V and M358L according to SEQ ID NO: 1. In some embodiments, the alpha-1-antitrypsin serpin domain has one or more mutations comprising G117F, C232S, M351V and M358L according to SEQ ID NO: 1. In some embodiments, the alpha-1-antitrypsin serpin domain has one or more mutations comprising C232S, K331F, M351V and M358L according to SEQ ID NO: 1. In some embodiments, the alpha-1-antitrypsin serpin domain has one or more mutations comprising C232S, K335A, M351V and M358L according to SEQ ID NO: 1. In some embodiments, the alpha-1-antitrypsin serpin domain has one or more mutations comprising K168C, F189C, C232S, M351V, and M358L according to SEQ ID NO: 1. In some embodiments, the alpha-1-antitrypsin serpin domain has one or more mutations comprising C232S, S283C, M351V, M358L, and P361C according to SEQ ID NO: 1. In some embodiments, the alpha-1-antitrypsin serpin domain has one or more mutations comprising F51L, G117F, C232S, M351V, and M358L according to SEQ ID NO: 1. In some embodiments, the alpha-1-antitrypsin serpin domain has one or more mutations comprising F51L, C232S, K331F, M351V, and M358L according to SEQ ID NO: 1. In some embodiments, the alpha-1-antitrypsin serpin domain has one or more mutations comprising F51L, C232S, K335A, M351V, and M358L according to SEQ ID NO: 1. In some embodiments, the alpha-1-antitrypsin serpin domain has one or more mutations comprising K51L, K168C, F189C, C232S, M351V, and M358L according to SEQ ID NO: 1. In some embodiments, the alpha-1-antitrypsin serpin domain has one or more mutations comprising F51L, C232S, S283C, M351V, M358L, and P361C according to SEQ ID NO: 1. In some embodiments, the alpha-1-antitrypsin serpin domain has one or more mutations comprising G117F, C232S, K331F, M351V, and M358L according to SEQ ID NO: 1. In some embodiments, the alpha-1-antitrypsin serpin domain has one or more mutations comprising G117F, K335A, C232S, M351V, and M358L according to SEQ ID NO: 1. In some embodiments, the alpha-1-antitrypsin serpin domain has one or more mutations comprising G117F, K168C, F189C, C232S, M351V, and M358L according to SEQ ID NO: 1. In some embodiments, the alpha-1-antitrypsin serpin domain has one or more mutations comprising G117F, C232S, S283C, M351V, M358L, and P361C according to SEQ ID NO: 1. In some embodiments, the alpha-1-antitrypsin serpin domain has one or more mutations comprising C232S, K331F, K335A, M351V, and M358L according to SEQ ID NO: 1. In some embodiments, the alpha-1-antitrypsin serpin domain has one or more mutations comprising K168C, F189C, C232S, K331F, M351V, and M358L according to SEQ ID NO: 1. In some embodiments, the alpha-1-antitrypsin serpin domain has one or more mutations comprising C232S, S283C, K331F, M351V, M358L, and P361C according to SEQ ID NO: 1. In some embodiments, the alpha-1-antitrypsin serpin domain has one or more mutations comprising K168C, F189C, C232S, K335A, M351V, and M358L according to SEQ ID NO: 1. In some embodiments, the alpha-1-antitrypsin serpin domain has one or more mutations comprising C232S, S283C, K335A, M351V, M358L, and P361C according to SEQ ID NO: 1. In some embodiments, the alpha-1-antitrypsin serpin domain has one or more mutations comprising K168C, F189C, C232S, S283C, M351V, M358L, and P361C according to SEQ ID NO: 1. In some embodiments, the alpha-1-antitrypsin serpin domain comprises a point mutation K335A according to SEQ ID NO: 1. In some embodiments, the alpha-1-antitrypsin serpin domain comprises a point mutation K331F according to SEQ ID NO: 1. In some embodiments, the alpha-1-antitrypsin serpin domain comprises a point mutation G117F according to SEQ ID NO: 1. In some embodiments, the alpha-1-antitrypsin serpin domain comprises a point mutation S283C according to SEQ ID NO: 1. In some embodiments, the alpha-1-antitrypsin serpin domain comprises a point mutation P361C according to SEQ ID NO: 1.

In some embodiments, the human serum albumin is at least a portion of SEQ ID NO: 3 or SEQ ID NO: 5. In some embodiments, the human serum albumin binding domain is one of SEQ ID NOs: 22-36. In some embodiments, the human serum albumin binding domain comprises one or more CDRs selected from SEQ ID NOs: 6-21. In some embodiments, the human serum albumin or human serum albumin binding domain increases plasma half-life of the alpha-1-antitrypsin serpin domain as compared to wild type alpha-1-antitrypsin. In some embodiments, a number of N-glycans or polysialyation of the recombinant protein in the alpha-1-antitrypsin serpin domain is greater than a wild type alpha-1-antitrypsin serpin domain.

In some embodiments, the human serum albumin comprises one or more mutations. In some embodiments, the one or more mutations are one or more of residues 407, 408, 409, 410, 413, and 414, wherein the one or more residues are numbered according to SEQ ID NO: 5. In some embodiments, the one or more mutations are one or more of L407A, 1,408V V409A, R410A, L413Q, and L414Q, wherein the one or more residues are numbered according to SEQ ID NO. 5, in some embodiments, the human serum albumin comprises a portion or a variant of human serum albumin.

In some embodiments, the human serum albumin binding protein comprises an amino acid sequence that is capable of binding to all or a part of human serum albumin protein having the sequence set forth in SEQ ID NO: 3 or SEQ ID NO: 5.

In some embodiments, the recombinant protein comprises or consists of a protein having any one of SEQ ID Nos: 64-68 or SEQ ID NO: 71. In some embodiments, the recombinant protein comprises or consists of a protein having SEQ ID NO: 64. In some embodiments, the recombinant protein comprises or consists of a protein having SEQ ID NO: 65. In some embodiments, the recombinant protein comprises or consists of a protein having SEQ ID NO: 66. In some embodiments, the recombinant protein comprises or consists of a protein having SEQ ID NO: 67. In some embodiments, the recombinant protein comprises or consists of a protein having SEQ ID NO: 68. In some embodiments, the recombinant protein comprises or consists of a protein having SEQ ID NO: 71.

In some embodiments, a nucleic acid is provided which encodes a recombinant protein as provided herein. In some embodiments, the nucleic acid comprises a vector. In some embodiments, the vector comprises a host cell.

Some embodiments are drawn to a method of making a recombinant protein comprising culturing the host cell with one of the nucleic acids provided herein and collecting the recombinant protein. In some embodiments, the host cell is a eukaryotic host cell. In some embodiments, the host cell is a mammalian host cell. In some embodiments, the mammalian host is a CHO cell. In some embodiments, the recombinant protein is collected using an alpha-1-antitrypsin-Fc capture select media at neutral pH.

Some embodiments are drawn to a method of treating an alpha-1-antitrypsin deficiency in a patient in need thereof comprising administering a recombinant protein, as provided herein, to the patient. In some embodiments, the recombinant protein comprises a pharmaceutical composition. In some embodiments, administration of the recombinant protein is administered about once a week or at longer intervals than about once a week, about once every 10 days or at longer intervals than about once every ten days, about once every 15 days or at longer intervals than about once every 15 days, about once every 20 days or at longer intervals than about once every 20 days, about once every 25 days or at longer intervals than about once every 25 days, about once every month or at longer intervals than about once every month, or about once every two months or at longer intervals than about once every two months.

Some embodiments are drawn to a method of improving the pharmacokinetics of a protein comprising an alpha-1-antitrypsin serpin domain. In some embodiments, the protein is any of the recombinant proteins set forth herein. In some embodiments improved pharmacokinetics means an improvement with respect to Prolastin.

BRIEF DESCRIPTION OF THE DRAWINGS

FIG. 4 depicts purified CE-SDS for constructs of the invention.

FIG. 7 depicts purified CE-SDS for constructs of the invention.

FIG. 9 depicts IC50 analysis of AAT mutants.

DETAILED DESCRIPTION OF THE INVENTION

Terminology

Figure 1A:
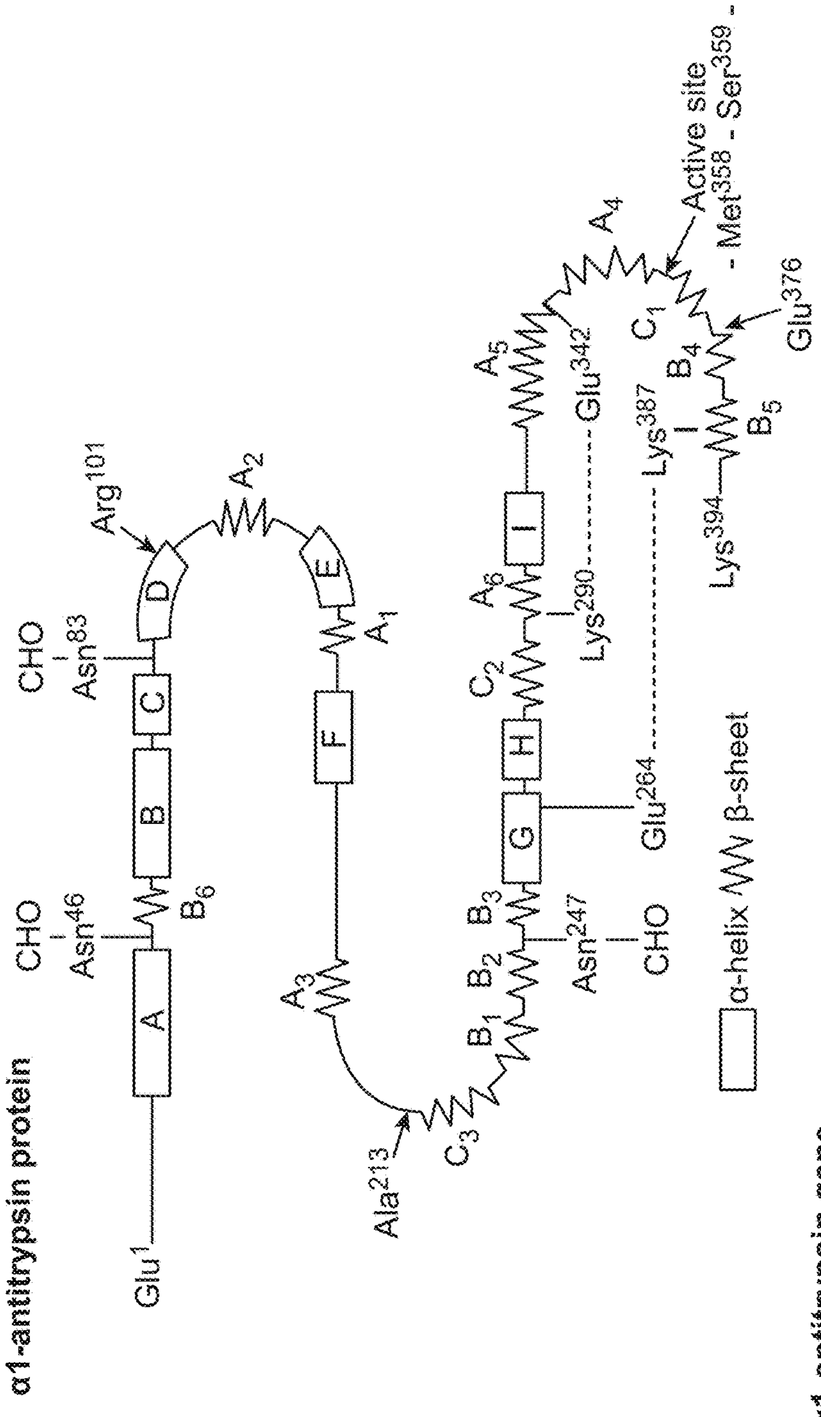
FIG. 1 depicts the structure of the alpha-1-antitrypsin protein and gene. The top shows the normal protein in its linear form, a 394 amino acid single chain protein with three asparaginyl-linked complex carbohydrates side chains at residues 46, 83, and 247 according to SEQ ID NO: 1. The bottom shows the gene (SEQ ID NO: 69) and consists of three non-coding exons (IA, IB, and IC) and four coding exons (II-V). Alpha helices are shown with boxes and beta sheets are shown with squiggles. The start codon is in exon II followed by a 24 residue signal peptide. The carbohydrate attachment sites are shown in the figure as CHO.
Figure 1B:
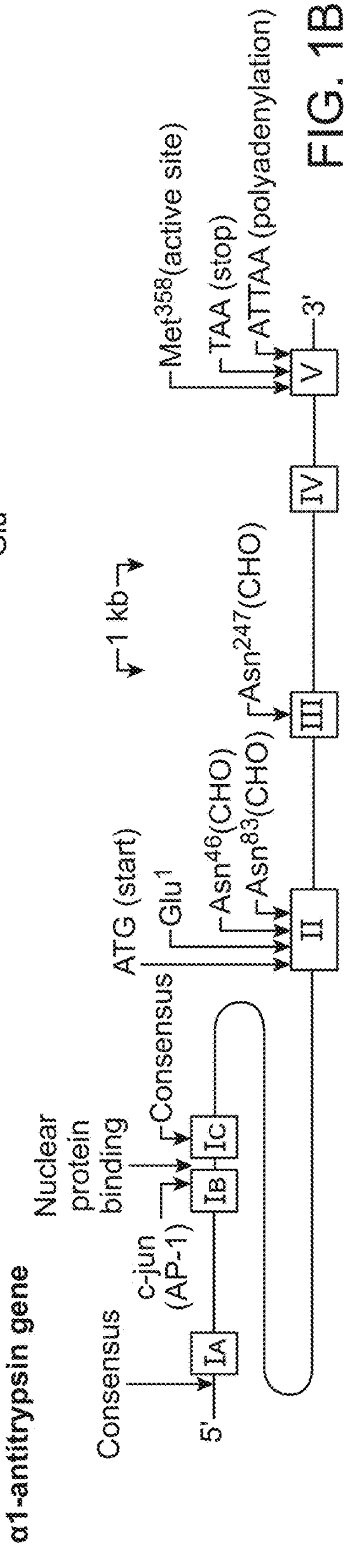
Figure 2:
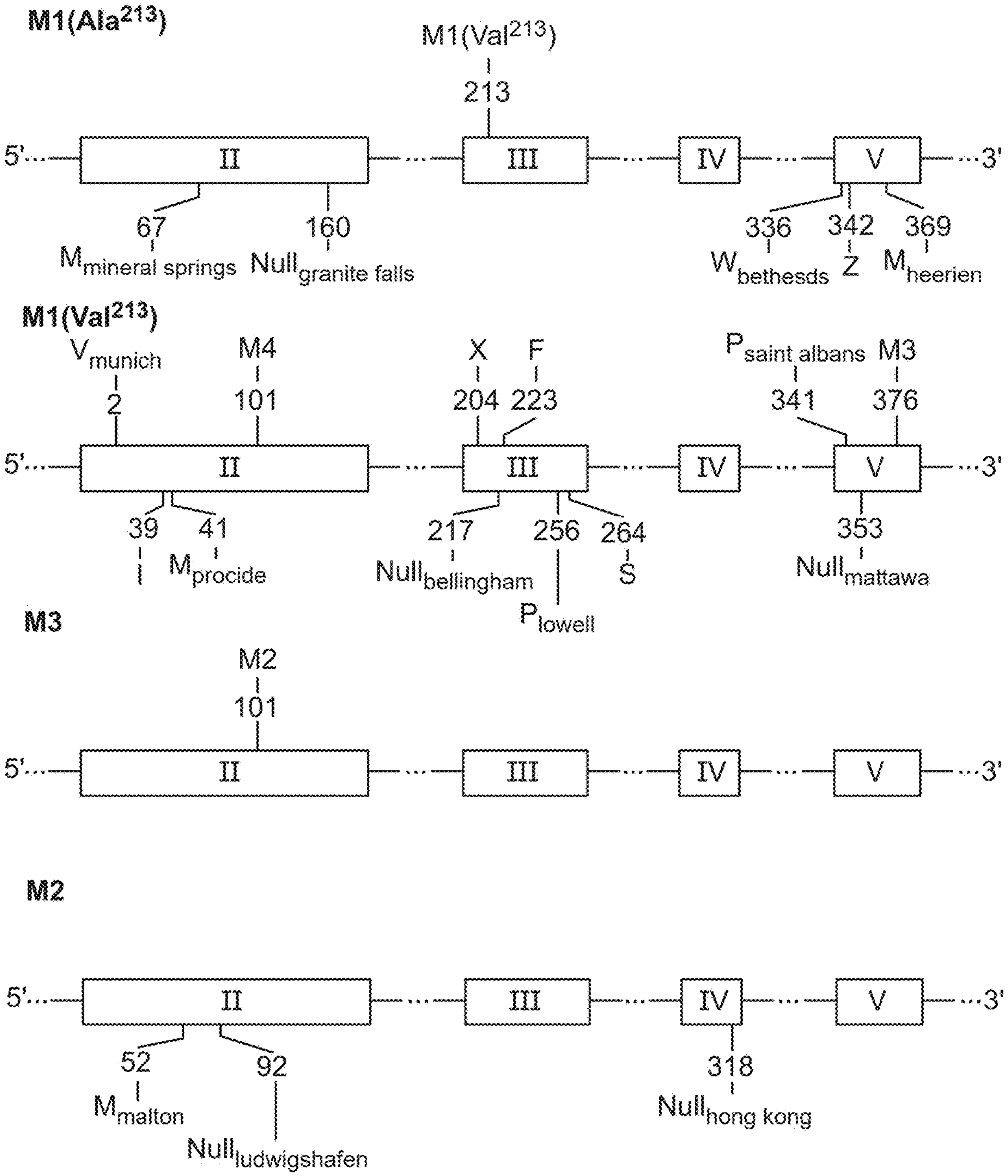
FIG. 2 shows locations of mutations associated with alpha-1-antitrypsin gene associated with alpha-1-antitrypsin deficiency.
Figure 3:
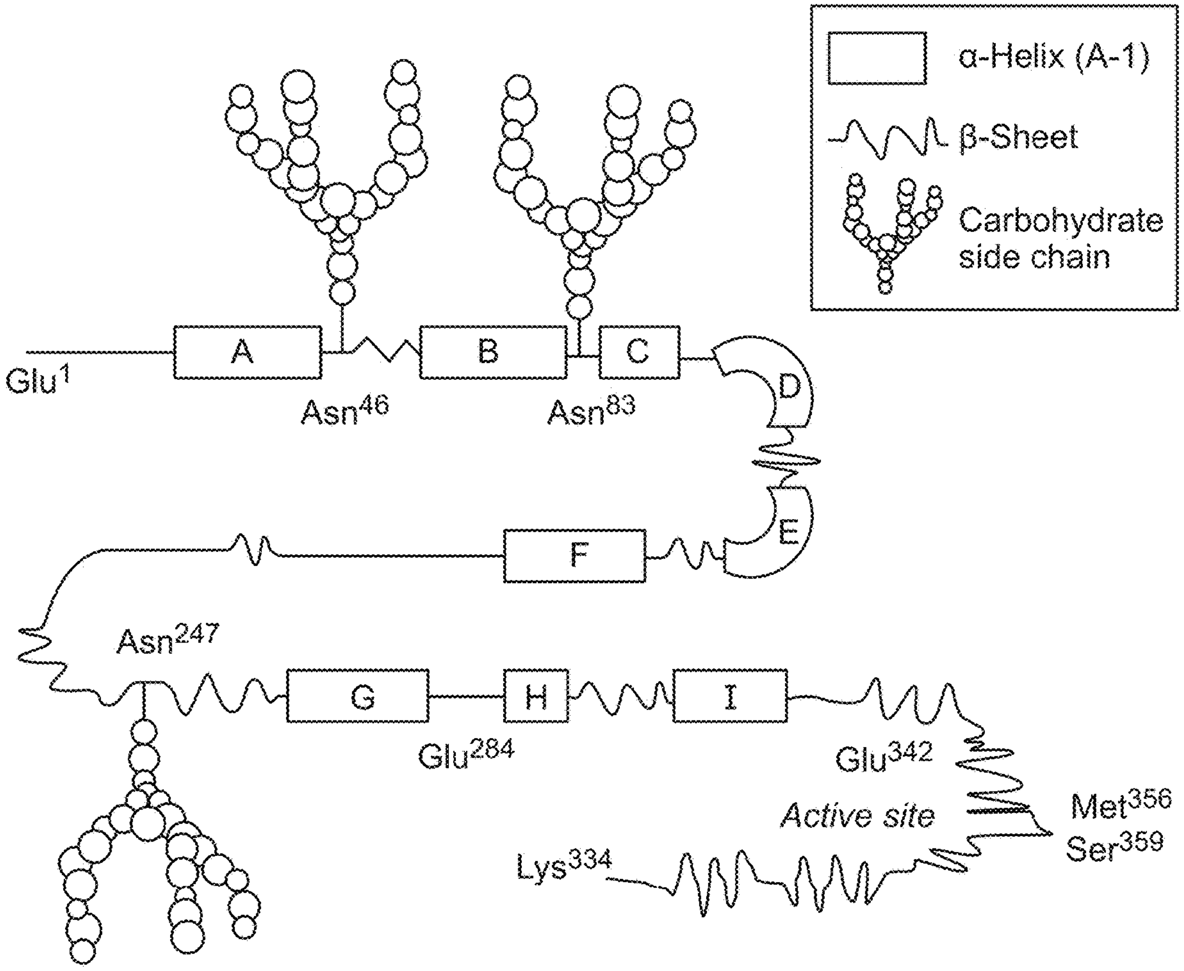
FIG. 3 shows alpha-1-antitrypsin secondary structure.
Figure 4A:
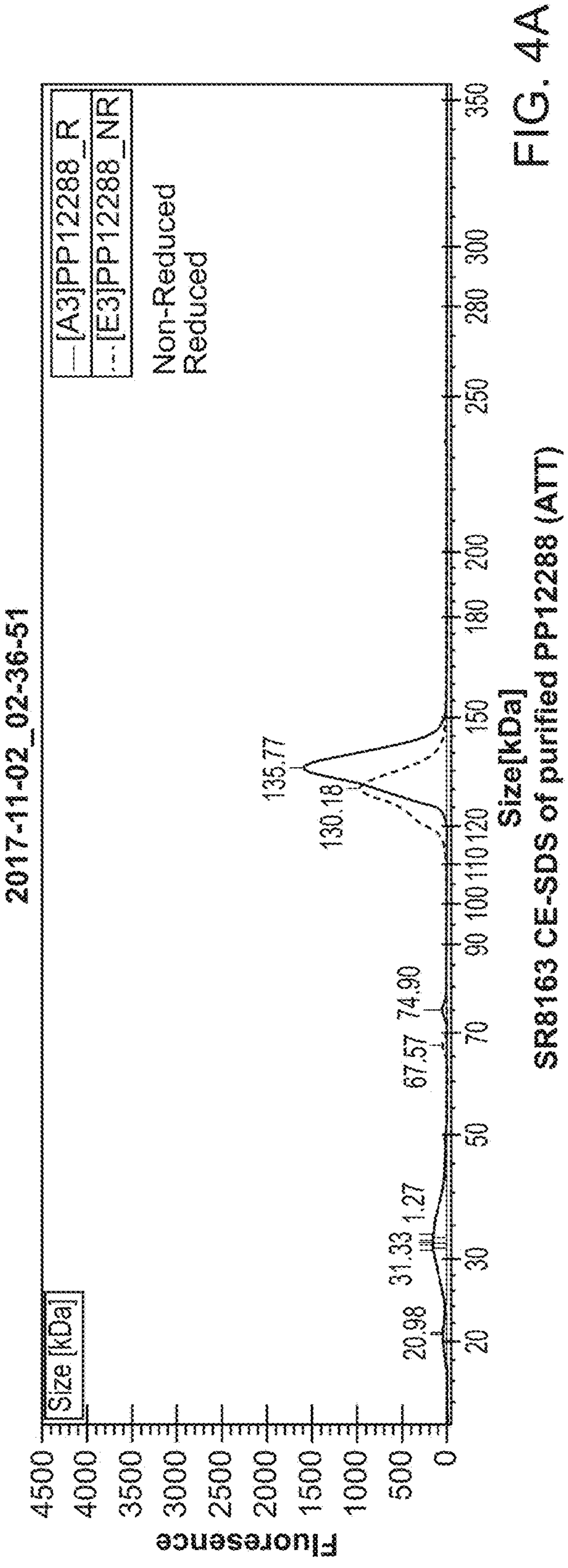
FIG. 4A depicts purified CE-SDS for PP11288.
Figure 4B:
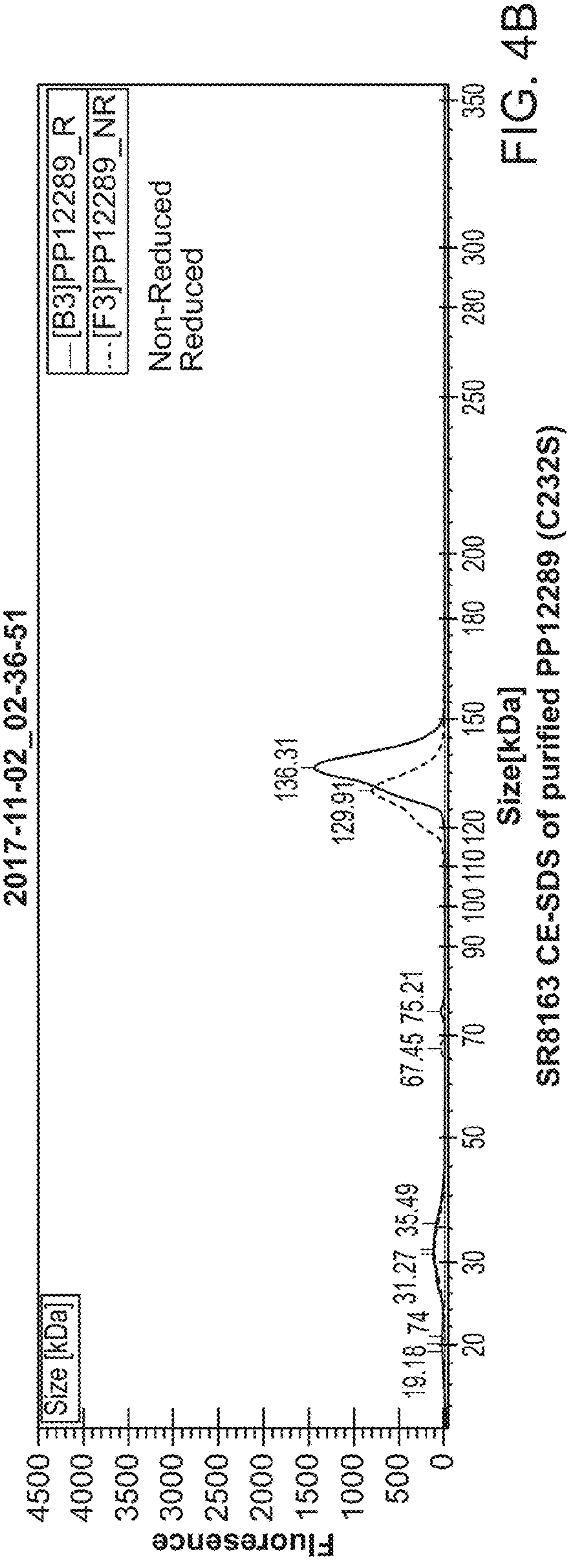
FIG. 4B depicts purified CE-SDS for PP11289.
Figure 4C:
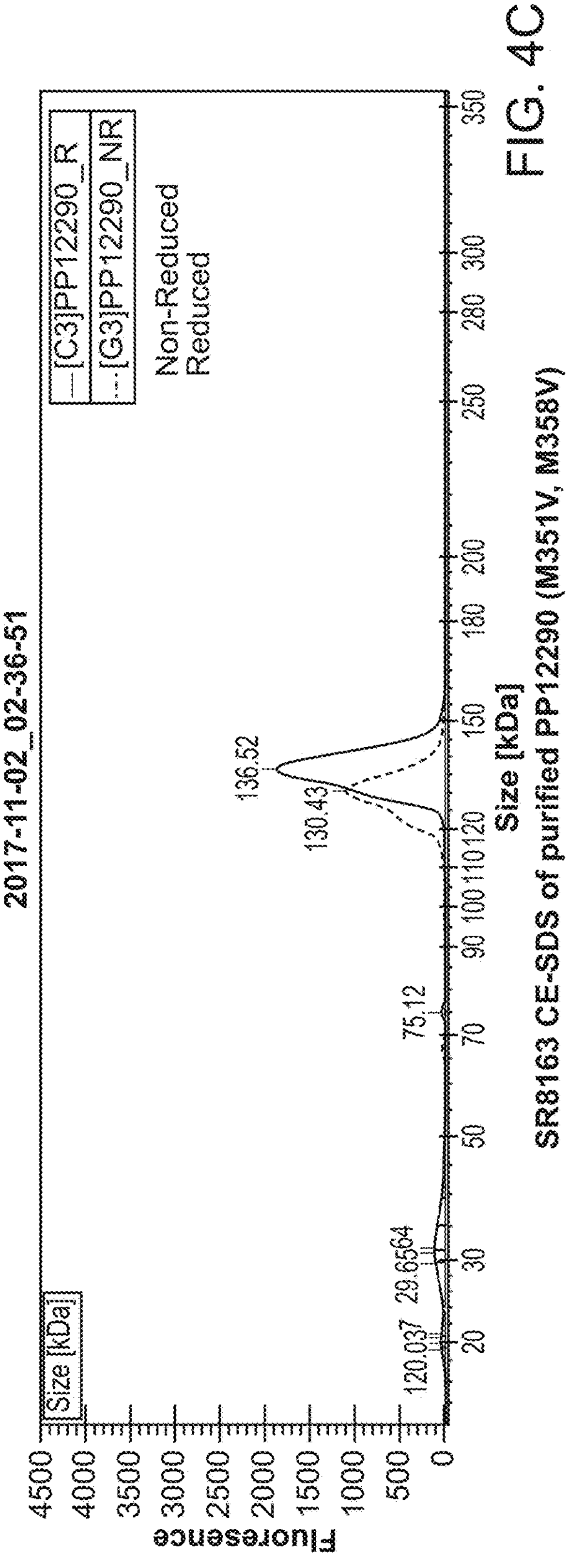
FIG. 4C depicts purified CE-SDS for PP11290.
Figure 4D:
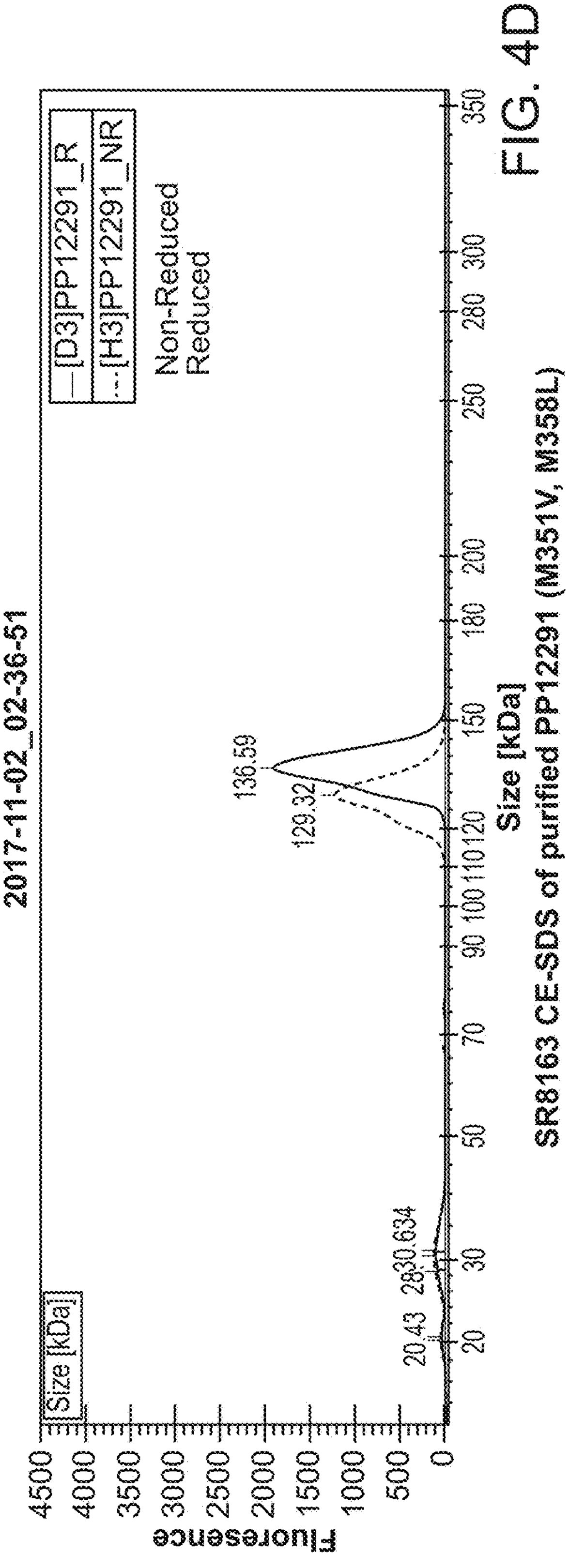
FIG. 4D depicts purified CE-SDS for PP11291.
Figure 4E:
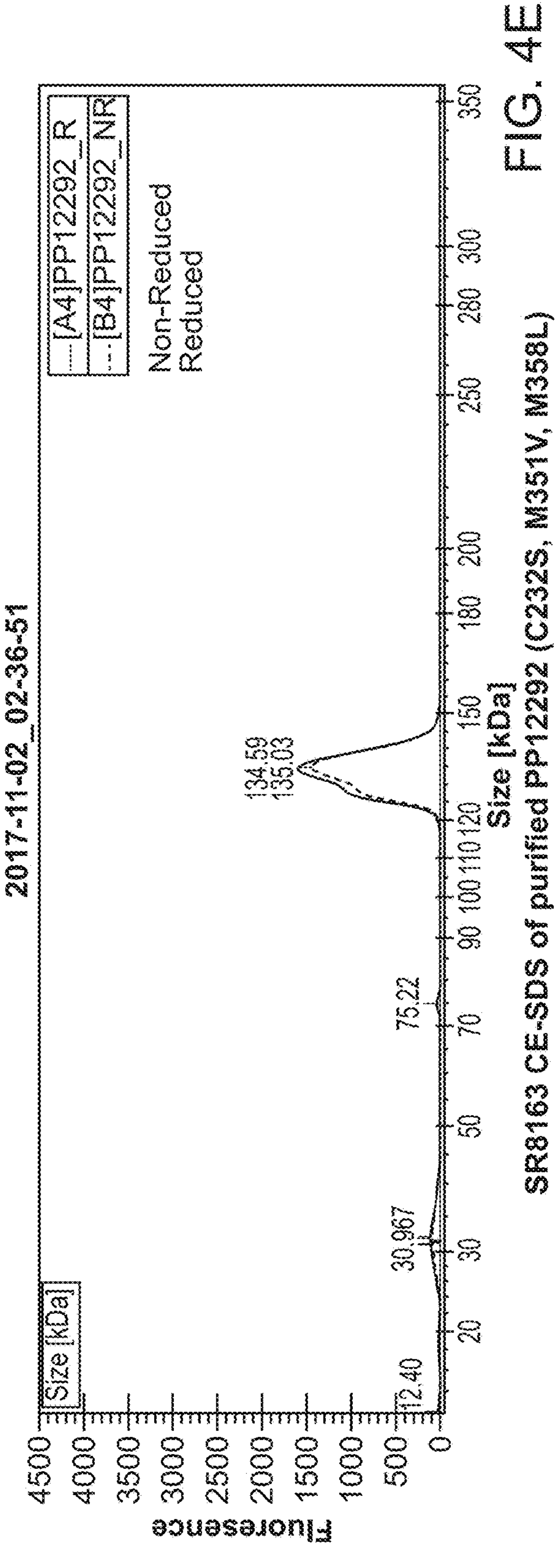
FIG. 4E depicts purified CE-SDS for PP11292.
Figure 4F:
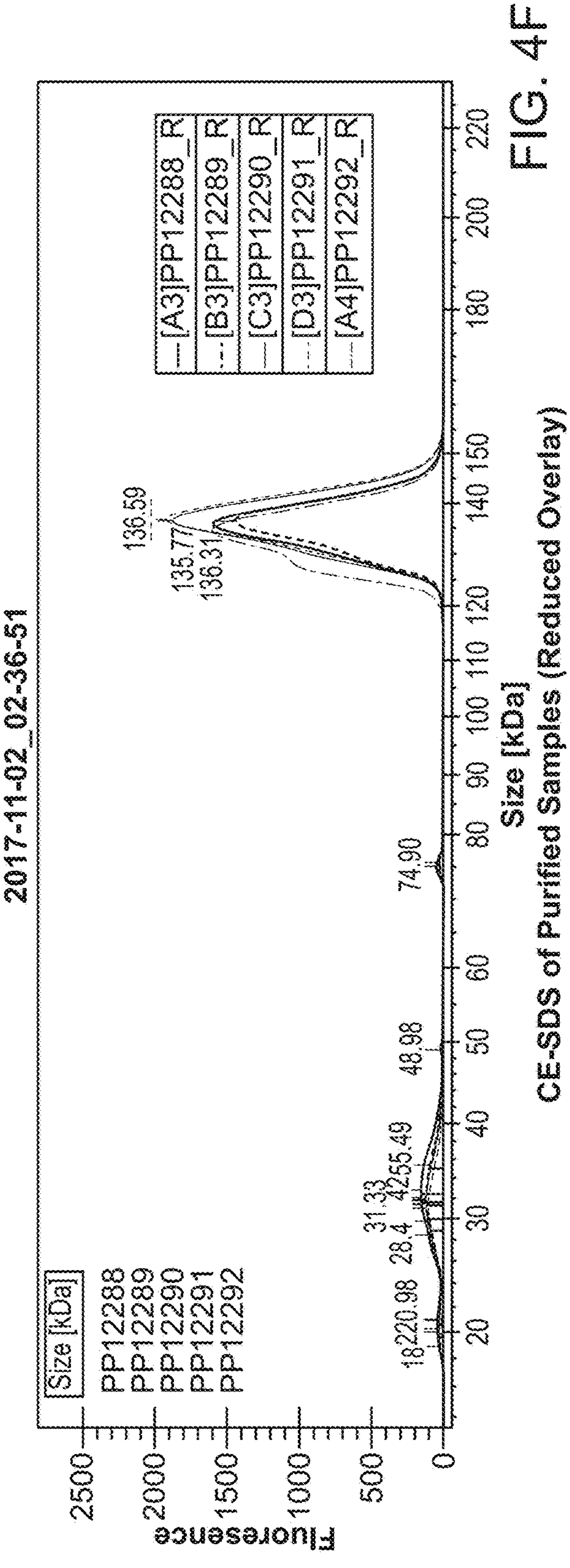
FIG. 4F depicts purified CE-SDS for purified samples (reduced overlay.)
Figure 4G:
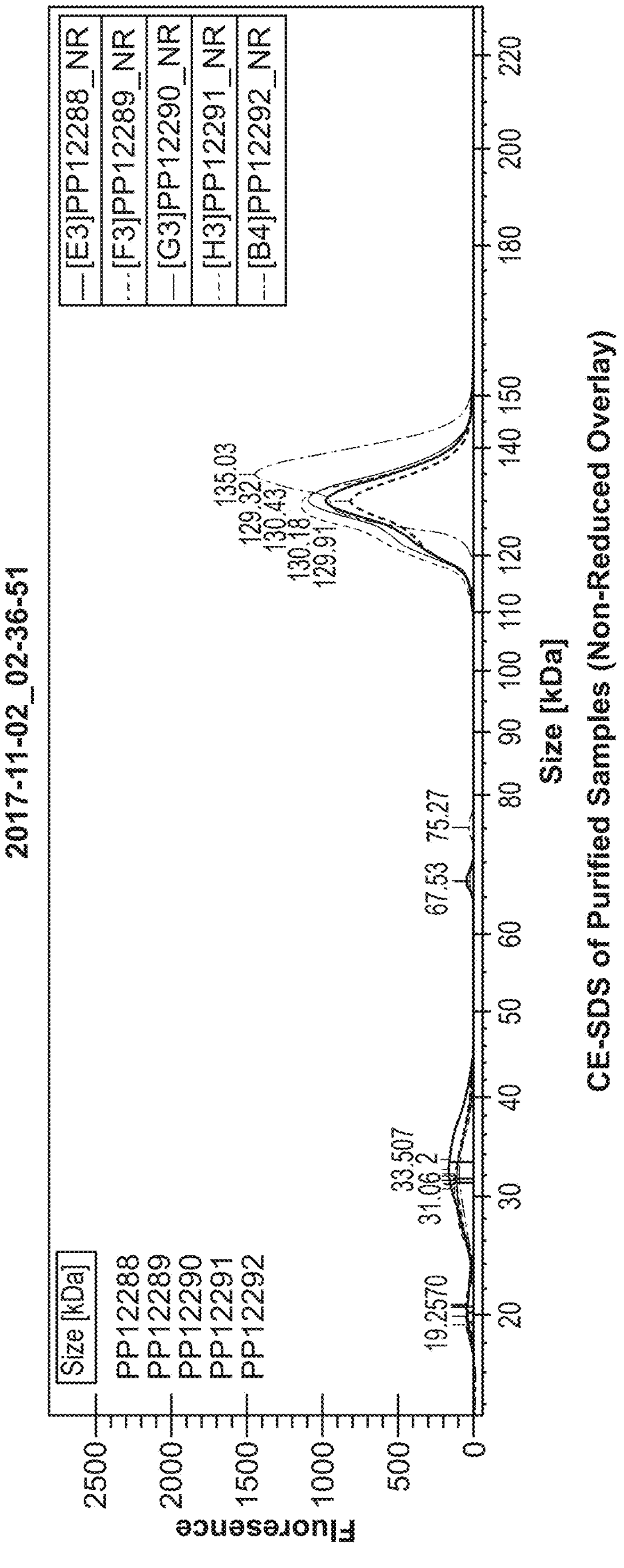
FIG. 4G depicts purified CE-SDS for purified samples (non-reducing conditions.)

As used herein, the term "about" shall refer to an approximate mathematical quantity and can be used with respect to integer values as well as percentages. When an upper or lower bound limit comprises an integer value, the term about shall refer to a boundary that is approximate and the term shall also include everything above that boundary (with respect to a lower boundary) or below that boundary (with respect to an upper boundary.) For example, a portion of a sequence that comprises "about" 20 residues of a 393 residue sequence shall include a boundary that is approximately 20 residues and all integer values above that value.

As used herein, "albumin" shall refer to an albumin protein or albumin fragment, portion, or variant having one or more functional activities of albumin or to a nucleic acid sequence encoding an albumin protein, fragment, portion, or variant thereof having one or more functional activities of albumin. Albumin may be derived from any vertebrate, especially any mammal. In some embodiments, the albumin is derived from human, cow, sheep, or pig. Non-mammalian albumins include, but are not limited to, hen and salmon. In some embodiments, an albumin derived from any vertebrate may be substituted for human albumin or human serum albumin.

The term "antibody" as used herein refers to a type of immunoglobulin molecule and is used in its broadest sense. An antibody specifically includes intact antibodies (e.g., intact immunoglobulins), and antibody fragments. Antibodies comprise at least one antigen-binding domain. One example of an antigen-binding domain is an antigen binding domain formed by a $V_H$-$V_L$ dimer. Other examples of antibodies are set forth in the following sections.

The $V_H$ and $V_L$ regions may be further subdivided into regions of hypervariability ("hypervariable regions (HVRs);" also called CDRs, as defined herein) interspersed with regions that are more conserved. The more conserved regions are called framework regions (FRs). Each $V_H$ and $V_L$ generally comprises three CDRs and four FRs, arranged in the following order (from N-terminus to C-terminus): FR1-CDR1-FR2-CDR2-FR3-CDR3-FR4. The CDRs are involved in antigen binding, and confer antigen specificity and binding affinity to the antibody. See Kabat et al., Sequences of Proteins of Immunological Interest 5th ed. (1991) Public Health Service, National Institutes of Health, Bethesda, MD, incorporated by reference in its entirety.

The light chain from any vertebrate species can be assigned to one of two types, called kappa and lambda, based on the sequence of the constant domain.

The heavy chain from any vertebrate species can be assigned to one of five different classes (or isotypes): IgA, IgD, IgE, IgG, and IgM. These classes are also designated α, δ, ε, γ, and μ, respectively. The IgG and IgA classes are further divided into subclasses on the basis of differences in sequence and function. Humans express the following subclasses: IgG1, IgG2, IgG3, IgG4, IgA1, and IgA2.

An "antibody fragment" comprises a portion of an intact antibody, such as the antigen binding or variable region of an intact antibody. Antibody fragments include, for example, Fv fragments, Fab fragments, $F(ab')_2$ fragments, Fab' fragments, scFv (sFv) fragments, and scFv-Fc fragments.

"Fv" fragments comprise a non-covalently-linked dimer of one heavy chain variable domain and one light chain variable domain.

"Fab" fragments comprise, in addition to the heavy and light chain variable domains, the constant domain of the light chain and the first constant domain ($C_{H1}$) of the heavy chain. Fab fragments may be generated, for example, by papain digestion of a full-length antibody.

"$F(ab')_2$" fragments contain two Fab' fragments joined, near the hinge region, by disulfide bonds. $F(ab')_2$ fragments may be generated, for example, by pepsin digestion of an intact antibody. The F(ab') fragments can be dissociated, for example, by treatment with β-mercaptoethanol.

"Single-chain Fv" or "sFv" or "scFv" antibody fragments comprise a $V_H$ domain and a $V_L$ domain in a single polypeptide chain linked by a peptide linker. See Plückthun A. (1994.) "scFv-Fc" fragments comprise an scFv attached to an Fc domain. For example, an Fc domain may be attached to the C-terminal of the scFv. The Fc domain may follow the $V_H$ or $V_L$, depending on the orientation of the variable domains in the scFv (i.e., $V_H$-$V_L$ or $V_L$-$V_H$). Any suitable Fc domain known in the art or described herein may be used.

"Humanized" forms of non-human antibodies are chimeric antibodies that contain minimal sequence derived from the non-human antibody. A humanized antibody is generally a human immunoglobulin (recipient antibody) in which residues from one or more CDRs are replaced by residues from one or more CDRs of a non-human antibody (donor antibody).

A "human antibody" is one which possesses an amino acid sequence corresponding to that of an antibody produced by a human or a human cell, or derived from a non-human source that utilizes a human antibody repertoire or human antibody-encoding sequences (e.g., obtained from human sources or designed de novo). Human antibodies specifically exclude humanized antibodies.

As used herein, a "single domain antibody" shall refer to an antibody whose CDRs are part of a single domain polypeptide. Examples include, but are not limited to, heavy chain antibodies, antibodies naturally devoid of light chains, single domain antibodies derived from conventional four chain antibodies and single domain scaffolds other than those derived from antibodies. Single domain antibodies may be derived from any species including, but not limited to, mouse, human, camel, llama, goat, rabbit, shark, and bovine. As an example, a single domain antibody may be raised in Camelidae species such as camel, dromedary, alpaca, and guanaco. In some embodiment, a single domain antibody comprises a sequence set forth in any one of SEQ ID NOs: 22-28 and SEQ ID NOs: 29-36.

As used herein, "complementary-determing regions" or "CDRs" are part of the variable chains in antibodies. The CDRs are responsible for specific antibodies. One skilled in the art would appreciate how to determine the location of CDRs within an antibody for specific antibodies and there are several systems determining CDR location. For the sake of clarity, in this application, CDRs for single domain antibodies shall be determined according to US 2010/011339, which is incorporated by reference in its entirety herein.

The term "epitope" means a portion of an antigen capable of specific binding to a binding protein, such as, for example, without limitation, an antibody. Epitopes frequently consist of surface-accessible amino acid residues and/or sugar side chains and may have specific three-dimensional structural characteristics, as well as specific charge characteristics. An epitope may comprise amino acid residues that are directly involved in the binding, and other amino acid residues, which are not directly involved in the binding. The epitope to which an antibody binds can be determined using known techniques for epitope determination.

As used herein, "human albumin" refers to a human albumin protein or human albumin fragment or variant or portion having one or more functional activities of human albumin or nucleic acid sequence encoding a human albumin, fragment, portion, or variant thereof having one or more functional activities of human albumin. Human albumin is a polypeptide sequence of 609 amino acids, the first 18 amino acids of which constitute the leader sequence not found in the final blood bourne product. A human albumin is set forth in SEQ ID NO: 3 in some embodiments.

As used herein, "human serum albumin" shall refer to the human serum albumin found in human blood, which is normally devoid of the initial 18 amino acid leader sequence. In some embodiments, human serum albumin has the sequence set forth in SEQ ID NO: 5. A human serum albumin domain shall also refer to any human serum albumin protein or human serum albumin fragment or variant or portion having one or more functional activities of human serum albumin.

As used herein, "human serum albumin binding protein" or "human albumin binding domain" shall refer to any protein or protein fragment or variant having one or more binding activities to human albumin or human serum albumin.

As used herein, "alpha-1-antitrypsin" or "$\alpha_1$-antitrypsin" (also "A1AT," "A1A," or "AAT") shall refer to an alpha-1-antitrypsin protein or an alpha-1-antitrypsin fragment or variant having one or more functional activities of alpha-1-antitrypsin or a nucleic acid sequence encoding an alpha-1-antitrypsin protein, fragment, or variant thereof having one or more functional activities of alpha-1-antitrypsin. In some embodiments, the alpha-1-antitrypsin protein has the sequence set forth in SEQ ID NO: 1.

As used herein, "alpha-1-antitrypsin serpin domain" or "$\alpha_1$-antitrypsin serpin domain" (also "A1AT, domain" "A1A domain," or "AAT domain") shall refer to an alpha-1-antitrypsin serpin domain or an alpha-1-antitrypsin serpin domain fragment or variant having one or more functional activities of an alpha-1-antitrypsin protein or fragment or a nucleic acid sequence encoding an alpha-1-antitrypsin protein serpin domain or fragment, or variant thereof having one or more functional activities of alpha-1-antitrypsin protein.

As used herein, "alpha-1-antitrypsin deficiency" or "AATD" is a genetic disorder that causes defective production of alpha-1-antitrypsin. The disease leads to a decrease of alpha-1-antitrypsin and is also referred to as hereditary pulmonary emphysema and results in lung and liver disease. There are several forms and degrees of the deficiency. The form and degree depend on whether the sufferer has one or two copies of a defective allele. Severe alpha-1-antitrypsin deficiency causes panacinar emphysema or COPD in adult life in many people with the condition, especially if they are exposed to cigarette smoke. The disorder can also lead to various liver diseases in a minority of children and adults, and occasionally more unusual problems. Alpha-1-antitrypsin deficiency usually produces some degree of disability and reduces life expectancy.

An "effective amount" of a recombinant protein described herein or functional fragment or variant thereof refers to the amount of the polypeptide or functional fragment or variant thereof, when administered in an aggregate of multiple doses, or as part of any other type of defined treatment regimen, produces a measureable statistical improvement in outcome or prophylaxis, as evidenced by at least one clinical parameter associated with the complication.

As used herein, "neutrophil elastase" shall refer to a serine protease that destroys elastase, the rubberlike macromolecule that provides elastic recoil to the lung. When the blood contains inadequate amounts of AAT, neutrophil elastase can break down elastin, degrading the elasticity of the lungs, which results in respiratory complications, such as chronic obstructive pulmonary disease.

The term "portion" as used herein shall mean a part of a whole or piece of something such as a protein or polypeptide.

As used herein, "recombinant" in reference to a protein or polypeptide molecule, refers to a protein or polypeptide molecule expressed utilizing isolated nucleic acid molecules or recombinant nucleic acid molecules.

The term "variant" or "variants" as used herein shall mean a different sequence of a protein including, for example, without limitation, insertions, deletions, and substitutions, either conservative or non-conservative, where such changes do not substantially alter one or more of the oncotic, useful ligand-binding, and non-immunogenic properties of an albumin or albumin binding domain or do not alter the serpin domain.

Variants of polypeptides described herein include polypeptides having at least about 75%, at least about 80%, at least about 85%, at least about 90%, at least about 95%, at least about 96%, at least about 97%, at least about 98% or at least about 99% identity with the amino acid sequence of the human wild type polypeptides provided herein. For example, variants of alpha-1-antitrypsin include polypeptides having at least about 75%, at least about 80%, at least about 85%, at least about 90%, at least about 95%, at least about 96%, at least about 97%, at least about 98%, or at least about 99% identity with the amino acid sequence of SEQ ID NO: 1. For example, variants of human albumin include polypeptides having at least about 75%, at least about 80%, at least about 85%, at least about 90%, at least about 95%, at least about 96%, at least about 97%, at least about 98%, or at least about 99% identity with the amino acid sequence of SEQ ID NO: 3 or SEQ ID NO: 5. Calculations of "identity" or "sequence homology" between two sequences (the terms are used interchangeably herein) are performed by aligning for optimal comparison purposes (e.g., gaps can be introduced in one or both of a first and a second amino acid or nucleic acid sequence for optimal alignment and non-homologous sequences can be disregarded for comparison purposes). The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences. Variants include, but are not limited to, polypeptides that have been either chemically modified relative to the human wild type polypeptide and/or contain one or more amino acid sequence alterations relative to the human wild type polypeptide.

Variants of polypeptides described herein can be those having amino acid modifications (e.g., deletions, additions, or substitutions, such as conservative substations) from the wild type amino acid sequence of the polypeptide. In some embodiments, a variant of AAT can differ by at least 1, 2, 3, 4, 5, or more resides from alpha-1-antitrypsin (SEQ ID NO: 1) and a variant of a human serum albumin can vary by at least 1, 2, 3, 4, or 5 residues from human serum albumin (SEQ ID NO: 5).

A "conservative amino acid substitution" is one in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Recombinant proteins having conservative substitutions are intended to be within the scope of the current invention.

The term "fusion" or "fusion molecule" can refer to a polypeptide or a nucleic acid fusion, depending on the context. It may include a full-length sequence or a protein or nucleic acid or a fragment thereof. It may also include a recombinant protein with or without a linker molecule.

An "isolated" protein refers to a protein that is removed from at least about 90% of at least one component of a natural sample from which the isolated protein can be obtained. Proteins can be "of at least about" a certain degree of purity if the species or population of species of interest is at least about 5, 25, 50, 75, 80, 90, 92, 95, 98, or 99% pure on a weight-weight basis.

As used herein, the term "oncotic" shall refer to oncotic pressure, or colloid osmotic pressure. It is a form of osmotic pressure exerted by proteins, notably albumin, in a blood vessel's plasma that pulls water into the circulatory system. It is the opposing force to hydrostatic pressure. It has a major effect on the pressure across the glomerular filter.

A "patient," "subject," or "host" (these terms are used interchangeably) to be treated by the subject method may mean either a human or non-human animal. Preferably, a patient, subject, or host refers to a human patient.

The term "prophylactically treating" a disease in a subject refers to subjecting the subject to a pharmaceutical treatment, e.g., the administration of a drug, such that at least one symptom of the disease is prophylactically treated, that is, administered prior to clinical manifestation of the unwanted condition so that it protects the host against developing the unwanted condition. "Prohylactially treating" a disease may also be referred to as "prophylaxis." In some embodiments, prophylactic treatment prevents the disorder.

As used herein, "treating" a disorder associated with an alpha-1-antitrypsin deficiency in a subject in need or "treating" a subject having a disorder associated with an alpha-1-antitrypsin deficiency, refers to subjecting the subject to a pharmaceutical treatment, e.g., the administration of a drug, such that at least one symptom of the disease is cured, alleviated, or decreased.

Any of the treatments described herein can be administered in combination with another agent or therapy. The term "combination" refers to the use of the two or more agents or therapies to treat the same patient, wherein the use or action of the agents or therapies overlap in time. The agents or therapies can be administered at the same time (e.g., as a single formulation that is administered to a patient or as two separate formulations administered concurrently) or sequentially in any order.

Recombinant Protein

Some embodiments provide a recombinant protein comprising an alpha-1-antitrypsin serpin domain, or functional fragment or variant thereof, and a human serum albumin domain or functional fragment or variant thereof, or human serum albumin binding domain or functional fragment or variant thereof.

Alpha-1-Antitrypsin Serpin Domain

In some embodiments, the alpha-1-antitrypsin serpin domain comprises a full-length alpha-1-antitrypsin. In some embodiments, the alpha-1-antitrypsin is a protein that comprises the sequence set forth in SEQ ID NO: 1.

In some embodiments, the alpha-1-antitrypsin serpin domain comprises one or more mutations. In some embodiments, the one or more mutations comprises a mutation in at least one of the following residue positions according to SEQ ID NO 1: 51, 100, 114, 117, 163, 164, 165, 168, 169, 172, 173, 174, 183, 189, 232, 283, 300, 302, 303, 304, 306, 330, 331, 333, 335, 336, 337, 338, 339, 340, 351, 356, 358, or 361. In some embodiments, the one or more mutations comprises one or more of the following mutations according to SEQ ID NO 1: F51L, L100F, L100C, T114F, G117F, K163T, G164V, T165S, K168C, K168I, K168A, K169V, L172V, L172A, L172C, V173C, K174T, A183V, F189C, F189I, F189V, C232S, S283C, K300A, V302A, L303A, G304A, 11,306A, S330R, K331F, K331I, K331V, K331T, K331C, V333C, V333A, K335A, K331F, K335G, K335T, A336G, V337C, V337A, L338a, T339S, I340V, M351V, I356M, M358I, M358P, M358A, M358V, or P361C. In some embodiments, the one or more mutations comprises F51L, G117F, K168C, F189C, C232S, S283C, K331F, K335A, M351V, M358V, M358L, or P361C according to SEQ ID NO: 1. In some embodiments, the one or more mutations are both of K168C and F189C according to SEQ ID NO: 1. In some embodiments, the one or more mutations are both of P361C and S283C according to SEQ ID NO: 1.

In some embodiments, the alpha-1-antitrypsin serpin domain has one or more mutations comprising C232S according to SEQ ID NO: 1. In some embodiments, the alpha-1-antitrypsin serpin domain has one or more mutations comprising M351V and M358V according to SEQ ID NO: 1. In some embodiments, the alpha-1-antitrypsin serpin domain has one or more mutations comprising M351V and M358L according to SEQ ID NO: 1. In some embodiments, the alpha-1-antitrypsin serpin domain has one or more mutations comprising C232S, M351V, and M358V according to SEQ ID NO: 1.

In some embodiments, the alpha-1-antitrypsin serpin domain has one or more mutations comprising F51L, C232S, M351V and M358L according to SEQ ID NO: 1. In some embodiments, the alpha-1-antitrypsin serpin domain has one or more mutations comprising G117F, C232S, M351V and M358L according to SEQ ID NO: 1. In some embodiments, the alpha-1-antitrypsin serpin domain has one or more mutations comprising C232S, K331F, M351V and M358L according to SEQ ID NO: 1. In some embodiments, the alpha-1-antitrypsin serpin domain has one or more mutations comprising C232S, K335A, M351V and M358L according to SEQ ID NO: 1. In some embodiments, the alpha-1-antitrypsin serpin domain has one or more mutations comprising K168C, F189C, C232S, M351V, and M358L according to SEQ ID NO: 1. In some embodiments, the alpha-1-antitrypsin serpin domain has one or more mutations comprising C232S, S283C, M351V, M358L, and P361C according to SEQ ID NO: 1. In some embodiments, the alpha-1-antitrypsin serpin domain has one or more mutations comprising F51L, G117F, C232S, M351V, and M358L according to SEQ ID NO: 1. In some embodiments, the alpha-1-antitrypsin serpin domain has one or more mutations comprising F51L, C232S, K331F, M351V, and M358L according to SEQ ID NO: 1. In some embodiments, the alpha-1-antitrypsin serpin domain has one or more mutations comprising F51L, C232S, K335A, M351V, and M358L according to SEQ ID NO: 1. In some embodiments, the alpha-1-antitrypsin serpin domain has one or more mutations comprising K51L, K168C, F189C, C232S, M351V, and M358L according to SEQ ID NO: 1. In some embodiments, the alpha-1-antitrypsin serpin domain has one or more mutations comprising F51L, C232S, S283C, M351V, M358L, and P361C according to SEQ ID NO: 1. In some embodiments, the alpha-1-antitrypsin serpin domain has one or more mutations comprising G117F, C232S, K331F, M351V, and M358L according to SEQ ID NO: 1. In some embodiments, the alpha-1-antitrypsin serpin domain has one or more mutations comprising G117F, K335A, C232S, M351V, and M358L according to SEQ ID NO: 1. In some embodiments, the alpha-1-antitrypsin serpin domain has one or more mutations comprising G117F, K168C, F189C, C232S, M351V, and M358L according to SEQ ID NO: 1. In some embodiments, the alpha-1-antitrypsin serpin domain has one or more mutations comprising G117F, C232S, S283C, M351V, M358L, and P361C according to SEQ ID NO: 1. In some embodiments, the alpha-1-antitrypsin serpin domain has one or more mutations comprising C232S, K331F, K335A, M351V, and M358L according to SEQ ID NO: 1. In some embodiments, the alpha-1-antitrypsin serpin domain has one or more mutations comprising K168C, F189C, C232S, K331F, M351V, and M358L according to SEQ ID NO: 1. In some embodiments, the alpha-1-antitrypsin serpin domain has one or more mutations comprising C232S, S283C, K331F, M351V, M358L, and P361C according to SEQ ID NO: 1. In some embodiments, the alpha-1-antitrypsin serpin domain has one or more mutations comprising K168C, F189C, C232S, K335A, M351V, and M358L according to SEQ ID NO: 1. In some embodiments, the alpha-1-antitrypsin serpin domain has one or more mutations comprising C232S, S283C, K335A, M351V, M358L, and P361C according to SEQ ID NO: 1. In some embodiments, the alpha-1-antitrypsin serpin domain has one or more mutations comprising K168C, F189C, C232S, S283C, M351V, M358L, and P361C according to SEQ ID NO: 1. In some embodiments, the alpha-1-antitrypsin serpin domain comprises a point mutation K335A according to SEQ ID NO: 1. In some embodiments, the alpha-1-antitrypsin serpin domain comprises a point mutation K331F according to SEQ ID NO: 1. In some embodiments, the alpha-1-antitrypsin serpin domain comprises a point mutation G117F according to SEQ ID NO: 1. In some embodiments, the alpha-1-antitrypsin serpin domain comprises a point mutation S283C according to SEQ ID NO: 1. In some embodiments, the alpha-1-antitrypsin serpin domain comprises a point mutation P361C according to SEQ ID NO: 1.

In some embodiments, glycan sites in an alpha-1-antitrypsin serpin domain are truncated and deleted. In some embodiments, the first residue of SEQ ID NO: 1 is mutated so that the glycan sites are deleted. In some embodiments, residues 1-46 of SEQ ID NO: 1 are deleted.

In some embodiments, the one or more mutations provide improved stability including improved stability to oxidation, retention of potency against human neutrophil elastase, resistance to polymerization, and ease of production, wherein the improved stability is measured against wild type.

In some embodiments, the one or more mutations are one or more mutations as set forth in Table 1 and in Tables 2-5 with residue positions being set forth according to SEQ ID NO: 1.

TABLE 1

AAT-Albumin Fusion

| | |
|---|---|
| Base | WT |
| Base | C232S |
| Base | M351V, M358V |
| Base | M351V, M358L |
| Base | C232S, M351V, M358L |

AAT Mutants

| | Base | F51L | G117F | K331F | K335A | K168C/ F189C | P361C- S283C |
|---|---|---|---|---|---|---|---|
| Base | | 1 | 2 | 3 | 4 | 5 | 6 |
| F51L | | | 7 | 8 | 9 | 10 | 11 |
| G117F | | | | 12 | 13 | 14 | 15 |
| K331F | | | | | 16 | 17 | 18 |
| K335A | | | | | | 19 | 20 |
| K168C/ F189C | | | | | | | 21 |
| P361C- S283C | | | | | | | |

In some embodiments, the alpha-1-antitrypsin serpin domain comprises a portion of the alpha-1-antitrypsin. In some embodiments, the portion of the alpha-1-antitrypsin serpin domain has an activity that is equal to or greater than a full length human alpha-1-antitrypsin such as, for example, without limitation, the alpha-1-antitrypsin serpin domain having the sequence set forth in SEQ ID NO: 1. In some embodiments, the portion is at least about 20 residues of an alpha-1-antitrypsin, at least about 30 residues of an alpha-1-antitrypsin, at least about 40 residues of an alpha-1-antitrypsin, at least about 50 residues of an alpha-1-antitrypsin, at least about 60 residues of an alpha-1-antitrypsin, at least about 70 residues of an alpha-1-antitrypsin, at least about 80 residues of an alpha-1-antitrypsin, at least about 90 residues of an alpha-1-antitrypsin, at least about 100 residues of an alpha-1-antitrypsin, at least about 110 residues of an alpha-1-antitrypsin, at least about 120 residues of an alpha-1-antitrypsin, at least about 130 residues of an alpha-1-antitrypsin, at least about 140 residues of an alpha-1-antitrypsin, at least about 150 residues of an alpha-1-antitrypsin, at least about 160 residues of an alpha-1-antitrypsin, at least about 170 residues of an alpha-1-antitrypsin, at least about 180 residues of an alpha-1-antitrypsin, at least about 190 residues of an alpha-1-antitrypsin, at least about 200 residues of an alpha-1-antitrypsin, at least about 210 residues of an alpha-1-antitrypsin, at least about 220 residues of an alpha-1-antitrypsin, at least about 230 residues of an alpha-1-antitrypsin, at least about 240 residues of an alpha-1-antitrypsin, at least about 250 residues of an alpha-1-antitrypsin, at least about 260 residues of an alpha-1-antitrypsin, at least about 270 residues of an alpha-1-antitrypsin, at least about 280 residues of an alpha-1-antitrypsin, at least about 290 residues of an alpha-1-antitrypsin, at least about 300 residues of an alpha-1-antitrypsin, at least about 310 residues of an alpha-1-antitrypsin, at least about 320 residues of an alpha-1-antitrypsin, at least about 330 residues of an alpha-1-antitrypsin, at least about 340 residues of an alpha-1-antitrypsin, at least about 350 residues of an alpha-1-antitrypsin, at least about 360 residues of an alpha-1-antitrypsin, at least about 370 residues of an alpha-1-antitrypsin, at least about 380 residues of an alpha-1-antitrypsin, or at least about 390 residues of an alpha-1-antitrypsin.

In some embodiments, the portion is at least about 20 residues of an alpha-1-antitrypsin having the sequence set forth in SEQ ID NO: 1, at least about 30 residues of an alpha-1-antitrypsin having the sequence set forth in SEQ ID NO: 1, at least about 40 residues of an alpha-1-antitrypsin having the sequence set forth in SEQ ID NO: 1, at least about 50 residues of an alpha-1-antitrypsin having the sequence set forth in SEQ ID NO: 1, at least about 60 residues of an alpha-1-antitrypsin having the sequence set forth in SEQ ID NO: 1, at least about 70 residues of an alpha-1-antitrypsin having the sequence set forth in SEQ ID NO: 1, at least about 80 residues of an alpha-1-antitrypsin having the sequence set forth in SEQ ID NO: 1, at least about 90 residues of an alpha-1-antitrypsin having the sequence set forth in SEQ ID NO: 1, at least about 100 residues of an alpha-1-antitrypsin having the sequence set forth in SEQ ID NO: 1, at least about 110 residues of an alpha-1-antitrypsin having the sequence set forth in SEQ ID NO: 1, at least about 120 residues of an alpha-1-antitrypsin having the sequence set forth in SEQ ID NO: 1, at least about 130 residues of an alpha-1-antitrypsin having the sequence set forth in SEQ ID NO: 1, at least about 140 residues of an alpha-1-antitrypsin having the sequence set forth in SEQ ID NO: 1, at least about 150 residues of an alpha-1-antitrypsin having the sequence set forth in SEQ ID NO: 1, at least about 160 residues of an alpha-1-antitrypsin having the sequence set forth in SEQ ID NO: 1, at least about 170 residues of an alpha-1-antitrypsin having the sequence set forth in SEQ ID NO: 1, at least about 180 residues of an alpha-1-antitrypsin having the sequence set forth in SEQ ID NO: 1, at least about 190 residues of an alpha-1-antitrypsin having the sequence set forth in SEQ ID NO: 1, at least about 200 residues of an alpha-1-antitrypsin having the sequence set forth in SEQ ID NO: 1, at least about 210 residues of an alpha-1-antitrypsin having the sequence set forth in SEQ ID NO: 1, at least about 220 residues of an alpha-1-antitrypsin having the sequence set forth in SEQ ID NO: 1, at least about 230 residues of an alpha-1-antitrypsin having the sequence set forth in SEQ ID NO: 1, at least about 240 residues of an alpha-1-antitrypsin having the sequence set forth in SEQ ID NO: 1, at least about 250 residues of an alpha-1-antitrypsin having the sequence set forth in SEQ ID NO: 1, at least about 260 residues of an alpha-1-antitrypsin having the sequence set forth in SEQ ID NO: 1, at least about 270 residues of an alpha-1-antitrypsin having the sequence set forth in SEQ ID NO: 1, at least about 280 residues of an alpha-1-antitrypsin having the sequence set forth in SEQ ID NO: 1, at least about 290 residues of an alpha-1-antitrypsin having the sequence set forth in SEQ ID NO: 1, at least about 300 residues of an alpha-1-antitrypsin having the sequence set forth in SEQ ID NO: 1, at least about 310 residues of an alpha-1-antitrypsin having the sequence set forth in SEQ ID NO: 1, at least about 320 residues of an alpha-1-antitrypsin having the sequence set forth in SEQ ID NO: 1, at least about 330 residues of an alpha-1-antitrypsin having the sequence set forth in SEQ ID NO: 1, at least about 340 residues of an alpha-1-antitrypsin having the sequence set forth in SEQ ID NO: 1, at least about 350 residues of an alpha-1-antitrypsin having the sequence set forth in SEQ ID NO: 1, at least about 360 residues of an alpha-1-antitrypsin having the sequence set forth in SEQ ID NO: 1, at least about 370 residues of an alpha-1-antitrypsin having the sequence set forth in SEQ ID NO: 1, at least about 380 residues of an alpha-1-antitrypsin having the sequence set forth in SEQ ID NO: 1, or at least about 390 residues of an alpha-1-antitrypsin having the sequence set forth in SEQ ID NO: 1.

In some embodiments, an alpha-1-antitrypsin serpin domain comprises a variant of a normal alpha-1-antitrypsin as set forth in SEQ ID NO: 1. In some embodiments, the variant comprises an active portion of the alpha-1-antitrypsin serpin domain.

Albumin

In some embodiments, the human serum albumin domain comprises a full-length human albumin. In some embodiments, the human serum albumin domain comprises the sequence set forth in SEQ ID NO: 3 or SEQ ID NO: 5. In some embodiments, the human serum albumin domain has a sequence comprising SEQ ID NO: 3 or SEQ ID NO: 5

In some embodiments, the human serum albumin domain comprises one or more mutations. In some embodiments, the one or more mutations comprises mutations in one or more of the following locations: 407, 408, 409, 410, 413, and 414, wherein the location numbers are with respect to SEQ ID NO. 5. In some embodiments, the one or more mutations comprises at least one of the following mutations: L407A, L408V, V409A, R410A, L413Q, and L414Q, wherein the position numbers are with respect to SEQ ID NO. 5 (See, e.g., International Publication No. WO95/23857, hereby incorporated in its entirety by reference herein.) in some embodiments, the one or more mutations comprises L407A, L408V, V409A, and R410A, wherein the position numbers are with respect to SEQ ID NO. 5. In some embodiments, the one or more mutations comprises R410A, L413Q, and L414Q, wherein the position numbers are with respect to SEQ ID NO. 5. In some embodiments, the one or more mutations improves stability and/or increases production of the recombinant protein.

In some embodiments, the human serum albumin domain comprises a portion of human albumin. In some embodiments, the portion is at least about 20 residues of a human serum albumin, at least about 30 residues of a human serum albumin, at least about 40 residues of a human serum albumin, at least about 50 residues of a human serum albumin, at least about 60 residues of a human serum albumin, at least about 70 residues of a human serum albumin, at least about 80 residues of a human serum albumin, at least about 90 residues of a human serum albumin, at least about 100 residues of a human serum albumin, at least about 110 residues of a human serum albumin, at least about 120 residues of a human serum albumin, at least about 130 residues of a human serum albumin, at least about 140 residues of a human serum albumin, at least about 150 residues of a human serum albumin, at least about 160 residues of a human serum albumin, at least about 170 residues of a human serum albumin, at least about 180 residues of a human serum albumin, at least about 190 residues of a human serum albumin, at least about 200 residues of a human serum albumin, at least about 210 residues of a human serum albumin, at least about 220 residues of a human serum albumin, at least about 230 residues of a human serum albumin, at least about 240 residues of a human serum albumin, at least about 250 residues of a human serum albumin, at least about 260 residues of a human serum albumin, at least about 270 residues of a human serum albumin, at least about 280 residues of a human serum albumin, at least about 290 residues of a human serum albumin, at least about 300 residues of a human serum albumin, at least about 310 residues of a human serum albumin, at least about 320 residues of a human serum albumin, at least about 330 residues of a human serum albumin, at least about 340 residues of a human serum albumin, at least about 350 residues of a human serum albumin, at least about 360 residues of a human serum albumin, at least about 370 residues of a human serum albumin, at least about 380 residues of a human serum albumin, at least about 390 residues of a human serum albumin, at least about 400 residues of a human serum albumin, at least about 410 residues of a human serum albumin, at least about 420 residues of a human serum albumin, at least about 430 residues of a human serum albumin, at least about 440 residues of a human serum albumin, at least about 450 residues of a human serum albumin, at least about 460 residues of a human serum albumin, at least about 470 residues of a human serum albumin, at least about 480 residues of a human serum albumin, at least about 490 residues of a human serum albumin, at least about 500 residues of a human serum albumin, at least about 510 residues of a human serum albumin, at least about 520 residues of a human serum albumin, at least about 530 residues of a human serum albumin, at least about 540 residues of a human serum albumin, at least about 550 residues of a human serum albumin, at least about 560 residues of a human serum albumin, at least about 570 residues of a human serum albumin, at least about 580 residues of a human serum albumin, at least about 590 residues of a human serum albumin, or at least about 600 residues of a human serum albumin.

In some embodiments, the portion is at least about 20 residues of a human serum albumin having the sequence set forth in SEQ ID NO: 3 or SEQ ID NO: 5, at least about 30 residues of a human serum albumin having the sequence set forth in SEQ ID NO: 3 or SEQ ID NO: 5, at least about 40 residues of a human serum albumin having the sequence set forth in SEQ ID NO: 3 or SEQ ID NO: 5, at least about 50 residues of a human serum albumin having the sequence set forth in SEQ ID NO: 3 or SEQ ID NO: 5, at least about 60 residues of a human serum albumin having the sequence set forth in SEQ ID NO: 3 or SEQ ID NO: 5, at least about 70 residues of a human serum albumin having the sequence set forth in SEQ ID NO: 3 or SEQ ID NO: 5, at least about 80 residues of a human serum albumin having the sequence set forth in SEQ ID NO: 3 or SEQ ID NO: 5, at least about 90 residues of a human serum albumin having the sequence set forth in SEQ ID NO: 3 or SEQ ID NO: 5, at least about 100 residues of a human serum albumin having the sequence set forth in SEQ NO: 3 or SEQ ID NO: 5, at least about 110 residues of a human serum albumin having the sequence set forth in SEQ ID NO: 3 or SEQ ID NO: 5, at least about 120 residues of a human serum albumin having the sequence set forth in SEQ ID NO: 3 or SEQ ID NO: 5, at least about 130 residues of a human serum albumin having the sequence set forth in SEQ ID NO: 3 or SEQ ID NO: 5, at least about 140 residues of a human serum albumin having the sequence set forth in SEQ ID NO: 3 or SEQ ID NO: 5, at least about 150 residues of a human serum albumin having the sequence set forth in SEQ ID NO: 3 or SEQ ID NO: 5, at least about 160 residues of a human serum albumin having the sequence set forth in SEQ ID NO: 3 or SEQ ID NO: 5, at least about 170 residues of a human serum albumin having the sequence set forth in SEQ ID NO: 3 or SEQ ID NO: 5, at least about 180 residues of a human serum albumin having the sequence set forth in SEQ ID NO: 3 or SEQ ID NO: 5, at least about 190 residues of a human serum albumin having the sequence set forth in SEQ ID NO: 3 or SEQ ID NO: 5, at least about 200 residues of a human serum albumin having the sequence set forth in SEQ ID NO: 3 or SEQ ID NO: 5, at least about 210 residues of a human serum albumin having the sequence set forth in SEQ ID NO: 3 or SEQ ID NO: 5, at least about 220 residues of a human serum albumin having the sequence set forth in SEQ ID NO: 3 or SEQ ID NO: 5, at least about 230 residues of a human serum albumin having the sequence set forth in SEQ ID NO: 3 or SEQ ID NO: 5, at least about 240 residues of a human serum albumin having the sequence set forth in SEQ ID NO: 3 or SEQ ID NO: 5, at least about 250 residues of a human serum albumin having the sequence set forth in SEQ ID NO: 3 or SEQ ID NO: 5, at least about 260 residues of a human serum albumin having the sequence set forth in SEQ ID NO: 3 or SEQ ID NO: 5, at least about 270 residues of a human serum albumin having the sequence set forth in SEQ ID NO: 3 or SEQ ID NO: 5, at least about 280 residues of a human serum albumin having the sequence set forth in SEQ ID NO: 3 or SEQ ID NO: 5, at least about 290 residues of a human serum albumin having the sequence set forth in SEQ ID NO: 3 or SEQ ID NO: 5, at least about 300 residues of a human serum albumin having the sequence set forth in SEQ ID NO: 3 or SEQ ID NO: 5, at least about 310 residues of a human serum albumin having the sequence set forth in SEQ ID NO: 3 or SEQ ID NO: 5, at least about 320 residues of a human serum albumin having the sequence set forth in SEQ ID NO: 3 or SEQ ID NO: 5, at least about 330 residues of a human serum albumin having the sequence set forth in SEQ ID NO: 3 or SEQ ID NO: 5, at least about 340 residues of a human serum albumin having the sequence set forth in SEQ ID NO: 3 or SEQ ID NO: 5, at least about 350 residues of a human serum albumin having the sequence set forth in SEQ ID NO: 3 or SEQ ID NO: 5, at least about 360 residues of a human serum albumin having the sequence set forth in SEQ ID NO: 3 or SEQ ID NO: 5, at least about 370 residues of a human serum albumin having the sequence set forth in SEQ ID NO: 3 or SEQ ID NO: 5, at least about 380 residues of a human serum albumin having the sequence set forth in SEQ ID NO: 3 or SEQ ID NO: 5, at least about 390 residues of a human serum albumin having the sequence set forth in SEQ ID NO: 3 or SEQ ID NO: 5, at least about 400 residues of a human serum albumin having the sequence set forth in SEQ ID NO: 3 or SEQ ID NO: 5, at least about 410 residues of a human serum albumin having the sequence set forth in SEQ ID NO: 3 or SEQ ID NO: 5, at least about 420 residues of a human serum albumin having the sequence set forth in SEQ ID NO: 3 or SEQ ID NO: 5, at least about 430 residues of a human serum albumin having the sequence set forth in SEQ ID NO: 3 or SEQ ID NO: 5, at least about 440 residues of a human serum albumin having the sequence set forth in SEQ ID NO: 3 or SEQ ID NO: 5, at least about 450 residues of a human serum albumin having the sequence set forth in SEQ ID NO: 3 or SEQ ID NO: 5, at least about 460 residues of a human serum albumin having the sequence set forth in SEQ ID NO: 3 or SEQ ID NO: 5, at least about 470 residues of a human serum albumin having the sequence set forth in SEQ ID NO: 3 or SEQ ID NO: 5, at least about 480 residues of a human serum albumin having the sequence set forth in SEQ ID NO: 3 or SEQ ID NO: 5, at least about 490 residues of a human serum albumin having the sequence set forth in SEQ ID NO: 3 or SEQ ID NO: 5, at least about 500 residues of a human serum albumin having the sequence set forth in SEQ ID NO: 3 or SEQ ID NO: 5, at least about 510 residues of a human serum albumin having the sequence set forth in SEQ ID NO: 3 or SEQ ID NO: 5, at least about 520 residues of a human serum albumin having the sequence set forth in SEQ ID NO: 3 or SEQ ID NO: 5, at least about 530 residues of a human serum albumin having the sequence set forth in SEQ ID NO: 3 or SEQ ID NO: 5, at least about 540 residues of a human serum albumin having the sequence set forth in SEQ ID NO: 3 or SEQ ID NO: 5, at least about 550 residues of a human serum albumin having the sequence set forth in SEQ ID NO: 3 or SEQ ID NO: 5, at least about 560 residues of a human serum albumin having the sequence set forth in SEQ ID NO: 3 or SEQ ID NO: 5, at least about 570 residues of a human serum albumin having the sequence set forth in SEQ ID NO: 3 or SEQ ID NO: 5, at least about 580 residues of a human serum albumin having the sequence set forth in SEQ ID NO: 3 or SEQ ID NO: 5, at least about 590 residues of a human serum albumin having the sequence set forth in SEQ ID NO: 3 or SEQ ID NO: 5, or at least about 600 residues of a human serum albumin having the sequence set forth in SEQ ID NO: 3 or SEQ ID NO: 5.

In some embodiments, the portion of human serum albumin consists of or comprises at least one amino acid sequence, or a variant thereof, of the sequences set forth in amino acid residues 1-194 of SEQ ID NO: 5, amino acid residues 195-387 of SEQ ID NO: 5, amino acid residues 388-585 of SEQ ID NO: 5, 1-387 of SEQ ID NO: 5, 195-585 of SEQ ID NO: 5, or amino acid residues 1-194 of SEQ ID NO:5 and amino acid residues 388-585 of SEQ ID NO: 5. Each domain is itself made up of two homologous subdomains namely 1-105, 120-194, 195-291, 316-387, 388-491 and 512-585, with flexible inter-subdomain linker regions (See, for example, EP 2 090 589 A1, which is incorporated by reference herein, including any drawings.) In some embodiments, the portion consists of or comprises at least one subdomain.

In some embodiments, the portion of the human serum albumin domain has an activity that is equal to or greater than a full length human albumin such as. In some embodiments, the human serum albumin has a sequence comprising the sequence set forth in SEQ ID NO: 5.

In some embodiments, the human serum albumin domain comprises a variant of a wild type human serum albumin.

Albumin Binding Protein

In some embodiments, the human serum albumin binding domain comprises amino acid sequences that are capable of binding to human serum albumin. In some embodiments, the human serum albumin has the sequence set forth in SEQ ID NO: 3 or SEQ ID NO: 5. In some embodiments, human serum albumin comprises a portion of the human serum albumin set forth in SEQ ID NO: 5. In some embodiments, the portion of the human albumin comprises an epitope.

In some embodiments, the human serum albumin binding domain comprises an antibody. In some embodiments, the antibody is a monoclonal antibody. In some embodiments, the antibody is a humanized antibody. In some embodiments, the antibody is a human immunoglobulin ((e.g., IgG (e.g., IgG1, IgG2, IgG3, IgG4); IgE (e.g., IgE1), IgA (e.g., IgA1, IgA2), IgM (e.g., IgM1), IgD (e.g., IgD1)) or fragment, portion, or variant of a human immunoglobulin.

In some embodiments, the human serum albumin binding domain comprises a single domain antibody. In some embodiments, the single domain antibody comprises a CDR1 sequence comprising, consisting of, or consisting essentially of a sequence selected from SEQ ID NOs: 6-9. In some embodiments, the single domain antibody comprises a CDR2 sequence comprising, consisting of, or consisting essentially of a sequence selected from SEQ ID NOs: 10-16. In some embodiments, the single domain antibody comprises a CDR3 sequence comprising, consisting of, or consisting essentially of a sequence selected from SEQ ID NOs: 17-21. In some embodiments, the single domain antibody includes any one or more of the framework regions having a sequence comprising SEQ ID NOs: 37-62.

In some embodiments, the single domain antibody comprises a combination of one or more binding domains. In some embodiments, the single domain antibody comprises a combination of one or more of CDR1, CDR2, and CDR3. In some embodiments, the single domain antibody comprises a CDR1 sequence comprising, consisting of, or consisting essentially of a sequence selected from SEQ ID NOs: 6-9 and a CDR2 sequence comprising, consisting of, or consisting essentially of a sequence selected from SEQ ID NOs: 10-16. In some embodiments, the single domain antibody comprises a CDR1 sequence comprising, consisting of, or consisting essentially of a sequence selected from SEQ ID NOs: 6-9 and a CDR3 sequence comprising, consisting of, or consisting essentially of a sequence selected from SEQ ID NOs: 17-21. In some embodiments, the single domain antibody comprises a CDR2 sequence comprising, consisting of, or consisting essentially of a sequence selected from SEQ ID NOs: 10-16 and a CDR3 sequence comprising, consisting of, or consisting essentially of a sequence selected from SEQ ID NOs: 17-21. In some embodiments, the single domain antibody comprises a CDR1 sequence comprising, consisting of, or consisting essentially of a sequence selected from SEQ ID NOs: 6-9, a CDR2 sequence comprising, consisting of, or consisting essentially of a sequence selected from SEQ ID NOs: 10-16, and a CDR3 sequence comprising, consisting of, or consisting essentially of a sequence selected from SEQ ID NOs: 17-21.

In some embodiments, the single domain antibody comprises a sequence selected from SEQ ID NOs: 22-28.

In some embodiments, the single domain antibody comprises a humanized sequence selected from SEQ ID NOs: 29-36. In some embodiments, the single domain antibody comprises a humanized sequence comprising, consisting of, or consisting essentially of SEQ ID NO: 29. In some embodiments, the single domain antibody comprises a humanized sequence comprising, consisting of, or consisting essentially of SEQ ID NO: 30. In some embodiments, the single domain antibody comprises a humanized sequence comprising, consisting of, or consisting essentially of SEQ ID NO: 31. In some embodiments, the single domain antibody comprises a humanized sequence comprising, consisting of, or consisting essentially of SEQ ID NO: 32. In some embodiments, the single domain antibody comprises a humanized sequence having SEQ ID NO: 33. In some embodiments, the single domain antibody comprises a humanized sequence comprising, consisting of, or consisting essentially of SEQ ID NO: 34. In some embodiments, the single domain antibody comprises a humanized sequence comprising, consisting of, or consisting essentially of SEQ ID NO: 35. In some embodiments, the single domain antibody comprises a humanized sequence comprising, consisting of, or consisting essentially of SEQ ID NO: 36.

In some embodiments, the single domain antibody comprises a variant of a humanized sequence selected from SEQ ID NOs: 29-36. Variants described herein include polypeptides having at least about 75%, at least about 80%, at least about 85%, at least about 90%, at least about 95%, at least about 96%, at least about 97%, at least about 98% or at least about 99% identity with any sequence of the popypeptides provided herein. For example, variants of a humanized single domain antibody would have at least about 75%, at least about 80%, at least about 85%, at least about 90%, at least about 95%, at least about 96%, at least about 97%, at least about 98%, or at least about 99% identity with the amino acid sequence of any one of SEQ ID NOs: 29-36.

Nucleic Acids

Some embodiments comprise an isolated nucleic acid molecule encoding a recombinant protein comprising a nucleic acid encoding an alpha-1-antitrypsin serpin domain operatively linked to a nucleotide sequence encoding a human serum albumin or a human serum albumin binding domain. In some embodiments, the human serum albumin binding domain comprises an antibody. In some embodiments, the antibody comprises a single domain antibody.

In some embodiments, the disclosure features a nucleic acid molecule that includes a fragment of an alpha-1-antitrypsin serpin domain encoding sequence and a fragment of a human serum albumin binding domain or a human serum albumin domain encoding sequence. In some embodiments, the nucleotide sequence encodes a fragment or variant of the alpha-1-antitrypsin of SEQ ID NO: 1 and/or a fragment of a human serum albumin binding domain or a human serum albumin domain encoding sequence of SEQ ID NO: 3 or SEQ ID NO: 5 or any of SEQ NOs: 22-36.

In some embodiments, the nucleic acid comprises a vector as will be set forth below.

Domains, Domain Order, and Linkers

In some embodiments, the recombinant proteins of the invention have one human serum albumin domain or one human serum albumin binding domain and one alpha1-antitrypsin serum domain. In some embodiments, multiple domains of each protein, however, may be used to make a recombinant protein of the invention. Similarly, more than one alpha-1-antitrypsin serum domain may be used to make a recombinant protein of the invention. For instance, an alpha-1-antitrypsin serum domain may be fused to both the N- and C-terminal ends of the human serum albumin domain or the human serum albumin binding domain.

In some embodiments, the recombinant proteins do not contain a linker between the fused portions of the polypeptides (e.g., the portion of alpha-1-antitrypsin serpin domain is fused to the portion of the human serum albumin domain and/or human serum albumin binding domain). In some embodiments, the recombinant proteins include a linker peptide between the fused portions of the polypeptides. The linker can be a peptide linker. The linker can improve expression yield of the recombinant protein. The linker can improve and/or enhance biological activity of the alpha-1-antitrypsin serpin domain.

One skilled in the art will appreciate that there are a great number of linkers that can be used for the present invention (See, for example, Chen at al., Fusion Protein Linkers: Property, Design, and Functionality, *Adv Drug Deliv Rev.* 2013 October 15; 65(10): 1357-1369 (2012), which is incorporated by reference herein in its entirety.) In some embodiments, the linker is a peptide having a sequence comprising, consisting of or, or consisting essentially of the set forth in SEQ ID NO: 63.

Compositions

The disclosure provides a pharmaceutical composition comprising any of the recombinant proteins set forth herein. Pharmaceutical compositions may take the form of any acceptable pharmaceutical formulation. Pharmaceutical compositions can be formulated in a variety of different forms, such as liquid, semi-solid, and solid dosage forms, such as liquid solutions (e.g., injectable and infusible solutions), dispersions or suspensions, tablets, pills, powders, liposomes, and suppositories. The preferred form can depend on the intended mode of administration and therapeutic application.

Exemplary pharmaceutical compositions are described below. The pharmaceutical compositions include those suitable for parenteral (including intravenous, subcutaneous, intradermal, intramuscular, and intraarticular), topical (including dermal, transdermal, transmucosal, buccal, sublingual, and intraocular), and rectal administration, although the most suitable route may depend upon, for example, the condition and disorder of the recipient.

The pharmaceutical compositions described herein can be administered systemically, e.g., parenteral (e.g., intravenous, subcutaneous, intradermal, intramuscular, and intraarticular). The pharmaceutical compositions described herein can be administered locally, e.g., administered to an area affected by the condition or disorder the pharmaceutical composition is being administered to treat.

Compositions for parenteral administration include aqueous and non-aqueous sterile injection solutions that may contain anti-oxidants, buffers, bacteriostats, and solutes that render the composition isotonic with the blood of the intended recipient and aqueous and non-aqueous sterile suspensions that may include suspending agents and thickening agents. The composition may be presented in unit-dose or multi-dose containers, for example sealed ampoules and vials, and may be stored in a freeze-dried (lyophilized) condition requiring only the addition of the sterile liquid carrier, for example saline or water-for-injection, immediately prior to use. Extemporaneous injection solutions and suspensions may be prepared from sterile powders, granules, and tablets. Exemplary compositions for parenteral administration include injectable solutions or suspensions which can contain, for example, suitable non-toxic, parenterally acceptable diluents, or solvents, such as EDTA, mannitol, 1,3-butanediol, water, Ringer's solution, an isotonic sodium chloride solution, or other suitable dispersing or wetting and suspending agents. The compositions may contain pharmaceutically acceptable substances or adjuvants, including, but not limited to, EDTA, e.g., 0.5 mM EDTA; pH adjusting and buffering agents and/or tonicity adjusting agents, e.g., sodium acetate, sodium lactate, sodium chloride, potassium chloride, calcium chloride, sorbitan monolaurate, minor amounts of non-toxic auxiliary substances, such as wetting, or emulsifying agents or preservatives.

Treatment

In some embodiments, the disclosure features a method of treating a disorder associated with an alpha-1 antitrypsin deficiency, the method comprising administering to a patient or subject in need thereof having a disorder associated with an alpha-1-antitrypsin deficiency an effective amount of a recombinant protein or pharmaceutical compositions provided herein. In some embodiments, the disclosure features a method of prophylactically treating a disorder associated with an alpha-1 antitrypsin deficiency, the method comprising administering to a patient or subject in need thereof having a disorder associated with an alpha-1-antitrypsin deficiency an effective amount of a recombinant protein or pharmaceutical compositions as set forth herein. In some embodiments, the recombinant protein or pharmaceutical compositions may be administered to a patient in need thereof alone or in combination with another compound.

In some embodiments, administration of the recombinant protein or pharmaceutical compositions is administered about once a week or at longer intervals than about once a week, about once every 10 days or at longer intervals than about once every 10 days, about once every 15 days or at longer intervals than about once every 15 days, about once every 20 days or at longer intervals than about once every 20 days, about once every 25 days or at longer intervals than about once every 25 days, about once every month or at longer intervals than about once a month, about once every two months or at longer intervals than about once every two months, or about once every three months or at longer intervals than about once every three months.

In some embodiments, the subject has been diagnosed with or is at risk of being diagnosed with an alpha-1-antitrypsin deficiency. In some embodiments, the alpha-1-antitrypsin deficiency shows evidence of liver disease or evidence of lung disease. In some embodiments, the alpha-1-antitrypsin deficiency occurs in a person that has no apparent cause of liver disease or lung disease. In some embodiments, the evidence of liver disease or evidence of lung disease is at least one selected from the group consisting of emphysema, hepatic failure, hepatitis, hepatomology, jaundice, cirrhosis, nephratic syndrome, autosomal recessive inheritance, COPD-like symptoms, dyspnea, elevated hepatic transaminases, and hepatocellular carcinoma.

In some embodiments, the alpha-1-antitrypsin deficiency is caused by deficiency mutations in the SERPINA1 gene. More than 120 deficiency mutations in the SERPINA1 gene have been identified and may be useful for diagnosis according to the invention. Some deficiency mutations do not affect the production of alpha-1 antitrypsin while others cause a shortage or deficiency of the protein. In some embodiments, the deficiency mutations in the SERPINA1 gene replace the amino acid glutamic acid with the amino acid lysine at protein position 342 according to SEQ ID NO: 1.

Abnormal alpha-1 antitrypsin proteins may bind together to form a large molecule that cannot leave the liver. The accumulation of these polymers often results in liver damage. In addition, lung tissue is destroyed because not enough alpha-1 antitrypsin is available to protect against neutrophil elastase or PR3. Polymers of alpha-1 antitrypsin may also contribute to excessive inflammation, which may explain some of the other features of alpha-1 antitrypsin deficiency, such as a skin condition called panniculitis. Other SERPINA1 deficiency mutations lead to the production of an abnormally small form of alpha-1 antitrypsin that is quickly broken down in the liver. As a result, little or no alpha-1 antitrypsin is available in the lungs. While the liver remains healthy in individuals with these deficiency mutations, the lungs are left unprotected from neutrophil elastase or PR3.

In some embodiments, the deficiency mutation is a loss-of-function mutation. In some embodiments, the deficiency mutation results in a stop codon. In some embodiments, the deficiency mutation results in an amino acid substitution. In some embodiments, the deficiency mutation is a point mutation, insertion, deletion, and/or substitution. In some embodiments, the deficiency mutation is a point mutation. In some embodiments, the deficiency mutation is a deletion. The deletion can involve only one or a few base pairs, multiple exons, or the entire gene. In some embodiments, the deficiency mutation is a whole gene deletion. In some embodiments, the deficiency mutation is a partial gene deletion. In some embodiments, the deficiency mutation results in intronic changes that affect splicing. In some embodiments, the deficiency mutation is an alteration of the 3' untranslated region of the gene. In some embodiments, the deficiency mutation is a gross chromosomal rearrangement. In some embodiments, the deficiency mutation results in truncation of the SERPINA1 gene product.

In some embodiments, the subject has aberrant expression of the alpha-1-antitrypsin protein compared to a reference standard. In some embodiments, the reference standard is the level of expression of the alpha-1-antitrypsin protein in a subject who does not have the disorder associated with alpha-1-antitrypsin deficiency. In some embodiments, the subject has decreased or substantially no expression of the alpha-1-antitrypsin protein compared to a reference standard. In some embodiments, the reference standard is the level of expression of the alpha-1-antitrypsin protein in a subject who does not have the disorder associated with alpha-1-antitrypsin deficiency.

In some embodiments, the alpha-1-antitrypsin serpin domain is a normal alpha-1-antitrypsin domain allele (See Crystal, R. G. The alpha-1-antitrypsin gene and its deficiency states. Trends Genet. 5: 411-417, 1989. [PubMed: 2696185], which is incorporated by reference in its entirety herein.) In some embodiments, the allele is an allele with a valine at position 213 (M1V; 107400.0002) and that with alanine at position 213 (M1A; 107400.0001) according to SEQ ID NO: 1 (See Nukiwa, T., Brantly, M. L., Ogushi, F., Fells, G. A., Crystal, R. G. Characterization of the gene and protein of the common alpha-1-antitrypsin normal M2 allele. Am. J. Hum. Genet. 43: 322-330, 1988. [PubMed: 2901226], which is incorporated by reference in its entirety herein.) In some embodiments, the allele is a deficiency allele or a null allele.

In some embodiments, the subject has been diagnosed with or is at risk of a disorder associated with an alpha-1-antitrypsin deficiency. In some embodiments, the subject has a mutation in the gene encoding an alpha-1-antitrypsin domain. In some embodiments, the mutation is a mutation in one of the exons of alpha-1-antitrypsin. In some embodiments, the mutation is a mutation in exon 1 of alpha-1-antitrypsin, the 5-prime coding region of exon 2 of alpha-1-antitrypsin, or the 3-prime portion of exon 5 of alpha-1-antitrypsin (See Long, G. L., Chandra, T., Woo, S. L. C., Davie, E. W., Kurachi, K. Complete sequence of the cDNA for human alpha-1-antitrypsin and the gene for the S variant. Biochemistry 23: 4828-4837, 1984. [PubMed: 6093867], which is incorporated by reference in its entirety herein.)

In some embodiments, the recombinant protein or pharmaceutical compositions is administered intravenously. In some embodiments, the recombinant protein or pharmaceutical compositions is administered intradermally. In some embodiments, the recombinant protein or pharmaceutical compositions is administered topically. In some embodiments, the recombinant protein or pharmaceutical compositions is administered subcutaneously. In some embodiments, the recombinant protein or pharmaceutical compositions is administered intrathecally. In some embodiments, the recombinant protein or pharmaceutical compositions is administered intrathecally.

Vectors and Host Cells and Expression of Polypeptides

In some embodiments, the nucleic acid is a vector. In some embodiments, the vector comprises a host cell. Some embodiments are drawn to a method of making a recombinant protein comprising culturing the host cell with one of the nucleic acids provided herein and collecting the recombinant protein. In some embodiments, the recombinant protein is collected using an alpha-1-antitrypsin-Fc capture select media at neutral pH.

The recombinant proteins described herein may be produced, e.g., as recombinant molecules by secretion from any suitable host cell. Many expression systems are known and may be used, including bacteria (for example *E. coli* and *Bacillus subtilis*), yeasts (for example *Saccharomyces cerevisiae, Kluyveromyces lactis* and *Pichia pastoris*, filamentous fungi (for example *Aspergillus*), plant cells, animal cells, and insect cells.

In some embodiments, the host cell is a eukaryotic cell. In some embodiments, the host cell is a mammalian cell. In some embodiments, the host cell is selected from the group consisting of CHO cells, BHK cells, COS-7 cells, L cells, C127 cells, and 3T3 cells. In some embodiments, the host cell is a CHO cell.

In some embodiments, the host cell is a yeast cell. Exemplary genera of yeast which can be used as hosts described herein include but are not limited to *Pichia, Saccharomyces, Kluyveromyces, Aspergillus, Candida, Torulopsis, Torulaspora, Schizosaccharomyces, Citeromyces, Pachysolen, Zygosaccharomyces, Debaromyces, Trichoderma, Cephalosporium, Humicola, Mucor, Neurospora, Yarrowia, Metschunikowia, Rhodosporidium, Leucosporidium, Botryoascus, Sporidiobolus, Endomycopsis*, and the like. Examples of *Saccharomyces* spp, are *S. cerevisiae, S. italicus* and *S. rouxii*. Yeast strains suitable for the production of fusion polypeptides described herein can include, but are not limited to D88, DXY1 and BXP10.

In addition to the transformed host cells themselves, also described herein is a culture of those cells, preferably a monoclonal (clonally homogeneous) culture, or a culture derived from a monoclonal culture, in a nutrient medium. If the recombinant protein is secreted, the medium will contain the recombinant protein, with the cells, or without the cells if they have been filtered or centrifuged away.

The recombinant proteins can be produced in conventional ways, for example from a coding sequence inserted in the host chromosome or on a free plasmid. The host cells are transformed with a coding sequence for the recombinant protein by any method known in the art, for example electroporation. Successfully transformed cells, i.e., cells that contain a DNA construct described herein, can be identified by techniques known to those of skill in the art. For example, cells resulting from the introduction of an expression construct can be grown to produce the recombinant protein. Cells can be harvested and lysed and their DNA content examined for the presence of the DNA using methods known in the art. The presence of the recombinant protein in the supernatant can be detected using any method known in the art (e.g. an antibody based detection method).

Also disclosed herein are plasmid vectors comprising the nucleic acids used to express the recombinant proteins described herein. In order to express the recombinant proteins described herein, the nucleotide sequence encoding the appropriate recombinant proteins, or a functional equivalent, can be inserted into a suitable vector. A suitable vector contains the necessary and appropriate transcriptional and translational control sequences for expression of the inserted nucleic acid sequence. Standard methods, known to those skilled in the art, may be used to construct the recombinant expression vectors containing the nucleic acid sequences described herein. These methods include, but are not limited to, in vitro recombinant techniques, synthetic techniques, and in vivo recombination/genetic recombination; the choice of method depends on the nature of the specific nucleotide fragments and may be determined by persons skilled in the art.

Suitable vectors for use herein may contain an origin of replication and a restriction endonuclease sequence site. Persons skilled in the art would have knowledge of suitable origin of replication and restriction endonuclease sequences for use in the host cell.

Suitable vectors for use herein may contain sequence elements to aid transcription, including, but not limited to, promoter and enhancer elements. Persons skilled in the art would have knowledge of various transcriptional control elements, including but not limited to, promoters, inducible promoters, and enhancer elements, that would be suitable in the host cell.

Suitable vectors for use herein may also contain a selectable marker gene that encodes a product necessary for the host cell to grow and survive under specific conditions, aiding in the selection of host cells into which the vector has been introduced. Typical selection genes may include, but not be limited to, genes encoding a protein that confers resistance to an antibiotic, drug, or toxin (e.g. tetracycline, ampicillin, neomycin, hygromycin, etc). Persons skilled in the art would have knowledge of coding sequences for suitable selectable markers and reporter genes for use in the host cell.

Expression vectors described herein can be introduced into host cells via conventional transformation or transfection techniques. Transformation and transfection techniques include, but are not limited to, calcium phosphate or calcium chloride coprecipitation, DEAE-dextran-mediated transfection, lipofectamine, electroporation, microinjection, and viral mediated transfection (See, U.S. Pat. No. 6,632,637, which is incorporated by reference herein in its entirety.) Persons skilled in the art would have knowledge of suitable transformation and transfection methods based on the host cell/vector combination. For long term, high yield production of recombinant proteins, stable expression of the recombinant protein may be preferred. Host cells that stably express the recombinant protein may be engineered. Yeast plasmid vectors can include but are not limited to pRS403-406, pRS413-416, pRS403, pRS404, pRS405, pRS406, pRS413-416, pPPC0005, pScCHSA, pScNHSA, and pC4.

In another embodiment, the recombinant mammalian expression vector is capable of directing expression of the polypeptide preferentially in a particular cell type (e.g., tissue-specific regulatory elements are used I to express the polypeptide). Tissue-specific regulatory elements are known in the art. Non-limiting examples of suitable tissue-specific promoters include the albumin promoter (liver-specific; Pinkert et al. (1987) Genes Dev. 1:268-277), lymphoid-specific promoters (Calame and Eaton (1988) Adv. Immunol. 43:235-275), T cell promoters (Winoto and Baltimore (1989) EMBO J. 8:729-733) and immunoglobulin promoters (Banerji et al. (1983) Cell 33:729-740 and Queen and Baltimore (1983) Cell 33:741-748), neuron-specific promoters (e.g., the neurofilament promoter; Byrne and Ruddle (1989) Proc. Natl. Acad. Sci. USA 86:5473-5477), pancreas-specific promoters (Edlund et al. (1985) Science 230:912-916), and mammary gland-specific promoters (e.g., milk whey promoter; U.S. Pat. No. 4,873,316 and European Application Publication No. 264,166). Developmentally-regulated promoters are also encompassed, for example the murine hox promoters (Kessel and Gruss (1990) Science 249:374-379) and the alpha-fetoprotein promoter (Campes and Tilghman (1989) Genes Dev. 3:537-546). Each of the above-identified references are incorporated by reference in their entirety, including any drawings.

Recombinant proteins described herein can be recovered and purified from recombinant cell cultures by well-known methods including ammonium sulfate or ethanol precipitation, acid extraction, anion or cation exchange chromatography, phosphocellulose chromatography, hydrophobic interaction chromatography, affinity chromatography, hydroxylapatite chromatography, hydrophobic charge interaction chromatography, and lectin chromatography. In some embodiments, high performance liquid chromatography ("HPLC") is employed for purification. Polypeptides produced and recovered by recombinant and molecular biology methods described herein may be purified according to standard protocols known in the art (e.g., dialysis, ion exchange chromatography, affinity chromatography, SDS gel electrophoresis, etc). The polypeptides and/or fusion polypeptides described herein may be purified to homogeneity by ion exchange chromatography, hydrophobic interaction chromatography, reverse phase chromatography, or gel filtration. Depending upon the host employed in a recombinant production procedure, the polypeptides of the present invention may be glycosylated or may be non-glycosylated. In some embodiments, the recombinant protein will be purified with an alpha-1-antitrypisn-Fc capture select media at neutral pH.

In some embodiments, the nucleic acids encoding the recombinant protein described herein is optimized for expression in yeast. Exemplary genera of yeast which can be used as hosts for expressing the fusion polypeptides described herein include but are not limited to *Pichia, Saccharomyces, Kluyveromyces, Aspergillus, Candida, Torulopsis, Torulaspora, Schizosaccharomyces, Citeromyces, Pachysolen, Zygosaccharomyces, Debaromyces, Trichoderma, Cephalosporium, Humicola, Mucor, Neurospora, Yarrowia, Metschunikowia, Rhodosporidium, Leucosporidium, Botryoascus, Sporidiobolus, Endomycopsis*, and the like. Yeast strains suitable for the production of fusion polypeptides described herein can include, but are not limited to D88, DXY1 and BXP10. Yeast plasmid vectors can include but are not limited to pRS403-406, pRS413-416, pRS403, pRS404, pRS405, pRS406, pRS413-416, pPPC0005, pScCHSA, pScNHSA, and pC4. Vectors for making albumin fusion proteins for expression in yeast include pPPC0005, pScCHSA, pScNHSA, and pC4:HSA.

In some embodiments, the nucleic acids encoding the recombinant protein described herein is expressed in Saccharomyces. Preferred exemplary species of *Saccharomyces* include *S. cerevisiae, S. italicus, S. diastaticus*, and *Zygosaccharomyces rouxii*. Preferred exemplary species of *Kluyveromyces* include *K. fragilis* and *K. lactis*. Preferred exemplary species of *Hansenula* include *H. polymorpha* (now *Pichia angusta*), *H. anomala* (now *Pichia anomala*) and *Pichia capsulata*.

Other organisms may be used for expression. Additional exemplary species of *Pichia* include *P. pastoris*. Exemplary species of *Aspergillus* include *A. niger* and *A. nidulans*. Preferred exemplary species of *Yarrowia* include *Y. lipolytica*. Many preferred yeast species are available from the ATCC® (American Type Culture Collection).

TABLE S

| Sequences. | | |
|---|---|---|
| SEQ ID NO: | Region | Sequence |
| 1 | Alpha-1-antitrypsin | EDPQGDAAQKTDTSHHDQDHPTFNKITPNLAEFAFSLYRQLAHQSNSTNIFFSPVSIATAFAMLSLGTKADTHDEILEGLNFNLTEIPEAQIHEGFQELLRTLNQPDSQLQLTTGNGLFLSEGLKLVDKFLEDVKKLYHSEAFTVNFGDTEEAKKQINDYVEKGTQGKIVDLVKELDRDTVFALVNYIFFKGKWERPFEVKDTEEEDFHVDQVTTVKVPMMKRLGMFNIQHCKKLSSWVLLMKYLGNATAIFFLPDEGKLQHLENELTHDIITKFLENEDRRSASLHLPKLSITGTYDLKSVLGQLGITKVFSNGADLSGVTEEAPLKLSKAVHKAVLTIDEKGTEAAGAMFLEAIPMSIPPEVKFNKPFVFLMIEQNTKSPLFMGKWNPTQK |
| 2 | Alpha-1-antitrypsin leader | MPSSVSWGILLLAGLCCLVPVSLA |
| 3 | Human Albumin | MKWVTFISLLFLFSSAYSRGVFRRDAHKSEVAHRFKDLGEENFKALVLIAFAQYLQQCPFEDHVKLVNEVTEFAKTCVADESAENCDKSLHTLFGDKLCTVATLRETYGEMADCCAKQEPERNECFLQHKDDNPNLPRLVRPEVDVMCTAFHDNEETFLKKYLYEIARRHPYFYAPELLFFAKRYKAAFTECCQAADKAACLLPKLDELRDEGKASSAKQGLKCASLQKFGERAFKAWAVARLSQRFPKAEFAEVSKLVTDLTKVHTECCHGDLLECADDRADLAKYICENQDSISSKLKECCEKPLLEKSHCIAEVENDEMPADLPSLAADFVGSKDVCKNYAEAKDVFLGMFLYEYARRHPDYSVVLLLRLAKTYETTLEKCCAAADPHECYAKVFDEFKPLVEEPQNLIKQNCELFEQLGEYKFQNALLVRYTKKVPQVSTPTLVEVSRNLGKVGSKCCKHPEAKRMPCAEDCLSVFLNQLCVLHEKTPVSDRVT |
| 4 | Human Albumin Leader | MKWVTFISLLFLFSSAYS |
| 5 | Human Serum Albumin | RGVFRRDAHKSEVAHRFKDLGEENFKALVLIAFAQYLQQCPFEDHVKLVNEVTEFAKTCVADESAENCDKSLHTLFGDKLCTVATLRETYGEMADCCAKQEPERNECFLQHKDDNPNLPRLVRPEVDVMCTAFHDNEETFLKKYLYEIARRHPYFYAPELLFFAKRYKAAFTECCQAADKAACLLPKLDELRDEGKASSAKQGLKCASLQKFGERAFKAWAVARLSQRFPKAEFAEVSKLVTDLTKVHTECCHGDLLECADDRADLAKYICENQDSISSKLKECCEKPLLEKSHCIAEVENDEMPADLPSLAADFVGSKDVCKNYAEAKDVFLGMFLYEYARRHPDYSVVLLLRLAKTYETTLEKCCAAADPHECYAKVFDEFKPLVEEPQNLIKQNCELFEQLGEYKFQNALLVRYTKKVPQVSTPTLVEVSRNLGKVGSKCCKHPEAKRMPCAEDCLSVFLNQLCVLHEKTPVSDRVT |

TABLE S-continued

| Sequences. | | |
|---|---|---|
| SEQ ID NO: | Region | Sequence |
| 6 | CDR1 | LNLMG |
| 7 | CDR1 | INLLG |
| 8 | CDR1 | SFGMS |
| 9 | CDR1 | NYWMY |
| 10 | CDR2 | TCITVGDSTNYADSVKG |
| 11 | CDR2 | TITVGDSTSYADSVKG |
| 12 | CDR2 | SISGSGSDTLYADSVKG |
| 13 | CDR2 | SINGRGDDTRYADSVKG |
| 14 | CDR2 | AISADSSTKNYADSVKG |
| 15 | CDR2 | AISADSSDKRYADSVKG |
| 16 | CDR2 | RDISTGGGYSYYADSVKG |
| 17 | CDR3 | RRTWHSEL |
| 18 | CDR3 | GGSLSR |
| 19 | CDR3 | GRSVSRS |
| 20 | CDR3 | GRGSP |
| 21 | CDR3 | DREAQVDTLDFDY |
| 22 | SDA | AVQLVESGGGLVQGGGSLRLACAASERIFDLNLMGWYRQGPGNERELVATCITVGDSTNYADSVKGRFTISMDYTKQTVYLHMNSLRPEDTGLYYCKIRRTWHSELWGQGTQVTVSS |
| 23 | SDA | EVQLVESGGGLVQEGGSLRLACAASERIWDINLLGWYRQGPGNERELVATITVGDSTSYADSVKGRFTISRDYDKNTLYLQMNSLRPEDTGLYYCKIRRTWHSELWGQGTQVTVSS |
| 24 | SDA | AVQLVESGGGLVQPGNSLRLSCAASGFTFRSFGMSWVRQAPGKEPEWVSSISGSGSDTLYADSVKGRFTISRDNAKTTLYLQMNSLKPEDTAVYYCTIGGSLSRSSQGTQVTVS S |
| 25 | SDA | AVQLVDSGGGLVQPGGSLRLSCAASGFSFGSFGMSWVRQYPGKEPEWVSSINGRGDDTRYADSVKGRFSISRDNAKNTLYLQMNSLKPEDTAEYYCTIGRSVSRSRTQGTQVTVSS |
| 26 | SDA | AVQLVESGGGLVQPGGSLRLTCTASGFTFRSFGMSWVRQAPGKDQEWVSAISADSSTKNYADSVKGRFTISRDNAKKMLYLEMNSLKPEDTAVYYCVIGRGSPSSPGTQVTVSS |
| 27 | SDA | QVQLAESGGGLVQPGGSLRLTCTASGFTFGSFGMSWVRQAPGEGLEWVSAISADSSDKRYADSVKGRFTISRDNAKKMLYLEMNSLKSEDTAVYYCVIGRGSPASQGTQVTVSS |

TABLE S-continued

| SEQ ID NO: | Region | Sequence |
|---|---|---|
| 28 | SDA | QVQLVESGGGLVQPGGSLRLSC AASGFTFSNYWMYWVRVAPGKG LERISRDISTGGGYSYYADSVK GRFTISRDNAKNTLYLQMNSLK PEDTALYYCAKDREAQVDTLDF DYRGQGTQVTVSS |
| 29 | hSDA | EVQLVESGGGLVQPGGSLRLSC AASGFTFRSFGMSWVRQAPGKE PEWVSSISGSGSDTLYADSVKG RFTISRDNAKTTLYLQMNSLKP EDTAVYYCTIGGSLSRSSQGTQ VTVSS |
| 30 | hSDA | EVQLVESGGGLVQPGGSLRLSC AASGFTFSSFGMSWVRQAPGKE PEWVSSISGSGSDTLYADSVKG RFTISRDNAKTTLYLQMNSLKP EDTAVYYCTIGGSLSRSSQGTQ VTVSS |
| 31 | hSDA | EVQLVESGGGLVQPGGSLRLSC AASGFTFRSFGMSWVRQAPGKG LEWVSSISGSGSDTLYADSVKG RFTISRDNAKTTLYLQMNSLKP EDTAVYYCTIGGSLSRSSQGTQ VTVSS |
| 32 | hSDA | EVQLVESGGGLVQPGNSLRLSC AASGFTFRSFGMSWVRQAPGKG LEWVSSISGSGSDTLYADSVKG RFTISRDNAKTTLYLQMNSLKP EDTAVYYCTIGGSLSRSSQGTL VTVSS |
| 33 | hSDA | EVQLVESGGGLVQPGNSLRLSC AASGFTFRSFGMSWVRQAPGKG LEWVSSISGSGSDTLYADSVKG RFTISRDNAKTTLYLQMNSLRP EDTAVYYCTIGGSLSRSSQGTL VTVSS |
| 34 | hSDA | EVQLVESGGGLVQPGNSLRLSC AASGFTFSSFGMSWVRQAPGKG LEWVSSISGSGSDTLYADSVKG RFTISRDNAKTTLYLQMNSLRP EDTAVYYCTIGGSLSRSSQGTL VTVSS |
| 35 | hSDA | EVQLVESGGGLVQPGNSLRLSC AASGFTFSSFGMSWVRQAPGKG LEWVSSISGSGSDTLYADSVKG RFTISRDNAKNTLYLQMNSLRP EDTAVYYCTIGGSLSRSSQGTL VTVSS |
| 36 | hSDA | EVQLVESGGGLVQPGNSLRLSC AASGFTFSSFGMSWVRQAPGKG LEWVSSISGSGSDTLYADSVKG RFTISRDNAKNTLYLQMNSLRP EDTAVYYCTIGGSLSRSGQGTL VTVSS |
| 37 | FR1 | AVQLVESGGGLVQGGGSLRLAC AASERIFD |
| 38 | FR1 | EVQLVESGGGLVQEGGSLRLAC AASERIWD |
| 39 | FR1 | AVQLVESGGGLVQPGNSLRLSC AASGFTFR |
| 40 | FR1 | AVQLVDSGGGLVQPGGSLRLSC AASGFSFG |
| 41 | FR1 | AVQLVESGGGLVQPGGSLRLTC TASGFTFR |
| 42 | FR1 | QVQLAESGGGLVQPGGSLRLTC TASGFTFG |
| 43 | FR1 | QVQLVESGGGLVQPGGSLRLSC AASGFTFS |
| 44 | FR2 | WYRQGPGNERELVA |
| 45 | FR2 | WVRQAPGKEPEWVS |
| 46 | FR2 | WVRQYPGKEPEWVS |
| 47 | FR2 | WVRQAPGKDQEWVS |
| 48 | FR2 | WVRQAPGEGLEWVS |
| 49 | FR2 | WVRVAPGKGLERIS |
| 50 | FR3 | RFTISMDYTKQTVYLHMNSLRP EDTGLYYCKI |
| 51 | FR3 | RFTISRDYDKNTLYLQMNSLRP EDTGLYYCKI |
| 52 | FR3 | RFTISRDNAKTTLYLQMNSLKP EDTAVYYCTI |
| 53 | FR3 | RFSISRDNAKNTLYLQMNSLKP EDTAEYYCTI |
| 54 | FR3 | RFTISRDNAKKMLYLEMNSLKP EDTAVYYCVI |
| 55 | FR3 | RFTISRDNAKKMLYLEMNSLKS EDTAVYYCVI |
| 56 | FR3 | RFTISRDNAKNTLYLQMNSLKP EDTALYYCAK |
| 57 | FR4 | WGQGTQVTVSS |
| 58 | FR4 | SSQGTQVTVSS |
| 59 | FR4 | RTQGTQVTVSS |
| 60 | FR4 | SSPGTQVTVSS |
| 61 | FR4 | ASQGTQVTVSS |
| 62 | FR4 | RGQGTQVTVSS |
| 63 | Linker | GGSGGSGGSGGSGG |
| 64 | AAT-linkerAlbumin Fusion | MPSSVSWGILLLAGLCCLVPVS LA_EDPQGDAAQKTDTSHHDQD HPTFNKITPNLAEFAFSLYRQL AHQSNSTNIFFSPVSIATAFAM LSLGTKADTHDEILEGLNFNLT EIPEAQIHEGFQELLRTLNQPD SQLQLTTGNGLFLSEGLKLVDK FLEDVKKLYHSEAFTVNFGDTE EAKKQINDYVEKGTQGKIVDLV KELDRDTVFALVNYIFFKGKWE RPFEVKDTEEEDFHVDQVTTVK VPMMKRLGMFNIQHCKKLSSWV LLMKYLGNATAIFFLPDEGKLQ HLENELTHDIITKFLENEDRRS ASLHLPKLSITGTYDLKSVLGQ LGITKVFSNGADLSGVTEEAPL KLSKAVHKAVLTIDEKGTEAAG |

TABLE S-continued

Sequences.

| SEQ ID NO: | Region | Sequence |
|---|---|---|
| | | AMFLEAIPMSIPPEVKFNKPFV<br>FLMIEQNTKSPLFMGKVVNPTQ<br>KGGSGGSGGSGGSGGDAHKSEV<br>AHRFKDLGEENFKALVLIAFAQ<br>YLQQCPFEDHVKLVNEVTEFAK<br>TCVADESAENCDKSLHTLFGDK<br>LCTVATLRETYGEMADCCAKQE<br>PERNECFLQHKDDNPNLPRLVR<br>PEVDVMCTAFHDNEETFLKKYL<br>YEIARRHPYFYAPELLFFAKRY<br>KAAFTECCQAADKAACLLPKLD<br>ELRDEGKASSAKQRLKCASLQK<br>FGERAFKAWAVARLSQRFPKAE<br>FAEVSKLVTDLTKVHTECCHGD<br>LLECADDRADLAKYICENQDSI<br>SSKLKECCEKPLLEKSHCIAEV<br>ENDEMPADLPSLAADFVESKDV<br>CKNYAEAKDVFLGMFLYEYARR<br>HPDYSVVLLLRLAKTYETTLEK<br>CCAAADPHECYAKVFDEFKPLV<br>EEPQNLIKQNCELFEQLGEYKF<br>QNALLVRYTKKVPQVSTPTLVE<br>VSRNLGKVGSKCCKHPEAKRMP<br>CAEDYLSVVLNQLCVLHEKTPV<br>SDRVTKCCTESLVNRRPCFSAL<br>EVDETYVPKEFNAETFTFHADI<br>CTLSEKERQIKKQTALVELVKH<br>KPKATKEQLKAVMDDFAAFVEK<br>CCKADDKETCFAEEGKKLVAAS<br>QAALGL |
| 65 | Mutant AAT-linkerAlbumin Fusion (C232S) | MPSSVSWGILLLAGLCCLVPVS<br>LA_EDPQGDAAQKTDTSHHDQD<br>HPTFNKITPNLAEFAFSLYRQL<br>AHQSNSTNIFFSPVSIATAFAM<br>LSLGTKADTHDEILEGLNFNLT<br>EIPEAQIHEGFQELLRTLNQPD<br>SQLQLTTGNGLFLSEGLKLVDK<br>FLEDVKKLYHSEAFTVNFGDTE<br>EAKKQINDYVEKGTQGKIVDLV<br>KELDRDTVFALVNYIFFKGKWE<br>RPFEVKDTEEEDFHVDQVTTVK<br>VPMMKRLGMFNIQHSKKLSSWV<br>LLMKYLGNATAIFFLPDEGKLQ<br>HLENELTHDIITKFLENEDRRS<br>ASLHLPKLSITGTYDLKSVLGQ<br>LGITKVFSNGADLSGVTEEAPL<br>KLSKAVHKAVLTIDEKGTEAAG<br>AMFLEAIPMSIPPEVKFNKPFV<br>FLMIEQNTKSPLFMGKVVNPTQ<br>KGGSGGSGGSGGSGGDAHKSEV<br>AHRFKDLGEENFKALVLIAFAQ<br>YLQQCPFEDHVKLVNEVTEFAK<br>TCVADESAENCDKSLHTLFGDK<br>LCTVATLRETYGEMADCCAKQE<br>PERNECFLQHKDDNPNLPRLVR<br>PEVDVMCTAFHDNEETFLKKYL<br>YEIARRHPYFYAPELLFFAKRY<br>KAAFTECCQAADKAACLLPKLD<br>ELRDEGKASSAKQRLKCASLQK<br>FGERAFKAWAVARLSQRFPKAE<br>FAEVSKLVTDLTKVHTECCHGD<br>LLECADDRADLAKYICENQDSI<br>SSKLKECCEKPLLEKSHCIAEV<br>ENDEMPADLPSLAADFVESKDV<br>CKNYAEAKDVFLGMFLYEYARR<br>HPDYSVVLLLRLAKTYETTLEK<br>CCAAADPHECYAKVFDEFKPLV<br>EEPQNLIKQNCELFEQLGEYKF<br>QNALLVRYTKKVPQVSTPTLVE<br>VSRNLGKVGSKCCKHPEAKRMP<br>CAEDYLSVVLNQLCVLHEKTPV<br>SDRVTKCCTESLVNRRPCFSAL<br>EVDETYVPKEFNAETFTFHADI<br>CTLSEKERQIKKQTALVELVKH<br>KPKATKEQLKAVMDDFAAFVEK<br>CCKADDKETCFAEEGKKLVAAS<br>QAALGL |
| 66 | Mutant AAT-linkerAlbumin Fusion (M351V, M358V) | MPSSVSWGILLLAGLCCLVPVS<br>LA_EDPQGDAAQKTDTSHHDQD<br>HPTFNKITPNLAEFAFSLYRQL<br>AHQSNSTNIFFSPVSIATAFAM<br>LSLGTKADTHDEILEGLNFNLT<br>EIPEAQIHEGFQELLRTLNQPD<br>SQLQLTTGNGLFLSEGLKLVDK<br>FLEDVKKLYHSEAFTVNFGDTE<br>EAKKQINDYVEKGTQGKIVDLV<br>KELDRDTVFALVNYIFFKGKWE<br>RPFEVKDTEEEDFHVDQVTTVK<br>VPMMKRLGMFNIQHCKKLSSWV<br>LLMKYLGNATAIFFLPDEGKLQ<br>HLENELTHDIITKFLENEDRRS<br>ASLHLPKLSITGTYDLKSVLGQ<br>LGITKVFSNGADLSGVTEEAPL<br>KLSKAVHKAVLTIDEKGTEAAG<br>AVFLEAIPVSIPPEVKFNKPFV<br>FLMIEQNTKSPLFMGKVVNPTQ<br>KGGSGGSGGSGGSGGDAHKSEV<br>AHRFKDLGEENFKALVLIAFAQ<br>YLQQCPFEDHVKLVNEVTEFAK<br>TCVADESAENCDKSLHTLFGDK<br>LCTVATLRETYGEMADCCAKQE<br>PERNECFLQHKDDNPNLPRLVR<br>PEVDVMCTAFHDNEETFLKKYL<br>YEIARRHPYFYAPELLFFAKRY<br>KAAFTECCQAADKAACLLPKLD<br>ELRDEGKASSAKQRLKCASLQK<br>FGERAFKAWAVARLSQRFPKAE<br>FAEVSKLVTDLTKVHTECCHGD<br>LLECADDRADLAKYICENQDSI<br>SSKLKECCEKPLLEKSHCIAEV<br>ENDEMPADLPSLAADFVESKDV<br>CKNYAEAKDVFLGMFLYEYARR<br>HPDYSVVLLLRLAKTYETTLEK<br>CCAAADPHECYAKVFDEFKPLV<br>EEPQNLIKQNCELFEQLGEYKF<br>QNALLVRYTKKVPQVSTPTLVE<br>VSRNLGKVGSKCCKHPEAKRMP<br>CAEDYLSVVLNQLCVLHEKTPV<br>SDRVTKCCTESLVNRRPCFSAL<br>EVDETYVPKEFNAETFTFHADI<br>CTLSEKERQIKKQTALVELVKH<br>KPKATKEQLKAVMDDFAAFVEK<br>CCKADDKETCFAEEGKKLVAAS<br>QAALGL |
| 67 | Mutant AAT-linkerAlbumin Fusion (M351V, M358L) | MPSSVSWGILLLAGLCCLVPVS<br>LA_EDPQGDAAQKTDTSHHDQD<br>HPTFNKITPNLAEFAFSLYRQL<br>AHQSNSTNIFFSPVSIATAFAM<br>LSLGTKADTHDEILEGLNFNLT<br>EIPEAQIHEGFQELLRTLNQPD<br>SQLQLTTGNGLFLSEGLKLVDK<br>FLEDVKKLYHSEAFTVNFGDTE<br>EAKKQINDYVEKGTQGKIVDLV<br>KELDRDTVFALVNYIFFKGKWE<br>RPFEVKDTEEEDFHVDQVTTVK<br>VPMMKRLGMFNIQHCKKLSSWV<br>LLMKYLGNATAIFFLPDEGKLQ<br>HLENELTHDIITKFLENEDRRS<br>ASLHLPKLSITGTYDLKSVLGQ<br>LGITKVFSNGADLSGVTEEAPL<br>KLSKAVHKAVLTIDEKGTEAAG<br>AVFLEAIPLSIPPEVKFNKPFV<br>FLMIEQNTKSPLFMGKVVNPTQ<br>KGGSGGSGGSGGSGGDAHKSEV<br>AHRFKDLGEENFKALVLIAFAQ |

TABLE S-continued

Sequences.

| SEQ ID NO: | Region | Sequence |
|---|---|---|
| | | YLQQCPFEDHVKLVNEVTEFAK<br>TCVADESAENCDKSLHTLFGDK<br>LCTVATLRETYGEMADCCAKQE<br>PERNECFLQHKDDNPNLPRLVR<br>PEVDVMCTAFHDNEETFLKKYL<br>YEIARRHPYFYAPELLFFAKRY<br>KAAFTECCQAADKAACLLPKLD<br>ELRDEGKASSAKQRLKCASLQK<br>FGERAFKAWAVARLSQRFPKAE<br>FAEVSKLVTDLTKVHTECCHGD<br>LLECADDRADLAKYICENQDSI<br>SSKLKECCEKPLLEKSHCIAEV<br>ENDEMPADLPSLAADFVESKDV<br>CKNYAEAKDVFLGMFLYEYARR<br>HPDYSVVLLLRLAKTYETTLEK<br>CCAAADPHECYAKVFDEFKPLV<br>EEPQNLIKQNCELFEQLGEYKF<br>QNALLVRYTKKVPQVSTPTLVE<br>VSRNLGKVGSKCCKHPEAKRMP<br>CAEDYLSVVLNQLCVLHEKTPV<br>SDRVTKCCTESLVNRRPCFSAL<br>EVDETYVPKEFNAETFTFHADI<br>CTLSEKERQIKKQTALVELVKH<br>KPKATKEQLKAVMDDFAAFVEK<br>CCKADDKETCFAEEGKKLVAAS<br>QAALGL |
| 68 | Mutant AAT-linkerAlbumin Fusion (C232S, M351V, M358L) | MPSSVSWGILLLAGLCCLVPVS<br>LA_EDPQGDAAQKTDTSHHDQD<br>HPTFNKITPNLAEFAFSLYRQL<br>AHQSNSTNIFFSPVSIATAFAM<br>LSLGTKADTHDEILEGLNFNLT<br>EIPEAQIHEGFQELLRTLNQPD<br>SQLQLTTGNGLFLSEGLKLVDK<br>FLEDVKKLYHSEAFTVNFGDTE<br>EAKKQINDYVEKGTQGKIVDLV<br>KELDRDTVFALVNYIFFKGKWE<br>RPFEVKDTEEEDFHVDQVTTVK<br>VPMMKRLGMFNIQHSKKLSSWV<br>LLMKYLGNATAIFFLPDEGKLQ<br>HLENELTHDIITKFLENEDRRS<br>ASLHLPKLSITGTYDLKSVLGQ<br>LGITKVFSNGADLSGVTEEAPL<br>KLSKAVHKAVLTIDEKGTEAAG<br>AVFLEAIPLSIPPEVKFNKPFV<br>FLMIEQNTKSPLFMGKVVNPTQ<br>KGGSGGSGGSGGSGGDAHKSEV<br>AHRFKDLGEENFKALVLIAFAQ<br>YLQQCPFEDHVKLVNEVTEFAK<br>TCVADESAENCDKSLHTLFGDK<br>LCTVATLRETYGEMADCCAKQE<br>PERNECFLQHKDDNPNLPRLVR<br>PEVDVMCTAFHDNEETFLKKYL<br>YEIARRHPYFYAPELLFFAKRY<br>KAAFTECCQAADKAACLLPKLD<br>ELRDEGKASSAKQRLKCASLQK<br>FGERAFKAWAVARLSQRFPKAE<br>FAEVSKLVTDLTKVHTECCHGD<br>LLECADDRADLAKYICENQDSI<br>SSKLKECCEKPLLEKSHCIAEV<br>ENDEMPADLPSLAADFVESKDV<br>CKNYAEAKDVFLGMFLYEYARR<br>HPDYSVVLLLRLAKTYETTLEK<br>CCAAADPHECYAKVFDEFKPLV<br>EEPQNLIKQNCELFEQLGEYKF<br>QNALLVRYTKKVPQVSTPTLVE<br>VSRNLGKVGSKCCKHPEAKRMP<br>CAEDYLSVVLNQLCVLHEKTPV<br>SDRVTKCCTESLVNRRPCFSAL<br>EVDETYVPKEFNAETFTFHADI<br>CTLSEKERQIKKQTALVELVKH<br>KPKATKEQLKAVMDDFAAFVEK<br>CCKADDKETCFAEEGKKLVAAS<br>QAALGL |

TABLE S-continued

Sequences.

| SEQ ID NO: | Region | Sequence |
|---|---|---|
| 69 | Wild Type AAT Nucleic Acid | tgggcaggaactgggcactgtg<br>cccagggcatgcactgcctcca<br>cgcagcaaccctcagagtcctg<br>agctgaaccaagaaggaggagg<br>gggtcgggcctccgaggaaggc<br>ctagccgctgctgctgccagga<br>attccaggttggaggggcggca<br>acctcctgccagccttcaggcc<br>actctcctgtgcctgccagaag<br>agacagagcttgaggagagctt<br>gaggagagcaggaaaggacaat<br>gccgtcttctgtctcgtggggc<br>atcctcctgctggcaggcctgt<br>gctgcctggtccctgtctccct<br>ggctgaggatccccagggagat<br>gctgcccagaagacagatacat<br>cccaccatgatcaggatcaccc<br>aaccttcaacaagatcaccccc<br>aacctggctgagttcgccttca<br>gcctataccgccagctggcaca<br>ccagtccaacagcaccaatatc<br>ttcttctccccagtgagcatcg<br>ctacagcctttgcaatgctctc<br>cctggggaccaaggctgacact<br>cacgatgaaatcctggagggcc<br>tgaatttcaacctcacggagat<br>tccggaggctcagatccatgaa<br>ggcttccaggaactcctccgta<br>ccctcaaccagccagacagcca<br>gctccagctgaccaccggcaat<br>ggcctgttcctcagcgagggcc<br>tgaagctagtggataagttttt<br>ggaggatgttaaaaagttgtac<br>cactcagaagccttcactgtca<br>acttcggggacaccgaagaggc<br>caagaaacagatcaacgattac<br>gtggagaagggtactcaaggga<br>aaattgtggatttggtcaagga<br>gcttgacagagacacagttttt<br>gctctggtgaattacatcttct<br>ttaaaggcaaatgggagagacc<br>ctttgaagtcaaggacaccgag<br>gaagaggacttccacgtggacc<br>aggtgaccaccgtgaaggtgcc<br>tatgatgaagcgtttaggcatg<br>tttaacatccagcactgtaaga<br>agctgtccagctgggtgctgct<br>gatgaaatacctgggcaatgcc<br>accgccatcttcttcctgcctg<br>atgaggggaaactacagcacct<br>ggaaaatgaactcacccacgat<br>atcatcaccaagttcctggaaa<br>atgaagacagaaggtctgccag<br>cttacatttacccaaactgtcc<br>attactggaacctatgatctga<br>agagcgtcctgggtcaactggg<br>catcactaaggtcttcagcaat<br>ggggctgacctctccggggtca<br>cagaggaggcacccctgaagct<br>ctccaaggccgtgcataaggct<br>gtgctgaccatcgacgagaaag<br>ggactgaagctgctggggccat<br>gtttttagaggccatacccatg<br>tctatcccccccgaggtcaagt<br>tcaacaaaccctttgtcttctt<br>aatgattgaacaaaataccaag<br>tctcccctcttcatgggaaaag<br>tggtgaatcccacccaaaaata<br>actgcctctcgctcctcaaccc<br>ctcccctccatccctggccccc<br>tccctggatgaattaaagaagg<br>gttgagctggtccctgcctgca<br>tgtgactgtaaatccctcccat |

TABLE S-continued

Sequences.

| SEQ ID NO: | Region | Sequence |
|---|---|---|
| | | gttttctctgagtctccctttg |
| | | cctgctgaggctgtatgtgggc |
| | | tccaggtaacagtgctgtcttc |
| | | gggccccctgaactgtgttcat |
| | | ggagcatctggctgggtaggca |
| | | catgctgggcttgaatccaggg |
| | | gggactgaatcctcagcttacg |
| | | gacctgggcccatctgtttctg |
| | | gagggctccagtcttccttgtc |
| | | ctgtcttggagtccccaagaag |
| | | gaatcacaggggaggaaccaga |
| | | taccagccatgaccccaggctc |
| | | caccaagcatcttcatgtcccc |
| | | ctgctcatcccccactcccccc |
| | | cacccagagttgctcatcctgc |
| | | cagggctggctgtgcccacccc |
| | | aaggctgccctcctgggggccc |
| | | cagaactgcctgatcgtgccgt |
| | | ggcccagttttgtggcatctgc |
| | | agcaacacaagagagaggacaa |
| | | tgtcctcctcttgactcgggcc |
| | | ctgcacctctcaggcacttctg |
| | | gaaaatgactgaggcagattct |
| | | tcctgaagcccattctccatgg |
| | | ggcaacaaggacacctattctg |
| | | tccttgtccttccatcgctgcc |
| | | ccagaaagcctcacatatctcc |
| | | gtttagaatcaggtcccttctc |
| | | cccagatgaagaggagggtctc |
| | | tgctttgttttctctatctcct |
| | | cctcagacttgaccaggcccag |
| | | caggccccagaagaccattacc |
| | | ctatatcccttctcctccctag |
| | | tcacatggccataggcctgctg |
| | | atggctcaggaaggccattgca |
| | | aggactcctcagctatgggaga |
| | | ggaagcacatcacccattgacc |
| | | cccgcaacccctccctttcctc |
| | | ctctgagtcccgactggggcca |
| | | catgcagcctgacttctttgtg |
| | | cctgttgctgtccctgcagtct |
| | | tcagagggccaccgcagctcca |
| | | gtgccacggcaggaggctgttc |
| | | ctgaatagcccctgtggtaagg |
| | | gccaggagagtccttccatcct |
| | | ccaaggccctgctaaaggacac |
| | | agcagccaggaagtcccctggg |
| | | cccctagctgaaggacagcctg |
| | | ctccctccgtctctaccaggaa |
| | | tggccttgtcctatggaaggca |
| | | ctgccccatcccaaactaatct |
| | | aggaatcactgtctaaccactc |
| | | actgtcatgaatgtgtacttaa |
| | | aggatgaggttgagtcatacca |
| | | aatagtgatttcgatagttcaa |
| | | aatggtgaaattagcaattcta |
| | | catgattcagtctaatcaatgg |
| | | ataccgactgtttcccacacaa |
| | | gtctcctgttctcttaagctta |
| | | ctcactgacagcctttcactct |
| | | ccacaaatacattaaagatatg |
| | | gccatcaccaagcccccctagga |
| | | tgacaccagacctgagagtctg |
| | | aagacctggatccaagttctga |
| | | cttttccccctgacagctgtgt |
| | | gaccttcgtgaagtcgccaaac |
| | | ctctctgagccccagtcattgc |
| | | tagtaagacctgcctttgagtt |
| | | ggtatgatgttcaagttagata |
| | | acaaaatgtttatacccattag |
| | | aacagagaataaatagaactac |
| | | atttcttgca |

TABLE S-continued

Sequences.

| SEQ ID NO: | Region | Sequence |
|---|---|---|
| 70 | Wild | cctttcccagggacttctacaa |
| | Type | ggaaaaagctagagttggttac |
| | Human | tgacttctaataaataatgcct |
| | Serum | acaatttctaggaagttaaaag |
| | Albumin | ttgacataatttatccaagaaa |
| | Nucleic | gaattattttcttaacttagaa |
| | Acid | tagtttctttttcttttcaga |
| | | tgtaggtttttctggctttaga |
| | | aaaaatgcttgtttttcttcaa |
| | | tggaaaataggcacacttgttt |
| | | tatgtctgttcatctgtagtca |
| | | gaaagacaagtctggtatttcc |
| | | tttcaggactcccttgagtcat |
| | | taaaaaaaatcttcctatctat |
| | | ctatgtatctatcatccatcta |
| | | gctttgatttttttcctcttctg |
| | | tgctttattagttaattagtac |
| | | ccatttctgaagaagaaataac |
| | | ataagattatagaaaataattt |
| | | ctttcattgtaagactgaatag |
| | | aaaaaatttctttcattataa |
| | | gactgagtagaaaaaataatac |
| | | tttgttagtctctgtgcctcta |
| | | tgtgccatgaggaaatttgact |
| | | actggttttgactgactgagtt |
| | | atttaattaagtaaaataactg |
| | | gcttagtactaattattgttct |
| | | gtagtatcagagaaagttgttc |
| | | ttcctactggttgagctcagta |
| | | gttcttcatattctgagcaaaa |
| | | gggcagaggtaggatagctttt |
| | | ctgaggtagagataagaacctt |
| | | gggtagggaaggaagatttatg |
| | | aaatatttaaaaaattattctt |
| | | ccttcgctttgtttttagacat |
| | | aatgttaaatttattttgaaat |
| | | ttaaagcaacataaaagaacat |
| | | gtgatttttctacttattgaaa |
| | | gagagaaaggaaaaaaatatga |
| | | aacagggatggaaagaatccta |
| | | tgcctggtgaaggtcaagggtt |
| | | ctcataacctacagagaatttg |
| | | gggtcagcctgtcctattgtat |
| | | attatggcaaagataatcatca |
| | | tctcatttgggtccattttcct |
| | | ctccatctctgcttaactgaag |
| | | atcccatgagatatactcacac |
| | | tgaatctaaatagcctatctca |
| | | gggcttgaatcacatgtgggcc |
| | | acagcaggaatgggaacatgga |
| | | atttctaagtcctatcttactt |
| | | gttattgttgctatgtcttttt |
| | | cttagtttgcatctgaggcaac |
| | | atcagctttttcagacagaatg |
| | | gctttggaatagtaaaaaagac |
| | | acagaagccctaaaatatgtat |
| | | gtatgtatatgtgtgtgtgcat |
| | | gcgtgagtacttgtgtgtaaat |
| | | ttttcattatctataggtaaaa |
| | | gcacacttggaattagcaatag |
| | | atgcaatttgggacttaactct |
| | | ttcagtatgtcttatttctaag |
| | | caaagtatttagtttggttagt |
| | | aattactaaacactgagaacta |
| | | aattgcaaacaccaagaactaa |
| | | aatgttcaagtgggaaattaca |
| | | gttaaataccatggtaatgaat |
| | | aaaaggtacaaatcgtttaaac |
| | | tcttatgtaaaatttgataaga |
| | | tgttttacacaactttaataca |
| | | ttgacaaggtcttgtggagaaa |
| | | acagttccagatggtaaatata |
| | | cacaagggatttagtcaaacaa |

TABLE S-continued

Sequences.

| SEQ ID NO: | Region | Sequence |
|---|---|---|
| | | tttttggcaagaatattatga |
| | | attttgtaatcggttggcagcc |
| | | aatgaaatacaaagatgagtct |
| | | agttaataatctacaattattg |
| | | gttaaagaagtatattagtgct |
| | | aatttccctccgtttgtcctag |
| | | cttttctcttctgtcaacccca |
| | | cacgcctttggcacaatgaagt |
| | | gggtaacctttatttcccttct |
| | | ttttctctttagctcggcttat |
| | | tccaggggtgtgtttcgtcgag |
| | | atgcacgtaagaaatccatttt |
| | | tctattgttcaacttttattct |
| | | attttcccagtaaaataaagtt |
| | | ttagtaaactctgcatctttaa |
| | | agaattattttggcatttattt |
| | | ctaaaatggcatagtattttgt |
| | | atttgtgaagtcttacaaggtt |
| | | atcttattaataaaattcaaac |
| | | atcctaggtaaaaaaaaaaaaa |
| | | ggtcagaattgtttagtgactg |
| | | taattttcttttgcgcactaag |
| | | gaaagtgcaaagtaacttagag |
| | | tgactgaaacttcacagaatag |
| | | ggttgaagattgaattcataac |
| | | tatcccaaagacctatccattg |
| | | cactatgctttatttaaaaacc |
| | | acaaaacctgtgctgttgatct |
| | | cataaatagaacttgtatttat |
| | | atttattttcattttagtctgt |
| | | cttcttggttgctgttgataga |
| | | cactaaaagagtattagatatt |
| | | atctaagtttgaatataaggct |
| | | ataaatatttaataatttttaa |
| | | aatagtattcttggtaattgaa |
| | | ttattcttctgtttaaaggcag |
| | | aagaaataattgaacatcatcc |
| | | tgagtttttctgtaggaatcag |
| | | agcccaatattttgaaacaaat |
| | | gcataatctaagtcaaatggaa |
| | | agaaatataaaaagtaacatta |
| | | ttacttcttgttttcttcagta |
| | | tttaacaatcctttttttttctt |
| | | ccccttgcccagacaagagtgag |
| | | gttgctcatcggtttaaagatt |
| | | tgggagaagaaaatttcaaagc |
| | | cttgtaagttaaaatattgatg |
| | | aatcaaatttaatgtttctaat |
| | | agtgttgtttattattctaaag |
| | | tgcttatatttccttgtcatca |
| | | gggttcagattctaaaacagtg |
| | | ctgcctcgtagagttttctgcg |
| | | ttgaggaagatattctgtatct |
| | | gggctatccaataaggtagtca |
| | | ctggtcacatggctattgagta |
| | | cttcaaatatgacaagtgcaac |
| | | tgagaaacaaaaacttaaattg |
| | | tatttaattgtagttaatttga |
| | | atgtatatagtcacatgtggct |
| | | aatggctactgtattggacagt |
| | | acagctctggaacttgcttggt |
| | | ggaaaggactttaatataggtt |
| | | tcctttggtggcttacccacta |
| | | aatcttctttacatagcaagca |
| | | ttcctgtgcttagttgggaata |
| | | tttaattttttttttttttttaa |
| | | gacagggtctcgctctgtcgcc |
| | | caggctggagtgcagtggcgca |
| | | atctcggctcactgcaaactcc |
| | | gctcccgggttcacgccattct |
| | | cctgcctcagcctcccgagtag |
| | | ctgggactacaggcgcccgcca |
| | | tcacgcccggctaatcttttgt |
| | | atttttagtagagatggggttt |

TABLE S-continued

Sequences.

| SEQ ID NO: | Region | Sequence |
|---|---|---|
| | | caccgtgtgccaggatggtctc |
| | | aatctcctgacatcgtgatctg |
| | | cccacctcggcctcccaaagtg |
| | | ctgggattacaggagtgagtca |
| | | ccgcgcccggcctatttaaatg |
| | | ttttttaatctagtaaaaaatg |
| | | agaaaattgtttttttaaaagt |
| | | ctacctaatcctacaggctaat |
| | | taaagacgtgtgtggggatcag |
| | | gtgcggtggttcacacctgtaa |
| | | tcccagcactttggaaggctga |
| | | tgcaggaggattgcttgagccc |
| | | aggagtacaagaccagcctggg |
| | | caagtctctttaaaaaaaacaa |
| | | aacaaacaaacaaaaaaattag |
| | | gcatggtggcacatgcctgtag |
| | | tcctagctacttaggaggctga |
| | | cgtaggaggatcgtttggacct |
| | | gagaggtcaaggctacagtgag |
| | | ccatgattgtgccactgcactc |
| | | cagcctgggtgacagagtgaga |
| | | ctctgtctcaaaaaagaaaaag |
| | | gaaatctgtggggtttgtttta |
| | | gttttaagtaattctaaggact |
| | | ttaaaaatgcctagtcttgaca |
| | | attagatctatttggcatacaa |
| | | tttgcttgcttaatctatgtgt |
| | | gtgcatagatctactgacacac |
| | | gcatacatataaacattaggga |
| | | actaccattctctttgcgtagg |
| | | aagccacatatgcctatctagg |
| | | cctcagatcatacctgatatga |
| | | ataggctttctggataatggtg |
| | | aagaagatgtataaaagataga |
| | | acctatacccatacatgatttg |
| | | ttctctagcgtagcaacctgtt |
| | | acatattaaagttttattatac |
| | | tacatttttctacatcctttgt |
| | | ttcagggtgttgattgcctttg |
| | | ctcagtatcttcagcagtgtcc |
| | | atttgaagatcatgtaaaatta |
| | | gtgaatgaagtaactgaatttg |
| | | caaaaacatgtgttgctgatga |
| | | gtcagctgaaaattgtgacaaa |
| | | tcacttgtaagtacattctaat |
| | | tgtggagattctttcttctgtt |
| | | tgaagtaatcccaagcatttca |
| | | aaggaatttttttttaagttttc |
| | | tcaattattattaagtgtcctg |
| | | atttgtaagaaacactaaaaag |
| | | ttgctcatagactgataagcca |
| | | ttgtttcttttgtgatagagat |
| | | gctttagctatgtccacagttt |
| | | taaaatcatttctttattgaga |
| | | ccaaacacaacagtcatggtgt |
| | | atttaaatggcaatttgtcatt |
| | | tataaacacctctttttaaaat |
| | | ttgaggtttggtttctttttgt |
| | | agaggctaatagggatatgata |
| | | gcatgtatttatttatttattt |
| | | atcttattttattatagtaaga |
| | | acccttaacatgagatctaccc |
| | | tgttatattttttaagtgtacaa |
| | | tccattattgttaactacgggt |
| | | acactgttgtatagcttactca |
| | | tcttgctgtattaaaactttgt |
| | | gcccattgattagtaacccctc |
| | | gtttcgtcctcccccagccact |
| | | ggcaaccagcattatactcttt |
| | | gattctatgagtttgactactt |
| | | tagctaccttatataagtggta |
| | | ttatgtactgtttatcttttta |
| | | tgactgacttatttcccttagc |
| | | atagtgcattcaaagtccaacc |

TABLE S-continued

Sequences.

| SEQ ID NO: | Region | Sequence |
|---|---|---|
| | | atgttgttgcctattgcagaat<br>ttccttcttttcaaggctgaat<br>aatattccagtgcatgtgtgta<br>ccacattttctttatccattaa<br>tttgttgattgatagacattta<br>ggttggttttctacatcttgac<br>tatcatgaatagtgttgcaatg<br>aacacaggagagctactatctc<br>ttagagatgatatcatggtttt<br>tatcatcagaaaacacccactg<br>atttctatgctaattttgttac<br>ctgggtggaataatagtacagc<br>tatatattcctcattttagata<br>tctttgtatttctacatacaat<br>aaaaaagcagagtacttagtca<br>tgttgaagaactttaaactttt<br>agtatttccagatcaatcttca<br>aaacaaggacaggtttatcttt<br>ctctcaccactcaatctatata<br>tacctcttgtgggcaaggccag<br>tttttatcactggagcctttcc<br>cctttttattatgtacctctcc<br>ctcacagcagagtcaggacttt<br>aactttacacaatactatggct<br>ctacatatgaaatcttaaaaat<br>acataaaaattaataaattctg<br>tctagagtagtatattttccct<br>ggggttacgattactttcataa<br>taaaaattagagataaggaaag<br>gactcatttattggaaagtgat<br>tttaggtaacatttctggaaga<br>aaaatgtctatatcttaatagt<br>cacttaatatatgatggattgt<br>gttactcctcagttttcaatgg<br>catatactaaaacatggccctc<br>taaaaagggggcaaatgaaatg<br>agaaactctctgaatgtttttc<br>tcccctaggtgaattcacctgc<br>tgcttagaagcttattttctct<br>tgatttctgttataatgattgc<br>tcttaccctttagttttaagtt<br>tcaaaataggagtcatataact<br>ttccttaaagctattgactgtc<br>tttttgtcctgttttattcacc<br>atgagttatagtgtgacagtta<br>attcttatgaaaattatataga<br>gatggttaaatcatcagaaact<br>gtaaacctcgattgggagggga<br>agcggatttttaaatgatttcc<br>tgaccaagcttaaccagtatat<br>taaatcctttgtactgttcttt<br>ggctataaagaaaaaaggtact<br>gtccagcaactgaaacctgctt<br>tcttccatttagcatacccttt<br>ttggagacaaattatgcacagt<br>tgcaactcttcgtgaaacctat<br>ggtgaaatggctgactgctgtg<br>caaaacaagaacctgagagaaa<br>tgaatgcttcttgcaacacaaa<br>gatgacaacccaaacctccccc<br>gattggtgagaccagaggttga<br>tgtgatgtgcactgcttttcat<br>gacaatgaagagacatttttga<br>aaaagtaagtaatcagatgttt<br>atagttcaaaattaaaaagcat<br>ggagtaactccataggccaaca<br>ctctataaaaattaccataaca<br>aaaatattttcaacattaagac<br>ttggaagttttgttatgatgat<br>tttttaaagaagtagtatttga<br>taccacaaaattctacacagca<br>aaaaatatgatcaaagatattt<br>tgaagtttattgaaacaggata<br>caatctttctgaaaaatttaag |

TABLE S-continued

Sequences.

| SEQ ID NO: | Region | Sequence |
|---|---|---|
| | | atagacaaattatttaatgtat<br>tacgaagatatgtatatatggt<br>tgttataattgatttcgtttta<br>gtcagcaacattatattgccaa<br>aatttaaccatttatgcacaca<br>cacacacacacacacacactta<br>acccttttttccacatacttaa<br>agaatgacagagacaagaccat<br>catgtgcaaattgagcttaatt<br>ggttaattagatatctttggaa<br>tttggaggttctggggagaatg<br>tcgattacaattatttctgtaa<br>tattgtctgctatagaaaagtg<br>actgtttttctttttcaaaatt<br>tagatacttatatgaaattgcc<br>agaagacatccttacttttatg<br>ccccggaactccttttctttgc<br>taaaaggtataaagctgctttt<br>acagaatgttgccaagctgctg<br>ataaagctgcctgcctgttgcc<br>aaaggtattatgcaaaagaata<br>gaaaaaaagagttcattatcca<br>acctgattttgtccattttgtg<br>gctagatttagggaacctgagt<br>gtctgatacaaactttccgaca<br>tggtcaaaaaagccttcctttt<br>atctgtcttgaaaatctttcat<br>ctttgaaggcctacactctcgt<br>ttcttcttttaagatttgccaa<br>tgatgatctgtcagaggtaatc<br>actgtgcatgtgtttaaagatt<br>tcaccactttttatggtggtga<br>tcactatagtgaaatactgaaa<br>cttgtttgtcaaattgcacagc<br>aaggggacacagttcttgttta<br>tcttttcatgataatttttagt<br>agggagggaattcaaagtagag<br>aattttactgcatctagatgcc<br>tgagttcatgcattcattccat<br>aaatatatattatggaatgctt<br>tattttcttttctgaggagttt<br>actgatgttggtggaggagaga<br>ctgaaatgaattatacacaaaa<br>tttaaaaattagcaaaattgca<br>gcccctgggatattagcgtact<br>ctttctctgacttttctcccac<br>ttttaaggctctttttcctggc<br>aatgtttccagttggtttctaa<br>ctacatagggaattccgctgtg<br>accagaatgatcgaatgatctt<br>tccttttcttagagagcaaaat<br>cattattcgctaaagggagtac<br>ttgggaatttaggcataaatta<br>tgccttcaaaatttaatttggc<br>acagtctcatctgagcttatgg<br>aggggtgtttcatgtagaattt<br>ttcttctaattttcatcaaatt<br>attcctttttgtagctcgatga<br>acttcgggatgaagggaaggct<br>tcgtctgccaaacagagactca<br>agtgtgccagtctccaaaaatt<br>tggagaaagagctttcaaagca<br>tggtaaatacttttaaacatag<br>ttggcatctttataacgatgta<br>aatgataatgcttcagtgacaa<br>attgtacatttttatgtatttt<br>gcaaagtgctgtcaaatacatt<br>tctttggttgtctaacaggtag<br>aactctaatagaggtaaaaatc<br>agaatatcaatgacaatttgac<br>attatttttaatcttttctttt<br>ctaaatagttgaataatttaga<br>ggacgctgtcctttttgtccta<br>aaaaaagggacagatatttaag |

TABLE S-continued

Sequences.

| SEQ ID NO: | Region | Sequence |
|---|---|---|
| | | ttctatttatttataaaatctt |
| | | ggactcttattctaatggttca |
| | | ttatttttatagagctgtaggc |
| | | atggttctttatttaatttttt |
| | | aaagttatttttaatttttgtg |
| | | gatacagagtaggtatacatat |
| | | ttacggggtatatgagatattt |
| | | tgatataagtatacaacatata |
| | | taatccctttatttaattttat |
| | | cttccccccaatgatctaaaac |
| | | tatttgcttgtccttttatgtc |
| | | ttatagttaaattcagtcacca |
| | | actaagttgaagttacttctta |
| | | tttttgcatagctccagctctg |
| | | atcttcatctcatgtttttgcc |
| | | tgagcctctgttttcatattac |
| | | ttagttggttctgggagcatac |
| | | tttaatagccgagtcaagaaaa |
| | | atactagctgccccgtcaccca |
| | | cactcctcacctgctagtcaac |
| | | agcaaatcaacacaacaggaaa |
| | | taaaatgaaaataatagacatt |
| | | atgcatgctctctagaaactgt |
| | | caattgaactgtatttgctcat |
| | | cattcctaccatctacaccacc |
| | | aaaatcaaccaaatttatgaaa |
| | | aaaaaacagccccaacataaaa |
| | | ttatacacagataaacaggcta |
| | | tgattggttttgggaaagaagt |
| | | cacctttacctgatttaggcaa |
| | | ctgtgaaatgactagagaatga |
| | | agaaaattagacgtttacatct |
| | | tgtcatagagtttgaagatagt |
| | | gctggatctttctttttataag |
| | | taagatcaataaaaactccctc |
| | | attctgtagaagttatgatttc |
| | | ttttctaagagacctttagaag |
| | | tcagaaaaaatgtgtttcaatt |
| | | gagaaaaaagataactggagtt |
| | | tgtgtagtacttcccagattat |
| | | aaaatgcttttgtatgtattat |
| | | ctaatttaatcctcaaaacttc |
| | | ttcaatttagcatgttgtcatg |
| | | acactgcagaggctgaagctca |
| | | gagacgctgagccctctgctaa |
| | | caagtcctactgctaacaagtg |
| | | ataaagccagagctggaagtca |
| | | catctggactccaaacctgatg |
| | | cttctcagcctgttgccccttt |
| | | tagagttcctttttaatttctg |
| | | cttttatgacttgctagatttc |
| | | tacctaccacacacactcttaa |
| | | atggataattctgccctaagga |
| | | taagtgattaccatttggttca |
| | | gaactagaactaatgaatttta |
| | | aaaattatttctgtatgtccat |
| | | tttgaattttcttatgagaaat |
| | | agtatttgcctagtgttttcat |
| | | ataaaatatcgcatgataatac |
| | | cattttgattggcgattttctt |
| | | tttagggcagtagctcgcctga |
| | | gccagagatttcccaaagctga |
| | | gtttgcagaagtttccaagtta |
| | | gtgacagatcttaccaaagtcc |
| | | acacggaatgctgccatggaga |
| | | tctgcttgaatgtgctgatgac |
| | | agggtaaagagtcgtcgatatg |
| | | ctttttggtagcttgcatgctc |
| | | aagttggtagaatggatgcgtt |
| | | tggtatcattggtgatagctga |
| | | cagtgggttgagattgtcttct |
| | | gtgctttcgtctgtcctatctt |
| | | caatctttccctgcctatggtg |
| | | gtggtacctttctgtttttaac |

TABLE S-continued

Sequences.

| SEQ ID NO: | Region | Sequence |
|---|---|---|
| | | ctgctataaattaccagataaa |
| | | cccattcactgatttgtaactc |
| | | ctttcagtcatgctctaactgt |
| | | aaatgaaggcttaaactgaagt |
| | | agaacagttacaaggttttact |
| | | tggcagaacatcttgcaaggta |
| | | gatgtctaagaagattttttt |
| | | tctttttttaagacagagtttc |
| | | gctcttgtttcccaggctgggg |
| | | tgcaatggtgtgatcttggctc |
| | | agcgcaacctctgcctcctggg |
| | | ttcaagtgattttcatgcctca |
| | | gcctcccaagtagctgggatta |
| | | caggcatgcgccaccacacctg |
| | | gctaattttgtatttttagtag |
| | | aggcggggtttcaccatattgt |
| | | ccagactggtctcgaactcctg |
| | | acctcaggtgatccacccgcct |
| | | tggcctcccaaagtgctgggat |
| | | tacaggcatgagccaccttgcc |
| | | cagcctaagaagatttttttgag |
| | | ggaggtaggtggacttggagaa |
| | | ggtcactacttgaagagatttt |
| | | tggaaatgatgtatttttcttc |
| | | tctatattccttcccttaatta |
| | | actctgtttgttagatgtgcaa |
| | | atatttggaatgatatctcttt |
| | | tctcaaaacttataatattttc |
| | | tttctccctttcttcaagatta |
| | | aacttatgggcaaatactagaa |
| | | tcctaatctctcatggcacttt |
| | | ctggaaaatttaaggcggttat |
| | | tttatatatgtaagcagggcct |
| | | atgactatgatcttgactcatt |
| | | tttcaaaaatcttctatatttt |
| | | atttagttatttggtttcaaaa |
| | | ggcctgcacttaattttggggg |
| | | attatttggaaaaacagcattg |
| | | agttttaatgaaaaaaacttaa |
| | | atgccctaacagtagaaacata |
| | | aaattaataaataactgagctg |
| | | agcacctgctactgattagtct |
| | | attttaattaagtgggaatgtt |
| | | tttgtagtcctatctacatctc |
| | | caggtttaggagcaaacagagt |
| | | atgttcatagaaggaatatgtg |
| | | tatggtcttagaatacaatgaa |
| | | catgttctgccaacttaataaa |
| | | ggtctgaggagaaagtgtagca |
| | | atgtcaattcgtgttgaacaat |
| | | ttccaccaacttacttataggc |
| | | ggaccttgccaagtatatctgt |
| | | gaaaatcaagattcgatctcca |
| | | gtaaactgaaggaatgctgtga |
| | | aaaacctctgttggaaaaatcc |
| | | cactgcattgccgaagtggaaa |
| | | atgatgagatgcctgctgactt |
| | | gccttcattagctgctgatttt |
| | | gttgaaagtaaggatgtttgca |
| | | aaaactatgctgaggcaaagga |
| | | tgtcttcctgggcatgtaagta |
| | | gataagaaattattcttttata |
| | | gctttggcatgacctcacaact |
| | | taggaggatagcctaggctttt |
| | | ctgtggagttgctacaatttcc |
| | | ctgctgcccagaatgtttcttc |
| | | atccttccctttcccaggcttt |
| | | aacaattttttgaaatagttaat |
| | | tagttgaatacattgtcataaa |
| | | ataatacatgttcacggcaaag |
| | | ctcaacattccttactccttag |
| | | gggtatttctgaaaatacgtct |
| | | agaaacattttgtgtatatata |
| | | aattatgtatacttcagtcatt |

TABLE S-continued

Sequences.

| SEQ ID NO: | Region | Sequence |
|---|---|---|
| | | cattccaagtgtatttcttgaa |
| | | catctataatatatgtgtgtga |
| | | ctatgtattgcctgtctatcta |
| | | actaatctaatctaatctagtc |
| | | tatctatctaatctatgcaatg |
| | | atagcaaagaagtataaaaaga |
| | | aatatagagtctgacacaggtg |
| | | ctttatatttggtgaaaagacc |
| | | agaagttcagtataatggcaat |
| | | atggtaggcaactcaattacaa |
| | | aataaatgtttacgtattgtca |
| | | gaagttgtggtgataaactgca |
| | | tttttgttgttggattatgata |
| | | atgcactaaataatatttccta |
| | | aaattatgtaccctacaagatt |
| | | tcactcatacagagaagaaaga |
| | | gaatattttaagaacatatctc |
| | | tgcccatctatttatcagaatc |
| | | cttttgagatgtagtttaaatc |
| | | aaacaaaatgttaataaaaata |
| | | acaagtatcattcatcaaagac |
| | | ttcatatgtgccaagcagtgtg |
| | | tgctttgtgtagattatgtcat |
| | | atagttctcataatccaccttc |
| | | cgagacagatactatttatttt |
| | | ttgagacagagttttactcttg |
| | | ttgcccaggctggagtgcaatg |
| | | gtgccatctcggctcaccacaa |
| | | ccttcgcctcccaggttcaagc |
| | | gattctcctgcctcagcctcct |
| | | gggattacaggcatgcaccacc |
| | | atgcctggctaattttgtattt |
| | | ttagtagagatggggtttcacc |
| | | atgttggtcagactggtctcaa |
| | | actcctgacctctggtgatatg |
| | | cctgcctcagcctcctaaagtg |
| | | ctgggattacaggcatgagcca |
| | | ctgtgcccagccgacagatact |
| | | attattatttccattctaccga |
| | | gaaggagactaaggctctgatc |
| | | atttaaataagttgcctaaggt |
| | | gatgcagtgatataagtagcag |
| | | agctaggaattgagccttggta |
| | | actttaactctggaccccaagt |
| | | ccttagctactaagctttactg |
| | | catggggtttagtcaaattaag |
| | | acttttggaatatgagttactt |
| | | ttgagattagctttgtgatatt |
| | | ttttgtgctcatttgtccaaca |
| | | aagtctattttattttcatctt |
| | | aattaggtttttgtatgaatat |
| | | gcaagaaggcatcctgattact |
| | | ctgtcgtgctgctgctgagact |
| | | tgccaagacatatgaaaccact |
| | | ctagagaagtgctgtgccgctg |
| | | cagatcctcatgaatgctatgc |
| | | caaagtggtaggtttattgttg |
| | | gaaaaaaatgtagttctttgac |
| | | tgatgattccaataatgagaaa |
| | | gaaaaataatgcaagaatgtaa |
| | | aatgatatacagtgcaatttag |
| | | atcttttcttgagatggtttca |
| | | attctggaatcttaaacatgaa |
| | | agaaaaagtagccttagaatga |
| | | ttaacaaaatttagactagtta |
| | | gaatagaaagatctgaatagag |
| | | caatctctaaaaaattttgatc |
| | | tttttttctctttttcacaatc |
| | | ctgagaacaaaaaaaaattaaa |
| | | tttaaatgttaattagaagata |
| | | tttaacttagatgtaaagtgag |
| | | ttaacctgattccaggattaat |
| | | caagtactagaattagtatctt |
| | | atggcaaattatagaacctatc |

TABLE S-continued

Sequences.

| SEQ ID NO: | Region | Sequence |
|---|---|---|
| | | cctttagaatattttcaaatct |
| | | ttttgaggatgtttaggaatag |
| | | ttttacaagaaattaagttagg |
| | | agaggaaatctgttctggagga |
| | | tttttagggttcccactagcat |
| | | atgtaatggtttctgaactatt |
| | | cagaatcagagaaaactcattt |
| | | ttcctgctttcaagaagctact |
| | | gtatgccaggcaccatgcacaa |
| | | acaatgaccaacgtaaaatctc |
| | | tcattttggagagcctggaatc |
| | | taactggaaaggtgaactaata |
| | | ataataatatgtacaatcatag |
| | | ccatcatttattaaacttttat |
| | | tatatgcaaggcactgtttaat |
| | | ttcattagcttacctggtttac |
| | | agagcagctctatgagatgagt |
| | | gccatctttgcccctattttag |
| | | ggataaggattccgaaatgtgg |
| | | agatggtaagtaaaattgcaca |
| | | actgaagaatgagttacatgac |
| | | ttggctcaaatactggtcattg |
| | | aactccagagcctgaatattct |
| | | taaccacttacatgatgcaagc |
| | | tcaccaaataaatagttcgaat |
| | | gtattgtgacagagcggcattg |
| | | atattcatctattcatgtggct |
| | | ttgagtaggaagaagaaaggat |
| | | atcattctgaccagaggggtga |
| | | aaaacaacctgcatctgatcct |
| | | gaggcataatactattaacaca |
| | | attcttttatgtttcagttcga |
| | | tgaatttaaacctcttgtggaa |
| | | gagcctcagaatttaatcaaac |
| | | aaaattgtgagctttttgagca |
| | | gcttggagagtacaaattccag |
| | | aatgcgtaagtaatttttattg |
| | | actgattttttttatcaatttg |
| | | taattatttaagacttaatata |
| | | tgagccacctagcatagaactt |
| | | ttaagaatgaaaatacattgca |
| | | tatttctaatcactctttgtca |
| | | agaaagataggagaggagagat |
| | | aaaatagttgatggggtggaga |
| | | ggtctatatttgaatgtagtct |
| | | aaaaattgttctcttaagattg |
| | | gaagtatgtaggctgggagggt |
| | | aaataccaaatcttggtatatc |
| | | agaactgagcatgtcccttgaa |
| | | ggttaagaaatagttaatgggc |
| | | aaatagagcatggcaatatttt |
| | | gtagagcagcaagtagtaggcc |
| | | ttgaatagatgtcgctcaaaaa |
| | | gtaatatgtaagctgaacacaa |
| | | aaatgtaacaaatgaatttaga |
| | | tacatatttgaatattaaattc |
| | | aggttgtttgggagatgcacct |
| | | agtctttgatggttaaaccttt |
| | | ccctccatagaagagacagaga |
| | | cagaatggcttgctggactaat |
| | | gtcccaattcaatagagtctta |
| | | tctacgaaggttaaaaacaaga |
| | | agagacatattatacagtagat |
| | | atttattgtgtggctcatacac |
| | | atggtgctcttctgattatgga |
| | | ttttagagataataacagtgaa |
| | | caagacatagtttctttcctcg |
| | | agtagattaaagtcatacattg |
| | | acttttaatggtgactggcatt |
| | | cttaatacatgattattatata |
| | | ttaggtaccatgtcagattaat |
| | | tataatactttactatttttaa |
| | | tttaacccttgaactatcccta |
| | | ttgagtcagatatatttccttc |

TABLE S-continued

Sequences.

| SEQ ID NO: | Region | Sequence |
|---|---|---|
| | | cattttctacttgtatctttea |
| | | agtttagcatatgctgatacat |
| | | atgaagctctctccaggtttta |
| | | ttgaaagaagaaattaataaat |
| | | ttattaatgtcactgaattagg |
| | | caactcactttcccaagattat |
| | | gcaagtggtacaggtggaactc |
| | | aaagccaagtttaactagttgt |
| | | tcaggagaatgttttctaccct |
| | | ccactaacccactactctgcag |
| | | atggagataatatgatgaatgg |
| | | aacatagcaacatcttagttga |
| | | ttccggccaagtgttctctgtt |
| | | ttatctactatgttagacagtt |
| | | tcttgccttgctgaaaacacat |
| | | gacttctttttttcaggctatt |
| | | agttcgttacaccaagaaagta |
| | | ccccaagtgtcaactccaactc |
| | | ttgtagaggtctcaagaaacct |
| | | aggaaaagtgggcagcaaatgt |
| | | tgtaaacatcctgaagcaaaaa |
| | | gaatgccctgtgcagaagacta |
| | | tgtgagtctttaaaaaaatata |
| | | ataaattaataatgaaaaaatt |
| | | ttacctttagatattgataatg |
| | | ctagctttcataagcagaagga |
| | | agtaatgtgtgtgtgtgcatgt |
| | | ttgtgtgcatgtgtgtgtgcat |
| | | gcacgtgtgtgtatgtgtgata |
| | | ttggcagtcaaggccccgagga |
| | | tgataatttttttttttttttt |
| | | gagacggagtctcgctttgttg |
| | | tccaggctggagtgcagtggtg |
| | | ccatctcggctcactgcaacct |
| | | ccgcctcccaagttcaagccat |
| | | tctcctgcctcagcctcccaag |
| | | tagctgggactacaggtgcatg |
| | | ccaccatgcctggctaattttt |
| | | tgtatttttagtagaaaatttt |
| | | cagcttcacctcttttgaattt |
| | | ctgctctcctgcctgttcttta |
| | | gctatccgtggtcctgaaccag |
| | | ttatgtgtgttgcatgagaaaa |
| | | cgccagtaagtgacagagtcac |
| | | caaatgctgcacagaatccttg |
| | | gtgaacaggcgaccatgctttt |
| | | cagctctggaagtcgatgaaac |
| | | atacgttcccaaagagtttaat |
| | | gctgaaacattcaccttccatg |
| | | cagatatatgcacactttctga |
| | | gaaggagagacaaatcaagaaa |
| | | caaacgtgaggagtatttcatt |
| | | actgcatgtgtttgtagtcttg |
| | | atagcaagaactgtcaattcaa |
| | | gctagcaactttttcctgaagt |
| | | agtgattatatttcttagagga |
| | | aagtattggagtgttgccctta |
| | | ttatgctgataagagtacccag |
| | | aataaaatgaataactttttaa |
| | | agacaaaatcctctgttataat |
| | | attgctaaaattattcagagta |
| | | atattgtggattaaagccacaa |
| | | tagaataacatgttagaccata |
| | | ttcagtagaaaaagatgaacaa |
| | | ttaactgataaatttgtgcaca |
| | | tggcaaattagttaatgggaac |
| | | cataggagaatttatttctaga |
| | | tgtaaataattattttaagttt |
| | | gccctatggtggccccacacat |
| | | gagacaaacccccaagatgtga |
| | | cttttgagaatgagacttggat |
| | | aaaaaacatgtagaaatgcaag |
| | | ccctgaagctcaactccctatt |
| | | gctatcacaggggttataattg |
| | | cataaaatttagctatagaaag |
| | | ttgctgtcatctcttgtgggct |
| | | gtaatcatcgtctaggcttaag |
| | | agtaatattgcaaaacctgtca |
| | | tgcccacacaaatctctccctg |
| | | gcattgttgtctttgcagatgt |
| | | cagtgaaagagaaccagcagct |
| | | cccatgagtttggatagcctta |
| | | ttttctatagcctccccactga |
| | | agggagcaaagtttaagaacca |
| | | aatataaagtttctcatcttta |
| | | tagatgagaaaaattttaaata |
| | | aagtccaagataattaaatttt |
| | | taaggatcatttttagctcttt |
| | | aatagcaataaaactcaatatg |
| | | acataatatggcacttccaaaa |
| | | tctgaataatatataattgcaa |
| | | tgacatacttcttttcagagat |
| | | ttactgaaaagaaatttgttga |
| | | cactacataacgtgatgagtgg |
| | | tttatactgattgtttcagttg |
| | | gtcttcccaccaactccatgaa |
| | | agtggattttattatcctcatc |
| | | atgcagatgagaatattgagac |
| | | ttatagcggtatgcctggccca |
| | | agtactcagagttgcctggctc |
| | | caagatttataatcttaaatga |
| | | tgggactaccatccttactctc |
| | | tccatttttctatacgtgagta |
| | | atgtttttctgttttttttttt |
| | | ttctttttccattcaaactcag |
| | | tgcacttgttgagctcgtgaaa |
| | | cacaagcccaaggcaacaaaag |
| | | agcaactgaaagctgttatgga |
| | | tgatttcgcagcttttgtagag |
| | | aagtgctgcaaggctgacgata |
| | | aggagacctgctttgccgagga |
| | | ggtactacagttctcttcattt |
| | | taatatgtccagtattcatttt |
| | | tgcatgtttggttaggctaggg |
| | | cttagggatttatatatcaaag |
| | | gaggctttgtacatgtgggaca |
| | | gggatcttattttacaaacaat |
| | | tgtcttacaaaatgaataaaac |
| | | agcactttgtttttatctcctg |
| | | ctctattgtgccatactgttga |
| | | atgtttataatgcatgttctgt |
| | | ttccaaatttgtgatgcttatg |
| | | aatattaataggaatatttgta |
| | | aggcctgaaatattttgatcat |
| | | gaaatcaaaacattaatttatt |
| | | taaacatttacttgaaatgtgg |
| | | tggtttgtgatttagttgattt |
| | | tataggctagtgggagaattta |
| | | cattcaaatgtctaaatcactt |
| | | aaaatttccctttatggcctga |
| | | cagtaacttttttttattcatt |
| | | tggggacaactatgtccgtgag |
| | | cttccatccagagattatagta |
| | | gtaaattgtaattaaaggatat |
| | | gatgcacgtgaaatcactttgc |
| | | aatcatcaatagcttcataaat |
| | | gttaattttgtatcctaatagt |
| | | aatgctaatattttcctaacat |
| | | ctgtcatgtctttgtgttcagg |
| | | gtaaaaaacttgttgctgcaag |
| | | tcaagctgccttaggcttataa |
| | | catcacatttaaaagcatctca |
| | | ggtaactatattttgaattttt |
| | | taaaaaagtaactataatagtt |
| | | attattaaaatagcaaagattg |
| | | accatttccaagagccatatag |
| | | accagcaccgaccactattcta |
| | | aactatttatgtatgtaaatat |

TABLE S-continued

Sequences.

| SEQ ID NO: | Region | Sequence |
|---|---|---|
| | | tagcttttaaaattctcaaaat<br>agttgctgagttgggaaccact<br>attatttctattttgtagatga<br>gaaaatgaagataaacatcaaa<br>gcatagattaagtaattttcca<br>aagggtcaaaattcaaaattga<br>aaccaaggtttcagtgttgccc<br>attgtcctgttctgacttatat<br>gatgcggtacacagagccatcc<br>aagtaagtgatggctcagcagt<br>ggaatactctgggaattaggct<br>gaaccacatgaaagagtgcttt<br>atagggcaaaaacagttgaata<br>tcagtgatttcacatggttcaa<br>cctaatagttcaactcatcctt<br>tccattggagaatatgatggat<br>ctaccttctgtgaactttatag<br>tgaagaatctgctattacattt<br>ccaatttgtcaacatgctgagc<br>tttaataggacttatcttctta<br>tgacaacatttattggtgtgtc<br>cccttgcctagcccaacagaag<br>aattcagcagccgtaagtctag<br>gacaggcttaaattgttttcac<br>tggtgtaaattgcagaaagatg<br>atctaagtaatttggcatttat<br>tttaataggtttgaaaaacaca<br>tgccattttacaaataagactt<br>atatttgtccttttgtttttca<br>gcctaccatgagaataagagaa<br>agaaaatgaagatcaaaagctt<br>attcatctgtttttctttttcg<br>ttggtgtaaagccaacaccctg<br>tctaaaaaacataaatttcttt<br>aatcattttgcctcttttctct<br>gtgcttcaattaataaaaaatg<br>gaaagaatctaatagagtggta<br>cagcactgttatttttcaaaga<br>tgtgttgctatcctgaaaattc<br>tgtaggttctgtggaagttcca<br>gtgttctctcttattccacttc<br>ggtagaggatttctagtttctt<br>gtgggctaattaaataaatcat<br>taatactcttctaagttatgga<br>ttataaacattcaaaataatat<br>tttgacattatgataattctga<br>ataaaagaacaaaaaccatggt<br>ataggtaaggaatataaaacat<br>ggcttttaccttagaaaaaaca<br>attctaaaattcatatggaatc<br>aaaaaagagcctgcag |
| 71 | Mutant AAT-linkerAlbumin Fusion (S283C, K335A, P361C) | EDPQGDAAQKTDTSHHDQDHPT<br>FNKITPNLAEFAFSLYRQLAHQ<br>SNSTNIFFSPVSIATAFAMLSL<br>GTKADTHDEILEGLNFNLTEIP<br>EAQIHEGFQELLRTLNQPDSQL<br>QLTTGNGLFLSEGLKLVDKFLE<br>DVKKLYHSEAFTVNFGDTEEAK<br>KQINDYVEKGTQGKIVDLVKEL<br>DRDTVFALVNYIFFKGKWERPF<br>EVKDTEEEDFHVDQVTTVKVPM<br>MKRLGMFNIQHSKKLSSWVLLM<br>KYLGNATAIFFLPDEGKLQHLE<br>NELTHDIITKFLENEDRRCASL<br>HLPKLSITGTYDLKSVLGQLGI<br>TKVFSNGADLSGVTEEAPLKLS<br>KAVHAAVLTIDEKGTEAAGAVF<br>LEAIPLSICPEVKFNKPFVFLM<br>IEQNTKSPLFMGKVVNPTQKGG<br>SGGSGGSGGSGGDAHKSEVAHR<br>FKDLGEENFKALVLIAFAQYLQ<br>QCPFEDHVKLVNEVTEFAKTCV<br>ADESAENCDKSLHTLFGDKLCT |

TABLE S-continued

Sequences.

| SEQ ID NO: | Region | Sequence |
|---|---|---|
| | | VATLRETYGEMADCCAKQEPER<br>NECFLQHKDDNPNLPRLVRPEV<br>DVMCTAFHDNEETFLKKYLYEI<br>ARRHPYFYAPELLFFAKRYKAA<br>FTECCQAADKAACLLPKLDELR<br>DEGKASSAKQRLKCASLQKFGE<br>RAFKAWAVARLSQRFPKAEFAE<br>VSKLVTDLTKVHTECCHGDLLE<br>CADDRADLAKYICENQDSISSK<br>LKECCEKPLLEKSHCIAEVEND<br>EMPADLPSLAADFVESKDVCKN<br>YAEAKDVFLGMFLYEYARRHPD<br>YSVVLLLRLAKTYETTLEKCCA<br>AADPHECYAKVFDEFKPLVEEP<br>QNLIKQNCELFEQLGEYKFQNA<br>LLVRYTKKVPQVSTPTLVEVSR<br>NLGKVGSKCCKHPEAKRMPCAE<br>DYLSVVLNQLCVLHEKTPVSDR<br>VTKCCTESLVNRRPCFSALEVD<br>ETYVPKEFNAETFTFHADICTL<br>SEKERQIKKQTALVELVKHKPK<br>ATKEQLKAVMDDFAAFVEKCCK<br>ADDKETCFAEEGKKLVAASQAA<br>LGL |

EXAMPLES

Example 1: Construction of AAT-Albumin

Wildtype alpha-1-antitrypsin (alpha-1-antitrypsin, SEQ ID: 1) and four variants (C232S, SEQ ID: 64; M351V, M358V, SEQ ID: 65; M351V, M358L, SEQ ID: 66; C232S, M351V, M358L, SEQ ID: 67) are fused to the N-terminus of human serum albumin via long glycine-serine linker (GGSGGSGGSGGSGG (SEQ ID NO: 63)). The gene encoding human AAT can be PCR amplified from human liver cDNA (Zyagen). Specific point mutations within the AAT gene are created by overlapping PCR (See, for example, Higuchi R, Krummel B, Saiki R (1988) "A general method of in vitro preparation and specific mutagenesis of DNA fragments: study of protein and DNA interactions". *Nucleic Acids Res.* 16 (15): 7351-67, which is incorporated by reference herein in its entirety, including any drawings.) The alpha-1-antitrypsin gene is cloned in frame with a gene encoding human serum album and a linker, into a mammalian expression vector containing a mammalian secretion signal sequence up stream of the alpha-1-antitrypsin gene insertion site.

The initial AAT variants are chosen because they are either resistant to cysteine oxidation and/or methionine oxidation. Methionine oxidation is known to decrease the AAT inhibitory activity for human neutrophil elastase. Once expressed in Chinese Hamster Ovary (CHO) cells, each AAT-human serum albumin (WT or variant, SEQ ID:1-5) is purified using an anti-AAT resin (GE) and tested for inhibition of human neutrophil elastase (hNE). Each AAT-human serum albumin (WT or variant, SEQ ID:1-5) is also tested for overall protein stability using a dynamic light scattering (DLS) & dynamic scanning fluorimetry (DSF) instrument (UNcle, Unchained).

Overall AAT protein stability is known to correlate with resistance to self-polymerization of AAT. With this data, AAT-human serum albumins are chosen for further mutagenesis with at least one additional mutation (See Table 1 above). These mutations are known to further increase AAT stability and prevent self-polymerization. Each AAT-human serum albumin variant is expressed in CHO, purified, and tested for hNE inhibition and protein stability.

By combining multiple mutations together, unexpected synergistic increases in stability are observed with little to no loss in hNE inhibition.

Each gene sequence was cloned into proprietary high expression mammalian vectors. Each completed construct was sequence confirmed before proceeding to DNA scale up. Each DNA expression construct was scaled up to the appropriate amount for transfection. Plasmid DNA was run on agaraose gel for quality assessment and the sequence was confirmed before proceeding to transfection.

Example 2 Construction of AAT-Albumin Binding Domain

Preferred AAT domains are fused to an albumin binding single domain antibody instead of human serum albumin as set forth in Example 1. For example, single domain antibodies having any of respective sequences SEQ ID NOs 22-36 are fused to AAT as provided in Example 1. The AAT-albumin binding domain variant is expressed in CHO, purified, and tested for hNE inhibition and protein stability as set forth in Example 1.

Each gene sequence was cloned into proprietary high expression mammalian vectors. Each completed construct was sequence confirmed before proceeding to DNA scale up. Each DNA expression construct was scaled up to the appropriate amount for transfection. Plasmid DNA was run on agaraose gel for quality assessment and the sequence was confirmed before proceeding to transfection.

Example 3 CHO Transient Transfection

Suspension CHO cells were seeded in a shake flask and were expanded using serum-free chemically defined medium. On the day of transfection, expanded cells were seeded into a new flask with fresh medium. Each DNA construct was transiently transfected into the CHO cells. Cells were maintained as a batch-fed culture (C1603 and C1604, Medna) until the end of the production run.

The results can be seen in Table 2 and in Table 4.

TABLE 2

| Name | V | Harvest | Titer | Final Yield | In Stock | PI |
|---|---|---|---|---|---|---|
| PP12288-J1350 AAT | 100 mL | 50.99 mg | 509.9 mg/L | 28.14 mg | 23.10 mg | 5.6 (Calc.) |
| PP12289-J1351 C232S | 100 mL | 43.64 mg | 436.4 mg/L | 25.74 mg | 20.70 mg | 5.6 (Calc.) |
| PP12290-J1352 M351V, M358V | 100 mL | 43.65 mg | 436.5 mg/L | 25.58 mg | 20.42 mg | 5.6 (Calc.) |
| PP12291-J1353 M351V, M358L | 100 mL | 46.94 mg | 469.4 mg/L | 20.98 mg | 15.90 mg | 5.6 (Calc.) |
| PP12292-J1354 C232S, M351V, M358L | 100 mL | 47.73 mg | 477.3 mg/L | 28.89 mg | 23.52 mg | 5.6 (Calc.) |

TABLE 4

| Name | Harvest | V (L) | Titer (mg/L) | Final Yield | In-Stock | PI |
|---|---|---|---|---|---|---|
| F51L | 37.44 | 0.1 | 374.4 | 21.35 | 21.35 | 5.6 (Calc.) |
| G117F | 36.66 | 0.1 | 366.6 | 28.03 | 28.03 | 5.6 (Calc.) |
| K331F | 33.82 | 0.1 | 338.2 | 21.51 | 21.51 | 5.5 (Calc.) |
| K335A | 24.65 | 0.1 | 246.5 | 13.86 | 13.86 | 5.5 (Calc.) |
| K168C/F189C | 48.03 | 0.1 | 480.3 | 32.82 | 32.82 | 5.5 (Calc.) |
| S283C/P361C | 40.59 | 0.1 | 405.9 | 27.37 | 27.37 | 5.6 (Calc.) |
| F51L/G117F | 32.48 | 0.1 | 324.8 | 22.06 | 22.06 | 5.6 (Calc.) |
| F51L/K331F | 31.71 | 0.1 | 317.1 | 18.71 | 18.71 | 5.5 (Calc.) |
| F51L, K335A | 39.21 | 0.1 | 392.1 | 22.45 | 16.41 | 5.5 (Calc.) |
| F51L/K168C/F189C | 40.55 | 0.1 | 405.5 | 26.48 | 20.44 | 5.5 (Calc.) |
| F51L/S283C/P361C | 45.31 | 0.1 | 453.1 | 35.17 | 29.14 | 5.6 (Calc.) |
| G117F/K331F | 34.45 | 0.1 | 344.5 | 21.43 | 15.43 | 5.5 (Calc.) |
| G117F/K335A | 40.87 | 0.1 | 408.7 | 27.58 | 21.42 | 5.5 (Calc.) |
| G117F/K168C/F189C | 35.71 | 0.1 | 357.1 | 28.96 | 22.9 | 5.5 (Calc.) |
| G117F/S283C/P361C | 42.52 | 0.1 | 425.2 | 31.57 | 25.54 | 5.6 (Calc.) |
| K331F/K335A | 26.72 | 0.1 | 267.2 | 13.33 | 7.2 | 5.5 (Calc.) |
| K331F/K168C/F189C | 28 | 0.1 | 280.0 | 17.75 | 11.68 | 5.5 (Calc.) |
| K331F/S283C/P361C | 41.18 | 0.1 | 411.8 | 24.12 | 18.07 | 5.5 (Calc.) |
| K335A/K168C/F189C | 39.16 | 0.1 | 391.6 | 19.23 | 13.13 | 5.5 (Calc.) |
| K335A/S283C/P361C | 40.15 | 0.1 | 401.5 | 29.75 | 23.61 | 5.5 (Calc.) |
| K168C/F189C/S283C/P361C | 41.3 | 0.1 | 413.0 | 32.41 | 26.35 | 5.5 (Calc.) |

Example 4 CHO Albumin Affinity Purification

Conditioned media from the transient production run was harvested and clarified by centrifugation and filtration. The supernatant was loaded over a column packed with alpha-1 antitrypsin select resin and pre-equilibrated with PBS, pH 7.4. The column was washed with PBS to remove impurities until OD280 (measured by NanoDrop, Thermo Scientific) dropped to around zero. Target protein was eluted with a high salt elution buffer (20 mM Tris, 2 M MgCl2, pH 7.4), fractions were collected and OD280 was measured and recorded. Fractions containing the target protein were pooled and dialyzed to final buffer to PBS, pH 7.4. The final product was filtered through 0.2 μm membrane filter. Protein concentration and final yield were calculated from OD280 value and calculated extinction coefficient after buffer exchange.

CE-SDS analysis of target protein was performed using LabChip GXII (Perkins Elmer).

The results can be seen in FIG. 4 and in FIG. 7.

Example 5: Stability Analysis

A sample was submitted to the UNcle system (Unchained Labs) for analysis. A temperature ramp of 1° C./min was performed with monitoring from 25° C. to 95° C. for dynamic light scattering ("DSF") and static light scattering ("SLS"). UNcle measures SLS at 266 nm and 473 nm. DLS was measured at the beginning of thermal ramp. Tm, Tagg, and DLS measurements were calculated and analyzed by using the UNcle Analysis Software. The Tm as determined is indicated by a solid dropline in DSF graph.

Figure 5:
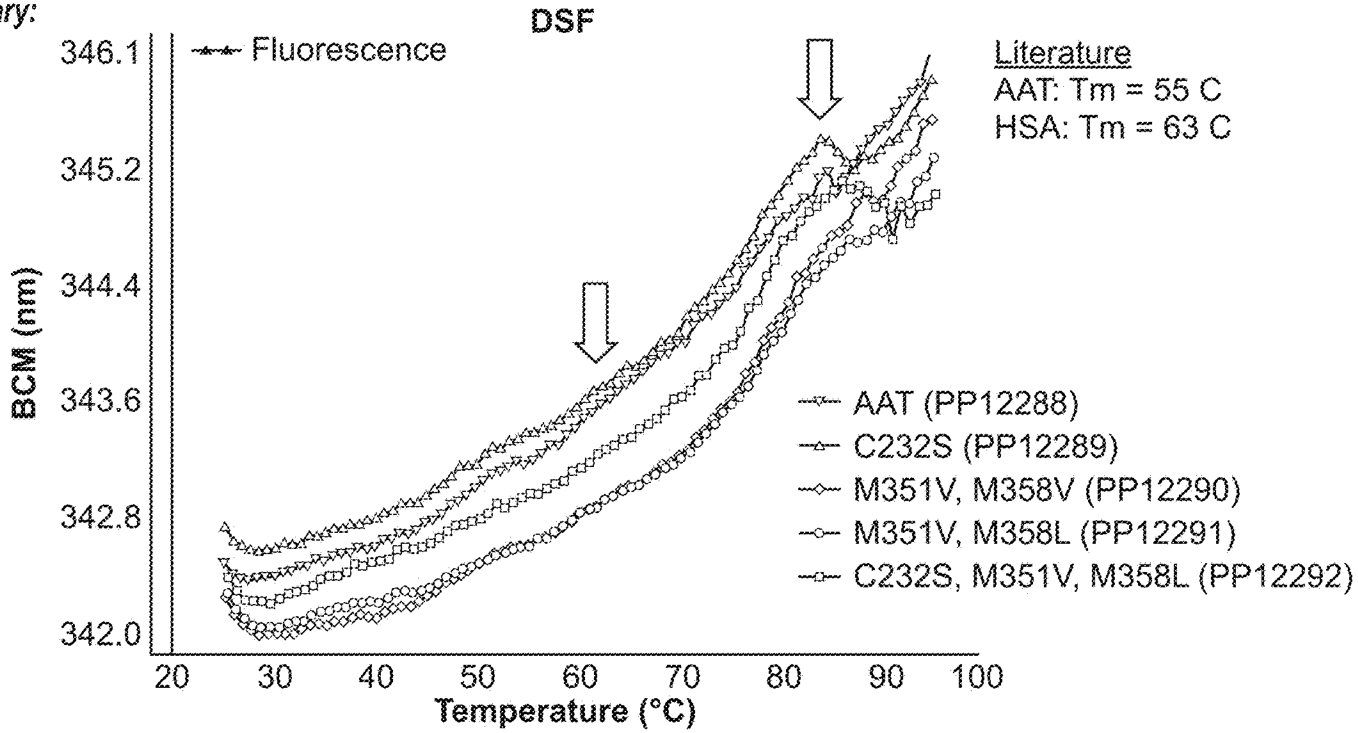
FIG. 5 depicts the stability analysis of 5 AAT-Albumin fusions.
Figure 8:
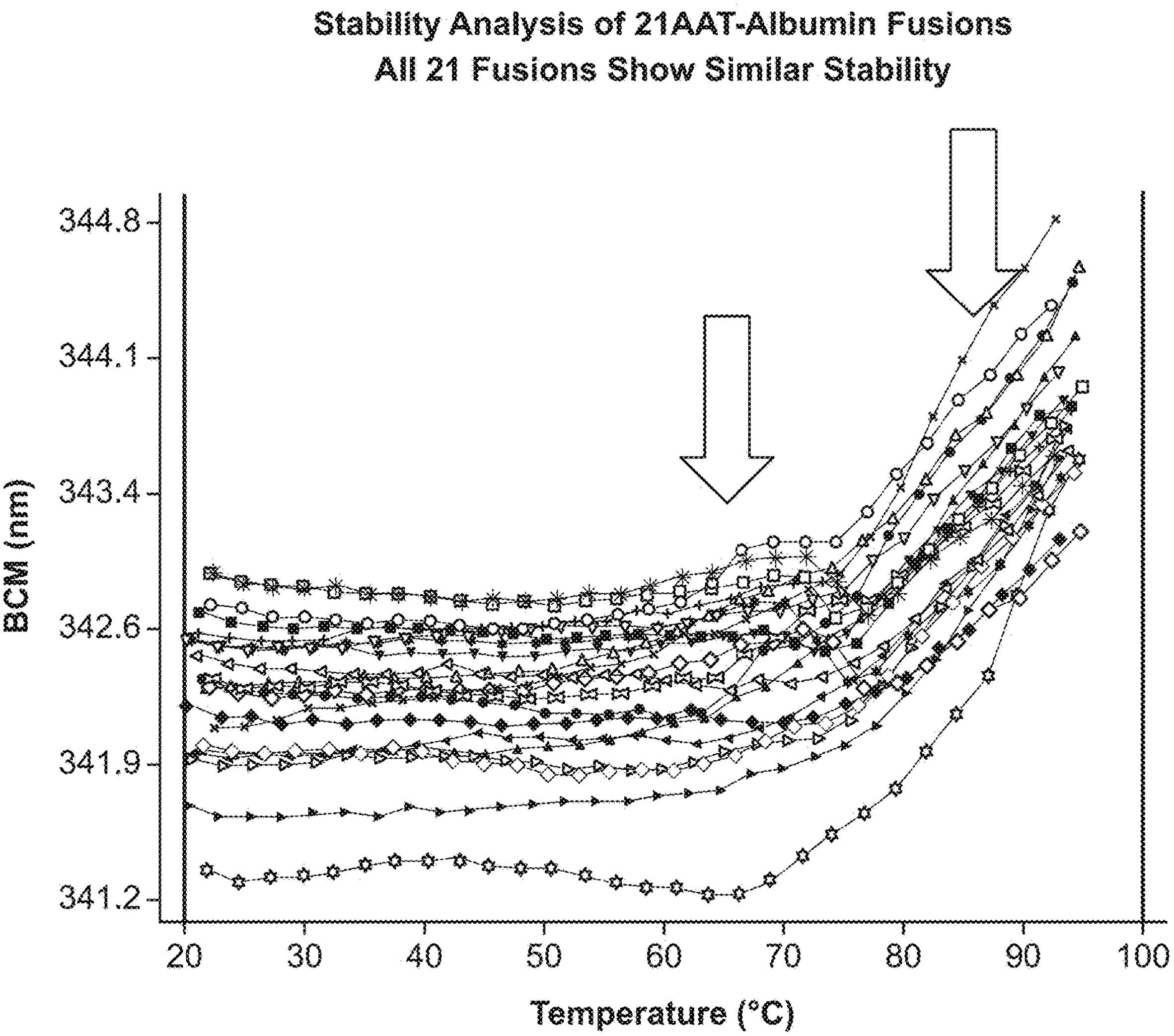
FIG. 8 depicts the stability analysis of 21 AAT-Albumin fusions.

The results can be seen in FIG. 5 and in FIG. 8.

Example 6: hNA Assay

Figure 6:
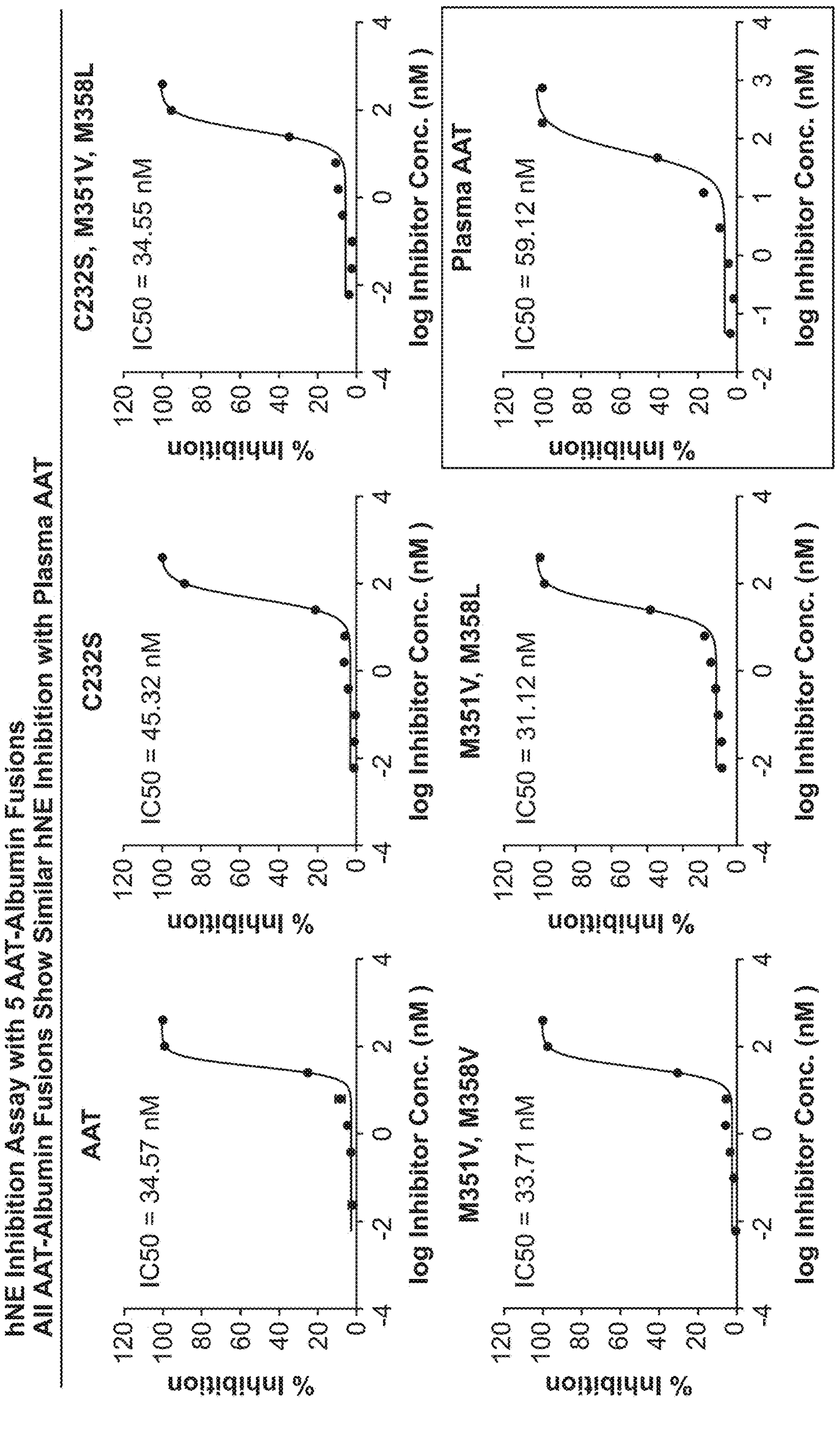
FIG. 6 depicts results for an hNE inhibition assay with 5 AAT-albumin fusions.
Figure 7A:
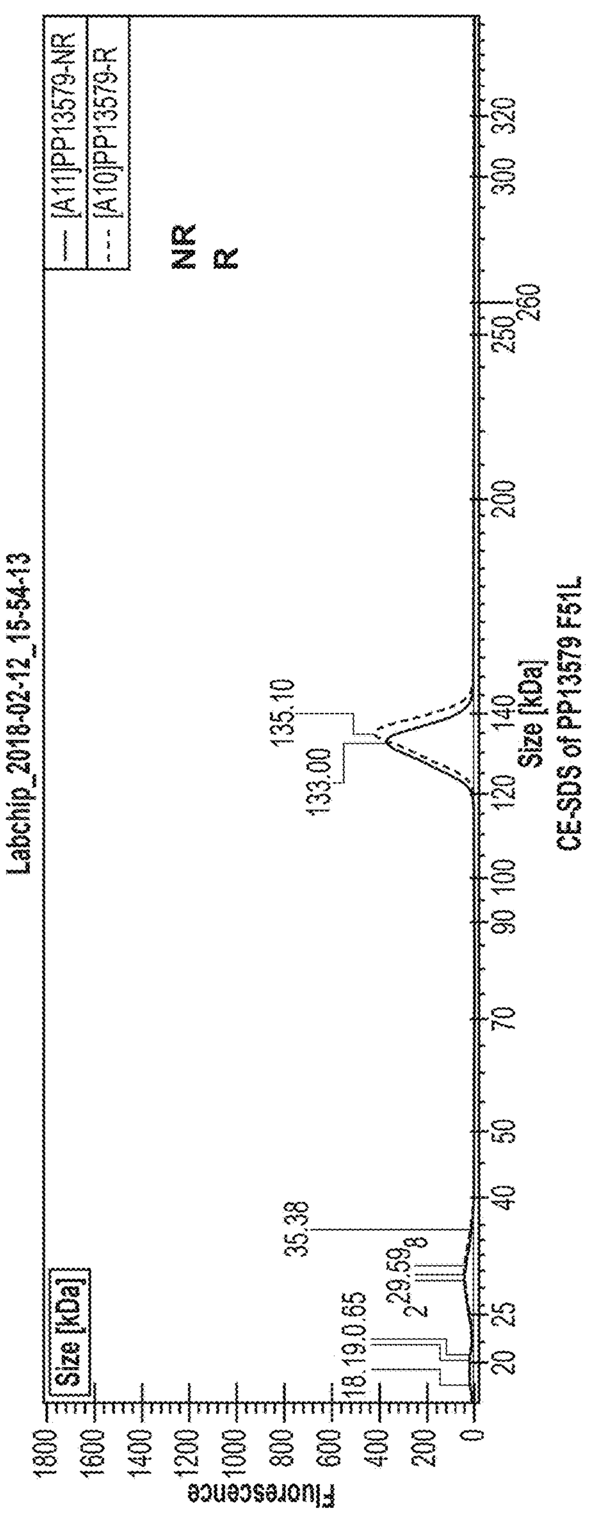
FIG. 7A depicts purified CE-SDS for PP13579.
Figure 7B:
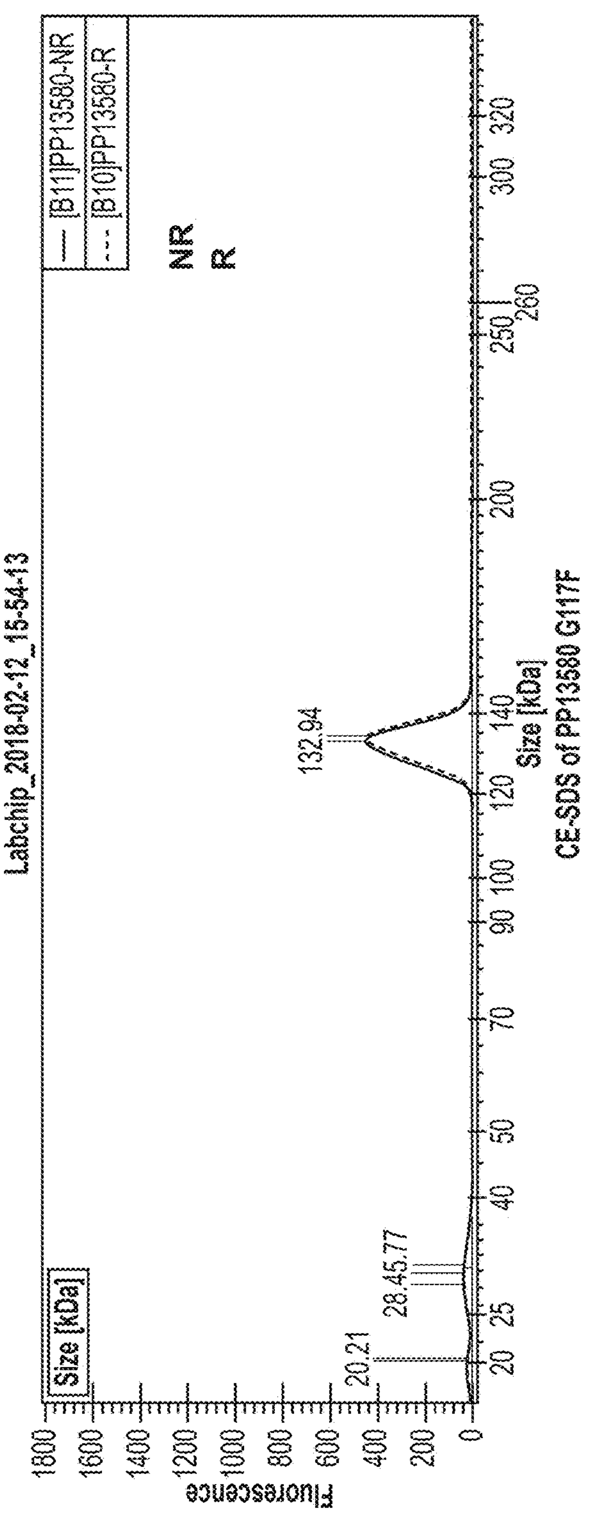
FIG. 7B depicts purified CE-SDS for PP13580.
Figure 7C:
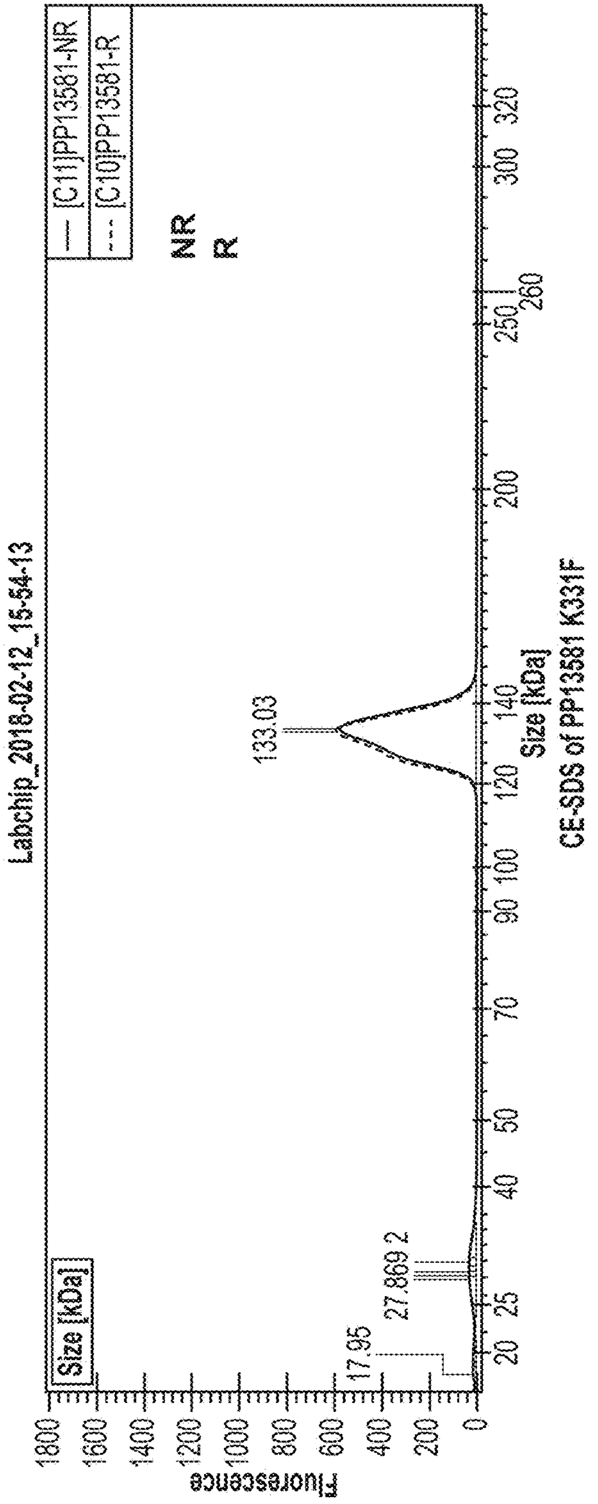
FIG. 7C depicts purified CE-SDS for PP13581.
Figure 7D:
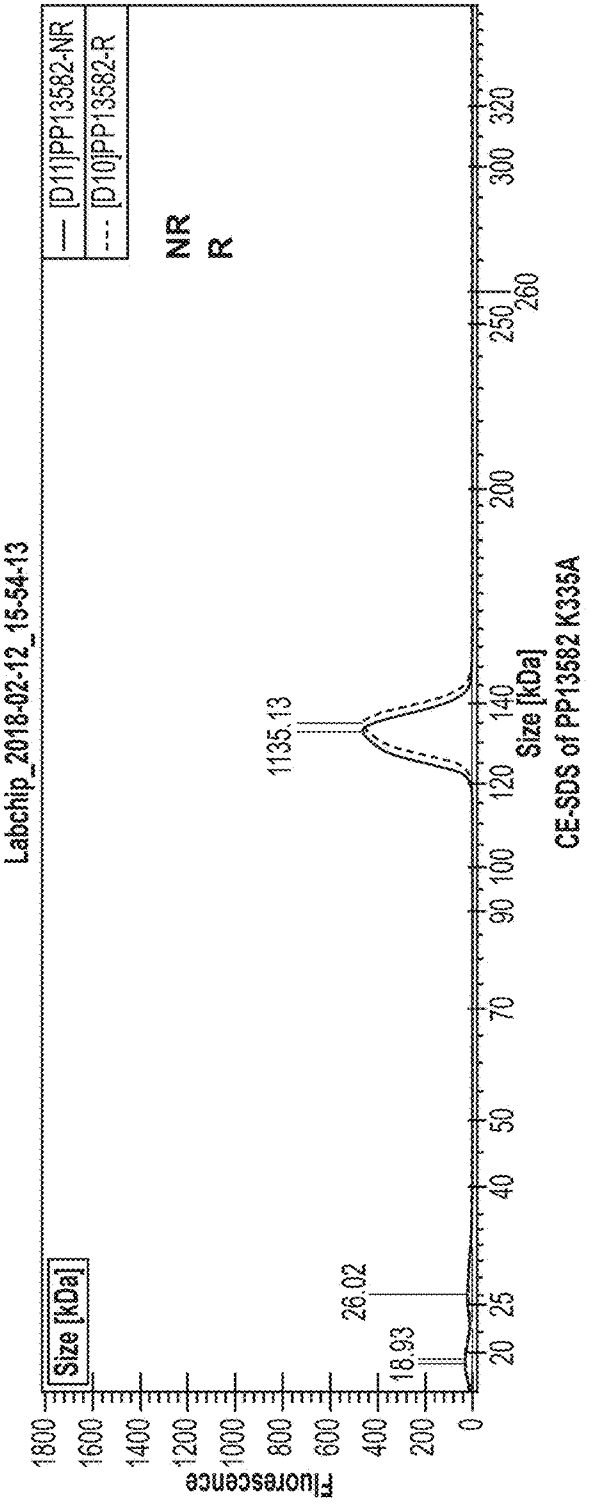
FIG. 7D depicts purified CE-SDS for PP13582.
Figure 7E:
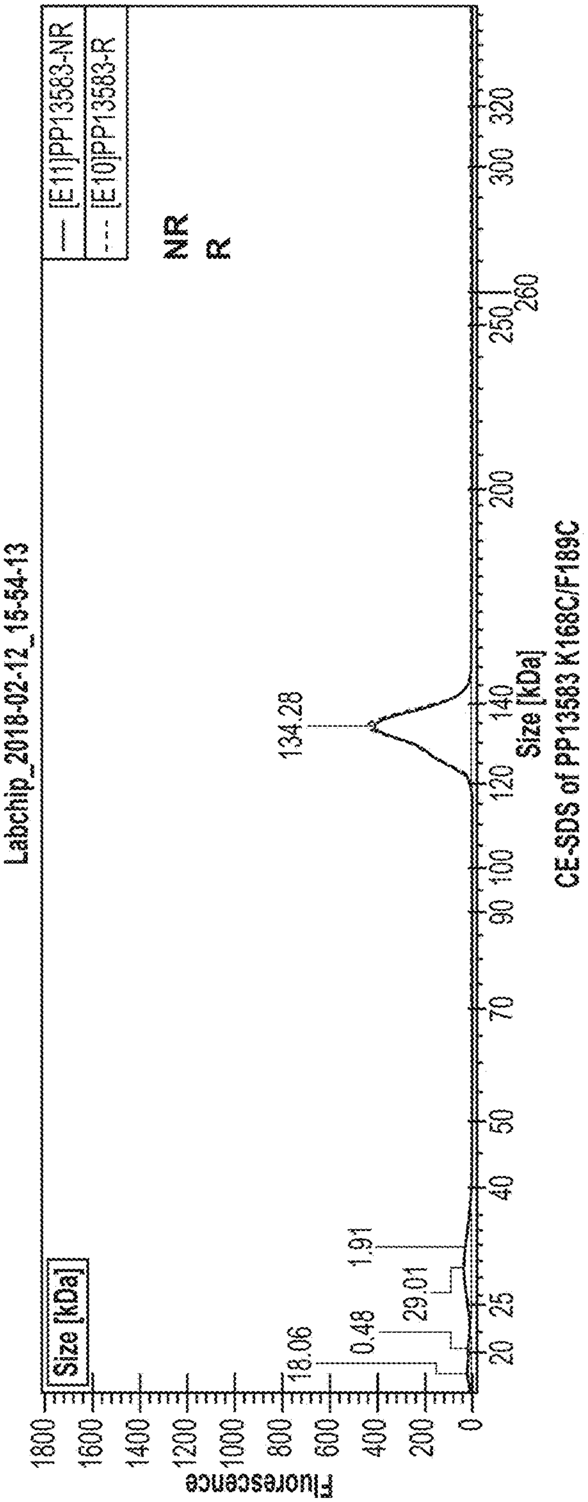
FIG. 7E depicts purified CE-SDS for PP13583.
Figure 7F:
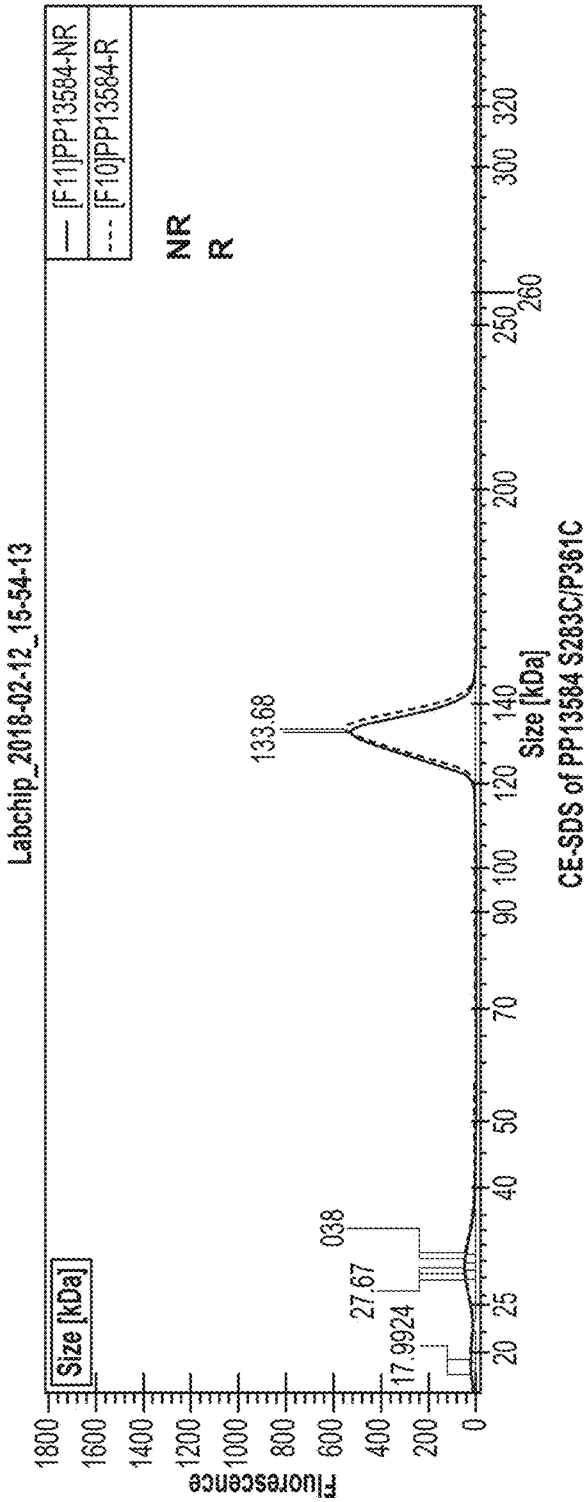
FIG. 7F depicts purified CE-SDS for PP13584.
Figure 7G:
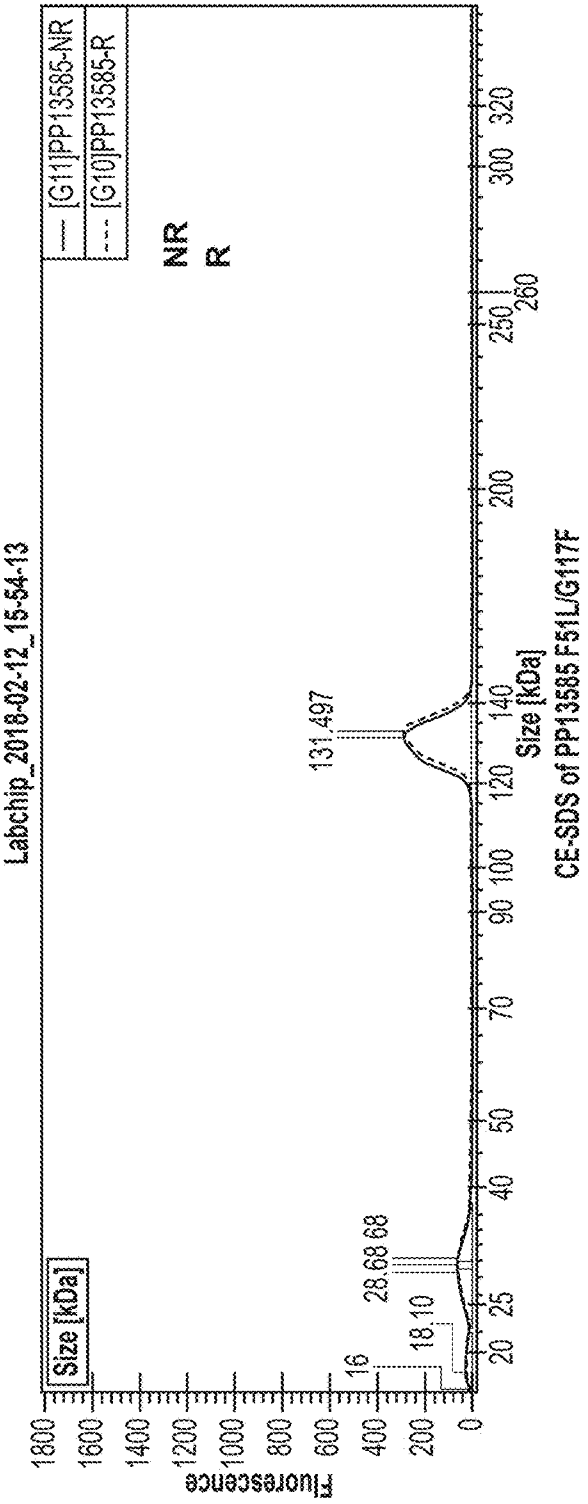
FIG. 7G depicts purified CE-SDS for PP13585.
Figure 7H:
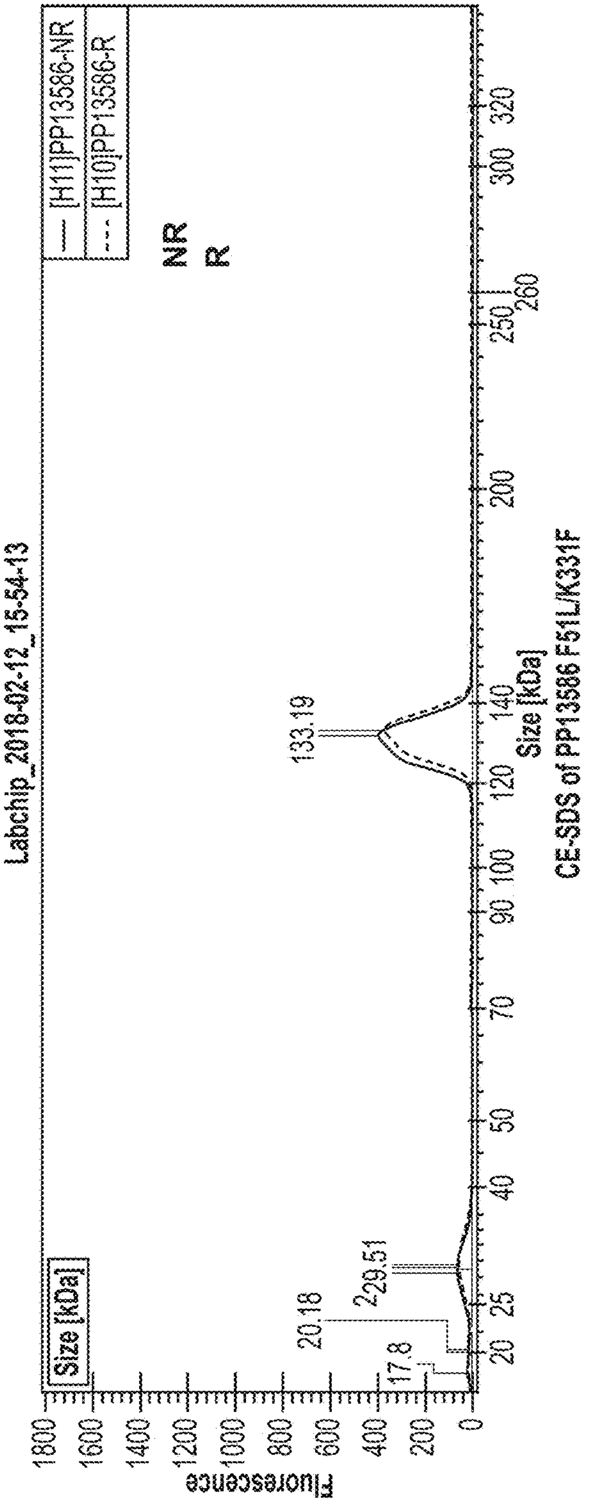
FIG. 7H depicts purified CE-SDS for PP13586.
Figure 7I:
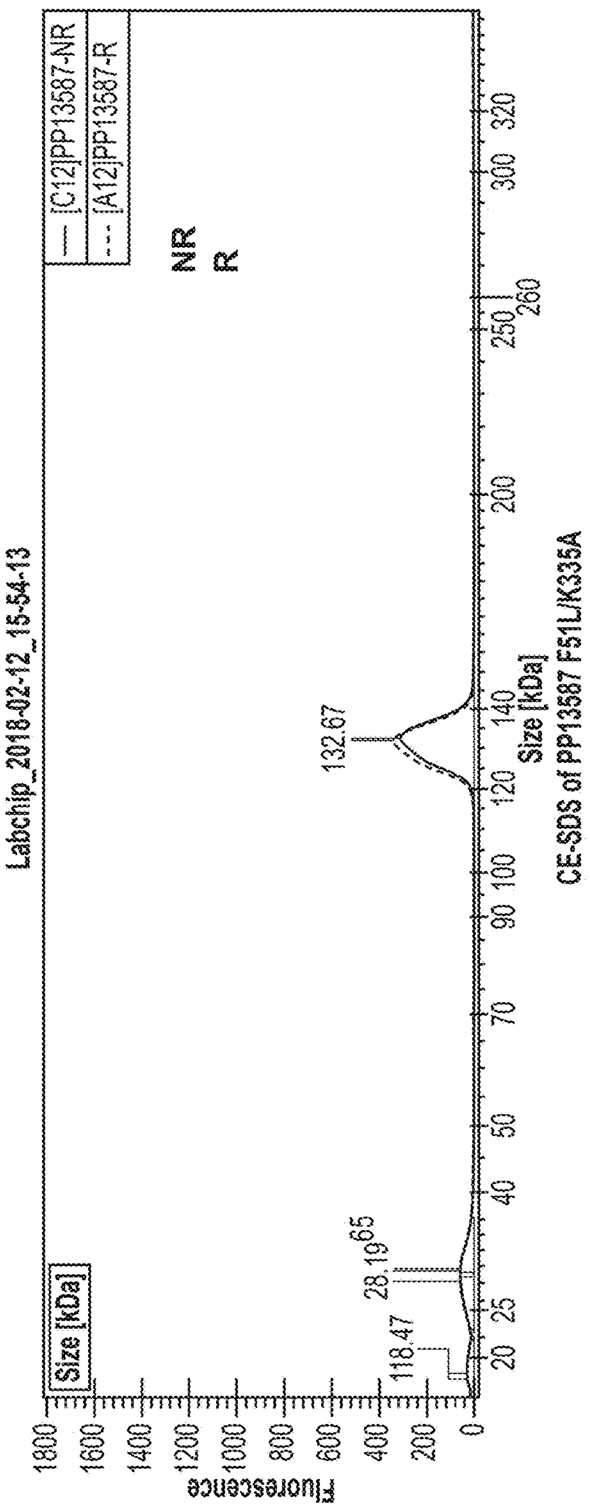
FIG. 7I depicts purified CE-SDS for PP13587.
Figure 7J:
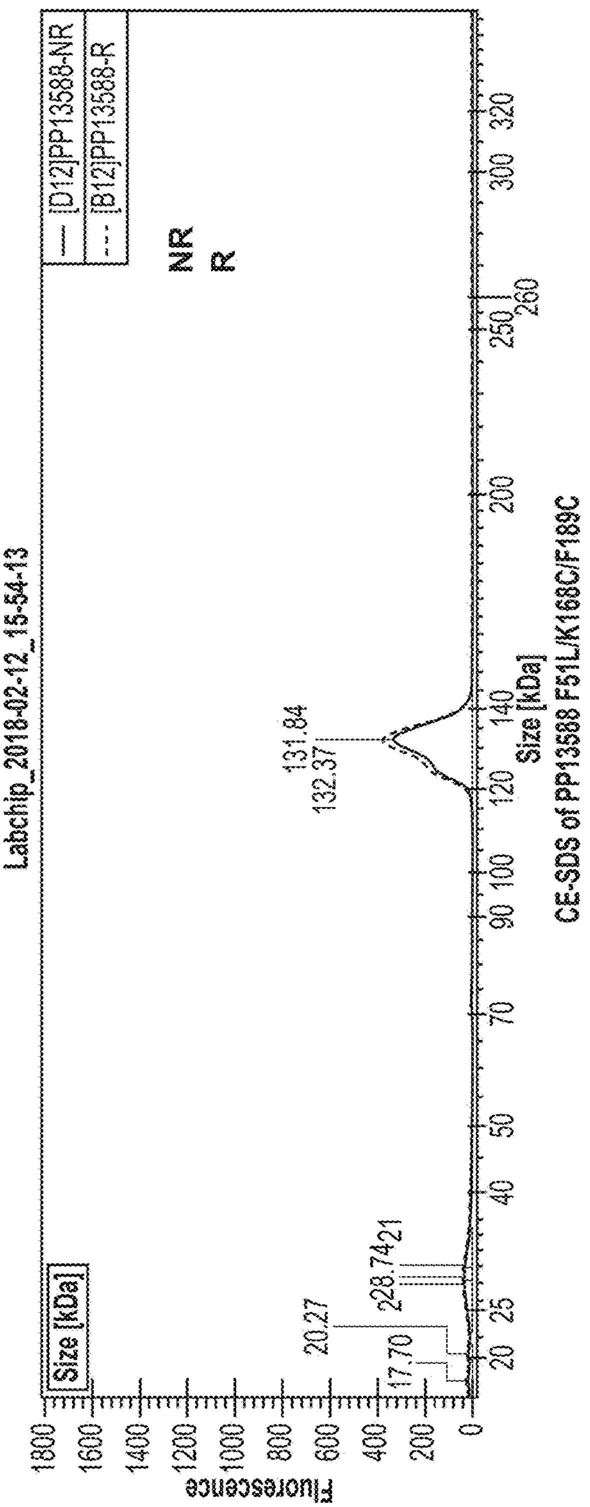
FIG. 7J depicts purified CE-SDS for PP13588.
Figure 7K:
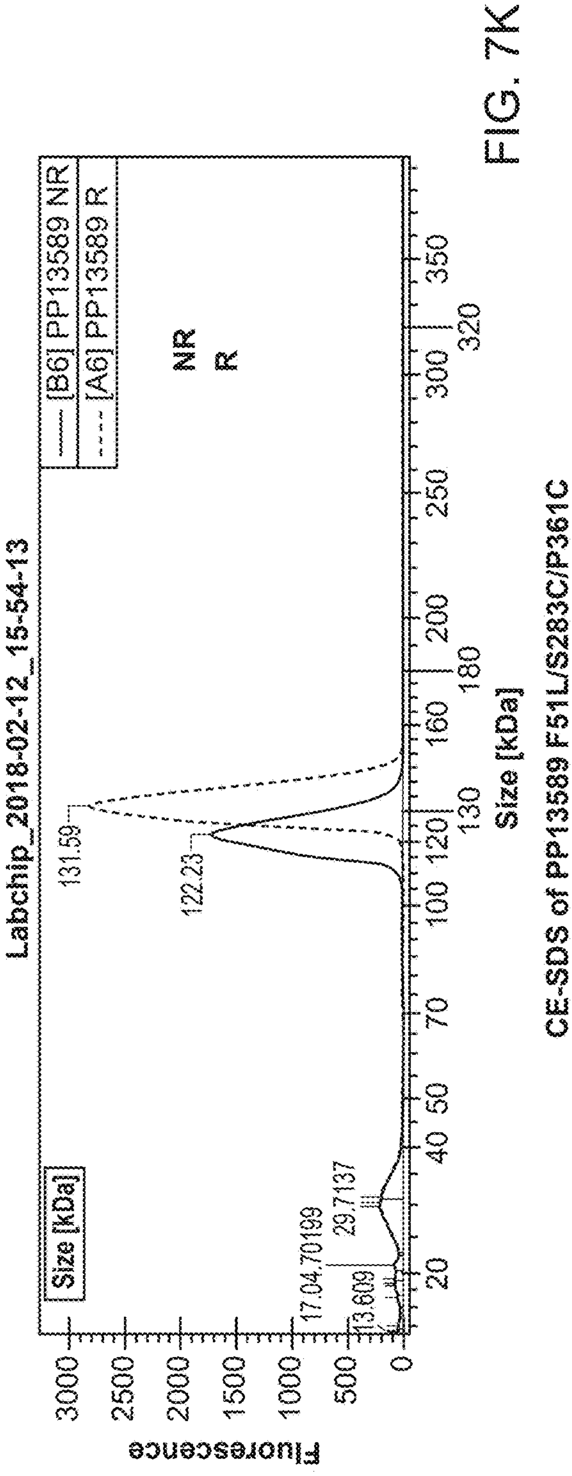
FIG. 7K depicts purified CE-SDS for PP13589.
Figure 7L:
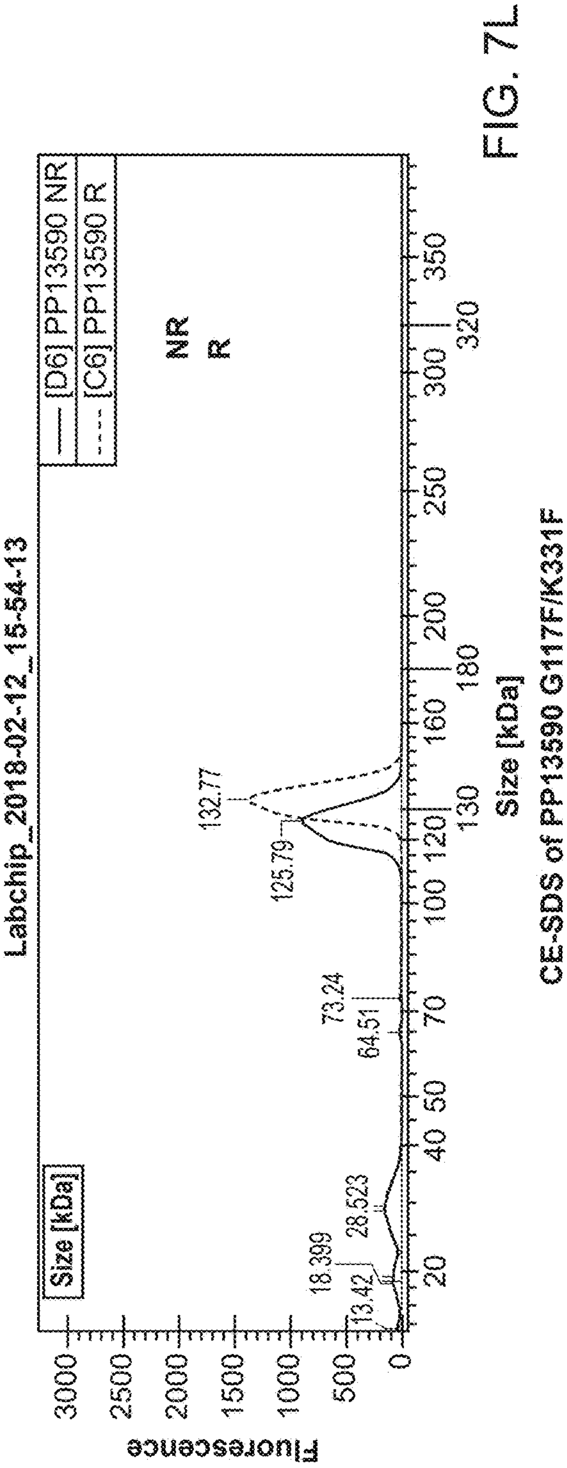
FIG. 7L depicts purified CE-SDS for PP13590.
Figure 7M:
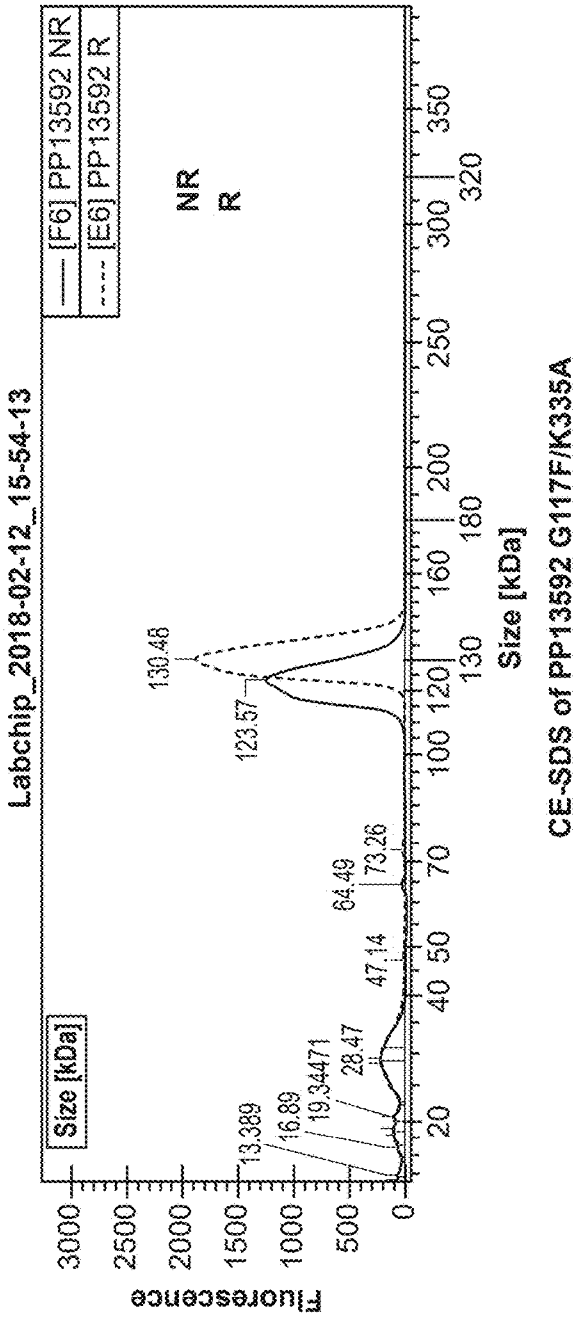
FIG. 7M depicts purified CE-SDS for PP13592.
Figure 7N:
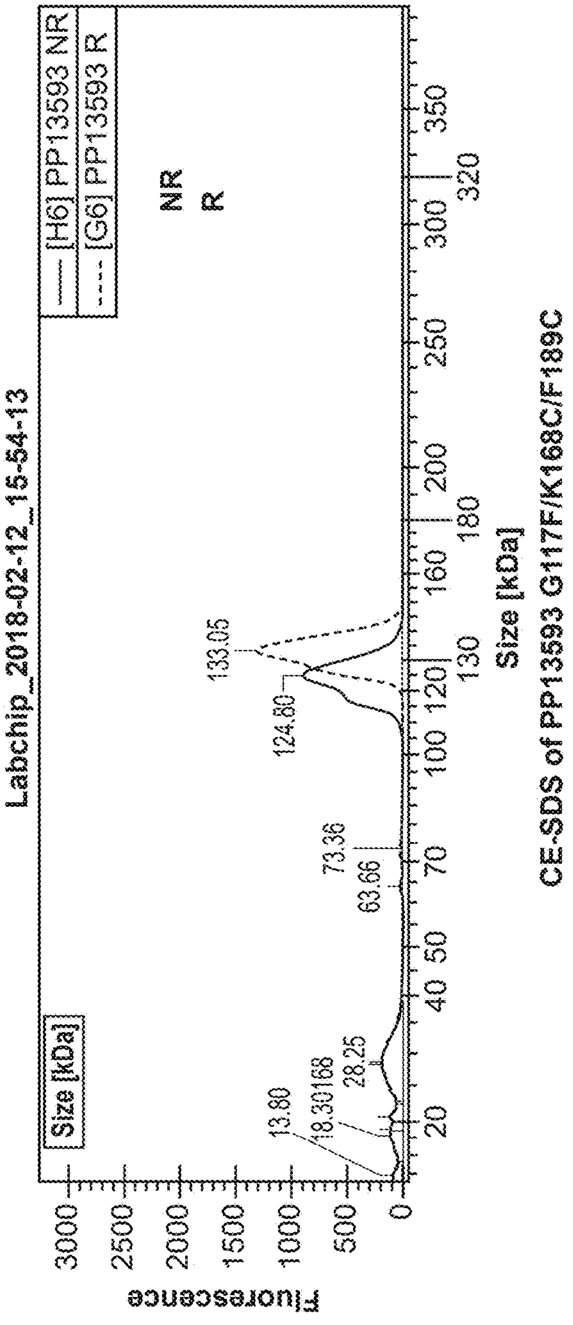
FIG. 7N depicts purified CE-SDS for PP13593.
Figure 7O:
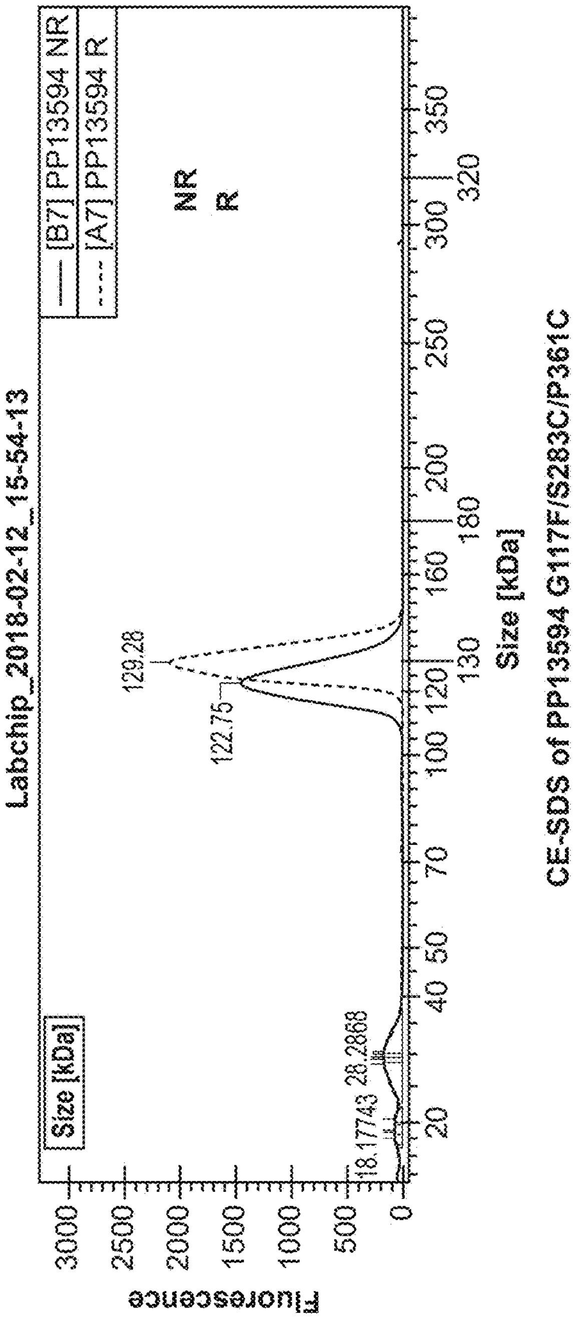
FIG. 7O depicts purified CE-SDS for PP13594.
Figure 7P:
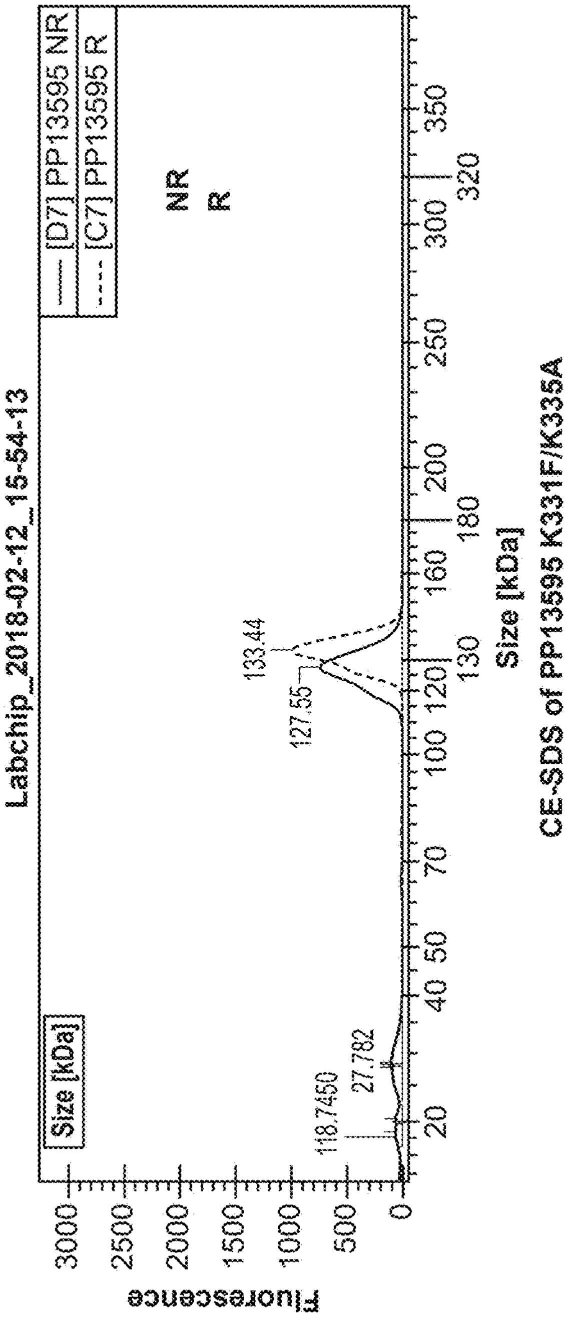
FIG. 7P depicts purified CE-SDS for PP13595.
Figure 7Q:
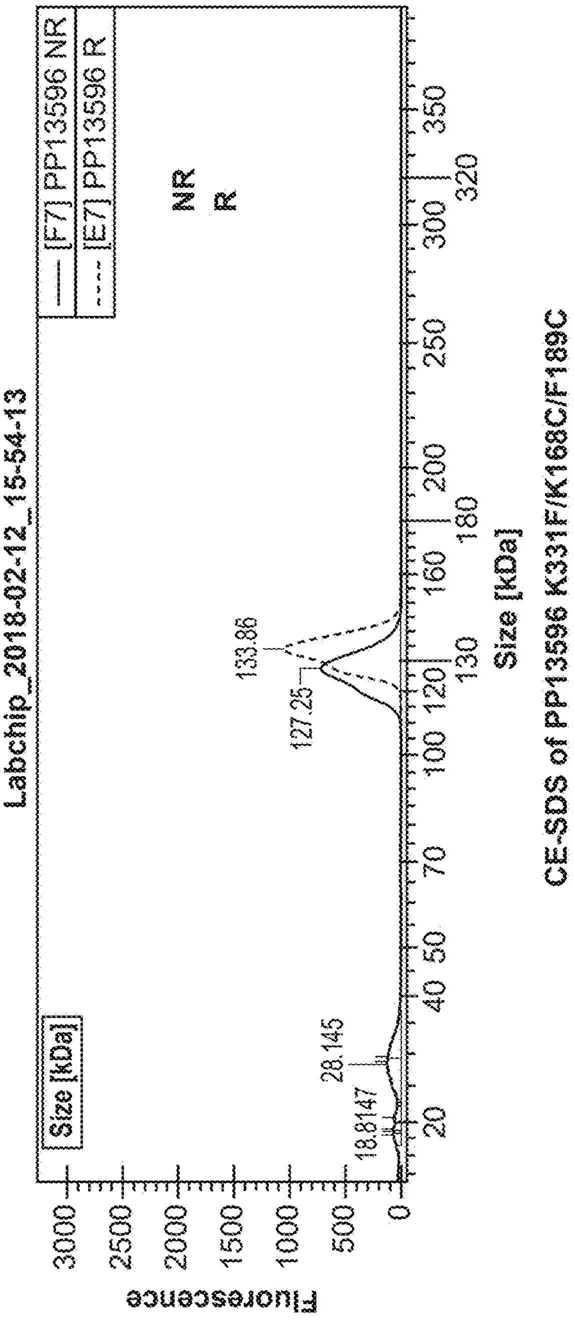
FIG. 7Q depicts purified CE-SDS for PP13596.
Figure 7R:
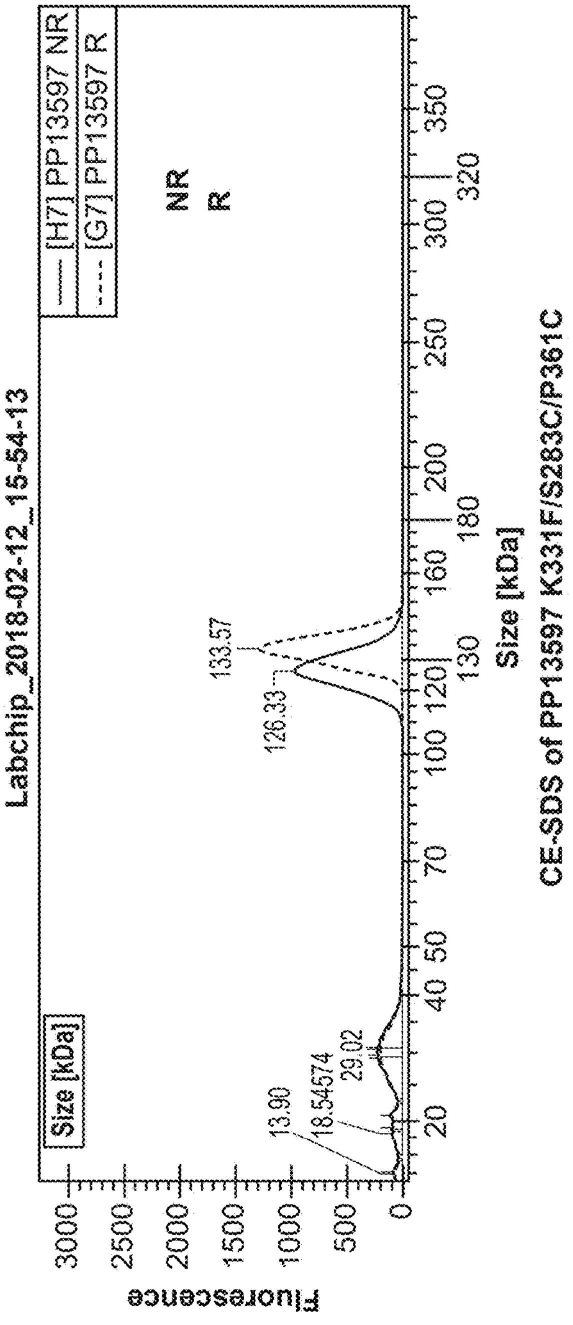
FIG. 7R depicts purified CE-SDS for PP13597.
Figure 7S:
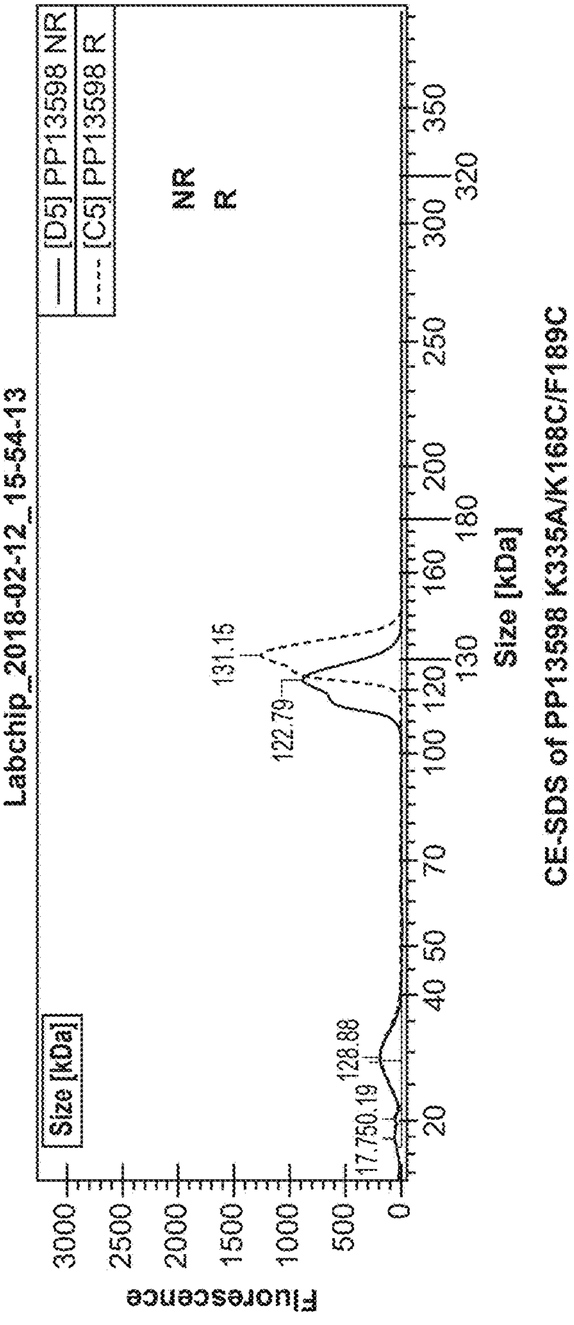
FIG. 7S depicts purified CE-SDS for PP13598.
Figure 7T:
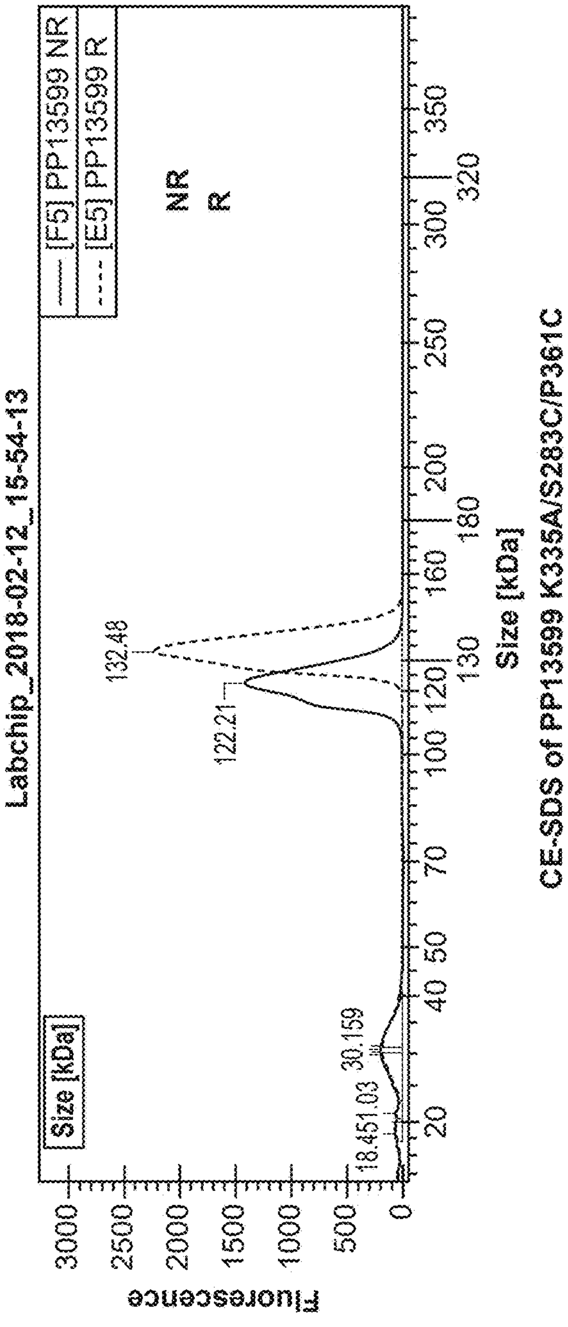
FIG. 7T depicts purified CE-SDS for PP13599.
Figure 7U:
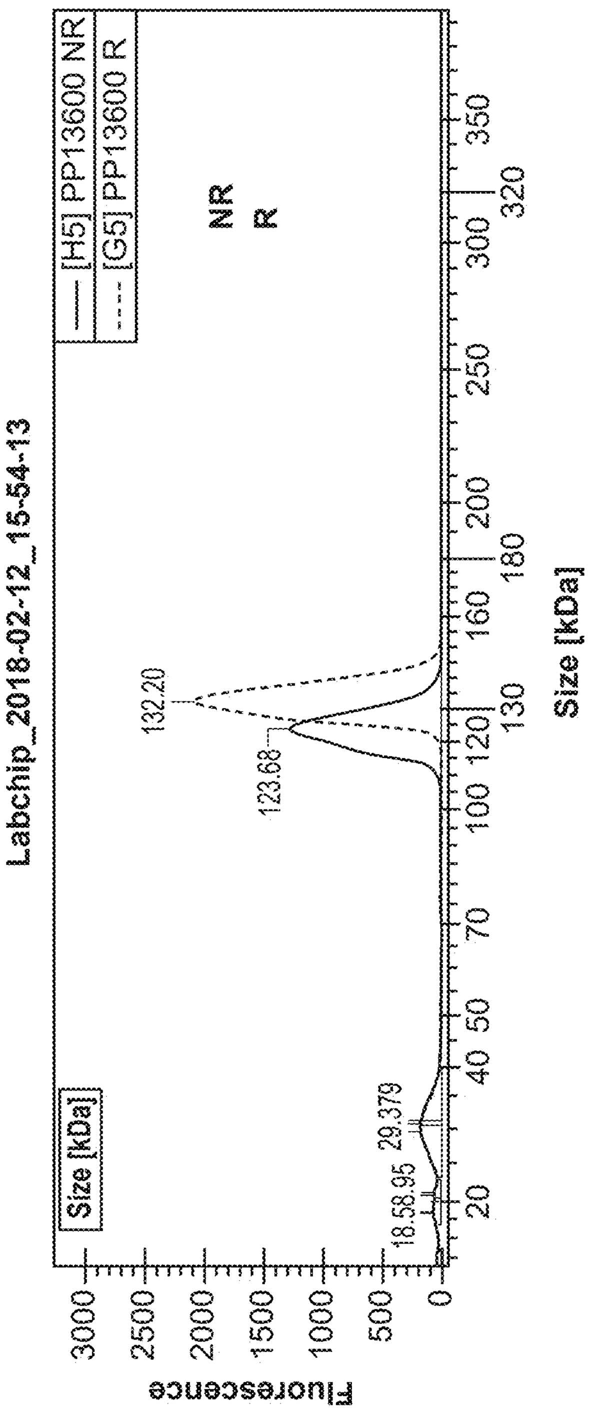
FIG. 7U depicts purified CE-SDS for PP13600.

A neutrophil elastase inhibitory assay was performed with the screening kit from Abcam (Cat #ab118971). Results are shown in FIG. 6.

Example 7: IC50

IC50 analysis of AAT mutants was also performed with the screening kit from Abcam (Cat #ab118971). 400 nM-98 pM was concentration range used for IC50 analysis and data obtained from two replicates was analyzed using GraphPad Prism.

Table 3 shows IC50s for base albumin-fusion.

TABLE 3

| Name | Titer | IC50 (nM) |
|---|---|---|
| PP12288-J1350 AAT | 509.9 mg/L | 34.57 |
| PP12289-J1351 C232S | 436.4 mg/L | 45.32 |
| PP12290-J1352 M351V, M358V | 436.5 mg/L | 33.71 |
| PP12291-J1353 M351V, M358L | 469.4 mg/L | 31.12 |
| PP12292-J1354 C232S, M351V, M358L | 477.3 mg/L | 34.55 |
| Plasma AAT | NA | 59.12 |

21 AAT mutant proteins and 1AAT serum control were also used to generate IC50 analysis curves. Table 5 shows IC50s for mutant AAT.

TABLE 5

| BASE | Mutations | Titer (mg/L) | IC50 (nM) |
|---|---|---|---|
| C232S, M351V, M358L | K335A | 247 | 5.96 |
| C232S, M351V, M358L | K331F | 338 | 7.05 |
| AAT Serum Control | — | — | 7.98 |
| C232S, M351V, M358L | K335A/S283C/P361C | 402 | 8.55 |
| C232S, M351V, M358L | G117F/K335A | 409 | 8.58 |
| C232S, M351V, M358L | G117F/K331F | 345 | 8.94 |
| C232S, M351V, M358L | F51L/K331F | 317 | 9.18 |
| C232S, M351V, M358L | K331F/K335A | 267 | 9.30 |
| C232S, M351V, M358L | G117F | 367 | 10.45 |
| C232S, M351V, M358L | F51L/K335A | 392 | 10.67 |
| C232S, M351V, M358L | F51L | 374 | 13.57 |
| C232S, M351V, M358L | K331F/S283C/P361C | 412 | 14.32 |
| C232S, M351V, M358L | K335A/K168C/F189C | 392 | 15.77 |
| C232S, M351V, M358L | F51L/S283C/P361C | 453 | 15.97 |
| C232S, M351V, M358L | F51L/G117F | 325 | 19.00 |
| C232S, M351V, M358L | G117F/S283C/P361C | 425 | 20.15 |
| C232S, M351V, M358L | F51L/K168C/F189C | 406 | 23.32 |
| C232S, M351V, M358L | K168C/F189C | 480 | 23.47 |
| C232S, M351V, M358L | K331F/K168C/F189C | 280 | 27.96 |
| C232S, M351V, M358L | G117F/K168C/F189C | 357 | 29.10 |
| C232S, M351V, M358L | K168C/F189C/S283C/P361C | 413 | 35.01 |
| C232S, M351V, M358L | S283C/P361C | 406 | 41.71 |

Figure 9A:
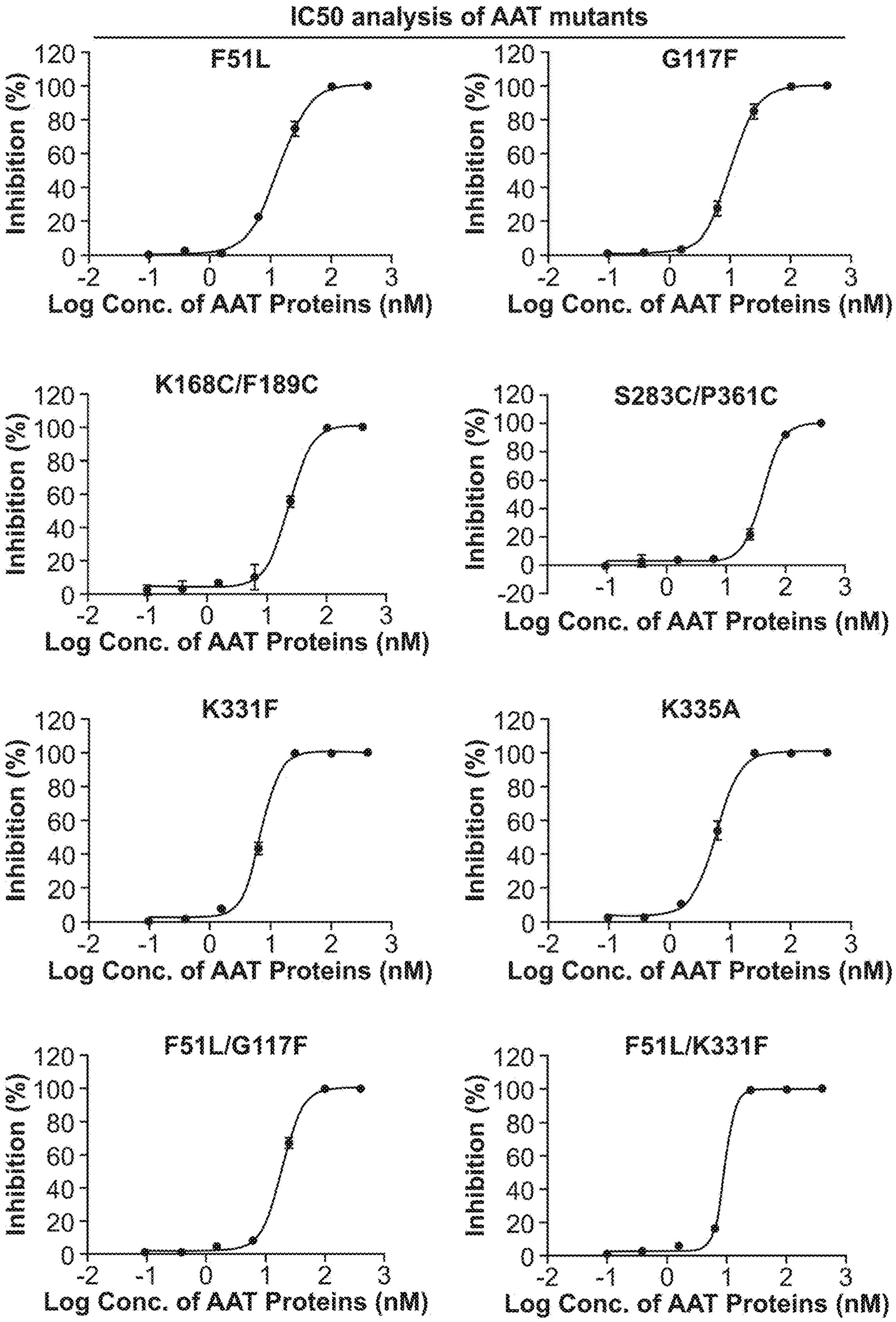
FIG. 9A depicts IC50 analysis of AAT mutants.
Figure 9B:
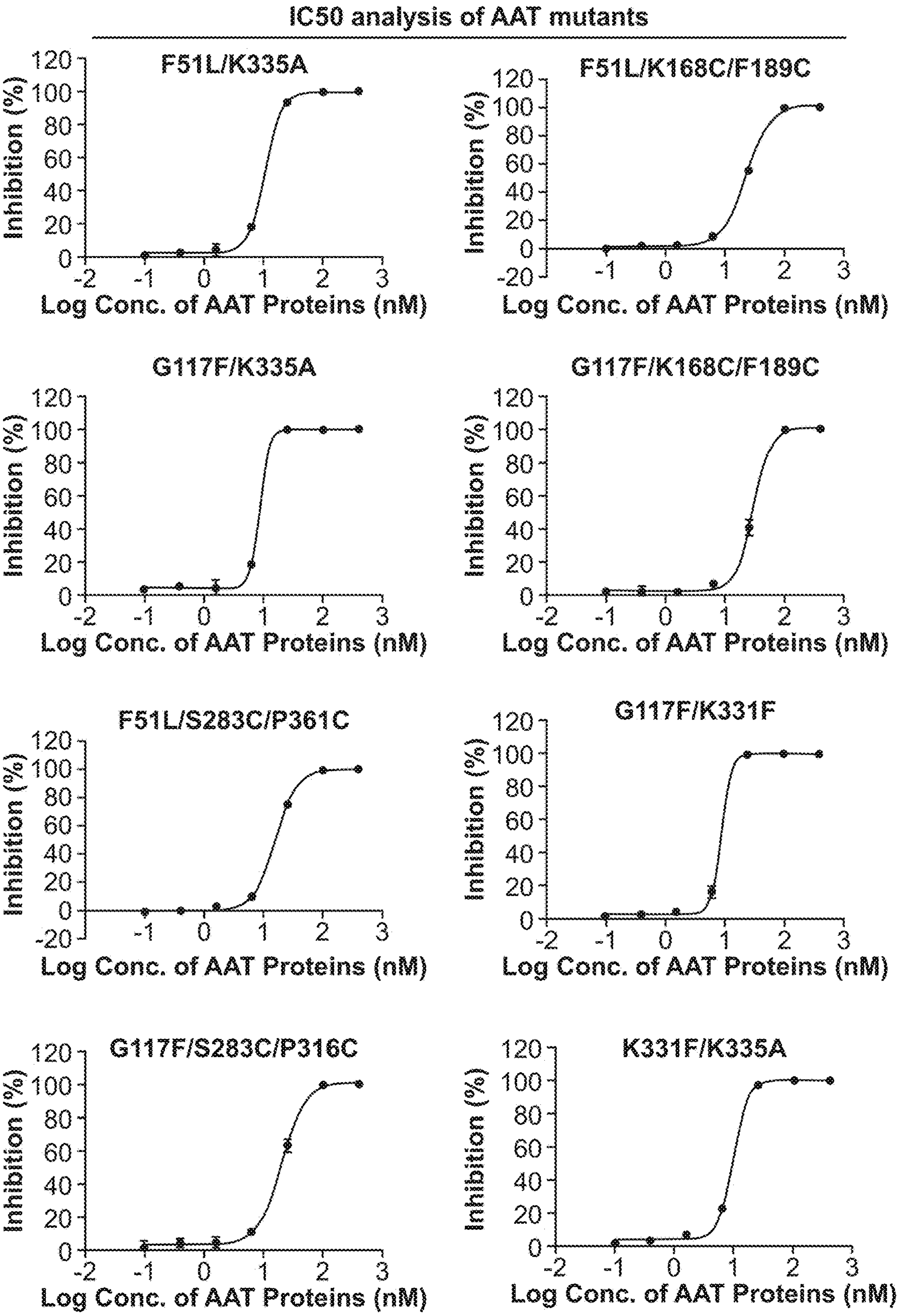
FIG. 9B depicts IC50 analysis of AAT mutants.
Figure 9C:
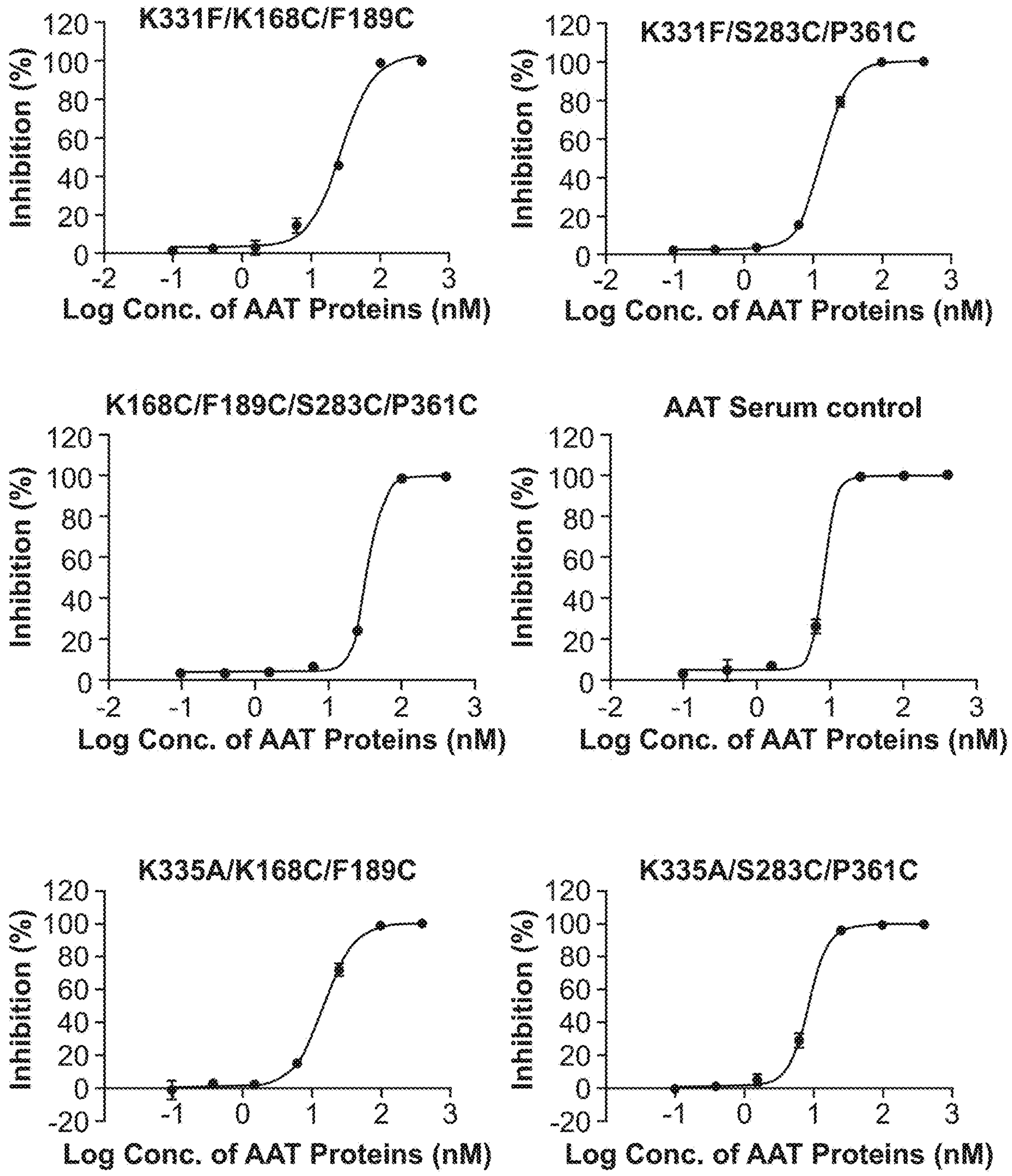
FIG. 9C depicts IC50 analysis of AAT mutants.

FIG. 9 shows IC50 analysis of AAT mutants, with the x-axis showing log concentration of AAT proteins (nM) and the y-axis showing percent inhibition. Curves that have a higher slope show a very cooperative inhibition profile. Mutants G11F/K335A, G117F/K331F, F51L/K331F, and K331F/K335A all have a very cooperative inhibition profile.

Example 8: In-Silico Immunogencity

A proprietary screen was used to compare proteins with those already in clinical use (See, Jawa et al., T-cell dependent immunogenicity of protein therapeutics: Preclinical assessment and mitigation, 149 Clinical Immunoology, 534-555 (2013), which is incorporated by reference herein in its entirety, including any drawings). AAT-albumin fusions ("AAT_MLA"), AAT mutants ("AAT_Mutant"), and albumin proteins ("Albumin") were screened for the presence of putative T-cell epitopes. The AAT Mutant has the following mutations according to SEQ ID NO: 1: C232S, M351V, M358L, K335A, S283C, and P361C. The immunogenic potential of each T-cell epitope or AAT-albumin fusions, AAT mutants, and albumin proteins were compared to others, normalized, and ranked.

Input sequences were parsed into overlapping 9-mer frames and each frame was evaluated with respect to a panel of eight common Class II HLA alleles. The alleles are called super-types. Each super type is functionally equivalent to, or nearly equivalent to, many additional family member alleles. Taken collectively, the eight super-type alleles, along with their respective family members, cover well over 95% of the human population. Each frame-by-allele assessment is a statement about predicted HLA binding affinity.

Assessment scores range from approximately −3 to +3. Assessment scores above 1.64 are defined as "hits" and are considered potentially immunogenic and worthy of further consideration. One can often expect about 5% of all assessments to score above 1.64. These peptides have a significant chance of binding to HLA molecules with moderate to high affinity and, therefore, have a significant chance of being presented on the surface of APCs, such as dendritic cells or macrophages, where they may be interrogated by passing T cells. The greater the burden of HLA ligands (i.e. hits)

contained in a given protein, the more likely that protein is to induce an immune response.

The EpiMatrix Protein Score is the difference between the number of predicted T cell epitopes one would expect to find in a protein of a given size and the number of putative epitopes predicted by the EpiMatrix System. EpiMatrix Protein Scores are "normalized" and can be plotted on a standardized scale (See, for example, FIG. 10). The EpiMatrix Protein Score of an "average" protein is zero. EpiMatrix Protein Scores above zero indicate the presence of excess MEW ligands and denote a higher potential for immunogenicity while scores below zero indicate the presence of fewer potential MEW ligands than expected and a lower potential for immunogenicity.

In analyzing the full AAT_MLA sequence, the algorithm performed a total of 7,880 frame-by-allele assessments. In analyzing the AAT_MUTANT domain, the algorithm performed a total of 3,088 frame-by-allele assessments. In analyzing the ALBUMIN domain, the algorithm performed a total of 4,616 frame-by-allele assessments. The results are shown in Table 6. Mutant AAT shows a marginally increased immunogenicity score compared to wild type AAT. The fusion of high-scoring AAT_MUTANT domain to the low-scoring glycine-serine linker and low-scoring ALBUMIN domain lowers the overall epitope density of the ATT_MLA fusion. AAT, when fused to albumin (AAT_MLA), has a negative score, indicating reduced immunogenic potential compared to wild type or mutant AAT alone.

TABLE 6

| Protein Label | Length | Assessments | EpiMatrix Hits | EpiMatrix Score |
|---|---|---|---|---|
| AAT MLA | 993 | 7,880 | 384 | −10.72 |
| AAT MUTANT | 394 | 3,088 | 206 | 26.87 |
| AAT WT | 394 | 3,088 | 202 | 21.01 |
| ALBUMIN | 585 | 4,616 | 178 | −32.04 |

Figure 10:
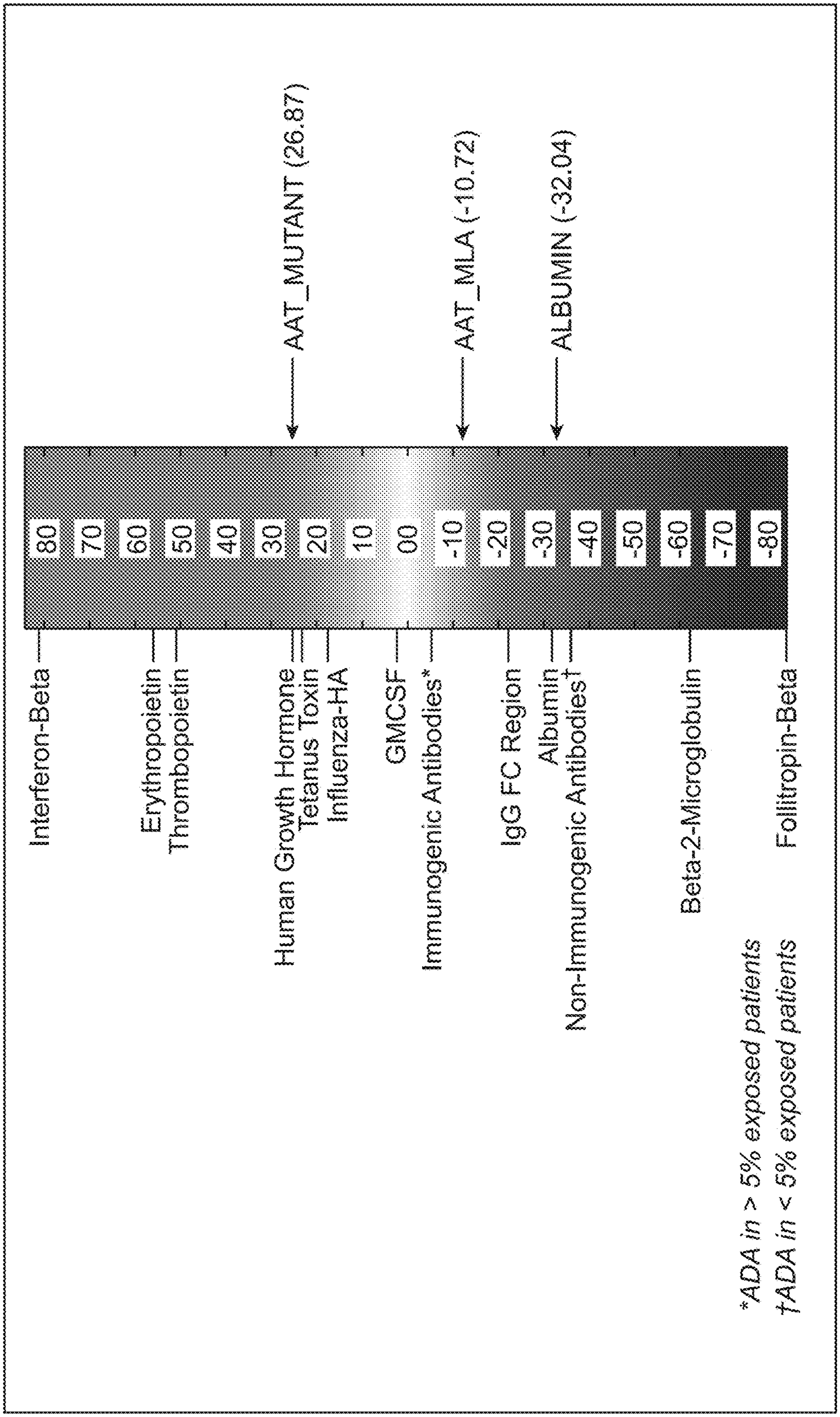
FIG. 10 depicts EpiMatrix protein scores normalized and plotted on a standardized scale.

384 peptide-to-HLA hits were identified within the full fusion sequence AAT_MLA, resulting in an overall score of −10.72. 206 hits were identified within the full fusion sequence AAT_MUTANT, resulting in an overall score of 26.87. 202 hits were identified within the full fusion sequence AAT WT, resulting in an overall score of 21.01. 178 hits were identified within the full fusion sequence AAT_MLA, resulting in an overall score of −32.04. The results are shown in FIG. 10.

Example 9: Stability Analysis of AAT Variant (K335A, S283C/P361C) on Base (C232S,M351V, M351L)

Figure 11:
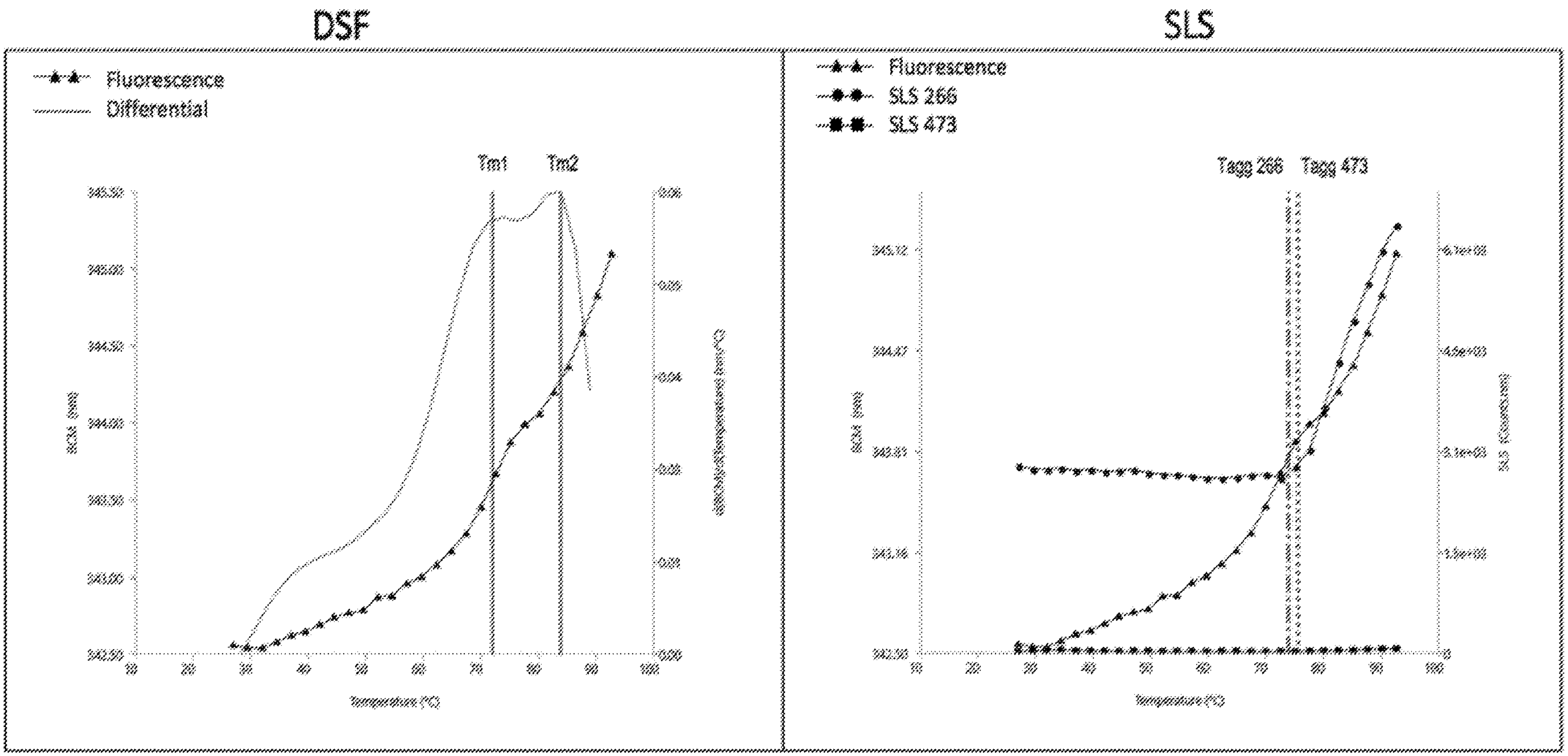
FIG. 11 depicts stability analysis of AAT variant (K335A, S283C/P361C) on base (C232S,M351V, M351L).

Sample was submitted to UNcle (Unchained Labs) for analysis. A temperature range of 1° C./mi was performed while being monitored from 25° C. to 95° C. for DSF and SLS. UNcle measures SLS at 266 nm and 473 nm. DLS was measured at the beginning of the thermal ramp. Tm, Tagg, and DLS measurements were calculated and analyzed by using the UNcle analysis software. Tm was determined as indicated by a solid dropline in FIG. 11. As can be seen, the variant AAT albumin fusion is very stable.

Example 10

Cyno PK Potential toxicity of recombinant Alpha-1-antitrypsin (AAT) K335A/S283C/P361C fused to human serum albumin (AAT Albumin Fusion) when given once by intravenous bolus injection for to cynomolgus monkeys was determined. The cynomolgus monkey was chosen as the animal model for this study as it is an accepted nonrodent species for preclinical toxicity testing by regulatory agencies and most accurately reflects the pharmacokinetics and pharmacodynamics of the test agent expected in human subjects. Pharmacokinetic characteristics of the AAT Albumin Fusion, compared to human plasma-derived AAT (Prolastin C) was also determined.

Table 7 provides the test articles and control article.

TABLE 7

| | Test Article -1 | Test Article -2 | Control Article |
|---|---|---|---|
| Identification | Recombinant AAT K335A/S283C/P361C fused to human | Human Plasma-Derived AAT (Prolastin C) | 137 mM NaCl 2.7 mM KCl |
| Physical Description | Liquid | Powder | Liquid |
| Concentration | 7.58 mg/mL | 1129 mg, dilute | Not applicable |

The control article was used for dilution of the test articles. Test article dosing formulations of 2 mg/mL were prepared to meet dose level requirements by diluting the test article stock (7.8 mg/mL), less than or equal to 4-fold serial dilution with the control article. Dose levels were selected based on the previous published studies (Journal of Chronic Obstructive Pulmonary Disease (2013) 10(6):687-95; Lancet (2015) 386(9991):360-8). Therapy with 60 mg/kg weekly as an intravenous (IV) infusion of human plasma-derived alpha-1 antitrypsin (AAT), is approved in individuals with alpha-1 antitrypsin deficiency. The safety and pharmacokinetic profile of weekly infusions of a 120 mg/kg dose AAT was considered to be safe and well tolerated in adults with AATD.

Animals were randomized and assigned to groups using a computer-based procedure prior to transfer to study. The experimental design used is provided in Table 8.

TABLE 8

| Group | Test Material | Dose Level | Dose | Dose | No. of |
|---|---|---|---|---|---|
| 1 | Recombinant AAT K335A/S283C/P361C | 10 | 5 | 2 | 2 |
| 2 | Human Plasma-Derived | 10 | 0.2 | 50 | 2 |

Test articles were administered to animals via intravenous (slow bolus) injection once on Day 1. The dose volume for each animal was based on the most recent body weight measurement. The animals were temporarily restrained for dose administration and were not be sedated Blood was collected by venipuncture. Samples were collected according to Table 9.

TABLE 9

| Group Nos. | Time Point | Hematology | Clinical Chemistry |
|---|---|---|---|
| All animals | Pretreatment | X | X |
| 1 and 2 | Day 29 | X | X |

Hematology was performed with a target volume of 1 mL and an anticoagulant of Potassium (K3) EDTA.A blood smear was prepared from each hematology sample. Smears were examined to assess an animal's health following. No animals were deemed unhealthy.

Clinical chemistry was performed with a target volume of 2 mL and without an anticoagulant.

Samples were collected according to Table 10.

TABLE 10

| Sample Collection Time Points | | |
|---|---|---|
| Group No(s). | Study Day/Week | Time Points (Relative to Dosing) |
| All Animals | Pretreatment | — |
| 1 to 2 | Day 1 | Day 1: 1, 6, and 12 hr post |
| | Day 2 | Day 1: 24 hr post |
| | Day 3 | Day 1: 48 hr post |
| | Day 4 | Day 1: 72 hr post |
| | Day 5 | Day 1: 96 hr post |
| | Day 8 | Day 1: 168 hr post |
| | Day 11 | Day 1: 240 hr post |
| | Day 15 | Day 1: 336 hr post |

Plasma from the samples was analyzed for concentration of test articles Bronchoalveolar lavage samples were collected from anesthetized animals and will be analyzed (data not shown).

Figure 12:
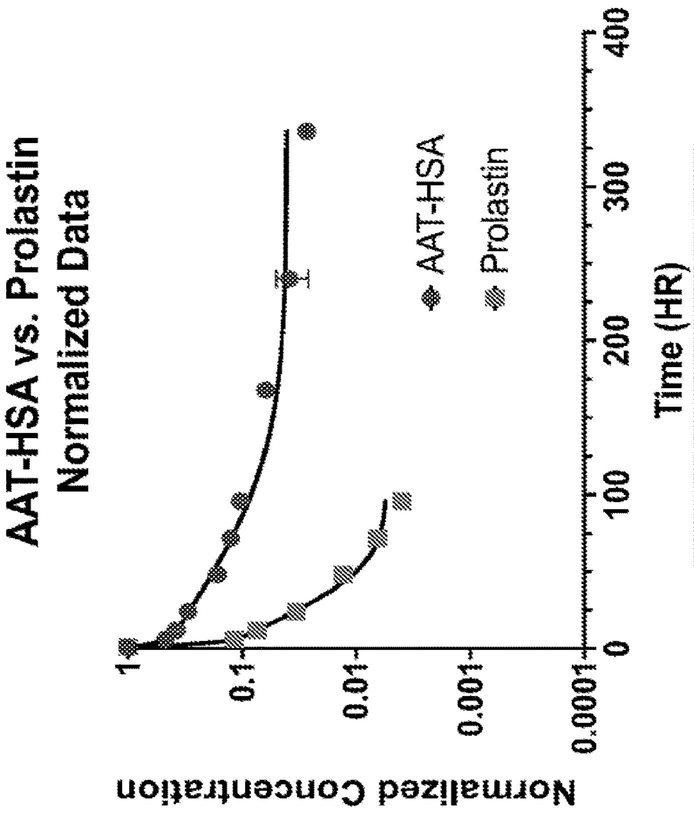
FIG. 12 depicts cyno PK data.
Figure 12:
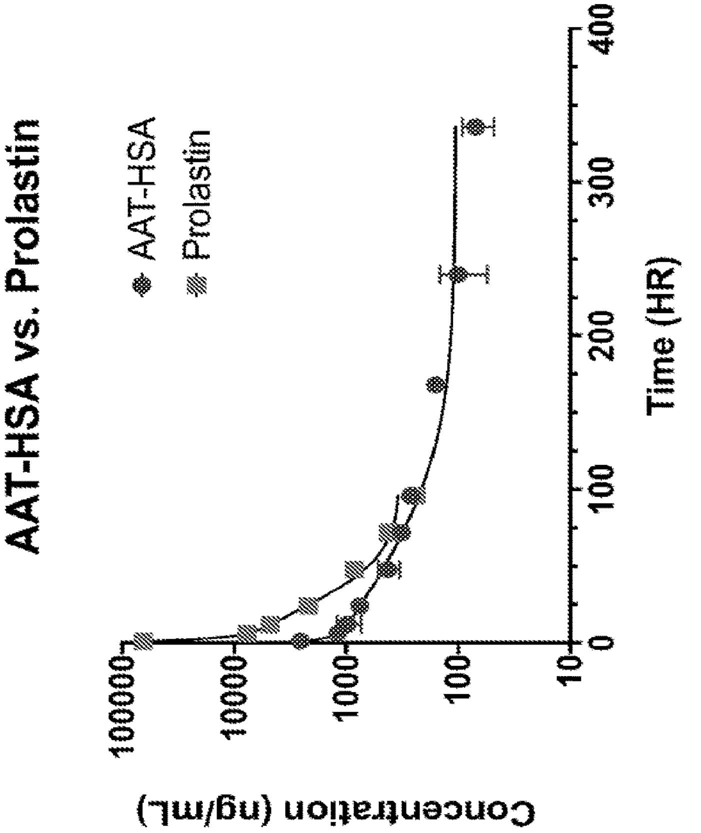

Plasma results are shown in FIG. 12 and were fitted to a 2 phase exponential decay model in Graphpad Prism. As can be seen from FIG. 12, the variant has a significantly longer terminal half life. The AAT-HSA variant (Test Article 1) half-life (beta phase, slow) was over 30 hours compared to less 10 hours for Prolastin (plasma AAT).

Figure 13:
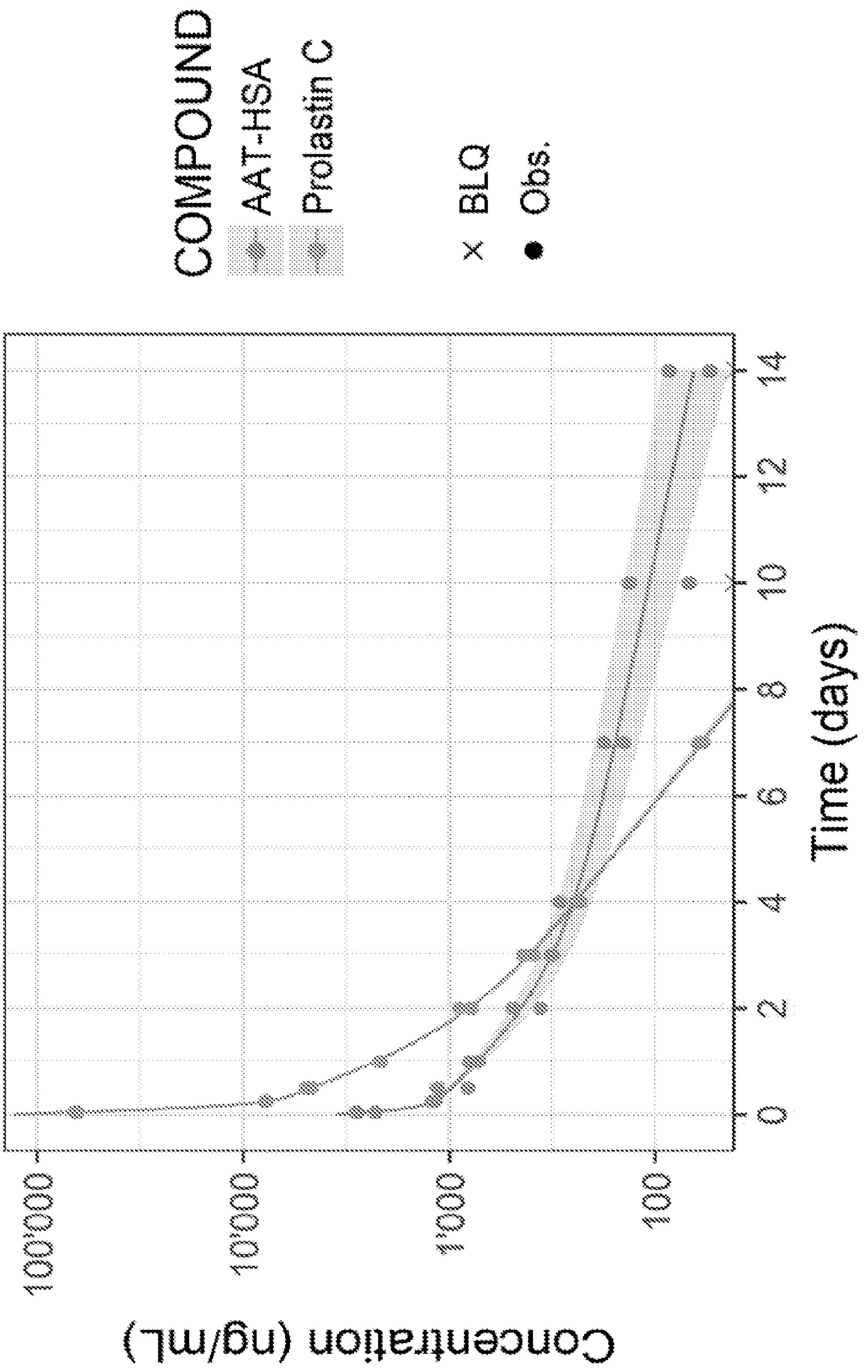
FIG. 13 depicts that AAT-HSA and prolastin after PK in monkey after 10 mg/kg was 3 compartmental.

The plasma results were further analyzed by a three compartment model (Tables 11-13) and are also shown in FIG. 13. FIG. 13 shows median (lines), 5th and 95th percentiles (areas) from 1000 simulated PK profiles together with the individual observations (symbols). Observations below limit of quantification (BLQ, crosses) were not included in the analysis.

As can be seen from above, monkey PK after 10 mg/kg was three compartmental. $C_{max}$ of test article 2 was ~40-fold higher than the $C_{max}$ of test article 1 for 10 mg/kg of compound. The central volume of distribution was 0.213 L for test article 2 and 8 L for test article 1. Total volumes of distribution were 1.45 L for test article 2 and 42 L for test article 1. Volume of distribution for Aralast (plasma derived AAT) in human was 5.6 L [https://www.drugbank.ca/drugs/DB00058]. Allometric scaling to NHP would predict a volume of distribution of 0.240 L, which is equivalent to test article 2 from this study.

Terminal HSA half-life in monkey is approximately 5 days. Test article 113 and γ half-lives were 0.75 days and 5.8 days, respectively. Test article 2 β and γ half-lives were 0.36 days and 1.49 days, respectively. The test article 2 γ half-life is approximately 3.9 times longer than the γ half-life of test article 1. The γ terminal half-life of HSA (from the literature) and test article 1 are equivalent in monkey.

Table 11 shows PK parameters for test article 2 and test article 1.

TABLE 11

| Description | Parameter | Test article 2 | Test article 1 |
|---|---|---|---|
| Clearance | Cl (mL/h) | 87.3 | 295 |
| Central volume of distribution | V1 (mL) | 213 | 8020 |
| 1$^{st}$ peripheral volume of distribution | V2 (mL) | 749 | 23600 |
| 2$^{nd}$ peripheral volume of distribution | V3 (mL) | 485 | 10800 |
| 1$^{st}$ inter-compartmental exchange coefficient | Q12 (mL/h) | 18.2 | 320 |
| 2$^{nd}$ inter-compartmental exchange coefficient | Q13 (mL/h) | 65.3 | 3'090 |
| α half life | $T_{1/2,\ \alpha}$ (h) | 0.80 | 0.97 |
| β half life | $T_{1/2,\ \beta}$ (h) | 8.64 | 18.1 |
| γ half life | $T_{1/2,\ \gamma}$ (h) | 35.7 | 134 |

Table 12 shows population PK parameters for test article 2:

TABLE 12

| Parameter | Parameter | Estimation (% CV) | RSE |
|---|---|---|---|
| Fixed effects | | | |
| Clearance | Cl (mL/h) | 87.3 (1) | 2.36 |
| Central volume of distribution | V1 (mL) | 213 (0) | 10.6 |
| Inter-compartmental clearance | Q2 (mL/h) | 18.2 (0) | 9.1 |
| Peripheral volume of distribution | V2 (mL) | 749 (0) | 5.71 |
| 2$^{nd}$ inter-compartmental clearance | Q3 (mL/h) | 65.3 (0) | 9.41 |
| 2$^{nd}$ peripheral volume of distribution | V3 (mL) | 485 (0) | 7.21 |
| Standard deviations | | | |
| Clearance | $\omega_{Cl}$ | 0.0128 | 65.1 |
| Observational error | | | |
| Proportional error | b | 0.0399 | 19.6 |

Table 13 shows population PK parameters for test article 1:

TABLE 13

| Parameter | Parameter | Estimation (% CV) | RSE |
|---|---|---|---|
| Fixed effects | | | |
| Clearance | Cl (mL/h) | 295 (12) | 9.05 |
| Central volume of distribution | V1 (mL) | 8020 (0) | 24.5 |
| Inter-compartmental clearance | Q2 (mL/h) | 320 (0) | 20.6 |
| Peripheral volume of distribution | V2 (mL) | 23600 (0) | 9.22 |
| 2$^{nd}$ inter-compartmental clearance | Q3 (mL/h) | 3090 (0) | 48.1 |
| 2$^{nd}$ peripheral volume of distribution | V3 (mL) | 10800 (0) | 20.3 |
| Standard deviations | | | |
| Clearance | $\omega_{Cl}$ | 0.122 | 53 |
| Observational error | | | |
| Proportional error | b | 0.0987 | 16.8 |

The invention claimed is:

1. A recombinant protein comprising:

(a) an alpha-1-antitrypsin serpin domain and (b) a human serum albumin domain, wherein the recombinant protein comprises a protein comprising SEQ ID NO: 71.

2. An isolated nucleic acid encoding the recombinant protein of claim 1.

3. A vector comprising the isolated nucleic acid of claim 2.

4. A host cell comprising the vector of claim 3.

5. A method of making a recombinant protein comprising culturing the host cell of claim 4 and collecting the recombinant fusion protein.

6. The method of claim 5, wherein the host cell is a eukaryotic cell.

7. The method of claim 6, wherein the eukaryotic cell is a yeast cell.

8. The method of claim 5, wherein the host cell is a mammalian host cell.

9. The method of claim 8, wherein the mammalian host cell is a CHO cell.

* * * * *

SEQUENCE LISTING

```
<160> NUMBER OF SEQ ID NOS: 71

<210> SEQ ID NO 1
<211> LENGTH: 394
<212> TYPE: PRT
<213> ORGANISM: Artificial Sequence
```

```
<220> FEATURE:
<223> OTHER INFORMATION: Synthetic: Alpha-1-antitrypsin

<400> SEQUENCE: 1

Glu Asp Pro Gln Gly Asp Ala Ala Gln Lys Thr Asp Thr Ser His His
1               5                   10                  15

Asp Gln Asp His Pro Thr Phe Asn Lys Ile Thr Pro Asn Leu Ala Glu
            20                  25                  30

Phe Ala Phe Ser Leu Tyr Arg Gln Leu Ala His Gln Ser Asn Ser Thr
        35                  40                  45

Asn Ile Phe Phe Ser Pro Val Ser Ile Ala Thr Ala Phe Ala Met Leu
    50                  55                  60

Ser Leu Gly Thr Lys Ala Asp Thr His Asp Glu Ile Leu Glu Gly Leu
65                  70                  75                  80

Asn Phe Asn Leu Thr Glu Ile Pro Glu Ala Gln Ile His Glu Gly Phe
                85                  90                  95

Gln Glu Leu Leu Arg Thr Leu Asn Gln Pro Asp Ser Gln Leu Gln Leu
            100                 105                 110

Thr Thr Gly Asn Gly Leu Phe Leu Ser Glu Gly Leu Lys Leu Val Asp
        115                 120                 125

Lys Phe Leu Glu Asp Val Lys Lys Leu Tyr His Ser Glu Ala Phe Thr
    130                 135                 140

Val Asn Phe Gly Asp Thr Glu Glu Ala Lys Lys Gln Ile Asn Asp Tyr
145                 150                 155                 160

Val Glu Lys Gly Thr Gln Gly Lys Ile Val Asp Leu Val Lys Glu Leu
                165                 170                 175

Asp Arg Asp Thr Val Phe Ala Leu Val Asn Tyr Ile Phe Phe Lys Gly
            180                 185                 190

Lys Trp Glu Arg Pro Phe Glu Val Lys Asp Thr Glu Glu Glu Asp Phe
        195                 200                 205

His Val Asp Gln Val Thr Thr Val Lys Val Pro Met Met Lys Arg Leu
    210                 215                 220

Gly Met Phe Asn Ile Gln His Cys Lys Lys Leu Ser Ser Trp Val Leu
225                 230                 235                 240

Leu Met Lys Tyr Leu Gly Asn Ala Thr Ala Ile Phe Phe Leu Pro Asp
                245                 250                 255

Glu Gly Lys Leu Gln His Leu Glu Asn Glu Leu Thr His Asp Ile Ile
            260                 265                 270

Thr Lys Phe Leu Glu Asn Glu Asp Arg Arg Ser Ala Ser Leu His Leu
        275                 280                 285

Pro Lys Leu Ser Ile Thr Gly Thr Tyr Asp Leu Lys Ser Val Leu Gly
    290                 295                 300

Gln Leu Gly Ile Thr Lys Val Phe Ser Asn Gly Ala Asp Leu Ser Gly
305                 310                 315                 320

Val Thr Glu Glu Ala Pro Leu Lys Leu Ser Lys Ala Val His Lys Ala
                325                 330                 335

Val Leu Thr Ile Asp Glu Lys Gly Thr Glu Ala Ala Gly Ala Met Phe
            340                 345                 350

Leu Glu Ala Ile Pro Met Ser Ile Pro Pro Glu Val Lys Phe Asn Lys
        355                 360                 365

Pro Phe Val Phe Leu Met Ile Glu Gln Asn Thr Lys Ser Pro Leu Phe
    370                 375                 380

Met Gly Lys Val Val Asn Pro Thr Gln Lys
385                 390
```

<210> SEQ ID NO 2
<211> LENGTH: 24
<212> TYPE: PRT
<213> ORGANISM: Artificial Sequence
<220> FEATURE:
<223> OTHER INFORMATION: Synthetic: Alpha-1-antitrypsin leader

<400> SEQUENCE: 2

```
Met Pro Ser Ser Val Ser Trp Gly Ile Leu Leu Leu Ala Gly Leu Cys
1               5                   10                  15

Cys Leu Val Pro Val Ser Leu Ala
            20
```

<210> SEQ ID NO 3
<211> LENGTH: 498
<212> TYPE: PRT
<213> ORGANISM: Homo sapiens
<220> FEATURE:
<221> NAME/KEY: misc_feature
<223> OTHER INFORMATION: Human Albumin

<400> SEQUENCE: 3

```
Met Lys Trp Val Thr Phe Ile Ser Leu Leu Phe Leu Phe Ser Ser Ala
1               5                   10                  15

Tyr Ser Arg Gly Val Phe Arg Arg Asp Ala His Lys Ser Glu Val Ala
            20                  25                  30

His Arg Phe Lys Asp Leu Gly Glu Glu Asn Phe Lys Ala Leu Val Leu
        35                  40                  45

Ile Ala Phe Ala Gln Tyr Leu Gln Gln Cys Pro Phe Glu Asp His Val
    50                  55                  60

Lys Leu Val Asn Glu Val Thr Glu Phe Ala Lys Thr Cys Val Ala Asp
65                  70                  75                  80

Glu Ser Ala Glu Asn Cys Asp Lys Ser Leu His Thr Leu Phe Gly Asp
                85                  90                  95

Lys Leu Cys Thr Val Ala Thr Leu Arg Glu Thr Tyr Gly Glu Met Ala
            100                 105                 110

Asp Cys Cys Ala Lys Gln Glu Pro Glu Arg Asn Glu Cys Phe Leu Gln
        115                 120                 125

His Lys Asp Asp Asn Pro Asn Leu Pro Arg Leu Val Arg Pro Glu Val
    130                 135                 140

Asp Val Met Cys Thr Ala Phe His Asp Asn Glu Glu Thr Phe Leu Lys
145                 150                 155                 160

Lys Tyr Leu Tyr Glu Ile Ala Arg Arg His Pro Tyr Phe Tyr Ala Pro
                165                 170                 175

Glu Leu Leu Phe Phe Ala Lys Arg Tyr Lys Ala Ala Phe Thr Glu Cys
            180                 185                 190

Cys Gln Ala Ala Asp Lys Ala Ala Cys Leu Leu Pro Lys Leu Asp Glu
        195                 200                 205

Leu Arg Asp Glu Gly Lys Ala Ser Ser Ala Lys Gln Gly Leu Lys Cys
    210                 215                 220

Ala Ser Leu Gln Lys Phe Gly Glu Arg Ala Phe Lys Ala Trp Ala Val
225                 230                 235                 240

Ala Arg Leu Ser Gln Arg Phe Pro Lys Ala Glu Phe Ala Glu Val Ser
                245                 250                 255

Lys Leu Val Thr Asp Leu Thr Lys Val His Thr Glu Cys Cys His Gly
            260                 265                 270
```

Asp Leu Leu Glu Cys Ala Asp Asp Arg Ala Asp Leu Ala Lys Tyr Ile
        275                 280                 285

Cys Glu Asn Gln Asp Ser Ile Ser Ser Lys Leu Lys Glu Cys Cys Glu
    290                 295                 300

Lys Pro Leu Leu Glu Lys Ser His Cys Ile Ala Glu Val Glu Asn Asp
305                 310                 315                 320

Glu Met Pro Ala Asp Leu Pro Ser Leu Ala Ala Asp Phe Val Gly Ser
                325                 330                 335

Lys Asp Val Cys Lys Asn Tyr Ala Glu Ala Lys Asp Val Phe Leu Gly
            340                 345                 350

Met Phe Leu Tyr Glu Tyr Ala Arg Arg His Pro Asp Tyr Ser Val Val
        355                 360                 365

Leu Leu Leu Arg Leu Ala Lys Thr Tyr Glu Thr Thr Leu Glu Lys Cys
    370                 375                 380

Cys Ala Ala Ala Asp Pro His Glu Cys Tyr Ala Lys Val Phe Asp Glu
385                 390                 395                 400

Phe Lys Pro Leu Val Glu Glu Pro Gln Asn Leu Ile Lys Gln Asn Cys
                405                 410                 415

Glu Leu Phe Glu Gln Leu Gly Glu Tyr Lys Phe Gln Asn Ala Leu Leu
            420                 425                 430

Val Arg Tyr Thr Lys Lys Val Pro Gln Val Ser Thr Pro Thr Leu Val
        435                 440                 445

Glu Val Ser Arg Asn Leu Gly Lys Val Gly Ser Lys Cys Cys Lys His
    450                 455                 460

Pro Glu Ala Lys Arg Met Pro Cys Ala Glu Asp Cys Leu Ser Val Phe
465                 470                 475                 480

Leu Asn Gln Leu Cys Val Leu His Glu Lys Thr Pro Val Ser Asp Arg
                485                 490                 495

Val Thr

<210> SEQ ID NO 4
<211> LENGTH: 18
<212> TYPE: PRT
<213> ORGANISM: Homo sapiens
<220> FEATURE:
<221> NAME/KEY: misc_feature
<223> OTHER INFORMATION: Human Albumin Leader

<400> SEQUENCE: 4

Met Lys Trp Val Thr Phe Ile Ser Leu Leu Phe Leu Phe Ser Ser Ala
1               5                   10                  15

Tyr Ser

<210> SEQ ID NO 5
<211> LENGTH: 480
<212> TYPE: PRT
<213> ORGANISM: Homo sapiens
<220> FEATURE:
<221> NAME/KEY: misc_feature
<223> OTHER INFORMATION: Human Serum Albumin

<400> SEQUENCE: 5

Arg Gly Val Phe Arg Arg Asp Ala His Lys Ser Glu Val Ala His Arg
1               5                   10                  15

Phe Lys Asp Leu Gly Glu Glu Asn Phe Lys Ala Leu Val Leu Ile Ala
            20                  25                  30

Phe Ala Gln Tyr Leu Gln Gln Cys Pro Phe Glu Asp His Val Lys Leu
        35                  40                  45

-continued

```
Val Asn Glu Val Thr Glu Phe Ala Lys Thr Cys Val Ala Asp Glu Ser
    50                  55                  60

Ala Glu Asn Cys Asp Lys Ser Leu His Thr Leu Phe Gly Asp Lys Leu
65                  70                  75                  80

Cys Thr Val Ala Thr Leu Arg Glu Thr Tyr Gly Glu Met Ala Asp Cys
                85                  90                  95

Cys Ala Lys Gln Glu Pro Glu Arg Asn Glu Cys Phe Leu Gln His Lys
            100                 105                 110

Asp Asp Asn Pro Asn Leu Pro Arg Leu Val Arg Pro Glu Val Asp Val
        115                 120                 125

Met Cys Thr Ala Phe His Asp Asn Glu Glu Thr Phe Leu Lys Lys Tyr
    130                 135                 140

Leu Tyr Glu Ile Ala Arg Arg His Pro Tyr Phe Tyr Ala Pro Glu Leu
145                 150                 155                 160

Leu Phe Phe Ala Lys Arg Tyr Lys Ala Ala Phe Thr Glu Cys Cys Gln
                165                 170                 175

Ala Ala Asp Lys Ala Ala Cys Leu Leu Pro Lys Leu Asp Glu Leu Arg
            180                 185                 190

Asp Glu Gly Lys Ala Ser Ser Ala Lys Gln Gly Leu Lys Cys Ala Ser
        195                 200                 205

Leu Gln Lys Phe Gly Glu Arg Ala Phe Lys Ala Trp Ala Val Ala Arg
    210                 215                 220

Leu Ser Gln Arg Phe Pro Lys Ala Glu Phe Ala Glu Val Ser Lys Leu
225                 230                 235                 240

Val Thr Asp Leu Thr Lys Val His Thr Glu Cys Cys His Gly Asp Leu
                245                 250                 255

Leu Glu Cys Ala Asp Asp Arg Ala Asp Leu Ala Lys Tyr Ile Cys Glu
            260                 265                 270

Asn Gln Asp Ser Ile Ser Ser Lys Leu Lys Glu Cys Cys Glu Lys Pro
        275                 280                 285

Leu Leu Glu Lys Ser His Cys Ile Ala Glu Val Glu Asn Asp Glu Met
    290                 295                 300

Pro Ala Asp Leu Pro Ser Leu Ala Ala Asp Phe Val Gly Ser Lys Asp
305                 310                 315                 320

Val Cys Lys Asn Tyr Ala Glu Ala Lys Asp Val Phe Leu Gly Met Phe
                325                 330                 335

Leu Tyr Glu Tyr Ala Arg Arg His Pro Asp Tyr Ser Val Val Leu Leu
            340                 345                 350

Leu Arg Leu Ala Lys Thr Tyr Glu Thr Thr Leu Glu Lys Cys Cys Ala
        355                 360                 365

Ala Ala Asp Pro His Glu Cys Tyr Ala Lys Val Phe Asp Glu Phe Lys
    370                 375                 380

Pro Leu Val Glu Glu Pro Gln Asn Leu Ile Lys Gln Asn Cys Glu Leu
385                 390                 395                 400

Phe Glu Gln Leu Gly Glu Tyr Lys Phe Gln Asn Ala Leu Leu Val Arg
                405                 410                 415

Tyr Thr Lys Lys Val Pro Gln Val Ser Thr Pro Thr Leu Val Glu Val
            420                 425                 430

Ser Arg Asn Leu Gly Lys Val Gly Ser Lys Cys Cys Lys His Pro Glu
        435                 440                 445

Ala Lys Arg Met Pro Cys Ala Glu Asp Cys Leu Ser Val Phe Leu Asn
    450                 455                 460
```

Gln Leu Cys Val Leu His Glu Lys Thr Pro Val Ser Asp Arg Val Thr
465 470 475 480

<210> SEQ ID NO 6
<211> LENGTH: 5
<212> TYPE: PRT
<213> ORGANISM: Artificial Sequence
<220> FEATURE:
<223> OTHER INFORMATION: Synthetic: CDR1

<400> SEQUENCE: 6

Leu Asn Leu Met Gly
1 5

<210> SEQ ID NO 7
<211> LENGTH: 5
<212> TYPE: PRT
<213> ORGANISM: Artificial Sequence
<220> FEATURE:
<223> OTHER INFORMATION: Synthetic: CDR1

<400> SEQUENCE: 7

Ile Asn Leu Leu Gly
1 5

<210> SEQ ID NO 8
<211> LENGTH: 5
<212> TYPE: PRT
<213> ORGANISM: Artificial Sequence
<220> FEATURE:
<223> OTHER INFORMATION: Synthetic: CDR1

<400> SEQUENCE: 8

Ser Phe Gly Met Ser
1 5

<210> SEQ ID NO 9
<211> LENGTH: 5
<212> TYPE: PRT
<213> ORGANISM: Artificial Sequence
<220> FEATURE:
<223> OTHER INFORMATION: Synthetic: CDR1

<400> SEQUENCE: 9

Asn Tyr Trp Met Tyr
1 5

<210> SEQ ID NO 10
<211> LENGTH: 17
<212> TYPE: PRT
<213> ORGANISM: Artificial Sequence
<220> FEATURE:
<223> OTHER INFORMATION: Synthetic: CDR2

<400> SEQUENCE: 10

Thr Cys Ile Thr Val Gly Asp Ser Thr Asn Tyr Ala Asp Ser Val Lys
1 5 10 15

Gly

<210> SEQ ID NO 11
<211> LENGTH: 16
<212> TYPE: PRT
<213> ORGANISM: Artificial Sequence
<220> FEATURE:
<223> OTHER INFORMATION: Synthetic: CDR2

<400> SEQUENCE: 11

Thr Ile Thr Val Gly Asp Ser Thr Ser Tyr Ala Asp Ser Val Lys Gly
1 5 10 15

<210> SEQ ID NO 12
<211> LENGTH: 17
<212> TYPE: PRT
<213> ORGANISM: Artificial Sequence
<220> FEATURE:
<223> OTHER INFORMATION: Synthetic: CDR2

<400> SEQUENCE: 12

Ser Ile Ser Gly Ser Gly Ser Asp Thr Leu Tyr Ala Asp Ser Val Lys
1 5 10 15

Gly

<210> SEQ ID NO 13
<211> LENGTH: 17
<212> TYPE: PRT
<213> ORGANISM: Artificial Sequence
<220> FEATURE:
<223> OTHER INFORMATION: Synthetic: CDR2

<400> SEQUENCE: 13

Ser Ile Asn Gly Arg Gly Asp Asp Thr Arg Tyr Ala Asp Ser Val Lys
1 5 10 15

Gly

<210> SEQ ID NO 14
<211> LENGTH: 17
<212> TYPE: PRT
<213> ORGANISM: Artificial Sequence
<220> FEATURE:
<223> OTHER INFORMATION: Synthetic: CDR2

<400> SEQUENCE: 14

Ala Ile Ser Ala Asp Ser Ser Thr Lys Asn Tyr Ala Asp Ser Val Lys
1 5 10 15

Gly

<210> SEQ ID NO 15
<211> LENGTH: 17
<212> TYPE: PRT
<213> ORGANISM: Artificial Sequence
<220> FEATURE:
<223> OTHER INFORMATION: Synthetic: CDR2

<400> SEQUENCE: 15

Ala Ile Ser Ala Asp Ser Ser Asp Lys Arg Tyr Ala Asp Ser Val Lys
1 5 10 15

Gly

<210> SEQ ID NO 16
<211> LENGTH: 18
<212> TYPE: PRT
<213> ORGANISM: Artificial Sequence
<220> FEATURE:
<223> OTHER INFORMATION: Synthetic: CDR2

<400> SEQUENCE: 16

Arg Asp Ile Ser Thr Gly Gly Gly Tyr Ser Tyr Tyr Ala Asp Ser Val
1 5 10 15

Lys Gly

<210> SEQ ID NO 17
<211> LENGTH: 8
<212> TYPE: PRT
<213> ORGANISM: Artificial Sequence
<220> FEATURE:
<223> OTHER INFORMATION: Synthetic: CDR3

<400> SEQUENCE: 17

Arg Arg Thr Trp His Ser Glu Leu
1               5

<210> SEQ ID NO 18
<211> LENGTH: 6
<212> TYPE: PRT
<213> ORGANISM: Artificial Sequence
<220> FEATURE:
<223> OTHER INFORMATION: Synthetic: CDR3

<400> SEQUENCE: 18

Gly Gly Ser Leu Ser Arg
1               5

<210> SEQ ID NO 19
<211> LENGTH: 7
<212> TYPE: PRT
<213> ORGANISM: Artificial Sequence
<220> FEATURE:
<223> OTHER INFORMATION: Synthetic: CDR3

<400> SEQUENCE: 19

Gly Arg Ser Val Ser Arg Ser
1               5

<210> SEQ ID NO 20
<211> LENGTH: 5
<212> TYPE: PRT
<213> ORGANISM: Artificial Sequence
<220> FEATURE:
<223> OTHER INFORMATION: Synthetic: CDR3

<400> SEQUENCE: 20

Gly Arg Gly Ser Pro
1               5

<210> SEQ ID NO 21
<211> LENGTH: 13
<212> TYPE: PRT
<213> ORGANISM: Artificial Sequence
<220> FEATURE:
<223> OTHER INFORMATION: Synthetic: CDR3

<400> SEQUENCE: 21

Asp Arg Glu Ala Gln Val Asp Thr Leu Asp Phe Asp Tyr
1               5                   10

<210> SEQ ID NO 22
<211> LENGTH: 117
<212> TYPE: PRT
<213> ORGANISM: Artificial Sequence
<220> FEATURE:
<223> OTHER INFORMATION: Synthetic: SDA

<400> SEQUENCE: 22

Ala Val Gln Leu Val Glu Ser Gly Gly Gly Leu Val Gln Gly Gly Gly
1               5                   10                  15

Ser Leu Arg Leu Ala Cys Ala Ala Ser Glu Arg Ile Phe Asp Leu Asn

```
            20                  25                  30

Leu Met Gly Trp Tyr Arg Gln Gly Pro Gly Asn Glu Arg Glu Leu Val
        35                  40                  45

Ala Thr Cys Ile Thr Val Gly Asp Ser Thr Asn Tyr Ala Asp Ser Val
    50                  55                  60

Lys Gly Arg Phe Thr Ile Ser Met Asp Tyr Thr Lys Gln Thr Val Tyr
65                  70                  75                  80

Leu His Met Asn Ser Leu Arg Pro Glu Asp Thr Gly Leu Tyr Tyr Cys
                85                  90                  95

Lys Ile Arg Arg Thr Trp His Ser Glu Leu Trp Gly Gln Gly Thr Gln
            100                 105                 110

Val Thr Val Ser Ser
        115


<210> SEQ ID NO 23
<211> LENGTH: 116
<212> TYPE: PRT
<213> ORGANISM: Artificial Sequence
<220> FEATURE:
<223> OTHER INFORMATION: Synthetic: SDA

<400> SEQUENCE: 23

Glu Val Gln Leu Val Glu Ser Gly Gly Gly Leu Val Gln Glu Gly Gly
1               5                   10                  15

Ser Leu Arg Leu Ala Cys Ala Ala Ser Glu Arg Ile Trp Asp Ile Asn
            20                  25                  30

Leu Leu Gly Trp Tyr Arg Gln Gly Pro Gly Asn Glu Arg Glu Leu Val
        35                  40                  45

Ala Thr Ile Thr Val Gly Asp Ser Thr Ser Tyr Ala Asp Ser Val Lys
    50                  55                  60

Gly Arg Phe Thr Ile Ser Arg Asp Tyr Asp Lys Asn Thr Leu Tyr Leu
65                  70                  75                  80

Gln Met Asn Ser Leu Arg Pro Glu Asp Thr Gly Leu Tyr Tyr Cys Lys
                85                  90                  95

Ile Arg Arg Thr Trp His Ser Glu Leu Trp Gly Gln Gly Thr Gln Val
            100                 105                 110

Thr Val Ser Ser
        115


<210> SEQ ID NO 24
<211> LENGTH: 115
<212> TYPE: PRT
<213> ORGANISM: Artificial Sequence
<220> FEATURE:
<223> OTHER INFORMATION: Synthetic: SDA

<400> SEQUENCE: 24

Ala Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Arg Ser Phe
            20                  25                  30

Gly Met Ser Trp Val Arg Gln Ala Pro Gly Lys Glu Pro Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80
```

```
Leu Gln Met Asn Ser Leu Lys Pro Glu Asp Thr Ala Val Tyr Tyr Cys
                85                  90                  95

Thr Ile Gly Gly Ser Leu Ser Arg Ser Ser Gln Gly Thr Gln Val Thr
            100                 105                 110

Val Ser Ser
        115


<210> SEQ ID NO 25
<211> LENGTH: 116
<212> TYPE: PRT
<213> ORGANISM: Artificial Sequence
<220> FEATURE:
<223> OTHER INFORMATION: Synthetic: SDA

<400> SEQUENCE: 25

Ala Val Gln Leu Val Asp Ser Gly Gly Gly Leu Val Gln Pro Gly Gly
1               5                   10                  15

Ser Leu Arg Leu Ser Cys Ala Ala Ser Gly Phe Ser Phe Gly Ser Phe
            20                  25                  30

Gly Met Ser Trp Val Arg Gln Tyr Pro Gly Lys Glu Pro Glu Trp Val
        35                  40                  45

Ser Ser Ile Asn Gly Arg Gly Asp Asp Thr Arg Tyr Ala Asp Ser Val
    50                  55                  60

Lys Gly Arg Phe Ser Ile Ser Arg Asp Asn Ala Lys Asn Thr Leu Tyr
65                  70                  75                  80

Leu Gln Met Asn Ser Leu Lys Pro Glu Asp Thr Ala Glu Tyr Tyr Cys
                85                  90                  95

Thr Ile Gly Arg Ser Val Ser Arg Ser Arg Thr Gln Gly Thr Gln Val
            100                 105                 110

Thr Val Ser Ser
        115


<210> SEQ ID NO 26
<211> LENGTH: 114
<212> TYPE: PRT
<213> ORGANISM: Artificial Sequence
<220> FEATURE:
<223> OTHER INFORMATION: Synthetic: SDA

<400> SEQUENCE: 26

Ala Val Gln Leu Val Glu Ser Gly Gly Gly Leu Val Gln Pro Gly Gly
1               5                   10                  15

Ser Leu Arg Leu Thr Cys Thr Ala Ser Gly Phe Thr Phe Arg Ser Phe
            20                  25                  30

Gly Met Ser Trp Val Arg Gln Ala Pro Gly Lys Asp Gln Glu Trp Val
        35                  40                  45

Ser Ala Ile Ser Ala Asp Ser Ser Thr Lys Asn Tyr Ala Asp Ser Val
    50                  55                  60

Lys Gly Arg Phe Thr Ile Ser Arg Asp Asn Ala Lys Lys Met Leu Tyr
65                  70                  75                  80

Leu Glu Met Asn Ser Leu Lys Pro Glu Asp Thr Ala Val Tyr Tyr Cys
                85                  90                  95

Val Ile Gly Arg Gly Ser Pro Ser Ser Pro Gly Thr Gln Val Thr Val
            100                 105                 110

Ser Ser


<210> SEQ ID NO 27
<211> LENGTH: 114
```

<212> TYPE: PRT
<213> ORGANISM: Artificial Sequence
<220> FEATURE:
<223> OTHER INFORMATION: Synthetic: SDA

<400> SEQUENCE: 27

```
Gln Val Gln Leu Ala Glu Ser Gly Gly Gly Leu Val Gln Pro Gly Gly
1               5                   10                  15

Ser Leu Arg Leu Thr Cys Thr Ala Ser Gly Phe Thr Phe Gly Ser Phe
            20                  25                  30

Gly Met Ser Trp Val Arg Gln Ala Pro Gly Glu Gly Leu Glu Trp Val
        35                  40                  45

Ser Ala Ile Ser Ala Asp Ser Ser Asp Lys Arg Tyr Ala Asp Ser Val
    50                  55                  60

Lys Gly Arg Phe Thr Ile Ser Arg Asp Asn Ala Lys Lys Met Leu Tyr
65                  70                  75                  80

Leu Glu Met Asn Ser Leu Lys Ser Glu Asp Thr Ala Val Tyr Tyr Cys
                85                  90                  95

Val Ile Gly Arg Gly Ser Pro Ala Ser Gln Gly Thr Gln Val Thr Val
            100                 105                 110

Ser Ser
```

<210> SEQ ID NO 28
<211> LENGTH: 123
<212> TYPE: PRT
<213> ORGANISM: Artificial Sequence
<220> FEATURE:
<223> OTHER INFORMATION: Synthetic: SDA

<400> SEQUENCE: 28

```
Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Trp Met Tyr Trp Val Arg Val Ala Pro Gly Lys Gly Leu Glu Arg Ile
        35                  40                  45

Ser Arg Asp Ile Ser Thr Gly Gly Gly Tyr Ser Tyr Tyr Ala Asp Ser
    50                  55                  60

Val Lys Gly Arg Phe Thr Ile Ser Arg Asp Asn Ala Lys Asn Thr Leu
65                  70                  75                  80

Tyr Leu Gln Met Asn Ser Leu Lys Pro Glu Asp Thr Ala Leu Tyr Tyr
                85                  90                  95

Cys Ala Lys Asp Arg Glu Ala Gln Val Asp Thr Leu Asp Phe Asp Tyr
            100                 105                 110

Arg Gly Gln Gly Thr Gln Val Thr Val Ser Ser
        115                 120
```

<210> SEQ ID NO 29
<211> LENGTH: 115
<212> TYPE: PRT
<213> ORGANISM: Artificial Sequence
<220> FEATURE:
<223> OTHER INFORMATION: Synthetic: hSDA

<400> SEQUENCE: 29

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Arg Ser Phe
            20                  25                  30
```

Gly Met Ser Trp Val Arg Gln Ala Pro Gly Lys Glu Pro Glu Trp Val
35 40 45

Ser Ser Ile Ser Gly Ser Gly Ser Asp Thr Leu Tyr Ala Asp Ser Val
50 55 60

Lys Gly Arg Phe Thr Ile Ser Arg Asp Asn Ala Lys Thr Thr Leu Tyr
65 70 75 80

Leu Gln Met Asn Ser Leu Lys Pro Glu Asp Thr Ala Val Tyr Tyr Cys
85 90 95

Thr Ile Gly Gly Ser Leu Ser Arg Ser Ser Gln Gly Thr Gln Val Thr
100 105 110

Val Ser Ser
115

<210> SEQ ID NO 30
<211> LENGTH: 115
<212> TYPE: PRT
<213> ORGANISM: Artificial Sequence
<220> FEATURE:
<223> OTHER INFORMATION: Synthetic: hSDA

<400> SEQUENCE: 30

Glu Val Gln Leu Val Glu Ser Gly Gly Gly Leu Val Gln Pro Gly Gly
1 5 10 15

Ser Leu Arg Leu Ser Cys Ala Ala Ser Gly Phe Thr Phe Ser Ser Phe
20 25 30

Gly Met Ser Trp Val Arg Gln Ala Pro Gly Lys Glu Pro Glu Trp Val
35 40 45

Ser Ser Ile Ser Gly Ser Gly Ser Asp Thr Leu Tyr Ala Asp Ser Val
50 55 60

Lys Gly Arg Phe Thr Ile Ser Arg Asp Asn Ala Lys Thr Thr Leu Tyr
65 70 75 80

Leu Gln Met Asn Ser Leu Lys Pro Glu Asp Thr Ala Val Tyr Tyr Cys
85 90 95

Thr Ile Gly Gly Ser Leu Ser Arg Ser Ser Gln Gly Thr Gln Val Thr
100 105 110

Val Ser Ser
115

<210> SEQ ID NO 31
<211> LENGTH: 115
<212> TYPE: PRT
<213> ORGANISM: Artificial Sequence
<220> FEATURE:
<223> OTHER INFORMATION: Synthetic: hSDA

<400> SEQUENCE: 31

Glu Val Gln Leu Val Glu Ser Gly Gly Gly Leu Val Gln Pro Gly Gly
1 5 10 15

Ser Leu Arg Leu Ser Cys Ala Ala Ser Gly Phe Thr Phe Arg Ser Phe
20 25 30

Gly Met Ser Trp Val Arg Gln Ala Pro Gly Lys Gly Leu Glu Trp Val
35 40 45

Ser Ser Ile Ser Gly Ser Gly Ser Asp Thr Leu Tyr Ala Asp Ser Val
50 55 60

Lys Gly Arg Phe Thr Ile Ser Arg Asp Asn Ala Lys Thr Thr Leu Tyr
65 70 75 80

Leu Gln Met Asn Ser Leu Lys Pro Glu Asp Thr Ala Val Tyr Tyr Cys

```
                85                  90                  95

Thr Ile Gly Gly Ser Leu Ser Arg Ser Ser Gln Gly Thr Gln Val Thr
            100                 105                 110

Val Ser Ser
        115


<210> SEQ ID NO 32
<211> LENGTH: 115
<212> TYPE: PRT
<213> ORGANISM: Artificial Sequence
<220> FEATURE:
<223> OTHER INFORMATION: Synthetic: hSDA

<400> SEQUENCE: 32

Glu Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Arg Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Lys Pro Glu Asp Thr Ala Val Tyr Tyr Cys
                85                  90                  95

Thr Ile Gly Gly Ser Leu Ser Arg Ser Ser Gln Gly Thr Leu Val Thr
            100                 105                 110

Val Ser Ser
        115


<210> SEQ ID NO 33
<211> LENGTH: 115
<212> TYPE: PRT
<213> ORGANISM: Artificial Sequence
<220> FEATURE:
<223> OTHER INFORMATION: Synthetic: hSDA

<400> SEQUENCE: 33

Glu Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Arg Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Ser Gln Gly Thr Leu Val Thr
            100                 105                 110

Val Ser Ser
        115


<210> SEQ ID NO 34
<211> LENGTH: 115
```

<212> TYPE: PRT
<213> ORGANISM: Artificial Sequence
<220> FEATURE:
<223> OTHER INFORMATION: Synthetic: hSDA

<400> SEQUENCE: 34

```
Glu Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Ser Gln Gly Thr Leu Val Thr
            100                 105                 110

Val Ser Ser
        115
```

<210> SEQ ID NO 35
<211> LENGTH: 115
<212> TYPE: PRT
<213> ORGANISM: Artificial Sequence
<220> FEATURE:
<223> OTHER INFORMATION: Synthetic: hSDA

<400> SEQUENCE: 35

```
Glu Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Ser Gln Gly Thr Leu Val Thr
            100                 105                 110

Val Ser Ser
        115
```

<210> SEQ ID NO 36
<211> LENGTH: 115
<212> TYPE: PRT
<213> ORGANISM: Artificial Sequence
<220> FEATURE:
<223> OTHER INFORMATION: Synthetic: hSDA

<400> SEQUENCE: 36

```
Glu Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Ser Ser Phe
```

```
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Gly Gln Gly Thr Leu Val Thr
            100                 105                 110

Val Ser Ser
        115


<210> SEQ ID NO 37
<211> LENGTH: 30
<212> TYPE: PRT
<213> ORGANISM: Artificial Sequence
<220> FEATURE:
<223> OTHER INFORMATION: Synthetic: FR1

<400> SEQUENCE: 37

Ala Val Gln Leu Val Glu Ser Gly Gly Gly Leu Val Gln Gly Gly Gly
1               5                   10                  15

Ser Leu Arg Leu Ala Cys Ala Ala Ser Glu Arg Ile Phe Asp
            20                  25                  30


<210> SEQ ID NO 38
<211> LENGTH: 30
<212> TYPE: PRT
<213> ORGANISM: Artificial Sequence
<220> FEATURE:
<223> OTHER INFORMATION: Synthetic: FR1

<400> SEQUENCE: 38

Glu Val Gln Leu Val Glu Ser Gly Gly Gly Leu Val Gln Glu Gly Gly
1               5                   10                  15

Ser Leu Arg Leu Ala Cys Ala Ala Ser Glu Arg Ile Trp Asp
            20                  25                  30


<210> SEQ ID NO 39
<211> LENGTH: 30
<212> TYPE: PRT
<213> ORGANISM: Artificial Sequence
<220> FEATURE:
<223> OTHER INFORMATION: Synthetic: FR1

<400> SEQUENCE: 39

Ala Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Arg
            20                  25                  30


<210> SEQ ID NO 40
<211> LENGTH: 30
<212> TYPE: PRT
<213> ORGANISM: Artificial Sequence
<220> FEATURE:
<223> OTHER INFORMATION: Synthetic: FR1

<400> SEQUENCE: 40

Ala Val Gln Leu Val Asp Ser Gly Gly Gly Leu Val Gln Pro Gly Gly
```

1 5 10 15

Ser Leu Arg Leu Ser Cys Ala Ala Ser Gly Phe Ser Phe Gly
20 25 30

<210> SEQ ID NO 41
<211> LENGTH: 30
<212> TYPE: PRT
<213> ORGANISM: Artificial Sequence
<220> FEATURE:
<223> OTHER INFORMATION: Synthetic: FR1

<400> SEQUENCE: 41

Ala Val Gln Leu Val Glu Ser Gly Gly Gly Leu Val Gln Pro Gly Gly
1 5 10 15

Ser Leu Arg Leu Thr Cys Thr Ala Ser Gly Phe Thr Phe Arg
20 25 30

<210> SEQ ID NO 42
<211> LENGTH: 30
<212> TYPE: PRT
<213> ORGANISM: Artificial Sequence
<220> FEATURE:
<223> OTHER INFORMATION: Synthetic: FR1

<400> SEQUENCE: 42

Gln Val Gln Leu Ala Glu Ser Gly Gly Gly Leu Val Gln Pro Gly Gly
1 5 10 15

Ser Leu Arg Leu Thr Cys Thr Ala Ser Gly Phe Thr Phe Gly
20 25 30

<210> SEQ ID NO 43
<211> LENGTH: 30
<212> TYPE: PRT
<213> ORGANISM: Artificial Sequence
<220> FEATURE:
<223> OTHER INFORMATION: Synthetic: FR1

<400> SEQUENCE: 43

Gln Val Gln Leu Val Glu Ser Gly Gly Gly Leu Val Gln Pro Gly Gly
1 5 10 15

Ser Leu Arg Leu Ser Cys Ala Ala Ser Gly Phe Thr Phe Ser
20 25 30

<210> SEQ ID NO 44
<211> LENGTH: 14
<212> TYPE: PRT
<213> ORGANISM: Artificial Sequence
<220> FEATURE:
<223> OTHER INFORMATION: Synthetic: FR2

<400> SEQUENCE: 44

Trp Tyr Arg Gln Gly Pro Gly Asn Glu Arg Glu Leu Val Ala
1 5 10

<210> SEQ ID NO 45
<211> LENGTH: 14
<212> TYPE: PRT
<213> ORGANISM: Artificial Sequence
<220> FEATURE:
<223> OTHER INFORMATION: Synthetic: FR2

<400> SEQUENCE: 45

Trp Val Arg Gln Ala Pro Gly Lys Glu Pro Glu Trp Val Ser
1 5 10

<210> SEQ ID NO 46
<211> LENGTH: 14
<212> TYPE: PRT
<213> ORGANISM: Artificial Sequence
<220> FEATURE:
<223> OTHER INFORMATION: Synthetic: FR2

<400> SEQUENCE: 46

Trp Val Arg Gln Tyr Pro Gly Lys Glu Pro Glu Trp Val Ser
1 5 10

<210> SEQ ID NO 47
<211> LENGTH: 14
<212> TYPE: PRT
<213> ORGANISM: Artificial Sequence
<220> FEATURE:
<223> OTHER INFORMATION: Synthetic: FR2

<400> SEQUENCE: 47

Trp Val Arg Gln Ala Pro Gly Lys Asp Gln Glu Trp Val Ser
1 5 10

<210> SEQ ID NO 48
<211> LENGTH: 14
<212> TYPE: PRT
<213> ORGANISM: Artificial Sequence
<220> FEATURE:
<223> OTHER INFORMATION: Synthetic: FR2

<400> SEQUENCE: 48

Trp Val Arg Gln Ala Pro Gly Glu Gly Leu Glu Trp Val Ser
1 5 10

<210> SEQ ID NO 49
<211> LENGTH: 14
<212> TYPE: PRT
<213> ORGANISM: Artificial Sequence
<220> FEATURE:
<223> OTHER INFORMATION: Synthetic: FR2

<400> SEQUENCE: 49

Trp Val Arg Val Ala Pro Gly Lys Gly Leu Glu Arg Ile Ser
1 5 10

<210> SEQ ID NO 50
<211> LENGTH: 32
<212> TYPE: PRT
<213> ORGANISM: Artificial Sequence
<220> FEATURE:
<223> OTHER INFORMATION: Synthetic: FR3

<400> SEQUENCE: 50

Arg Phe Thr Ile Ser Met Asp Tyr Thr Lys Gln Thr Val Tyr Leu His
1 5 10 15

Met Asn Ser Leu Arg Pro Glu Asp Thr Gly Leu Tyr Tyr Cys Lys Ile
20 25 30

<210> SEQ ID NO 51
<211> LENGTH: 32
<212> TYPE: PRT
<213> ORGANISM: Artificial Sequence
<220> FEATURE:
<223> OTHER INFORMATION: Synthetic: FR3

<400> SEQUENCE: 51

Arg Phe Thr Ile Ser Arg Asp Tyr Asp Lys Asn Thr Leu Tyr Leu Gln

```
1               5                   10                  15

Met Asn Ser Leu Arg Pro Glu Asp Thr Gly Leu Tyr Tyr Cys Lys Ile
            20                  25                  30


<210> SEQ ID NO 52
<211> LENGTH: 32
<212> TYPE: PRT
<213> ORGANISM: Artificial Sequence
<220> FEATURE:
<223> OTHER INFORMATION: Synthetic: FR3

<400> SEQUENCE: 52

Arg Phe Thr Ile Ser Arg Asp Asn Ala Lys Thr Thr Leu Tyr Leu Gln
1               5                   10                  15

Met Asn Ser Leu Lys Pro Glu Asp Thr Ala Val Tyr Tyr Cys Thr Ile
            20                  25                  30


<210> SEQ ID NO 53
<211> LENGTH: 32
<212> TYPE: PRT
<213> ORGANISM: Artificial Sequence
<220> FEATURE:
<223> OTHER INFORMATION: Synthetic: FR3

<400> SEQUENCE: 53

Arg Phe Ser Ile Ser Arg Asp Asn Ala Lys Asn Thr Leu Tyr Leu Gln
1               5                   10                  15

Met Asn Ser Leu Lys Pro Glu Asp Thr Ala Glu Tyr Tyr Cys Thr Ile
            20                  25                  30


<210> SEQ ID NO 54
<211> LENGTH: 32
<212> TYPE: PRT
<213> ORGANISM: Artificial Sequence
<220> FEATURE:
<223> OTHER INFORMATION: Synthetic: FR3

<400> SEQUENCE: 54

Arg Phe Thr Ile Ser Arg Asp Asn Ala Lys Lys Met Leu Tyr Leu Glu
1               5                   10                  15

Met Asn Ser Leu Lys Pro Glu Asp Thr Ala Val Tyr Tyr Cys Val Ile
            20                  25                  30


<210> SEQ ID NO 55
<211> LENGTH: 32
<212> TYPE: PRT
<213> ORGANISM: Artificial Sequence
<220> FEATURE:
<223> OTHER INFORMATION: Synthetic: FR3

<400> SEQUENCE: 55

Arg Phe Thr Ile Ser Arg Asp Asn Ala Lys Lys Met Leu Tyr Leu Glu
1               5                   10                  15

Met Asn Ser Leu Lys Ser Glu Asp Thr Ala Val Tyr Tyr Cys Val Ile
            20                  25                  30


<210> SEQ ID NO 56
<211> LENGTH: 32
<212> TYPE: PRT
<213> ORGANISM: Artificial Sequence
<220> FEATURE:
<223> OTHER INFORMATION: Synthetic: FR3

<400> SEQUENCE: 56
```

Arg Phe Thr Ile Ser Arg Asp Asn Ala Lys Asn Thr Leu Tyr Leu Gln
1 5 10 15

Met Asn Ser Leu Lys Pro Glu Asp Thr Ala Leu Tyr Tyr Cys Ala Lys
20 25 30

<210> SEQ ID NO 57
<211> LENGTH: 11
<212> TYPE: PRT
<213> ORGANISM: Artificial Sequence
<220> FEATURE:
<223> OTHER INFORMATION: Synthetic: FR4

<400> SEQUENCE: 57

Trp Gly Gln Gly Thr Gln Val Thr Val Ser Ser
1 5 10

<210> SEQ ID NO 58
<211> LENGTH: 11
<212> TYPE: PRT
<213> ORGANISM: Artificial Sequence
<220> FEATURE:
<223> OTHER INFORMATION: Synthetic: FR4

<400> SEQUENCE: 58

Ser Ser Gln Gly Thr Gln Val Thr Val Ser Ser
1 5 10

<210> SEQ ID NO 59
<211> LENGTH: 11
<212> TYPE: PRT
<213> ORGANISM: Artificial Sequence
<220> FEATURE:
<223> OTHER INFORMATION: Synthetic: FR4

<400> SEQUENCE: 59

Arg Thr Gln Gly Thr Gln Val Thr Val Ser Ser
1 5 10

<210> SEQ ID NO 60
<211> LENGTH: 11
<212> TYPE: PRT
<213> ORGANISM: Artificial Sequence
<220> FEATURE:
<223> OTHER INFORMATION: Synthetic: FR4

<400> SEQUENCE: 60

Ser Ser Pro Gly Thr Gln Val Thr Val Ser Ser
1 5 10

<210> SEQ ID NO 61
<211> LENGTH: 11
<212> TYPE: PRT
<213> ORGANISM: Artificial Sequence
<220> FEATURE:
<223> OTHER INFORMATION: Synthetic: FR4

<400> SEQUENCE: 61

Ala Ser Gln Gly Thr Gln Val Thr Val Ser Ser
1 5 10

<210> SEQ ID NO 62
<211> LENGTH: 11
<212> TYPE: PRT
<213> ORGANISM: Artificial Sequence
<220> FEATURE:
<223> OTHER INFORMATION: Synthetic: FR4

<400> SEQUENCE: 62

Arg Gly Gln Gly Thr Gln Val Thr Val Ser Ser
1               5                   10

<210> SEQ ID NO 63
<211> LENGTH: 14
<212> TYPE: PRT
<213> ORGANISM: Artificial Sequence
<220> FEATURE:
<223> OTHER INFORMATION: Synthetic: Linker

<400> SEQUENCE: 63

Gly Gly Ser Gly Gly Ser Gly Gly Ser Gly Gly Ser Gly Gly
1               5                   10

<210> SEQ ID NO 64
<211> LENGTH: 1017
<212> TYPE: PRT
<213> ORGANISM: Artificial Sequence
<220> FEATURE:
<223> OTHER INFORMATION: Synthetic: AAT-linkerAlbumin Fusion

<400> SEQUENCE: 64

Met Pro Ser Ser Val Ser Trp Gly Ile Leu Leu Leu Ala Gly Leu Cys
1               5                   10                  15

Cys Leu Val Pro Val Ser Leu Ala Glu Asp Pro Gln Gly Asp Ala Ala
            20                  25                  30

Gln Lys Thr Asp Thr Ser His His Asp Gln Asp His Pro Thr Phe Asn
        35                  40                  45

Lys Ile Thr Pro Asn Leu Ala Glu Phe Ala Phe Ser Leu Tyr Arg Gln
    50                  55                  60

Leu Ala His Gln Ser Asn Ser Thr Asn Ile Phe Phe Ser Pro Val Ser
65                  70                  75                  80

Ile Ala Thr Ala Phe Ala Met Leu Ser Leu Gly Thr Lys Ala Asp Thr
                85                  90                  95

His Asp Glu Ile Leu Glu Gly Leu Asn Phe Asn Leu Thr Glu Ile Pro
            100                 105                 110

Glu Ala Gln Ile His Glu Gly Phe Gln Glu Leu Leu Arg Thr Leu Asn
        115                 120                 125

Gln Pro Asp Ser Gln Leu Gln Leu Thr Thr Gly Asn Gly Leu Phe Leu
    130                 135                 140

Ser Glu Gly Leu Lys Leu Val Asp Lys Phe Leu Glu Asp Val Lys Lys
145                 150                 155                 160

Leu Tyr His Ser Glu Ala Phe Thr Val Asn Phe Gly Asp Thr Glu Glu
                165                 170                 175

Ala Lys Lys Gln Ile Asn Asp Tyr Val Glu Lys Gly Thr Gln Gly Lys
            180                 185                 190

Ile Val Asp Leu Val Lys Glu Leu Asp Arg Asp Thr Val Phe Ala Leu
        195                 200                 205

Val Asn Tyr Ile Phe Phe Lys Gly Lys Trp Glu Arg Pro Phe Glu Val
    210                 215                 220

Lys Asp Thr Glu Glu Glu Asp Phe His Val Asp Gln Val Thr Thr Val
225                 230                 235                 240

Lys Val Pro Met Met Lys Arg Leu Gly Met Phe Asn Ile Gln His Cys
                245                 250                 255

Lys Lys Leu Ser Ser Trp Val Leu Leu Met Lys Tyr Leu Gly Asn Ala
            260                 265                 270

-continued

```
Thr Ala Ile Phe Phe Leu Pro Asp Glu Gly Lys Leu Gln His Leu Glu
        275                 280                 285

Asn Glu Leu Thr His Asp Ile Ile Thr Lys Phe Leu Glu Asn Glu Asp
    290                 295                 300

Arg Arg Ser Ala Ser Leu His Leu Pro Lys Leu Ser Ile Thr Gly Thr
305                 310                 315                 320

Tyr Asp Leu Lys Ser Val Leu Gly Gln Leu Gly Ile Thr Lys Val Phe
                325                 330                 335

Ser Asn Gly Ala Asp Leu Ser Gly Val Thr Glu Glu Ala Pro Leu Lys
            340                 345                 350

Leu Ser Lys Ala Val His Lys Ala Val Leu Thr Ile Asp Glu Lys Gly
        355                 360                 365

Thr Glu Ala Ala Gly Ala Met Phe Leu Glu Ala Ile Pro Met Ser Ile
    370                 375                 380

Pro Pro Glu Val Lys Phe Asn Lys Pro Phe Val Phe Leu Met Ile Glu
385                 390                 395                 400

Gln Asn Thr Lys Ser Pro Leu Phe Met Gly Lys Val Val Asn Pro Thr
                405                 410                 415

Gln Lys Gly Gly Ser Gly Gly Ser Gly Gly Ser Gly Gly Ser Gly Gly
            420                 425                 430

Asp Ala His Lys Ser Glu Val Ala His Arg Phe Lys Asp Leu Gly Glu
        435                 440                 445

Glu Asn Phe Lys Ala Leu Val Leu Ile Ala Phe Ala Gln Tyr Leu Gln
    450                 455                 460

Gln Cys Pro Phe Glu Asp His Val Lys Leu Val Asn Glu Val Thr Glu
465                 470                 475                 480

Phe Ala Lys Thr Cys Val Ala Asp Glu Ser Ala Glu Asn Cys Asp Lys
                485                 490                 495

Ser Leu His Thr Leu Phe Gly Asp Lys Leu Cys Thr Val Ala Thr Leu
            500                 505                 510

Arg Glu Thr Tyr Gly Glu Met Ala Asp Cys Cys Ala Lys Gln Glu Pro
        515                 520                 525

Glu Arg Asn Glu Cys Phe Leu Gln His Lys Asp Asp Asn Pro Asn Leu
    530                 535                 540

Pro Arg Leu Val Arg Pro Glu Val Asp Val Met Cys Thr Ala Phe His
545                 550                 555                 560

Asp Asn Glu Glu Thr Phe Leu Lys Lys Tyr Leu Tyr Glu Ile Ala Arg
                565                 570                 575

Arg His Pro Tyr Phe Tyr Ala Pro Glu Leu Leu Phe Phe Ala Lys Arg
            580                 585                 590

Tyr Lys Ala Ala Phe Thr Glu Cys Cys Gln Ala Ala Asp Lys Ala Ala
        595                 600                 605

Cys Leu Leu Pro Lys Leu Asp Glu Leu Arg Asp Glu Gly Lys Ala Ser
    610                 615                 620

Ser Ala Lys Gln Arg Leu Lys Cys Ala Ser Leu Gln Lys Phe Gly Glu
625                 630                 635                 640

Arg Ala Phe Lys Ala Trp Ala Val Ala Arg Leu Ser Gln Arg Phe Pro
                645                 650                 655

Lys Ala Glu Phe Ala Glu Val Ser Lys Leu Val Thr Asp Leu Thr Lys
            660                 665                 670

Val His Thr Glu Cys Cys His Gly Asp Leu Leu Glu Cys Ala Asp Asp
        675                 680                 685

Arg Ala Asp Leu Ala Lys Tyr Ile Cys Glu Asn Gln Asp Ser Ile Ser
```

```
    690                 695                 700

Ser Lys Leu Lys Glu Cys Cys Glu Lys Pro Leu Leu Glu Lys Ser His
705                 710                 715                 720

Cys Ile Ala Glu Val Glu Asn Asp Glu Met Pro Ala Asp Leu Pro Ser
                725                 730                 735

Leu Ala Ala Asp Phe Val Glu Ser Lys Asp Val Cys Lys Asn Tyr Ala
            740                 745                 750

Glu Ala Lys Asp Val Phe Leu Gly Met Phe Leu Tyr Glu Tyr Ala Arg
        755                 760                 765

Arg His Pro Asp Tyr Ser Val Val Leu Leu Leu Arg Leu Ala Lys Thr
    770                 775                 780

Tyr Glu Thr Thr Leu Glu Lys Cys Cys Ala Ala Ala Asp Pro His Glu
785                 790                 795                 800

Cys Tyr Ala Lys Val Phe Asp Glu Phe Lys Pro Leu Val Glu Glu Pro
                805                 810                 815

Gln Asn Leu Ile Lys Gln Asn Cys Glu Leu Phe Glu Gln Leu Gly Glu
            820                 825                 830

Tyr Lys Phe Gln Asn Ala Leu Leu Val Arg Tyr Thr Lys Lys Val Pro
        835                 840                 845

Gln Val Ser Thr Pro Thr Leu Val Glu Val Ser Arg Asn Leu Gly Lys
    850                 855                 860

Val Gly Ser Lys Cys Cys Lys His Pro Glu Ala Lys Arg Met Pro Cys
865                 870                 875                 880

Ala Glu Asp Tyr Leu Ser Val Val Leu Asn Gln Leu Cys Val Leu His
                885                 890                 895

Glu Lys Thr Pro Val Ser Asp Arg Val Thr Lys Cys Cys Thr Glu Ser
            900                 905                 910

Leu Val Asn Arg Arg Pro Cys Phe Ser Ala Leu Glu Val Asp Glu Thr
        915                 920                 925

Tyr Val Pro Lys Glu Phe Asn Ala Glu Thr Phe Thr Phe His Ala Asp
    930                 935                 940

Ile Cys Thr Leu Ser Glu Lys Glu Arg Gln Ile Lys Lys Gln Thr Ala
945                 950                 955                 960

Leu Val Glu Leu Val Lys His Lys Pro Lys Ala Thr Lys Glu Gln Leu
                965                 970                 975

Lys Ala Val Met Asp Asp Phe Ala Ala Phe Val Glu Lys Cys Cys Lys
            980                 985                 990

Ala Asp Asp Lys Glu Thr Cys Phe  Ala Glu Glu Gly Lys  Lys Leu Val
        995                 1000                1005

Ala Ala  Ser Gln Ala Ala Leu  Gly Leu
    1010                1015


<210> SEQ ID NO 65
<211> LENGTH: 1017
<212> TYPE: PRT
<213> ORGANISM: Artificial Sequence
<220> FEATURE:
<223> OTHER INFORMATION: Synthetic: Mutant AAT-linkerAlbumin Fusion
      (C232S)

<400> SEQUENCE: 65

Met Pro Ser Ser Val Ser Trp Gly Ile Leu Leu Leu Ala Gly Leu Cys
1               5                   10                  15

Cys Leu Val Pro Val Ser Leu Ala Glu Asp Pro Gln Gly Asp Ala Ala
            20                  25                  30
```

```
Gln Lys Thr Asp Thr Ser His His Asp Gln Asp His Pro Thr Phe Asn
        35                  40                  45

Lys Ile Thr Pro Asn Leu Ala Glu Phe Ala Phe Ser Leu Tyr Arg Gln
    50                  55                  60

Leu Ala His Gln Ser Asn Ser Thr Asn Ile Phe Phe Ser Pro Val Ser
65                  70                  75                  80

Ile Ala Thr Ala Phe Ala Met Leu Ser Leu Gly Thr Lys Ala Asp Thr
                85                  90                  95

His Asp Glu Ile Leu Glu Gly Leu Asn Phe Asn Leu Thr Glu Ile Pro
            100                 105                 110

Glu Ala Gln Ile His Glu Gly Phe Gln Glu Leu Leu Arg Thr Leu Asn
        115                 120                 125

Gln Pro Asp Ser Gln Leu Gln Leu Thr Thr Gly Asn Gly Leu Phe Leu
    130                 135                 140

Ser Glu Gly Leu Lys Leu Val Asp Lys Phe Leu Glu Asp Val Lys Lys
145                 150                 155                 160

Leu Tyr His Ser Glu Ala Phe Thr Val Asn Phe Gly Asp Thr Glu Glu
                165                 170                 175

Ala Lys Lys Gln Ile Asn Asp Tyr Val Glu Lys Gly Thr Gln Gly Lys
            180                 185                 190

Ile Val Asp Leu Val Lys Glu Leu Asp Arg Asp Thr Val Phe Ala Leu
        195                 200                 205

Val Asn Tyr Ile Phe Phe Lys Gly Lys Trp Glu Arg Pro Phe Glu Val
    210                 215                 220

Lys Asp Thr Glu Glu Glu Asp Phe His Val Asp Gln Val Thr Thr Val
225                 230                 235                 240

Lys Val Pro Met Met Lys Arg Leu Gly Met Phe Asn Ile Gln His Ser
                245                 250                 255

Lys Lys Leu Ser Ser Trp Val Leu Leu Met Lys Tyr Leu Gly Asn Ala
            260                 265                 270

Thr Ala Ile Phe Phe Leu Pro Asp Glu Gly Lys Leu Gln His Leu Glu
        275                 280                 285

Asn Glu Leu Thr His Asp Ile Ile Thr Lys Phe Leu Glu Asn Glu Asp
    290                 295                 300

Arg Arg Ser Ala Ser Leu His Leu Pro Lys Leu Ser Ile Thr Gly Thr
305                 310                 315                 320

Tyr Asp Leu Lys Ser Val Leu Gly Gln Leu Gly Ile Thr Lys Val Phe
                325                 330                 335

Ser Asn Gly Ala Asp Leu Ser Gly Val Thr Glu Glu Ala Pro Leu Lys
            340                 345                 350

Leu Ser Lys Ala Val His Lys Ala Val Leu Thr Ile Asp Glu Lys Gly
        355                 360                 365

Thr Glu Ala Ala Gly Ala Met Phe Leu Glu Ala Ile Pro Met Ser Ile
    370                 375                 380

Pro Pro Glu Val Lys Phe Asn Lys Pro Phe Val Phe Leu Met Ile Glu
385                 390                 395                 400

Gln Asn Thr Lys Ser Pro Leu Phe Met Gly Lys Val Val Asn Pro Thr
                405                 410                 415

Gln Lys Gly Gly Ser Gly Gly Ser Gly Gly Ser Gly Gly Ser Gly Gly
            420                 425                 430

Asp Ala His Lys Ser Glu Val Ala His Arg Phe Lys Asp Leu Gly Glu
        435                 440                 445

Glu Asn Phe Lys Ala Leu Val Leu Ile Ala Phe Ala Gln Tyr Leu Gln
```

```
450                 455                 460

Gln Cys Pro Phe Glu Asp His Val Lys Leu Val Asn Glu Val Thr Glu
465                 470                 475                 480

Phe Ala Lys Thr Cys Val Ala Asp Glu Ser Ala Glu Asn Cys Asp Lys
                485                 490                 495

Ser Leu His Thr Leu Phe Gly Asp Lys Leu Cys Thr Val Ala Thr Leu
            500                 505                 510

Arg Glu Thr Tyr Gly Glu Met Ala Asp Cys Cys Ala Lys Gln Glu Pro
        515                 520                 525

Glu Arg Asn Glu Cys Phe Leu Gln His Lys Asp Asp Asn Pro Asn Leu
    530                 535                 540

Pro Arg Leu Val Arg Pro Glu Val Asp Val Met Cys Thr Ala Phe His
545                 550                 555                 560

Asp Asn Glu Glu Thr Phe Leu Lys Lys Tyr Leu Tyr Glu Ile Ala Arg
                565                 570                 575

Arg His Pro Tyr Phe Tyr Ala Pro Glu Leu Leu Phe Phe Ala Lys Arg
            580                 585                 590

Tyr Lys Ala Ala Phe Thr Glu Cys Cys Gln Ala Ala Asp Lys Ala Ala
        595                 600                 605

Cys Leu Leu Pro Lys Leu Asp Glu Leu Arg Asp Glu Gly Lys Ala Ser
    610                 615                 620

Ser Ala Lys Gln Arg Leu Lys Cys Ala Ser Leu Gln Lys Phe Gly Glu
625                 630                 635                 640

Arg Ala Phe Lys Ala Trp Ala Val Ala Arg Leu Ser Gln Arg Phe Pro
                645                 650                 655

Lys Ala Glu Phe Ala Glu Val Ser Lys Leu Val Thr Asp Leu Thr Lys
            660                 665                 670

Val His Thr Glu Cys Cys His Gly Asp Leu Leu Glu Cys Ala Asp Asp
        675                 680                 685

Arg Ala Asp Leu Ala Lys Tyr Ile Cys Glu Asn Gln Asp Ser Ile Ser
    690                 695                 700

Ser Lys Leu Lys Glu Cys Cys Glu Lys Pro Leu Leu Glu Lys Ser His
705                 710                 715                 720

Cys Ile Ala Glu Val Glu Asn Asp Glu Met Pro Ala Asp Leu Pro Ser
                725                 730                 735

Leu Ala Ala Asp Phe Val Glu Ser Lys Asp Val Cys Lys Asn Tyr Ala
            740                 745                 750

Glu Ala Lys Asp Val Phe Leu Gly Met Phe Leu Tyr Glu Tyr Ala Arg
        755                 760                 765

Arg His Pro Asp Tyr Ser Val Val Leu Leu Leu Arg Leu Ala Lys Thr
    770                 775                 780

Tyr Glu Thr Thr Leu Glu Lys Cys Cys Ala Ala Ala Asp Pro His Glu
785                 790                 795                 800

Cys Tyr Ala Lys Val Phe Asp Glu Phe Lys Pro Leu Val Glu Glu Pro
                805                 810                 815

Gln Asn Leu Ile Lys Gln Asn Cys Glu Leu Phe Glu Gln Leu Gly Glu
            820                 825                 830

Tyr Lys Phe Gln Asn Ala Leu Leu Val Arg Tyr Thr Lys Lys Val Pro
        835                 840                 845

Gln Val Ser Thr Pro Thr Leu Val Glu Val Ser Arg Asn Leu Gly Lys
    850                 855                 860

Val Gly Ser Lys Cys Cys Lys His Pro Glu Ala Lys Arg Met Pro Cys
865                 870                 875                 880
```

```
Ala Glu Asp Tyr Leu Ser Val Val Leu Asn Gln Leu Cys Val Leu His
                885                 890                 895

Glu Lys Thr Pro Val Ser Asp Arg Val Thr Lys Cys Cys Thr Glu Ser
            900                 905                 910

Leu Val Asn Arg Arg Pro Cys Phe Ser Ala Leu Glu Val Asp Glu Thr
        915                 920                 925

Tyr Val Pro Lys Glu Phe Asn Ala Glu Thr Phe Thr Phe His Ala Asp
    930                 935                 940

Ile Cys Thr Leu Ser Glu Lys Glu Arg Gln Ile Lys Lys Gln Thr Ala
945                 950                 955                 960

Leu Val Glu Leu Val Lys His Lys Pro Lys Ala Thr Lys Glu Gln Leu
                965                 970                 975

Lys Ala Val Met Asp Asp Phe Ala Ala Phe Val Glu Lys Cys Cys Lys
            980                 985                 990

Ala Asp Asp Lys Glu Thr Cys Phe  Ala Glu Glu Gly Lys  Lys Leu Val
        995                 1000                1005

Ala Ala  Ser Gln Ala Ala Leu  Gly Leu
    1010                1015


<210> SEQ ID NO 66
<211> LENGTH: 1017
<212> TYPE: PRT
<213> ORGANISM: Artificial Sequence
<220> FEATURE:
<223> OTHER INFORMATION: Synthetic: Mutant AAT-linkerAlbumin Fusion
      (M351V, M358V)

<400> SEQUENCE: 66

Met Pro Ser Ser Val Ser Trp Gly Ile Leu Leu Leu Ala Gly Leu Cys
1               5                   10                  15

Cys Leu Val Pro Val Ser Leu Ala Glu Asp Pro Gln Gly Asp Ala Ala
            20                  25                  30

Gln Lys Thr Asp Thr Ser His His Asp Gln Asp His Pro Thr Phe Asn
        35                  40                  45

Lys Ile Thr Pro Asn Leu Ala Glu Phe Ala Phe Ser Leu Tyr Arg Gln
    50                  55                  60

Leu Ala His Gln Ser Asn Ser Thr Asn Ile Phe Phe Ser Pro Val Ser
65                  70                  75                  80

Ile Ala Thr Ala Phe Ala Met Leu Ser Leu Gly Thr Lys Ala Asp Thr
                85                  90                  95

His Asp Glu Ile Leu Glu Gly Leu Asn Phe Asn Leu Thr Glu Ile Pro
            100                 105                 110

Glu Ala Gln Ile His Glu Gly Phe Gln Glu Leu Leu Arg Thr Leu Asn
        115                 120                 125

Gln Pro Asp Ser Gln Leu Gln Leu Thr Thr Gly Asn Gly Leu Phe Leu
    130                 135                 140

Ser Glu Gly Leu Lys Leu Val Asp Lys Phe Leu Glu Asp Val Lys Lys
145                 150                 155                 160

Leu Tyr His Ser Glu Ala Phe Thr Val Asn Phe Gly Asp Thr Glu Glu
                165                 170                 175

Ala Lys Lys Gln Ile Asn Asp Tyr Val Glu Lys Gly Thr Gln Gly Lys
            180                 185                 190

Ile Val Asp Leu Val Lys Glu Leu Asp Arg Asp Thr Val Phe Ala Leu
        195                 200                 205

Val Asn Tyr Ile Phe Phe Lys Gly Lys Trp Glu Arg Pro Phe Glu Val
```

-continued

```
    210                 215                 220

Lys Asp Thr Glu Glu Glu Asp Phe His Val Asp Gln Val Thr Thr Val
225                 230                 235                 240

Lys Val Pro Met Met Lys Arg Leu Gly Met Phe Asn Ile Gln His Cys
                245                 250                 255

Lys Lys Leu Ser Ser Trp Val Leu Leu Met Lys Tyr Leu Gly Asn Ala
            260                 265                 270

Thr Ala Ile Phe Phe Leu Pro Asp Glu Gly Lys Leu Gln His Leu Glu
        275                 280                 285

Asn Glu Leu Thr His Asp Ile Ile Thr Lys Phe Leu Glu Asn Glu Asp
    290                 295                 300

Arg Arg Ser Ala Ser Leu His Leu Pro Lys Leu Ser Ile Thr Gly Thr
305                 310                 315                 320

Tyr Asp Leu Lys Ser Val Leu Gly Gln Leu Gly Ile Thr Lys Val Phe
                325                 330                 335

Ser Asn Gly Ala Asp Leu Ser Gly Val Thr Glu Glu Ala Pro Leu Lys
            340                 345                 350

Leu Ser Lys Ala Val His Lys Ala Val Leu Thr Ile Asp Glu Lys Gly
        355                 360                 365

Thr Glu Ala Ala Gly Ala Val Phe Leu Glu Ala Ile Pro Val Ser Ile
    370                 375                 380

Pro Pro Glu Val Lys Phe Asn Lys Pro Phe Val Phe Leu Met Ile Glu
385                 390                 395                 400

Gln Asn Thr Lys Ser Pro Leu Phe Met Gly Lys Val Val Asn Pro Thr
                405                 410                 415

Gln Lys Gly Gly Ser Gly Gly Ser Gly Gly Ser Gly Gly Ser Gly Gly
            420                 425                 430

Asp Ala His Lys Ser Glu Val Ala His Arg Phe Lys Asp Leu Gly Glu
        435                 440                 445

Glu Asn Phe Lys Ala Leu Val Leu Ile Ala Phe Ala Gln Tyr Leu Gln
    450                 455                 460

Gln Cys Pro Phe Glu Asp His Val Lys Leu Val Asn Glu Val Thr Glu
465                 470                 475                 480

Phe Ala Lys Thr Cys Val Ala Asp Glu Ser Ala Glu Asn Cys Asp Lys
                485                 490                 495

Ser Leu His Thr Leu Phe Gly Asp Lys Leu Cys Thr Val Ala Thr Leu
            500                 505                 510

Arg Glu Thr Tyr Gly Glu Met Ala Asp Cys Cys Ala Lys Gln Glu Pro
        515                 520                 525

Glu Arg Asn Glu Cys Phe Leu Gln His Lys Asp Asp Asn Pro Asn Leu
    530                 535                 540

Pro Arg Leu Val Arg Pro Glu Val Asp Val Met Cys Thr Ala Phe His
545                 550                 555                 560

Asp Asn Glu Glu Thr Phe Leu Lys Lys Tyr Leu Tyr Glu Ile Ala Arg
                565                 570                 575

Arg His Pro Tyr Phe Tyr Ala Pro Glu Leu Leu Phe Phe Ala Lys Arg
            580                 585                 590

Tyr Lys Ala Ala Phe Thr Glu Cys Cys Gln Ala Ala Asp Lys Ala Ala
        595                 600                 605

Cys Leu Leu Pro Lys Leu Asp Glu Leu Arg Asp Glu Gly Lys Ala Ser
    610                 615                 620

Ser Ala Lys Gln Arg Leu Lys Cys Ala Ser Leu Gln Lys Phe Gly Glu
625                 630                 635                 640
```

```
Arg Ala Phe Lys Ala Trp Ala Val Ala Arg Leu Ser Gln Arg Phe Pro
                645                 650                 655

Lys Ala Glu Phe Ala Glu Val Ser Lys Leu Val Thr Asp Leu Thr Lys
            660                 665                 670

Val His Thr Glu Cys Cys His Gly Asp Leu Leu Glu Cys Ala Asp Asp
        675                 680                 685

Arg Ala Asp Leu Ala Lys Tyr Ile Cys Glu Asn Gln Asp Ser Ile Ser
    690                 695                 700

Ser Lys Leu Lys Glu Cys Cys Glu Lys Pro Leu Leu Glu Lys Ser His
705                 710                 715                 720

Cys Ile Ala Glu Val Glu Asn Asp Glu Met Pro Ala Asp Leu Pro Ser
                725                 730                 735

Leu Ala Ala Asp Phe Val Glu Ser Lys Asp Val Cys Lys Asn Tyr Ala
            740                 745                 750

Glu Ala Lys Asp Val Phe Leu Gly Met Phe Leu Tyr Glu Tyr Ala Arg
        755                 760                 765

Arg His Pro Asp Tyr Ser Val Val Leu Leu Leu Arg Leu Ala Lys Thr
    770                 775                 780

Tyr Glu Thr Thr Leu Glu Lys Cys Cys Ala Ala Ala Asp Pro His Glu
785                 790                 795                 800

Cys Tyr Ala Lys Val Phe Asp Glu Phe Lys Pro Leu Val Glu Glu Pro
                805                 810                 815

Gln Asn Leu Ile Lys Gln Asn Cys Glu Leu Phe Glu Gln Leu Gly Glu
            820                 825                 830

Tyr Lys Phe Gln Asn Ala Leu Leu Val Arg Tyr Thr Lys Lys Val Pro
        835                 840                 845

Gln Val Ser Thr Pro Thr Leu Val Glu Val Ser Arg Asn Leu Gly Lys
    850                 855                 860

Val Gly Ser Lys Cys Cys Lys His Pro Glu Ala Lys Arg Met Pro Cys
865                 870                 875                 880

Ala Glu Asp Tyr Leu Ser Val Val Leu Asn Gln Leu Cys Val Leu His
                885                 890                 895

Glu Lys Thr Pro Val Ser Asp Arg Val Thr Lys Cys Cys Thr Glu Ser
            900                 905                 910

Leu Val Asn Arg Arg Pro Cys Phe Ser Ala Leu Glu Val Asp Glu Thr
        915                 920                 925

Tyr Val Pro Lys Glu Phe Asn Ala Glu Thr Phe Thr Phe His Ala Asp
    930                 935                 940

Ile Cys Thr Leu Ser Glu Lys Glu Arg Gln Ile Lys Lys Gln Thr Ala
945                 950                 955                 960

Leu Val Glu Leu Val Lys His Lys Pro Lys Ala Thr Lys Glu Gln Leu
                965                 970                 975

Lys Ala Val Met Asp Asp Phe Ala Ala Phe Val Glu Lys Cys Cys Lys
            980                 985                 990

Ala Asp Asp Lys Glu Thr Cys Phe  Ala Glu Glu Gly Lys  Lys Leu Val
        995                 1000                1005

Ala Ala  Ser Gln Ala Ala Leu  Gly Leu
    1010                1015
```

<210> SEQ ID NO 67
<211> LENGTH: 1017
<212> TYPE: PRT
<213> ORGANISM: Artificial Sequence
<220> FEATURE:

<223> OTHER INFORMATION: Synthetic: Mutant AAT-linkerAlbumin Fusion
(M351V, M358L)

<400> SEQUENCE: 67

```
Met Pro Ser Ser Val Ser Trp Gly Ile Leu Leu Leu Ala Gly Leu Cys
1               5                   10                  15

Cys Leu Val Pro Val Ser Leu Ala Glu Asp Pro Gln Gly Asp Ala Ala
            20                  25                  30

Gln Lys Thr Asp Thr Ser His His Asp Gln Asp His Pro Thr Phe Asn
        35                  40                  45

Lys Ile Thr Pro Asn Leu Ala Glu Phe Ala Phe Ser Leu Tyr Arg Gln
    50                  55                  60

Leu Ala His Gln Ser Asn Ser Thr Asn Ile Phe Phe Ser Pro Val Ser
65                  70                  75                  80

Ile Ala Thr Ala Phe Ala Met Leu Ser Leu Gly Thr Lys Ala Asp Thr
                85                  90                  95

His Asp Glu Ile Leu Glu Gly Leu Asn Phe Asn Leu Thr Glu Ile Pro
            100                 105                 110

Glu Ala Gln Ile His Glu Gly Phe Gln Glu Leu Leu Arg Thr Leu Asn
        115                 120                 125

Gln Pro Asp Ser Gln Leu Gln Leu Thr Thr Gly Asn Gly Leu Phe Leu
    130                 135                 140

Ser Glu Gly Leu Lys Leu Val Asp Lys Phe Leu Glu Asp Val Lys Lys
145                 150                 155                 160

Leu Tyr His Ser Glu Ala Phe Thr Val Asn Phe Gly Asp Thr Glu Glu
                165                 170                 175

Ala Lys Lys Gln Ile Asn Asp Tyr Val Glu Lys Gly Thr Gln Gly Lys
            180                 185                 190

Ile Val Asp Leu Val Lys Glu Leu Asp Arg Asp Thr Val Phe Ala Leu
        195                 200                 205

Val Asn Tyr Ile Phe Phe Lys Gly Lys Trp Glu Arg Pro Phe Glu Val
    210                 215                 220

Lys Asp Thr Glu Glu Glu Asp Phe His Val Asp Gln Val Thr Thr Val
225                 230                 235                 240

Lys Val Pro Met Met Lys Arg Leu Gly Met Phe Asn Ile Gln His Cys
                245                 250                 255

Lys Lys Leu Ser Ser Trp Val Leu Leu Met Lys Tyr Leu Gly Asn Ala
            260                 265                 270

Thr Ala Ile Phe Phe Leu Pro Asp Glu Gly Lys Leu Gln His Leu Glu
        275                 280                 285

Asn Glu Leu Thr His Asp Ile Ile Thr Lys Phe Leu Glu Asn Glu Asp
    290                 295                 300

Arg Arg Ser Ala Ser Leu His Leu Pro Lys Leu Ser Ile Thr Gly Thr
305                 310                 315                 320

Tyr Asp Leu Lys Ser Val Leu Gly Gln Leu Gly Ile Thr Lys Val Phe
                325                 330                 335

Ser Asn Gly Ala Asp Leu Ser Gly Val Thr Glu Glu Ala Pro Leu Lys
            340                 345                 350

Leu Ser Lys Ala Val His Lys Ala Val Leu Thr Ile Asp Glu Lys Gly
        355                 360                 365

Thr Glu Ala Ala Gly Ala Val Phe Leu Glu Ala Ile Pro Leu Ser Ile
    370                 375                 380

Pro Pro Glu Val Lys Phe Asn Lys Pro Phe Val Phe Leu Met Ile Glu
385                 390                 395                 400
```

```
Gln Asn Thr Lys Ser Pro Leu Phe Met Gly Lys Val Val Asn Pro Thr
                405                 410                 415

Gln Lys Gly Gly Ser Gly Gly Ser Gly Gly Ser Gly Gly Ser Gly Gly
            420                 425                 430

Asp Ala His Lys Ser Glu Val Ala His Arg Phe Lys Asp Leu Gly Glu
        435                 440                 445

Glu Asn Phe Lys Ala Leu Val Leu Ile Ala Phe Ala Gln Tyr Leu Gln
    450                 455                 460

Gln Cys Pro Phe Glu Asp His Val Lys Leu Val Asn Glu Val Thr Glu
465                 470                 475                 480

Phe Ala Lys Thr Cys Val Ala Asp Glu Ser Ala Glu Asn Cys Asp Lys
                485                 490                 495

Ser Leu His Thr Leu Phe Gly Asp Lys Leu Cys Thr Val Ala Thr Leu
            500                 505                 510

Arg Glu Thr Tyr Gly Glu Met Ala Asp Cys Cys Ala Lys Gln Glu Pro
        515                 520                 525

Glu Arg Asn Glu Cys Phe Leu Gln His Lys Asp Asp Asn Pro Asn Leu
    530                 535                 540

Pro Arg Leu Val Arg Pro Glu Val Asp Val Met Cys Thr Ala Phe His
545                 550                 555                 560

Asp Asn Glu Glu Thr Phe Leu Lys Lys Tyr Leu Tyr Glu Ile Ala Arg
                565                 570                 575

Arg His Pro Tyr Phe Tyr Ala Pro Glu Leu Leu Phe Phe Ala Lys Arg
            580                 585                 590

Tyr Lys Ala Ala Phe Thr Glu Cys Cys Gln Ala Ala Asp Lys Ala Ala
        595                 600                 605

Cys Leu Leu Pro Lys Leu Asp Glu Leu Arg Asp Glu Gly Lys Ala Ser
    610                 615                 620

Ser Ala Lys Gln Arg Leu Lys Cys Ala Ser Leu Gln Lys Phe Gly Glu
625                 630                 635                 640

Arg Ala Phe Lys Ala Trp Ala Val Ala Arg Leu Ser Gln Arg Phe Pro
                645                 650                 655

Lys Ala Glu Phe Ala Glu Val Ser Lys Leu Val Thr Asp Leu Thr Lys
            660                 665                 670

Val His Thr Glu Cys Cys His Gly Asp Leu Leu Glu Cys Ala Asp Asp
        675                 680                 685

Arg Ala Asp Leu Ala Lys Tyr Ile Cys Glu Asn Gln Asp Ser Ile Ser
    690                 695                 700

Ser Lys Leu Lys Glu Cys Cys Glu Lys Pro Leu Leu Glu Lys Ser His
705                 710                 715                 720

Cys Ile Ala Glu Val Glu Asn Asp Glu Met Pro Ala Asp Leu Pro Ser
                725                 730                 735

Leu Ala Ala Asp Phe Val Glu Ser Lys Asp Val Cys Lys Asn Tyr Ala
            740                 745                 750

Glu Ala Lys Asp Val Phe Leu Gly Met Phe Leu Tyr Glu Tyr Ala Arg
        755                 760                 765

Arg His Pro Asp Tyr Ser Val Val Leu Leu Leu Arg Leu Ala Lys Thr
    770                 775                 780

Tyr Glu Thr Thr Leu Glu Lys Cys Cys Ala Ala Ala Asp Pro His Glu
785                 790                 795                 800

Cys Tyr Ala Lys Val Phe Asp Glu Phe Lys Pro Leu Val Glu Glu Pro
                805                 810                 815
```

```
Gln Asn Leu Ile Lys Gln Asn Cys Glu Leu Phe Glu Gln Leu Gly Glu
            820                 825                 830

Tyr Lys Phe Gln Asn Ala Leu Leu Val Arg Tyr Thr Lys Lys Val Pro
        835                 840                 845

Gln Val Ser Thr Pro Thr Leu Val Glu Val Ser Arg Asn Leu Gly Lys
    850                 855                 860

Val Gly Ser Lys Cys Cys Lys His Pro Glu Ala Lys Arg Met Pro Cys
865                 870                 875                 880

Ala Glu Asp Tyr Leu Ser Val Val Leu Asn Gln Leu Cys Val Leu His
                885                 890                 895

Glu Lys Thr Pro Val Ser Asp Arg Val Thr Lys Cys Cys Thr Glu Ser
            900                 905                 910

Leu Val Asn Arg Arg Pro Cys Phe Ser Ala Leu Glu Val Asp Glu Thr
        915                 920                 925

Tyr Val Pro Lys Glu Phe Asn Ala Glu Thr Phe Thr Phe His Ala Asp
    930                 935                 940

Ile Cys Thr Leu Ser Glu Lys Glu Arg Gln Ile Lys Lys Gln Thr Ala
945                 950                 955                 960

Leu Val Glu Leu Val Lys His Lys Pro Lys Ala Thr Lys Glu Gln Leu
                965                 970                 975

Lys Ala Val Met Asp Asp Phe Ala Ala Phe Val Glu Lys Cys Cys Lys
            980                 985                 990

Ala Asp Asp Lys Glu Thr Cys Phe  Ala Glu Glu Gly Lys  Lys Leu Val
        995                 1000                 1005

Ala Ala  Ser Gln Ala Ala Leu  Gly Leu
    1010                 1015


<210> SEQ ID NO 68
<211> LENGTH: 1017
<212> TYPE: PRT
<213> ORGANISM: Artificial Sequence
<220> FEATURE:
<223> OTHER INFORMATION: Synthetic: Mutant AAT-linkerAlbumin Fusion
      (C232S, M351V, M358L)

<400> SEQUENCE: 68

Met Pro Ser Ser Val Ser Trp Gly Ile Leu Leu Leu Ala Gly Leu Cys
1               5                   10                  15

Cys Leu Val Pro Val Ser Leu Ala Glu Asp Pro Gln Gly Asp Ala Ala
            20                  25                  30

Gln Lys Thr Asp Thr Ser His His Asp Gln Asp His Pro Thr Phe Asn
        35                  40                  45

Lys Ile Thr Pro Asn Leu Ala Glu Phe Ala Phe Ser Leu Tyr Arg Gln
    50                  55                  60

Leu Ala His Gln Ser Asn Ser Thr Asn Ile Phe Phe Ser Pro Val Ser
65                  70                  75                  80

Ile Ala Thr Ala Phe Ala Met Leu Ser Leu Gly Thr Lys Ala Asp Thr
                85                  90                  95

His Asp Glu Ile Leu Glu Gly Leu Asn Phe Asn Leu Thr Glu Ile Pro
            100                 105                 110

Glu Ala Gln Ile His Glu Gly Phe Gln Glu Leu Leu Arg Thr Leu Asn
        115                 120                 125

Gln Pro Asp Ser Gln Leu Gln Leu Thr Thr Gly Asn Gly Leu Phe Leu
    130                 135                 140

Ser Glu Gly Leu Lys Leu Val Asp Lys Phe Leu Glu Asp Val Lys Lys
145                 150                 155                 160
```

```
Leu Tyr His Ser Glu Ala Phe Thr Val Asn Phe Gly Asp Thr Glu Glu
                165                 170                 175

Ala Lys Lys Gln Ile Asn Asp Tyr Val Glu Lys Gly Thr Gln Gly Lys
            180                 185                 190

Ile Val Asp Leu Val Lys Glu Leu Asp Arg Asp Thr Val Phe Ala Leu
        195                 200                 205

Val Asn Tyr Ile Phe Phe Lys Gly Lys Trp Glu Arg Pro Phe Glu Val
    210                 215                 220

Lys Asp Thr Glu Glu Glu Asp Phe His Val Asp Gln Val Thr Thr Val
225                 230                 235                 240

Lys Val Pro Met Met Lys Arg Leu Gly Met Phe Asn Ile Gln His Ser
                245                 250                 255

Lys Lys Leu Ser Ser Trp Val Leu Leu Met Lys Tyr Leu Gly Asn Ala
            260                 265                 270

Thr Ala Ile Phe Phe Leu Pro Asp Glu Gly Lys Leu Gln His Leu Glu
        275                 280                 285

Asn Glu Leu Thr His Asp Ile Ile Thr Lys Phe Leu Glu Asn Glu Asp
    290                 295                 300

Arg Arg Ser Ala Ser Leu His Leu Pro Lys Leu Ser Ile Thr Gly Thr
305                 310                 315                 320

Tyr Asp Leu Lys Ser Val Leu Gly Gln Leu Gly Ile Thr Lys Val Phe
                325                 330                 335

Ser Asn Gly Ala Asp Leu Ser Gly Val Thr Glu Glu Ala Pro Leu Lys
            340                 345                 350

Leu Ser Lys Ala Val His Lys Ala Val Leu Thr Ile Asp Glu Lys Gly
        355                 360                 365

Thr Glu Ala Ala Gly Ala Val Phe Leu Glu Ala Ile Pro Leu Ser Ile
    370                 375                 380

Pro Pro Glu Val Lys Phe Asn Lys Pro Phe Val Phe Leu Met Ile Glu
385                 390                 395                 400

Gln Asn Thr Lys Ser Pro Leu Phe Met Gly Lys Val Val Asn Pro Thr
                405                 410                 415

Gln Lys Gly Gly Ser Gly Gly Ser Gly Gly Ser Gly Gly Ser Gly Gly
            420                 425                 430

Asp Ala His Lys Ser Glu Val Ala His Arg Phe Lys Asp Leu Gly Glu
        435                 440                 445

Glu Asn Phe Lys Ala Leu Val Leu Ile Ala Phe Ala Gln Tyr Leu Gln
    450                 455                 460

Gln Cys Pro Phe Glu Asp His Val Lys Leu Val Asn Glu Val Thr Glu
465                 470                 475                 480

Phe Ala Lys Thr Cys Val Ala Asp Glu Ser Ala Glu Asn Cys Asp Lys
                485                 490                 495

Ser Leu His Thr Leu Phe Gly Asp Lys Leu Cys Thr Val Ala Thr Leu
            500                 505                 510

Arg Glu Thr Tyr Gly Glu Met Ala Asp Cys Cys Ala Lys Gln Glu Pro
        515                 520                 525

Glu Arg Asn Glu Cys Phe Leu Gln His Lys Asp Asp Asn Pro Asn Leu
    530                 535                 540

Pro Arg Leu Val Arg Pro Glu Val Asp Val Met Cys Thr Ala Phe His
545                 550                 555                 560

Asp Asn Glu Glu Thr Phe Leu Lys Lys Tyr Leu Tyr Glu Ile Ala Arg
                565                 570                 575
```

```
Arg His Pro Tyr Phe Tyr Ala Pro Glu Leu Leu Phe Phe Ala Lys Arg
            580                 585                 590

Tyr Lys Ala Ala Phe Thr Glu Cys Cys Gln Ala Ala Asp Lys Ala Ala
        595                 600                 605

Cys Leu Leu Pro Lys Leu Asp Glu Leu Arg Asp Glu Gly Lys Ala Ser
    610                 615                 620

Ser Ala Lys Gln Arg Leu Lys Cys Ala Ser Leu Gln Lys Phe Gly Glu
625                 630                 635                 640

Arg Ala Phe Lys Ala Trp Ala Val Ala Arg Leu Ser Gln Arg Phe Pro
                645                 650                 655

Lys Ala Glu Phe Ala Glu Val Ser Lys Leu Val Thr Asp Leu Thr Lys
            660                 665                 670

Val His Thr Glu Cys Cys His Gly Asp Leu Leu Glu Cys Ala Asp Asp
        675                 680                 685

Arg Ala Asp Leu Ala Lys Tyr Ile Cys Glu Asn Gln Asp Ser Ile Ser
    690                 695                 700

Ser Lys Leu Lys Glu Cys Cys Glu Lys Pro Leu Leu Glu Lys Ser His
705                 710                 715                 720

Cys Ile Ala Glu Val Glu Asn Asp Glu Met Pro Ala Asp Leu Pro Ser
                725                 730                 735

Leu Ala Ala Asp Phe Val Glu Ser Lys Asp Val Cys Lys Asn Tyr Ala
            740                 745                 750

Glu Ala Lys Asp Val Phe Leu Gly Met Phe Leu Tyr Glu Tyr Ala Arg
        755                 760                 765

Arg His Pro Asp Tyr Ser Val Val Leu Leu Leu Arg Leu Ala Lys Thr
    770                 775                 780

Tyr Glu Thr Thr Leu Glu Lys Cys Cys Ala Ala Ala Asp Pro His Glu
785                 790                 795                 800

Cys Tyr Ala Lys Val Phe Asp Glu Phe Lys Pro Leu Val Glu Glu Pro
                805                 810                 815

Gln Asn Leu Ile Lys Gln Asn Cys Glu Leu Phe Glu Gln Leu Gly Glu
            820                 825                 830

Tyr Lys Phe Gln Asn Ala Leu Leu Val Arg Tyr Thr Lys Lys Val Pro
        835                 840                 845

Gln Val Ser Thr Pro Thr Leu Val Glu Val Ser Arg Asn Leu Gly Lys
    850                 855                 860

Val Gly Ser Lys Cys Cys Lys His Pro Glu Ala Lys Arg Met Pro Cys
865                 870                 875                 880

Ala Glu Asp Tyr Leu Ser Val Val Leu Asn Gln Leu Cys Val Leu His
                885                 890                 895

Glu Lys Thr Pro Val Ser Asp Arg Val Thr Lys Cys Cys Thr Glu Ser
            900                 905                 910

Leu Val Asn Arg Arg Pro Cys Phe Ser Ala Leu Glu Val Asp Glu Thr
        915                 920                 925

Tyr Val Pro Lys Glu Phe Asn Ala Glu Thr Phe Thr Phe His Ala Asp
    930                 935                 940

Ile Cys Thr Leu Ser Glu Lys Glu Arg Gln Ile Lys Lys Gln Thr Ala
945                 950                 955                 960

Leu Val Glu Leu Val Lys His Lys Pro Lys Ala Thr Lys Glu Gln Leu
                965                 970                 975

Lys Ala Val Met Asp Asp Phe Ala Ala Phe Val Glu Lys Cys Cys Lys
            980                 985                 990

Ala Asp Asp Lys Glu Thr Cys Phe  Ala Glu Glu Gly Lys  Lys Leu Val
```

```
        995                 1000                1005

Ala Ala  Ser Gln Ala Ala Leu  Gly Leu
    1010                 1015


<210> SEQ ID NO 69
<211> LENGTH: 3178
<212> TYPE: DNA
<213> ORGANISM: Homo sapiens
<220> FEATURE:
<221> NAME/KEY: misc_feature
<223> OTHER INFORMATION: Wild Type AAT Nucleic Acid

<400> SEQUENCE: 69

tgggcaggaa ctgggcactg tgcccagggc atgcactgcc tccacgcagc aaccctcaga     60

gtcctgagct gaaccaagaa ggaggagggg gtcgggcctc cgaggaaggc ctagccgctg    120

ctgctgccag gaattccagg ttggaggggc ggcaacctcc tgccagcctt caggccactc    180

tcctgtgcct gccagaagag acagagcttg aggagagctt gaggagagca ggaaaggaca    240

atgccgtctt ctgtctcgtg gggcatcctc ctgctggcag gcctgtgctg cctggtccct    300

gtctccctgg ctgaggatcc ccagggagat gctgcccaga agacagatac atcccaccat    360

gatcaggatc acccaacctt caacaagatc acccccaacc tggctgagtt cgccttcagc    420

ctataccgcc agctggcaca ccagtccaac agcaccaata tcttcttctc cccagtgagc    480

atcgctacag cctttgcaat gctctccctg gggaccaagg ctgacactca cgatgaaatc    540

ctggagggcc tgaatttcaa cctcacggag attccggagg ctcagatcca tgaaggcttc    600

caggaactcc tccgtaccct caaccagcca gacagccagc tccagctgac caccggcaat    660

ggcctgttcc tcagcgaggg cctgaagcta gtggataagt tttggaggga tgttaaaaag    720

ttgtaccact cagaagcctt cactgtcaac ttcggggaca ccgaagaggc caagaaacag    780

atcaacgatt acgtggagaa gggtactcaa gggaaaattg tggatttggt caaggagctt    840

gacagagaca cagtttttgc tctggtgaat tacatcttct ttaaaggcaa atgggagaga    900

ccctttgaag tcaaggacac cgaggaagag gacttccacg tggaccaggt gaccaccgtg    960

aaggtgccta tgatgaagcg tttaggcatg tttaacatcc agcactgtaa gaagctgtcc   1020

agctgggtgc tgctgatgaa atacctgggc aatgccaccg ccatcttctt cctgcctgat   1080

gaggggaaac tacagcacct ggaaaatgaa ctcacccacg atatcatcac caagttcctg   1140

gaaaatgaag acagaaggtc tgccagctta catttaccca aactgtccat tactggaacc   1200

tatgatctga agagcgtcct gggtcaactg ggcatcacta aggtcttcag caatggggct   1260

gacctctccg gggtcacaga ggaggcaccc ctgaagctct ccaaggccgt gcataaggct   1320

gtgctgacca tcgacgagaa agggactgaa gctgctgggg ccatgttttt agaggccata   1380

cccatgtcta tcccccccga ggtcaagttc aacaaaccct ttgtcttctt aatgattgaa   1440

caaaatacca agtctcccct cttcatggga aaagtggtga atcccaccca aaaataactg   1500

cctctcgctc ctcaacccct cccctccatc cctggccccc tccctggatg aattaaagaa   1560

gggttgagct ggtccctgcc tgcatgtgac tgtaaatccc tcccatgttt tctctgagtc   1620

tccctttgcc tgctgaggct gtatgtgggc tccaggtaac agtgctgtct tcgggccccc   1680

tgaactgtgt tcatggagca tctggctggg taggcacatg ctgggcttga atccaggggg   1740

gactgaatcc tcagcttacg gacctgggcc catctgtttc tggagggctc cagtcttcct   1800

tgtcctgtct tggagtcccc aagaaggaat cacaggggag gaaccagata ccagccatga   1860

ccccaggctc caccaagcat cttcatgtcc ccctgctcat cccccactcc cccccaccca   1920
```

```
gagttgctca tcctgccagg gctggctgtg cccaccccaa ggctgccctc ctgggggccc   1980
cagaactgcc tgatcgtgcc gtggcccagt tttgtggcat ctgcagcaac acaagagaga   2040
ggacaatgtc ctcctcttga ctcgggccct gcacctctca ggcacttctg gaaaatgact   2100
gaggcagatt cttcctgaag cccattctcc atggggcaac aaggacacct attctgtcct   2160
tgtccttcca tcgctgcccc agaaagcctc acatatctcc gtttagaatc aggtcccttc   2220
tccccagatg aagaggaggg tctctgcttt gttttctcta tctcctcctc agacttgacc   2280
aggcccagca ggccccagaa gaccattacc ctatatccct tctcctccct agtcacatgg   2340
ccataggcct gctgatggct caggaaggcc attgcaagga ctcctcagct atgggagagg   2400
aagcacatca cccattgacc cccgcaaccc ctccctttcc tcctctgagt cccgactggg   2460
gccacatgca gcctgacttc tttgtgcctg ttgctgtccc tgcagtcttc agagggccac   2520
cgcagctcca gtgccacggc aggaggctgt tcctgaatag cccctgtggt aagggccagg   2580
agagtccttc catcctccaa ggccctgcta aaggacacag cagccaggaa gtcccctggg   2640
cccctagctg aaggacagcc tgctccctcc gtctctacca ggaatggcct tgtcctatgg   2700
aaggcactgc cccatcccaa actaatctag gaatcactgt ctaaccactc actgtcatga   2760
atgtgtactt aaaggatgag gttgagtcat accaaatagt gatttcgata gttcaaaatg   2820
gtgaaattag caattctaca tgattcagtc taatcaatgg ataccgactg tttcccacac   2880
aagtctcctg ttctcttaag cttactcact gacagccttt cactctccac aaatacatta   2940
aagatatggc catcaccaag ccccctagga tgacaccaga cctgagagtc tgaagacctg   3000
gatccaagtt ctgacttttc cccctgacag ctgtgtgacc ttcgtgaagt cgccaaacct   3060
ctctgagccc cagtcattgc tagtaagacc tgcctttgag ttggtatgat gttcaagtta   3120
gataacaaaa tgtttatacc cattagaaca gagaataaat agaactacat ttcttgca     3178
```

<210> SEQ ID NO 70
<211> LENGTH: 19002
<212> TYPE: DNA
<213> ORGANISM: Homo sapiens
<220> FEATURE:
<221> NAME/KEY: misc_feature
<223> OTHER INFORMATION: Wild Type Human Serum Albumin Nucleic Acid

<400> SEQUENCE: 70

```
cctttcccag ggacttctac aaggaaaaag ctagagttgg ttactgactt ctaataaata     60
atgcctacaa tttctaggaa gttaaaagtt gacataattt atccaagaaa gaattatttt    120
cttaacttag aatagtttct tttttctttt cagatgtagg tttttctggc tttagaaaaa    180
atgcttgttt ttcttcaatg gaaaataggc acacttgttt tatgtctgtt catctgtagt    240
cagaaagaca agtctggtat ttcctttcag gactcccttg agtcattaaa aaaaatcttc    300
ctatctatct atgtatctat catccatcta gctttgattt tttcctcttc tgtgctttat    360
tagttaatta gtacccattt ctgaagaaga aataacataa gattatagaa aataatttct    420
ttcattgtaa gactgaatag aaaaaatttt ctttcattat aagactgagt agaaaaaata    480
atactttgtt agtctctgtg cctctatgtg ccatgaggaa atttgactac tggttttgac    540
tgactgagtt atttaattaa gtaaaataac tggcttagta ctaattattg ttctgtagta    600
tcagagaaag ttgttcttcc tactggttga gctcagtagt tcttcatatt ctgagcaaaa    660
gggcagaggt aggatagctt ttctgaggta gagataagaa ccttgggtag ggaaggaaga    720
tttatgaaat atttaaaaaa ttattcttcc ttcgctttgt ttttagacat aatgttaaat    780
```

```
ttattttgaa atttaaagca acataaaaga acatgtgatt tttctactta ttgaaagaga    840
gaaaggaaaa aaatatgaaa cagggatgga aagaatccta tgcctggtga aggtcaaggg    900
ttctcataac ctacagagaa tttggggtca gcctgtccta ttgtatatta tggcaaagat    960
aatcatcatc tcatttgggt ccattttcct ctccatctct gcttaactga agatcccatg   1020
agatatactc acactgaatc taaatagcct atctcagggc ttgaatcaca tgtgggccac   1080
agcaggaatg ggaacatgga atttctaagt cctatcttac ttgttattgt tgctatgtct   1140
ttttcttagt ttgcatctga ggcaacatca gctttttcag acagaatggc tttggaatag   1200
taaaaaagac acagaagccc taaaatatgt atgtatgtat atgtgtgtgt gcatgcgtga   1260
gtacttgtgt gtaaattttt cattatctat aggtaaaagc acacttggaa ttagcaatag   1320
atgcaatttg ggacttaact ctttcagtat gtcttatttc taagcaaagt atttagtttg   1380
gttagtaatt actaaacact gagaactaaa ttgcaaacac caagaactaa aatgttcaag   1440
tgggaaatta cagttaaata ccatggtaat gaataaaagg tacaaatcgt ttaaactctt   1500
atgtaaaatt tgataagatg ttttacacaa ctttaataca ttgacaaggt cttgtggaga   1560
aaacagttcc agatggtaaa tatacacaag ggatttagtc aaacaatttt ttggcaagaa   1620
tattatgaat tttgtaatcg gttggcagcc aatgaaatac aaagatgagt ctagttaata   1680
atctacaatt attggttaaa gaagtatatt agtgctaatt tccctccgtt tgtcctagct   1740
tttctcttct gtcaacccca cacgcctttg gcacaatgaa gtgggtaacc tttatttccc   1800
ttctttttct ctttagctcg gcttattcca ggggtgtgtt tcgtcgagat gcacgtaaga   1860
aatccatttt tctattgttc aacttttatt ctattttccc agtaaaataa agttttagta   1920
aactctgcat ctttaaagaa ttattttggc atttatttct aaaatggcat agtattttgt   1980
atttgtgaag tcttacaagg ttatcttatt aataaaattc aaacatccta ggtaaaaaaa   2040
aaaaaaggtc agaattgttt agtgactgta attttctttt gcgcactaag gaaagtgcaa   2100
agtaacttag agtgactgaa acttcacaga atagggttga agattgaatt cataactatc   2160
ccaaagacct atccattgca ctatgcttta tttaaaaacc acaaaacctg tgctgttgat   2220
ctcataaata gaacttgtat ttatatttat tttcatttta gtctgtcttc ttggttgctg   2280
ttgatagaca ctaaaagagt attagatatt atctaagttt gaatataagg ctataaatat   2340
ttaataattt ttaaaatagt attcttggta attgaattat tcttctgttt aaaggcagaa   2400
gaaataattg aacatcatcc tgagtttttc tgtaggaatc agagcccaat attttgaaac   2460
aaatgcataa tctaagtcaa atggaaagaa atataaaaag taacattatt acttcttgtt   2520
ttcttcagta tttaacaatc cttttttttc ttcccttgcc cagacaagag tgaggttgct   2580
catcggttta aagatttggg agaagaaaat ttcaaagcct tgtaagttaa aatattgatg   2640
aatcaaattt aatgtttcta atagtgttgt ttattattct aaagtgctta tatttccttg   2700
tcatcagggt tcagattcta aaacagtgct gcctcgtaga gttttctgcg ttgaggaaga   2760
tattctgtat ctgggctatc caataaggta gtcactggtc acatggctat tgagtacttc   2820
aaatatgaca agtgcaactg agaaacaaaa acttaaattg tatttaattg tagttaattt   2880
gaatgtatat agtcacatgt ggctaatggc tactgtattg gacagtacag ctctggaact   2940
tgcttggtgg aaaggacttt aatataggtt tcctttggtg gcttacccac taaatcttct   3000
ttacatagca agcattcctg tgcttagttg ggaatattta attttttttt ttttttaaga   3060
cagggtctcg ctctgtcgcc caggctggag tgcagtggcg caatctcggc tcactgcaaa   3120
```

ctccgctccc gggttcacgc cattctcctg cctcagcctc ccgagtagct gggactacag 3180
gcgcccgcca tcacgcccgg ctaatctttt gtatttttag tagagatggg gtttcaccgt 3240
gtgccaggat ggtctcaatc tcctgacatc gtgatctgcc cacctcggcc tcccaaagtg 3300
ctgggattac aggagtgagt caccgcgccc ggcctattta aatgtttttt aatctagtaa 3360
aaaatgagaa aattgttttt ttaaaagtct acctaatcct acaggctaat taaagacgtg 3420
tgtggggatc aggtgcggtg gttcacacct gtaatcccag cactttggaa ggctgatgca 3480
ggaggattgc ttgagcccag gagtacaaga ccagcctggg caagtctctt taaaaaaaac 3540
aaaacaaaca aacaaaaaaa ttaggcatgg tggcacatgc ctgtagtcct agctacttag 3600
gaggctgacg taggaggatc gtttggacct gagaggtcaa ggctacagtg agccatgatt 3660
gtgccactgc actccagcct gggtgacaga gtgagactct gtctcaaaaa agaaaaagga 3720
aatctgtggg gtttgtttta gttttaagta attctaagga ctttaaaaat gcctagtctt 3780
gacaattaga tctatttggc atacaatttg cttgcttaat ctatgtgtgt gcatagatct 3840
actgacacac gcatacatat aaacattagg gaactaccat tctctttgcg taggaagcca 3900
catatgccta tctaggcctc agatcatacc tgatatgaat aggctttctg gataatggtg 3960
aagaagatgt ataaaagata gaacctatac ccatacatga tttgttctct agcgtagcaa 4020
cctgttacat attaaagttt tattatacta catttttcta catcctttgt ttcagggtgt 4080
tgattgcctt tgctcagtat cttcagcagt gtccatttga agatcatgta aaattagtga 4140
atgaagtaac tgaatttgca aaaacatgtg ttgctgatga gtcagctgaa aattgtgaca 4200
aatcacttgt aagtacattc taattgtgga gattctttct tctgtttgaa gtaatcccaa 4260
gcatttcaaa ggaatttttt ttaagttttc tcaattatta ttaagtgtcc tgatttgtaa 4320
gaaacactaa aaagttgctc atagactgat aagccattgt ttcttttgtg atagagatgc 4380
tttagctatg tccacagttt taaaatcatt tctttattga gaccaaacac aacagtcatg 4440
gtgtatttaa atggcaattt gtcatttata aacacctctt tttaaaattt gaggtttggt 4500
ttctttttgt agaggctaat agggatatga tagcatgtat ttatttattt atttatctta 4560
ttttattata gtaagaaccc ttaacatgag atctaccctg ttatattttt aagtgtacaa 4620
tccattattg ttaactacgg gtacactgtt gtatagctta ctcatcttgc tgtattaaaa 4680
ctttgtgccc attgattagt aacccctcgt ttcgtcctcc cccagccact ggcaaccagc 4740
attatactct ttgattctat gagtttgact actttagcta ccttatataa gtggtattat 4800
gtactgttta tctttttatg actgacttat ttcccttagc atagtgcatt caaagtccaa 4860
ccatgttgtt gcctattgca gaatttcctt cttttcaagg ctgaataata ttccagtgca 4920
tgtgtgtacc acattttctt tatccattaa tttgttgatt gatagacatt taggttggtt 4980
ttctacatct tgactatcat gaatagtgtt gcaatgaaca caggagagct actatctctt 5040
agagatgata tcatggtttt tatcatcaga aaacacccac tgatttctat gctaattttg 5100
ttacctgggt ggaataatag tacagctata tattcctcat tttagatatc tttgtatttc 5160
tacatacaat aaaaaagcag agtacttagt catgttgaag aactttaaac ttttagtatt 5220
tccagatcaa tcttcaaaac aaggacaggt ttatctttct ctcaccactc aatctatata 5280
tacctcttgt gggcaaggcc agtttttatc actggagcct ttcccctttt tattatgtac 5340
ctctccctca cagcagagtc aggactttaa ctttacacaa tactatggct ctacatatga 5400
aatcttaaaa atacataaaa attaataaat tctgtctaga gtagtatatt ttccctgggg 5460
ttacgattac tttcataata aaaattagag ataaggaaag gactcattta ttggaaagtg 5520

```
attttaggta acatttctgg aagaaaaatg tctatatctt aatagtcact taatatatga   5580
tggattgtgt tactcctcag ttttcaatgg catatactaa aacatggccc tctaaaaagg   5640
gggcaaatga aatgagaaac tctctgaatg tttttctccc ctaggtgaat tcacctgctg   5700
cttagaagct tattttctct tgatttctgt tataatgatt gctcttaccc tttagtttta   5760
agtttcaaaa taggagtcat ataactttcc ttaaagctat tgactgtctt tttgtcctgt   5820
tttattcacc atgagttata gtgtgacagt taattcttat gaaaattata tagagatggt   5880
taaatcatca gaaactgtaa acctcgattg ggaggggaag cggattttta aatgatttcc   5940
tgaccaagct taaccagtat attaaatcct ttgtactgtt ctttggctat aaagaaaaaa   6000
ggtactgtcc agcaactgaa acctgctttc ttccatttag catacccttt ttggagacaa   6060
attatgcaca gttgcaactc ttcgtgaaac ctatggtgaa atggctgact gctgtgcaaa   6120
acaagaacct gagagaaatg aatgcttctt gcaacacaaa gatgacaacc caaacctccc   6180
ccgattggtg agaccagagg ttgatgtgat gtgcactgct tttcatgaca atgaagagac   6240
atttttgaaa aagtaagtaa tcagatgttt atagttcaaa attaaaaagc atggagtaac   6300
tccataggcc aacactctat aaaaattacc ataacaaaaa tattttcaac attaagactt   6360
ggaagttttg ttatgatgat tttttaaaga agtagtattt gataccacaa aattctacac   6420
agcaaaaaat atgatcaaag atattttgaa gtttattgaa acaggataca atctttctga   6480
aaaatttaag atagacaaat tatttaatgt attacgaaga tatgtatata tggttgttat   6540
aattgatttc gttttagtca gcaacattat attgccaaaa tttaaccatt tatgcacaca   6600
cacacacaca cacacacact taaccctttt ttccacatac ttaaagaatg acagagacaa   6660
gaccatcatg tgcaaattga gcttaattgg ttaattagat atctttggaa tttggaggtt   6720
ctggggagaa tgtcgattac aattatttct gtaatattgt ctgctataga aaagtgactg   6780
tttttctttt tcaaaattta gatacttata tgaaattgcc agaagacatc cttactttta   6840
tgccccggaa ctccttttct ttgctaaaag gtataaagct gcttttacag aatgttgcca   6900
agctgctgat aaagctgcct gcctgttgcc aaaggtatta tgcaaaagaa tagaaaaaaa   6960
gagttcatta tccaacctga ttttgtccat tttgtggcta gatttaggga acctgagtgt   7020
ctgatacaaa ctttccgaca tggtcaaaaa agccttcctt ttatctgtct tgaaaatctt   7080
tcatctttga aggcctacac tctcgtttct tcttttaaga tttgccaatg atgatctgtc   7140
agaggtaatc actgtgcatg tgtttaaaga tttcaccact ttttatggtg gtgatcacta   7200
tagtgaaata ctgaaacttg tttgtcaaat tgcacagcaa ggggacacag ttcttgttta   7260
tcttttcatg ataattttta gtagggaggg aattcaaagt agagaatttt actgcatcta   7320
gatgcctgag ttcatgcatt cattccataa atatatatta tggaatgctt tattttcttt   7380
tctgaggagt ttactgatgt tggtggagga gagactgaaa tgaattatac acaaaattta   7440
aaaattagca aaattgcagc ccctgggata ttagcgtact ctttctctga cttttctccc   7500
acttttaagg ctctttttcc tggcaatgtt tccagttggt ttctaactac atagggaatt   7560
ccgctgtgac cagaatgatc gaatgatctt tccttttctt agagagcaaa atcattattc   7620
gctaaaggga gtacttggga atttaggcat aaattatgcc ttcaaaattt aatttggcac   7680
agtctcatct gagcttatgg aggggtgttt catgtagaat ttttcttcta attttcatca   7740
aattattcct ttttgtagct cgatgaactt cgggatgaag ggaaggcttc gtctgccaaa   7800
cagagactca agtgtgccag tctccaaaaa tttggagaaa gagctttcaa agcatggtaa   7860
```

-continued

```
atacttttaa acatagttgg catctttata acgatgtaaa tgataatgct tcagtgacaa   7920
attgtacatt tttatgtatt ttgcaaagtg ctgtcaaata catttctttg gttgtctaac   7980
aggtagaact ctaatagagg taaaaatcag aatatcaatg acaatttgac attattttta   8040
atcttttctt ttctaaatag ttgaataatt tagaggacgc tgtccttttt gtcctaaaaa   8100
aagggacaga tatttaagtt ctatttattt ataaaatctt ggactcttat tctaatggtt   8160
cattattttt atagagctgt aggcatggtt ctttatttaa ttttttaaag ttatttttaa   8220
tttttgtgga tacagagtag gtatacatat ttacggggta tatgagatat tttgatataa   8280
gtatacaaca tatataatcc ctttatttaa ttttatcttc cccccaatga tctaaaacta   8340
tttgcttgtc cttttatgtc ttatagttaa attcagtcac caactaagtt gaagttactt   8400
cttatttttg catagctcca gctctgatct tcatctcatg tttttgcctg agcctctgtt   8460
ttcatattac ttagttggtt ctgggagcat actttaatag ccgagtcaag aaaaatacta   8520
gctgccccgt cacccacact cctcacctgc tagtcaacag caaatcaaca caacaggaaa   8580
taaaatgaaa ataatagaca ttatgcatgc tctctagaaa ctgtcaattg aactgtattt   8640
gctcatcatt cctaccatct acaccaccaa aatcaaccaa atttatgaaa aaaaaacagc   8700
cccaacataa aattatacac agataaacag gctatgattg gttttgggaa agaagtcacc   8760
tttacctgat ttaggcaact gtgaaatgac tagagaatga agaaaattag acgtttacat   8820
cttgtcatag agtttgaaga tagtgctgga tctttctttt tataagtaag atcaataaaa   8880
actccctcat tctgtagaag ttatgatttc ttttctaaga gacctttaga agtcagaaaa   8940
aatgtgtttc aattgagaaa aaagataact ggagtttgtg tagtacttcc cagattataa   9000
aatgcttttg tatgtattat ctaatttaat cctcaaaact tcttcaattt agcatgttgt   9060
catgacactg cagaggctga agctcagaga cgctgagccc tctgctaaca agtcctactg   9120
ctaacaagtg ataaagccag agctggaagt cacatctgga ctccaaacct gatgcttctc   9180
agcctgttgc cccttttaga gttccttttt aatttctgct tttatgactt gctagatttc   9240
tacctaccac acacactctt aaatggataa ttctgcccta aggataagtg attaccattt   9300
ggttcagaac tagaactaat gaattttaaa aattatttct gtatgtccat tttgaatttt   9360
cttatgagaa atagtatttg cctagtgttt tcatataaaa tatcgcatga taataccatt   9420
ttgattggcg attttctttt tagggcagta gctcgcctga gccagagatt tcccaaagct   9480
gagtttgcag aagtttccaa gttagtgaca gatcttacca aagtccacac ggaatgctgc   9540
catggagatc tgcttgaatg tgctgatgac agggtaaaga gtcgtcgata tgctttttgg   9600
tagcttgcat gctcaagttg gtagaatgga tgcgtttggt atcattggtg atagctgaca   9660
gtgggttgag attgtcttct gtgctttcgt ctgtcctatc ttcaatcttt ccctgcctat   9720
ggtggtggta cctttctgtt tttaacctgc tataaattac cagataaacc cattcactga   9780
tttgtaactc ctttcagtca tgctctaact gtaaatgaag gcttaaactg aagtagaaca   9840
gttacaaggt tttacttggc agaacatctt gcaaggtaga tgtctaagaa gatttttttt   9900
tctttttttta agacagagtt tcgctcttgt ttcccaggct ggggtgcaat ggtgtgatct   9960
tggctcagcg caacctctgc ctcctgggtt caagtgattt tcatgcctca gcctcccaag  10020
tagctgggat tacaggcatg cgccaccaca cctggctaat tttgtatttt tagtagaggc  10080
ggggtttcac catattgtcc agactggtct cgaactcctg acctcaggtg atccacccgc  10140
cttggcctcc caaagtgctg ggattacagg catgagccac cttgcccagc ctaagaagat  10200
tttttgaggg aggtaggtgg acttggagaa ggtcactact tgaagagatt tttggaaatg  10260
```

```
atgtattttt cttctctata ttccttccct taattaactc tgtttgttag atgtgcaaat  10320
atttggaatg atatctcttt tctcaaaact tataatattt tctttctccc tttcttcaag  10380
attaaactta tgggcaaata ctagaatcct aatctctcat ggcactttct ggaaaattta  10440
aggcggttat tttatatatg taagcagggc ctatgactat gatcttgact catttttcaa  10500
aaatcttcta tattttattt agttatttgg tttcaaaagg cctgcactta attttggggg  10560
attatttgga aaaacagcat tgagttttaa tgaaaaaaac ttaaatgccc taacagtaga  10620
aacataaaat taataaataa ctgagctgag cacctgctac tgattagtct attttaatta  10680
agtgggaatg tttttgtagt cctatctaca tctccaggtt taggagcaaa cagagtatgt  10740
tcatagaagg aatatgtgta tggtcttaga atacaatgaa catgttctgc caacttaata  10800
aaggtctgag gagaaagtgt agcaatgtca attcgtgttg aacaatttcc accaacttac  10860
ttataggcgg accttgccaa gtatatctgt gaaaatcaag attcgatctc cagtaaactg  10920
aaggaatgct gtgaaaaacc tctgttggaa aaatcccact gcattgccga agtggaaaat  10980
gatgagatgc ctgctgactt gccttcatta gctgctgatt ttgttgaaag taaggatgtt  11040
tgcaaaaact atgctgaggc aaaggatgtc ttcctgggca tgtaagtaga taagaaatta  11100
ttcttttata gctttggcat gacctcacaa cttaggagga tagcctaggc ttttctgtgg  11160
agttgctaca atttccctgc tgcccagaat gtttcttcat ccttcccttt cccaggcttt  11220
aacaattttt gaaatagtta attagttgaa tacattgtca taaaataata catgttcacg  11280
gcaaagctca acattcctta ctccttaggg gtatttctga aaatacgtct agaaacattt  11340
tgtgtatata taaattatgt atacttcagt cattcattcc aagtgtattt cttgaacatc  11400
tataatatat gtgtgtgact atgtattgcc tgtctatcta actaatctaa tctaatctag  11460
tctatctatc taatctatgc aatgatagca aagaagtata aaaagaaata tagagtctga  11520
cacaggtgct ttatatttgg tgaaaagacc agaagttcag tataatggca atatggtagg  11580
caactcaatt acaaaataaa tgtttacgta ttgtcagaag ttgtggtgat aaactgcatt  11640
tttgttgttg gattatgata atgcactaaa taatatttcc taaaattatg taccctacaa  11700
gatttcactc atacagagaa gaaagagaat attttaagaa catatctctg cccatctatt  11760
tatcagaatc cttttgagat gtagtttaaa tcaaacaaaa tgttaataaa aataacaagt  11820
atcattcatc aaagacttca tatgtgccaa gcagtgtgtg ctttgtgtag attatgtcat  11880
atagttctca taatccacct tccgagacag atactattta ttttttgaga cagagtttta  11940
ctcttgttgc ccaggctgga gtgcaatggt gccatctcgg ctcaccacaa ccttcgcctc  12000
ccaggttcaa gcgattctcc tgcctcagcc tcctgggatt acaggcatgc accaccatgc  12060
ctggctaatt ttgtattttt agtagagatg gggtttcacc atgttggtca gactggtctc  12120
aaactcctga cctctggtga tatgcctgcc tcagcctcct aaagtgctgg gattacaggc  12180
atgagccact gtgcccagcc gacagatact attattattt ccattctacc gagaaggaga  12240
ctaaggctct gatcatttaa ataagttgcc taaggtgatg cagtgatata agtagcagag  12300
ctaggaattg agccttggta actttaactc tggaccccaa gtccttagct actaagcttt  12360
actgcatggg gtttagtcaa attaagactt ttggaatatg agttactttt gagattagct  12420
ttgtgatatt ttttgtgctc atttgtccaa caaagtctat tttattttca tcttaattag  12480
gtttttgtat gaatatgcaa gaaggcatcc tgattactct gtcgtgctgc tgctgagact  12540
tgccaagaca tatgaaacca ctctagagaa gtgctgtgcc gctgcagatc ctcatgaatg  12600
```

```
ctatgccaaa gtggtaggtt tattgttgga aaaaaatgta gttctttgac tgatgattcc  12660
aataatgaga aagaaaaata atgcaagaat gtaaaatgat atacagtgca atttagatct  12720
tttcttgaga tggtttcaat tctggaatct taaacatgaa agaaaaagta gccttagaat  12780
gattaacaaa atttagacta gttagaatag aaagatctga atagagcaat ctctaaaaaa  12840
ttttgatctt tttttctctt tttcacaatc ctgagaacaa aaaaaaatta aatttaaatg  12900
ttaattagaa gatatttaac ttagatgtaa agtgagttaa cctgattcca ggattaatca  12960
agtactagaa ttagtatctt atggcaaatt atagaaccta tccctttaga atattttcaa  13020
atctttttga ggatgtttag gaatagtttt acaagaaatt aagttaggag aggaaatctg  13080
ttctggagga tttttagggt tcccactagc atatgtaatg gtttctgaac tattcagaat  13140
cagagaaaac tcatttttcc tgctttcaag aagctactgt atgccaggca ccatgcacaa  13200
acaatgacca acgtaaaatc tctcattttg gagagcctgg aatctaactg gaaaggtgaa  13260
ctaataataa taatatgtac aatcatagcc atcatttatt aaacttttat tatatgcaag  13320
gcactgttta atttcattag cttacctggt ttacagagca gctctatgag atgagtgcca  13380
tctttgcccc tattttaggg ataaggattc cgaaatgtgg agatggtaag taaaattgca  13440
caactgaaga atgagttaca tgacttggct caaatactgg tcattgaact ccagagcctg  13500
aatattctta accacttaca tgatgcaagc tcaccaaata aatagttcga atgtattgtg  13560
acagagcggc attgatattc atctattcat gtggctttga gtaggaagaa gaaaggatat  13620
cattctgacc agaggggtga aaaacaacct gcatctgatc ctgaggcata atactattaa  13680
cacaattctt ttatgtttca gttcgatgaa tttaaacctc ttgtggaaga gcctcagaat  13740
ttaatcaaac aaaattgtga gctttttgag cagcttggag agtacaaatt ccagaatgcg  13800
taagtaattt ttattgactg attttttta tcaatttgta attatttaag acttaatata  13860
tgagccacct agcatagaac ttttaagaat gaaaatacat tgcatatttc taatcactct  13920
ttgtcaagaa agataggaga ggagagataa aatagttgat ggggtggaga ggtctatatt  13980
tgaatgtagt ctaaaaattg ttctcttaag attggaagta tgtaggctgg gagggtaaat  14040
accaaatctt ggtatatcag aactgagcat gtcccttgaa ggttaagaaa tagttaatgg  14100
gcaaatagag catggcaata ttttgtagag cagcaagtag taggccttga atagatgtcg  14160
ctcaaaaagt aatatgtaag ctgaacacaa aaatgtaaca aatgaattta gatacatatt  14220
tgaatattaa attcaggttg tttgggagat gcacctagtc tttgatggtt aaacctttcc  14280
ctccatagaa gagacagaga cagaatggct tgctggacta atgtcccaat tcaatagagt  14340
cttatctacg aaggttaaaa acaagaagag acatattata cagtagatat ttattgtgtg  14400
gctcatacac atggtgctct tctgattatg gattttagag ataataacag tgaacaagac  14460
atagtttctt tcctcgagta gattaaagtc atacattgac ttttaatggt gactggcatt  14520
cttaatacat gattattata tattaggtac catgtcagat taattataat actttactat  14580
ttttaattta acccttgaac tatccctatt gagtcagata tatttccttc cattttctac  14640
ttgtatcttt caagtttagc atatgctgat acatatgaag ctctctccag gttttattga  14700
aagaagaaat taataaattt attaatgtca ctgaattagg caactcactt tcccaagatt  14760
atgcaagtgg tacaggtgga actcaaagcc aagtttaact agttgttcag gagaatgttt  14820
tctaccctcc actaacccac tactctgcag atggagataa tatgatgaat ggaacatagc  14880
aacatcttag ttgattccgg ccaagtgttc tctgttttat ctactatgtt agacagtttc  14940
ttgccttgct gaaaacacat gacttctttt tttcaggcta ttagttcgtt acaccaagaa  15000
```

```
agtaccccaa gtgtcaactc caactcttgt agaggtctca agaaacctag gaaaagtggg  15060
cagcaaatgt tgtaaacatc ctgaagcaaa aagaatgccc tgtgcagaag actatgtgag  15120
tctttaaaaa aatataataa attaataatg aaaaaatttt acctttagat attgataatg  15180
ctagctttca taagcagaag gaagtaatgt gtgtgtgtgc atgtttgtgt gcatgtgtgt  15240
gtgcatgcac gtgtgtgtat gtgtgatatt ggcagtcaag gccccgagga tgataatttt  15300
ttttttttt ttgagacgga gtctcgcttt gttgtccagg ctggagtgca gtggtgccat  15360
ctcggctcac tgcaacctcc gcctcccaag ttcaagccat tctcctgcct cagcctccca  15420
agtagctggg actacaggtg catgccacca tgcctggcta attttttgta tttttagtag  15480
aaaatttca gcttcacctc ttttgaattt ctgctctcct gcctgttctt tagctatccg  15540
tggtcctgaa ccagttatgt gtgttgcatg agaaaacgcc agtaagtgac agagtcacca  15600
aatgctgcac agaatccttg gtgaacaggc gaccatgctt ttcagctctg gaagtcgatg  15660
aaacatacgt tcccaaagag tttaatgctg aaacattcac cttccatgca gatatatgca  15720
cactttctga gaaggagaga caaatcaaga aacaaacgtg aggagtattt cattactgca  15780
tgtgtttgta gtcttgatag caagaactgt caattcaagc tagcaacttt ttcctgaagt  15840
agtgattata tttcttagag gaaagtattg gagtgttgcc cttattatgc tgataagagt  15900
acccagaata aaatgaataa ctttttaaag acaaaatcct ctgttataat attgctaaaa  15960
ttattcagag taatattgtg gattaaagcc acaatagaat aacatgttag accatattca  16020
gtagaaaaag atgaacaatt aactgataaa tttgtgcaca tggcaaatta gttaatggga  16080
accataggag aatttatttc tagatgtaaa taattatttt aagtttgccc tatggtggcc  16140
ccacacatga gacaaacccc caagatgtga cttttgagaa tgagacttgg ataaaaaaca  16200
tgtagaaatg caagccctga agctcaactc cctattgcta tcacaggggt tataattgca  16260
taaaatttag ctatagaaag ttgctgtcat ctcttgtggg ctgtaatcat cgtctaggct  16320
taagagtaat attgcaaaac ctgtcatgcc cacacaaatc tctccctggc attgttgtct  16380
ttgcagatgt cagtgaaaga gaaccagcag ctcccatgag tttggatagc cttatttttct  16440
atagcctccc cactgaaggg agcaaagttt aagaaccaaa tataaagttt ctcatcttta  16500
tagatgagaa aaattttaaa taaagtccaa gataattaaa tttttaagga tcatttttag  16560
ctctttaata gcaataaaac tcaatatgac ataatatggc acttccaaaa tctgaataat  16620
atataattgc aatgacatac ttcttttcag agatttactg aaaagaaatt tgttgacact  16680
acataacgtg atgagtggtt tatactgatt gtttcagttg gtcttcccac caactccatg  16740
aaagtggatt ttattatcct catcatgcag atgagaatat tgagacttat agcggtatgc  16800
ctggcccaag tactcagagt tgcctggctc caagatttat aatcttaaat gatgggacta  16860
ccatccttac tctctccatt tttctatacg tgagtaatgt tttttctgtt ttttttttt  16920
ctttttccat tcaaactcag tgcacttgtt gagctcgtga aacacaagcc caaggcaaca  16980
aaagagcaac tgaaagctgt tatggatgat ttcgcagctt ttgtagagaa gtgctgcaag  17040
gctgacgata aggagacctg ctttgccgag gaggtactac agttctcttc attttaatat  17100
gtccagtatt catttttgca tgtttggtta ggctagggct tagggattta tatatcaaag  17160
gaggctttgt acatgtggga cagggatctt attttacaaa caattgtctt acaaaatgaa  17220
taaaacagca ctttgttttt atctcctgct ctattgtgcc atactgttga atgtttataa  17280
tgcatgttct gtttccaaat ttgtgatgct tatgaatatt aataggaata tttgtaaggc  17340
```

ctgaaatatt ttgatcatga aatcaaaaca ttaatttatt taaacattta cttgaaatgt 17400
ggtggtttgt gatttagttg attttatagg ctagtgggag aatttacatt caaatgtcta 17460
aatcacttaa aatttccctt tatggcctga cagtaacttt tttttattca tttggggaca 17520
actatgtccg tgagcttcca tccagagatt atagtagtaa attgtaatta aaggatatga 17580
tgcacgtgaa atcactttgc aatcatcaat agcttcataa atgttaattt tgtatcctaa 17640
tagtaatgct aatattttcc taacatctgt catgtctttg tgttcagggt aaaaaacttg 17700
ttgctgcaag tcaagctgcc ttaggcttat aacatcacat ttaaaagcat ctcaggtaac 17760
tatattttga atttttaaa aaagtaacta taatagttat tattaaaata gcaaagattg 17820
accatttcca agagccatat agaccagcac cgaccactat tctaaactat ttatgtatgt 17880
aaatattagc ttttaaaatt ctcaaaatag ttgctgagtt gggaaccact attatttcta 17940
ttttgtagat gagaaaatga agataaacat caaagcatag attaagtaat tttccaaagg 18000
gtcaaaattc aaaattgaaa ccaaggtttc agtgttgccc attgtcctgt tctgacttat 18060
atgatgcggt acacagagcc atccaagtaa gtgatggctc agcagtggaa tactctggga 18120
attaggctga accacatgaa agagtgcttt atagggcaaa aacagttgaa tatcagtgat 18180
ttcacatggt tcaacctaat agttcaactc atcctttcca ttggagaata tgatggatct 18240
accttctgtg aactttatag tgaagaatct gctattacat ttccaatttg tcaacatgct 18300
gagctttaat aggacttatc ttcttatgac aacatttatt ggtgtgtccc cttgcctagc 18360
ccaacagaag aattcagcag ccgtaagtct aggacaggct taaattgttt tcactggtgt 18420
aaattgcaga aagatgatct aagtaatttg gcatttattt taataggttt gaaaaacaca 18480
tgccatttta caaataagac ttatatttgt ccttttgttt ttcagcctac catgagaata 18540
agagaaagaa aatgaagatc aaaagcttat tcatctgttt ttctttttcg ttggtgtaaa 18600
gccaacaccc tgtctaaaaa acataaattt ctttaatcat tttgcctctt ttctctgtgc 18660
ttcaattaat aaaaaatgga aagaatctaa tagagtggta cagcactgtt atttttcaaa 18720
gatgtgttgc tatcctgaaa attctgtagg ttctgtggaa gttccagtgt tctctcttat 18780
tccacttcgg tagaggattt ctagtttctt gtgggctaat taaataaatc attaatactc 18840
ttctaagtta tggattataa acattcaaaa taatattttg acattatgat aattctgaat 18900
aaaagaacaa aaaccatggt ataggtaagg aatataaaac atggctttta ccttagaaaa 18960
aacaattcta aaattcatat ggaatcaaaa aagagcctgc ag 19002

<210> SEQ ID NO 71
<211> LENGTH: 993
<212> TYPE: PRT
<213> ORGANISM: Artificial Sequence
<220> FEATURE:
<223> OTHER INFORMATION: Synthetic: Mutant AAT-linkerAlbumin Fusion
(S283C, K335A, P361C)

<400> SEQUENCE: 71

Glu Asp Pro Gln Gly Asp Ala Ala Gln Lys Thr Asp Thr Ser His His
1 5 10 15

Asp Gln Asp His Pro Thr Phe Asn Lys Ile Thr Pro Asn Leu Ala Glu
20 25 30

Phe Ala Phe Ser Leu Tyr Arg Gln Leu Ala His Gln Ser Asn Ser Thr
35 40 45

Asn Ile Phe Phe Ser Pro Val Ser Ile Ala Thr Ala Phe Ala Met Leu
50 55 60

-continued

```
Ser Leu Gly Thr Lys Ala Asp Thr His Asp Glu Ile Leu Glu Gly Leu
65                  70                  75                  80

Asn Phe Asn Leu Thr Glu Ile Pro Glu Ala Gln Ile His Glu Gly Phe
                85                  90                  95

Gln Glu Leu Leu Arg Thr Leu Asn Gln Pro Asp Ser Gln Leu Gln Leu
            100                 105                 110

Thr Thr Gly Asn Gly Leu Phe Leu Ser Glu Gly Leu Lys Leu Val Asp
        115                 120                 125

Lys Phe Leu Glu Asp Val Lys Lys Leu Tyr His Ser Glu Ala Phe Thr
    130                 135                 140

Val Asn Phe Gly Asp Thr Glu Glu Ala Lys Lys Gln Ile Asn Asp Tyr
145                 150                 155                 160

Val Glu Lys Gly Thr Gln Gly Lys Ile Val Asp Leu Val Lys Glu Leu
                165                 170                 175

Asp Arg Asp Thr Val Phe Ala Leu Val Asn Tyr Ile Phe Phe Lys Gly
            180                 185                 190

Lys Trp Glu Arg Pro Phe Glu Val Lys Asp Thr Glu Glu Glu Asp Phe
        195                 200                 205

His Val Asp Gln Val Thr Thr Val Lys Val Pro Met Met Lys Arg Leu
    210                 215                 220

Gly Met Phe Asn Ile Gln His Ser Lys Lys Leu Ser Ser Trp Val Leu
225                 230                 235                 240

Leu Met Lys Tyr Leu Gly Asn Ala Thr Ala Ile Phe Phe Leu Pro Asp
                245                 250                 255

Glu Gly Lys Leu Gln His Leu Glu Asn Glu Leu Thr His Asp Ile Ile
            260                 265                 270

Thr Lys Phe Leu Glu Asn Glu Asp Arg Arg Cys Ala Ser Leu His Leu
        275                 280                 285

Pro Lys Leu Ser Ile Thr Gly Thr Tyr Asp Leu Lys Ser Val Leu Gly
    290                 295                 300

Gln Leu Gly Ile Thr Lys Val Phe Ser Asn Gly Ala Asp Leu Ser Gly
305                 310                 315                 320

Val Thr Glu Glu Ala Pro Leu Lys Leu Ser Lys Ala Val His Ala Ala
                325                 330                 335

Val Leu Thr Ile Asp Glu Lys Gly Thr Glu Ala Ala Gly Ala Val Phe
            340                 345                 350

Leu Glu Ala Ile Pro Leu Ser Ile Cys Pro Glu Val Lys Phe Asn Lys
        355                 360                 365

Pro Phe Val Phe Leu Met Ile Glu Gln Asn Thr Lys Ser Pro Leu Phe
    370                 375                 380

Met Gly Lys Val Val Asn Pro Thr Gln Lys Gly Gly Ser Gly Gly Ser
385                 390                 395                 400

Gly Gly Ser Gly Gly Ser Gly Gly Asp Ala His Lys Ser Glu Val Ala
                405                 410                 415

His Arg Phe Lys Asp Leu Gly Glu Glu Asn Phe Lys Ala Leu Val Leu
            420                 425                 430

Ile Ala Phe Ala Gln Tyr Leu Gln Gln Cys Pro Phe Glu Asp His Val
        435                 440                 445

Lys Leu Val Asn Glu Val Thr Glu Phe Ala Lys Thr Cys Val Ala Asp
    450                 455                 460

Glu Ser Ala Glu Asn Cys Asp Lys Ser Leu His Thr Leu Phe Gly Asp
465                 470                 475                 480

Lys Leu Cys Thr Val Ala Thr Leu Arg Glu Thr Tyr Gly Glu Met Ala
```

```
                485                 490                 495

Asp Cys Cys Ala Lys Gln Glu Pro Glu Arg Asn Glu Cys Phe Leu Gln
            500                 505                 510

His Lys Asp Asp Asn Pro Asn Leu Pro Arg Leu Val Arg Pro Glu Val
        515                 520                 525

Asp Val Met Cys Thr Ala Phe His Asp Asn Glu Glu Thr Phe Leu Lys
    530                 535                 540

Lys Tyr Leu Tyr Glu Ile Ala Arg Arg His Pro Tyr Phe Tyr Ala Pro
545                 550                 555                 560

Glu Leu Leu Phe Phe Ala Lys Arg Tyr Lys Ala Ala Phe Thr Glu Cys
                565                 570                 575

Cys Gln Ala Ala Asp Lys Ala Ala Cys Leu Leu Pro Lys Leu Asp Glu
            580                 585                 590

Leu Arg Asp Glu Gly Lys Ala Ser Ser Ala Lys Gln Arg Leu Lys Cys
        595                 600                 605

Ala Ser Leu Gln Lys Phe Gly Glu Arg Ala Phe Lys Ala Trp Ala Val
    610                 615                 620

Ala Arg Leu Ser Gln Arg Phe Pro Lys Ala Glu Phe Ala Glu Val Ser
625                 630                 635                 640

Lys Leu Val Thr Asp Leu Thr Lys Val His Thr Glu Cys Cys His Gly
                645                 650                 655

Asp Leu Leu Glu Cys Ala Asp Asp Arg Ala Asp Leu Ala Lys Tyr Ile
            660                 665                 670

Cys Glu Asn Gln Asp Ser Ile Ser Ser Lys Leu Lys Glu Cys Cys Glu
        675                 680                 685

Lys Pro Leu Leu Glu Lys Ser His Cys Ile Ala Glu Val Glu Asn Asp
    690                 695                 700

Glu Met Pro Ala Asp Leu Pro Ser Leu Ala Ala Asp Phe Val Glu Ser
705                 710                 715                 720

Lys Asp Val Cys Lys Asn Tyr Ala Glu Ala Lys Asp Val Phe Leu Gly
                725                 730                 735

Met Phe Leu Tyr Glu Tyr Ala Arg Arg His Pro Asp Tyr Ser Val Val
            740                 745                 750

Leu Leu Leu Arg Leu Ala Lys Thr Tyr Glu Thr Thr Leu Glu Lys Cys
        755                 760                 765

Cys Ala Ala Ala Asp Pro His Glu Cys Tyr Ala Lys Val Phe Asp Glu
    770                 775                 780

Phe Lys Pro Leu Val Glu Glu Pro Gln Asn Leu Ile Lys Gln Asn Cys
785                 790                 795                 800

Glu Leu Phe Glu Gln Leu Gly Glu Tyr Lys Phe Gln Asn Ala Leu Leu
                805                 810                 815

Val Arg Tyr Thr Lys Lys Val Pro Gln Val Ser Thr Pro Thr Leu Val
            820                 825                 830

Glu Val Ser Arg Asn Leu Gly Lys Val Gly Ser Lys Cys Cys Lys His
        835                 840                 845

Pro Glu Ala Lys Arg Met Pro Cys Ala Glu Asp Tyr Leu Ser Val Val
    850                 855                 860

Leu Asn Gln Leu Cys Val Leu His Glu Lys Thr Pro Val Ser Asp Arg
865                 870                 875                 880

Val Thr Lys Cys Cys Thr Glu Ser Leu Val Asn Arg Arg Pro Cys Phe
                885                 890                 895

Ser Ala Leu Glu Val Asp Glu Thr Tyr Val Pro Lys Glu Phe Asn Ala
            900                 905                 910
```

-continued

```
Glu Thr Phe Thr Phe His Ala Asp Ile Cys Thr Leu Ser Glu Lys Glu
        915                 920                 925

Arg Gln Ile Lys Lys Gln Thr Ala Leu Val Glu Leu Val Lys His Lys
    930                 935                 940

Pro Lys Ala Thr Lys Glu Gln Leu Lys Ala Val Met Asp Asp Phe Ala
945                 950                 955                 960

Ala Phe Val Glu Lys Cys Cys Lys Ala Asp Asp Lys Glu Thr Cys Phe
                965                 970                 975

Ala Glu Glu Gly Lys Lys Leu Val Ala Ala Ser Gln Ala Ala Leu Gly
            980                 985                 990

Leu
```